(12) United States Patent
Saitoh

(10) Patent No.: US 10,844,936 B2
(45) Date of Patent: Nov. 24, 2020

(54) CONSTANT MESH TYPE TRANSMISSION FOR STRADDLED VEHICLE WITH RATCHET MECHANISM

(71) Applicant: YAMAHA HATSUDOKI KABUSHIKI KAISHA, Iwata (JP)

(72) Inventor: Tetsushi Saitoh, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 415 days.

(21) Appl. No.: 15/884,100

(22) Filed: Jan. 30, 2018

(65) Prior Publication Data

US 2018/0216708 A1    Aug. 2, 2018

(30) Foreign Application Priority Data

Jan. 30, 2017    (JP) .................................. 2017-014125

(51) Int. Cl.
*F16H 3/10* (2006.01)
*F16H 61/04* (2006.01)
(Continued)

(52) U.S. Cl.
CPC ............. *F16H 3/10* (2013.01); *F16H 57/021* (2013.01); *F16H 57/031* (2013.01); *F16H 57/0424* (2013.01); *F16H 61/0403* (2013.01); *F16H 63/18* (2013.01); *F16H 63/30* (2013.01); *F16H 63/32* (2013.01); *F16H 3/089* (2013.01); *F16H 2057/02065* (2013.01);
(Continued)

(58) Field of Classification Search
CPC . F16H 3/10; F16H 63/30; F16H 3/089; F16H 57/0424; F16H 63/18; F16H 57/031; F16H 2063/3093; F16H 2063/3096; F16H 57/021; F16H 2057/02065; F16H 2200/0013; F16H 2200/0052; B60Y 2200/12

See application file for complete search history.

(56) References Cited

U.S. PATENT DOCUMENTS 8,561,492 B2 * 10/2013 Matsumoto ............. F16H 3/083
  74/325
2011/0011193 A1    1/2011 Matsumoto
(Continued)

FOREIGN PATENT DOCUMENTS

JP    2007120549 A    5/2007
JP    2009243654 A    10/2009
(Continued)

*Primary Examiner* — Victor L MacArthur
(74) *Attorney, Agent, or Firm* — Rabin & Berdo, P.C.

(57) ABSTRACT

A constant-mesh type transmission for straddled vehicle with a ratchet mechanism is configured to be mounted on a straddled vehicle and has five or more gear stages in addition to a neutral position. The transmission includes an input shaft; five or more drive gears; an output shaft; an odd-numbered stage hub and an even-numbered stage hub; a plurality of odd-numbered stage driven gears; a plurality of even-numbered stage driven gears; a dog engagement mechanism; and a ratchet mechanism. The ratchet mechanism has an odd-numbered stage accelerating pawl, an odd-numbered stage decelerating pawl, an even-numbered stage accelerating pawl, an even-numbered stage decelerating pawl, and a ratchet control mechanism.

22 Claims, 94 Drawing Sheets

(51) Int. Cl.
    *F16H 63/18*     (2006.01)
    *F16H 57/021*     (2012.01)
    *F16H 57/04*     (2010.01)
    *F16H 63/32*     (2006.01)
    *F16H 57/031*     (2012.01)
    *F16H 63/30*     (2006.01)
    *F16H 3/089*     (2006.01)
    *F16H 57/02*     (2012.01)

(52) U.S. Cl.
    CPC ............... *F16H 2063/3093* (2013.01); *F16H 2063/3096* (2013.01); *F16H 2200/0013* (2013.01); *F16H 2200/0052* (2013.01)

(56) References Cited

U.S. PATENT DOCUMENTS

| | | | |
|---|---|---|---|
| 2011/0023639 A1* | 2/2011 | Matsumoto | F16H 3/083 74/337.5 |
| 2012/0240697 A1* | 9/2012 | Yamasaki | F16D 1/108 74/325 |
| 2013/0139627 A1 | 6/2013 | Saitoh | |

FOREIGN PATENT DOCUMENTS

| | | |
|---|---|---|
| JP | 2011-33094 A | 2/2011 |
| JP | 2016161100 A | 9/2016 |

\* cited by examiner

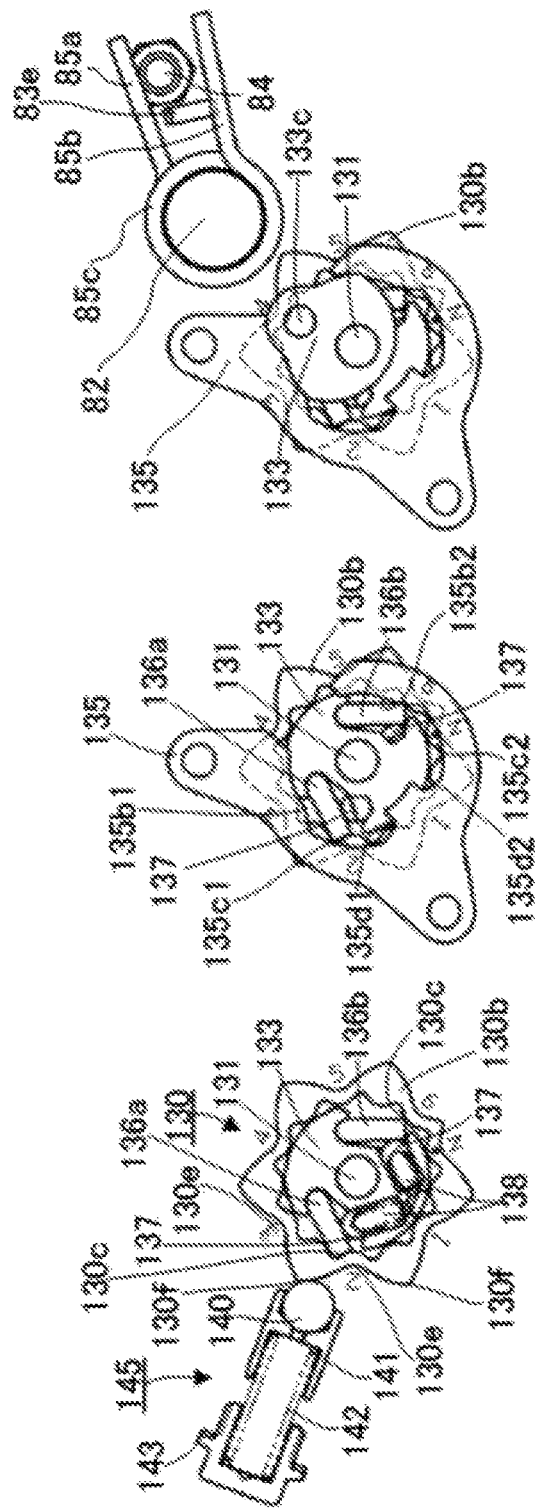

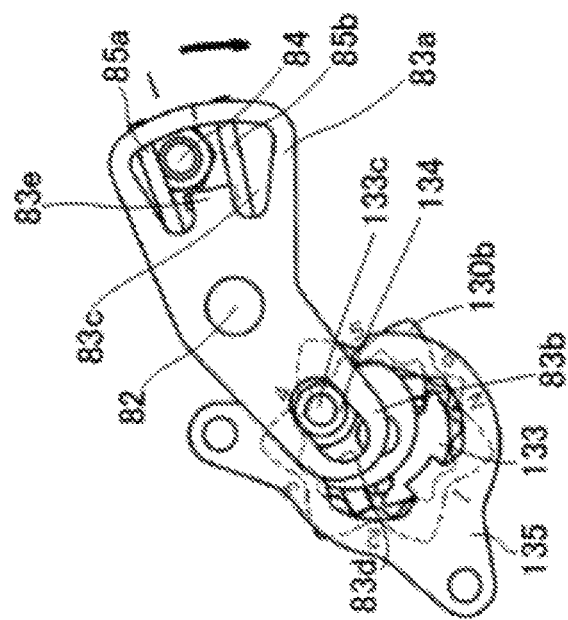

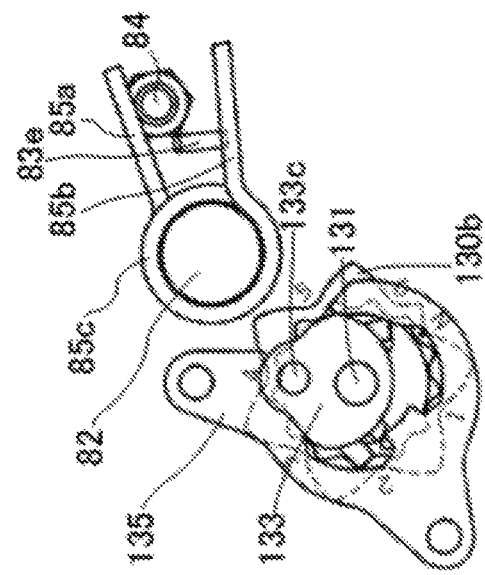
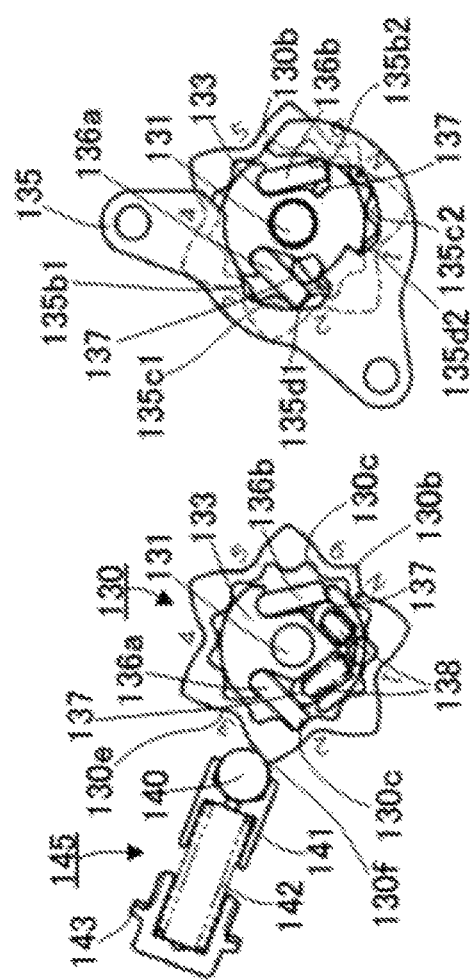
FIG.15C
FIG.15B
FIG.15A

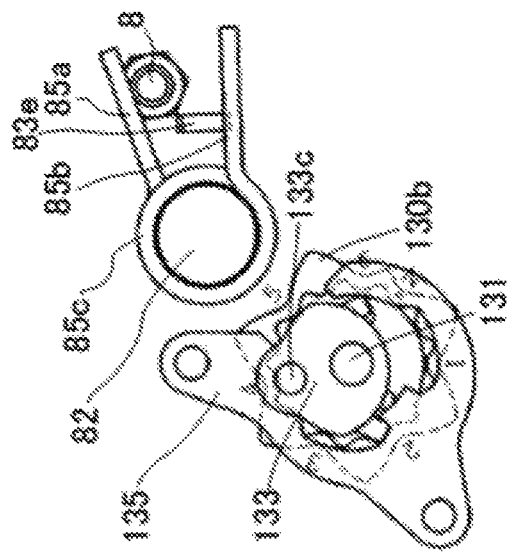
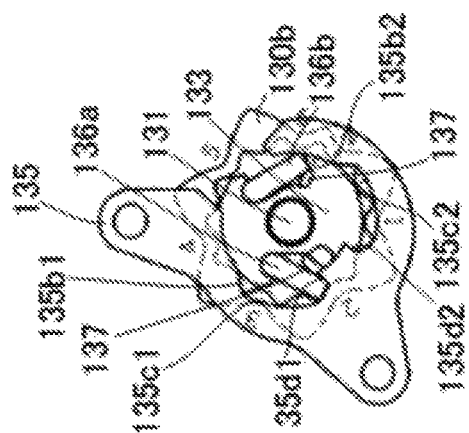
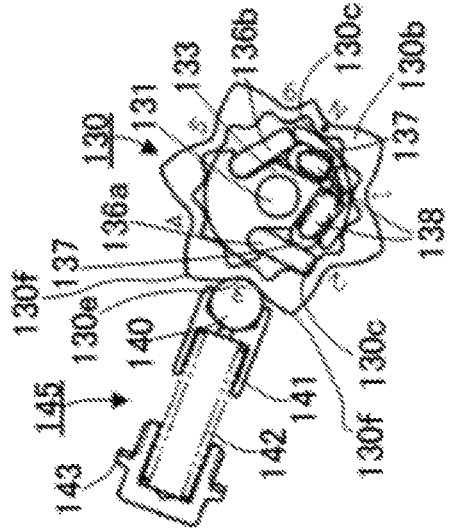
FIG. 16C
FIG. 16B
FIG. 16A

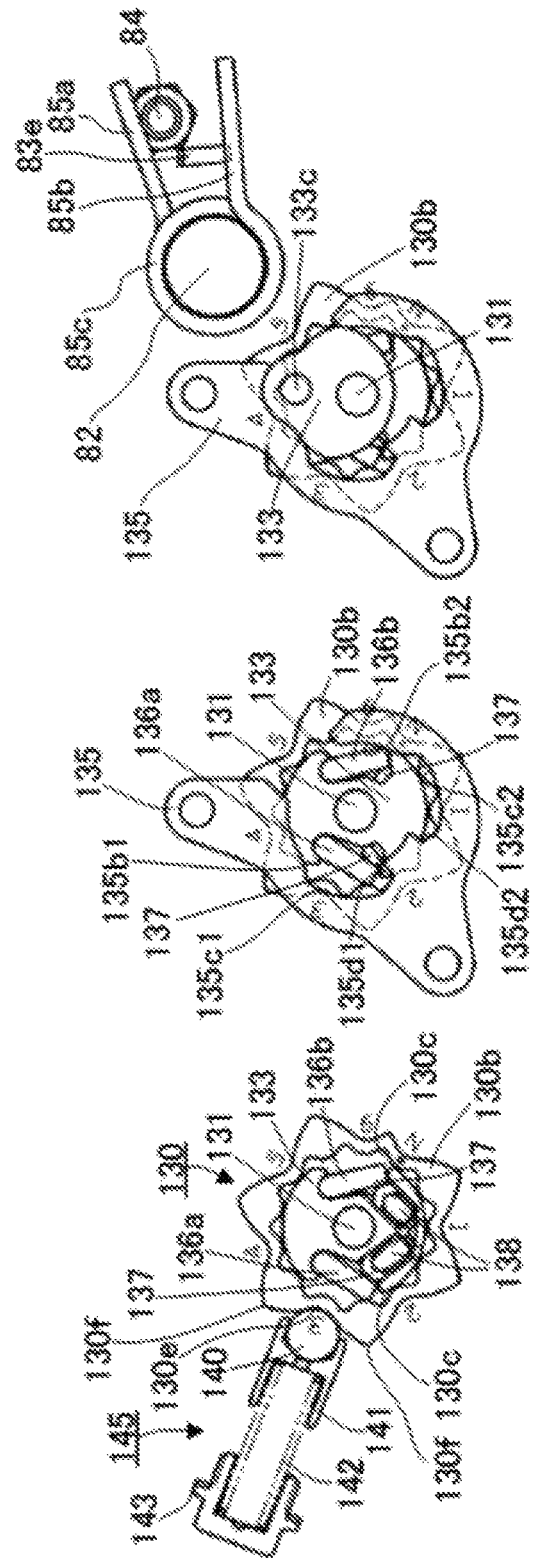

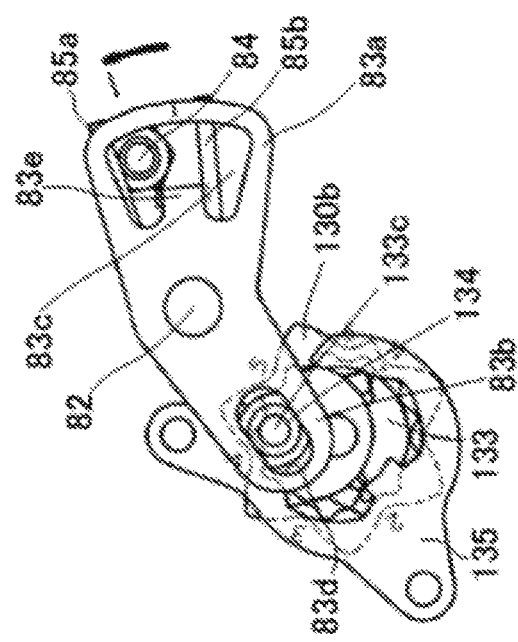

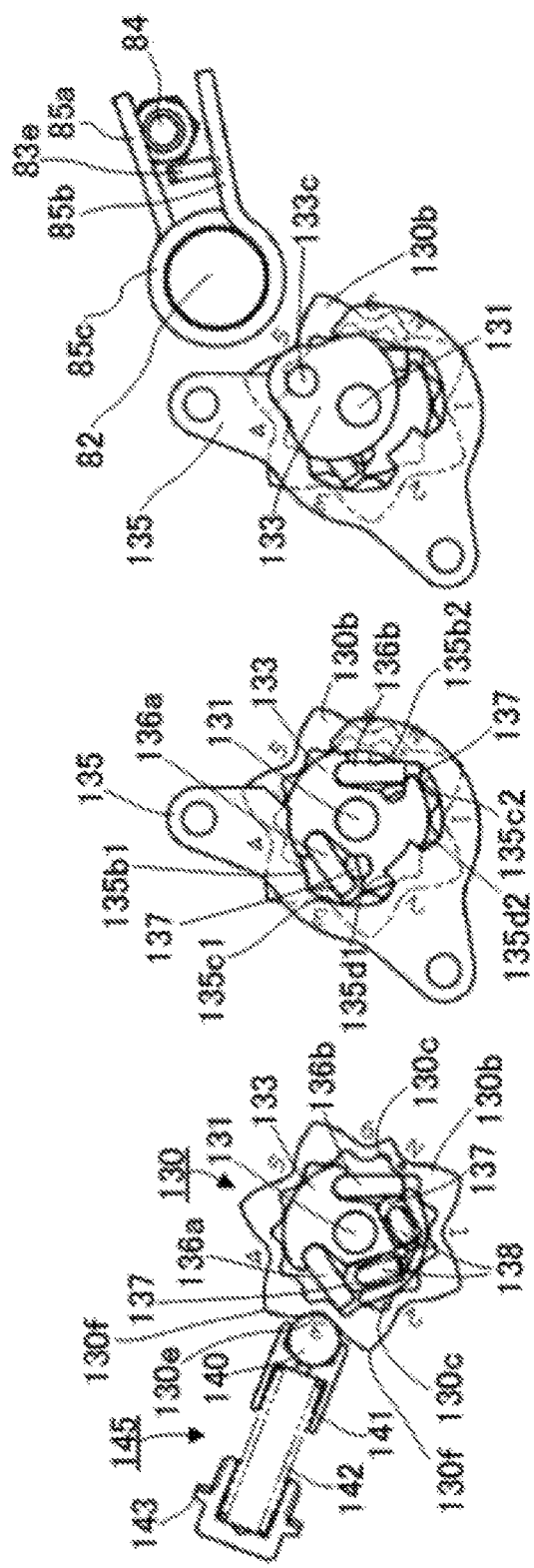

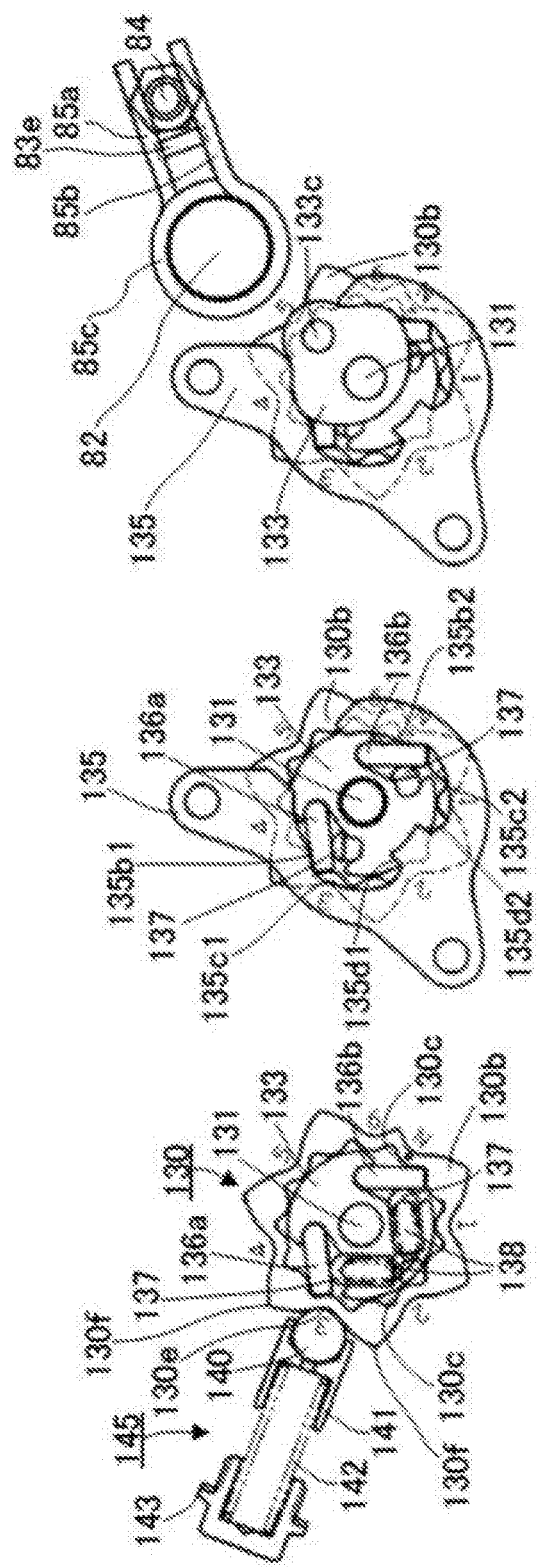

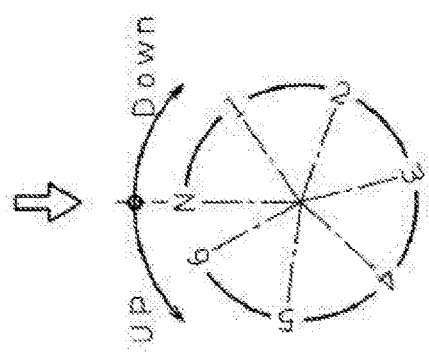
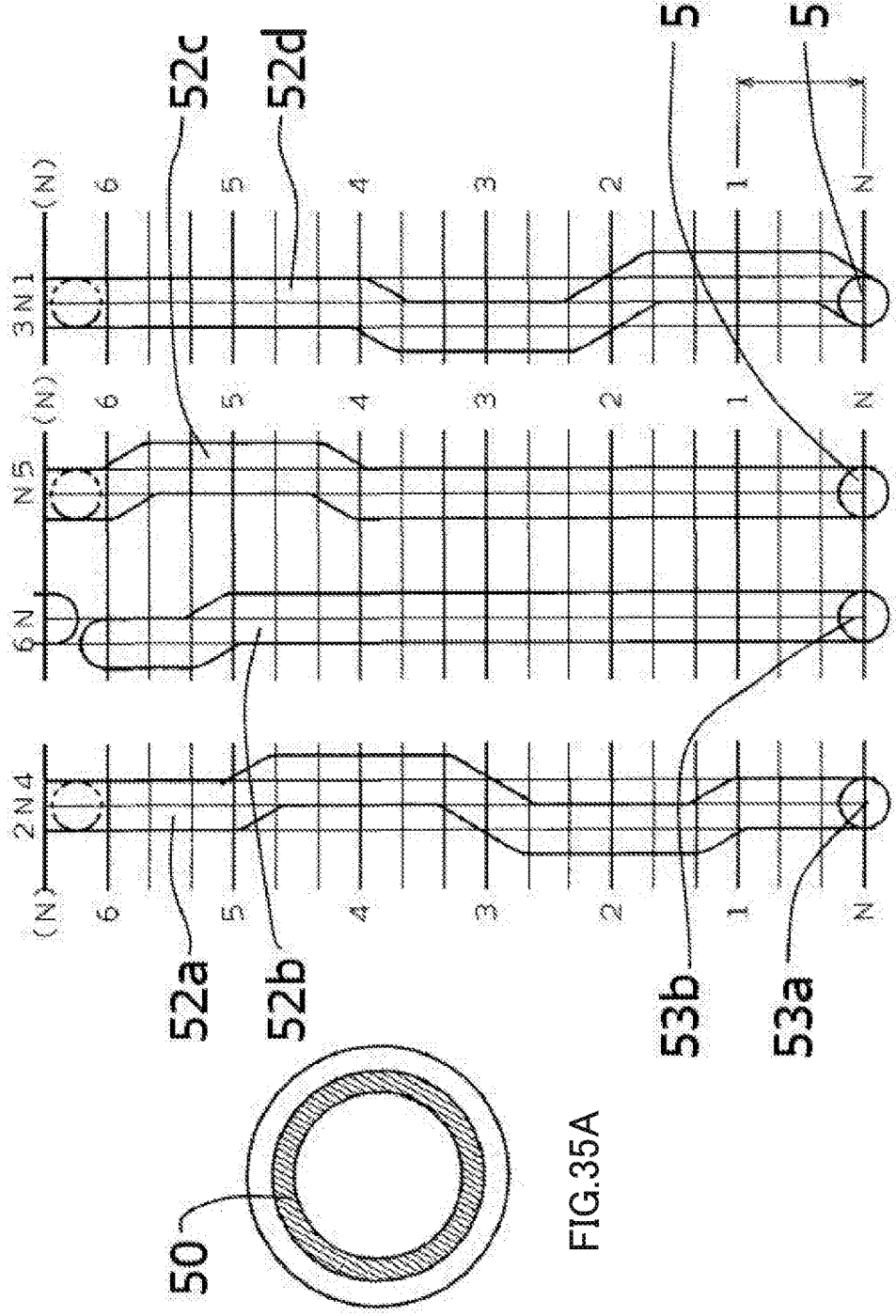
FIG.35A FIG.35B FIG.35C

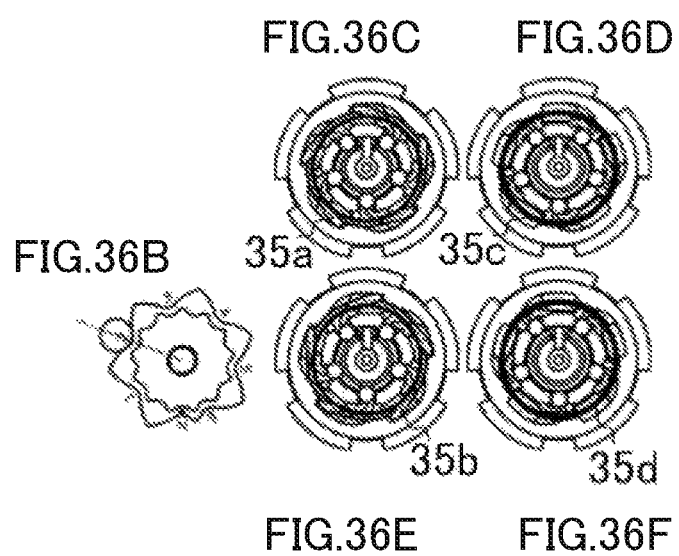

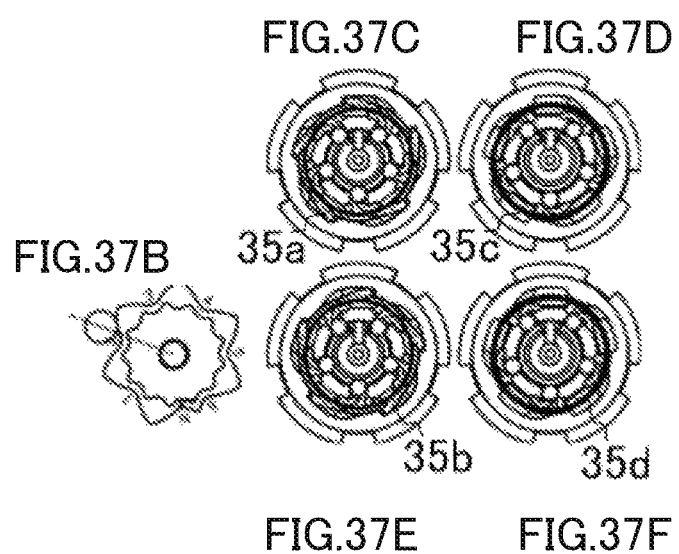

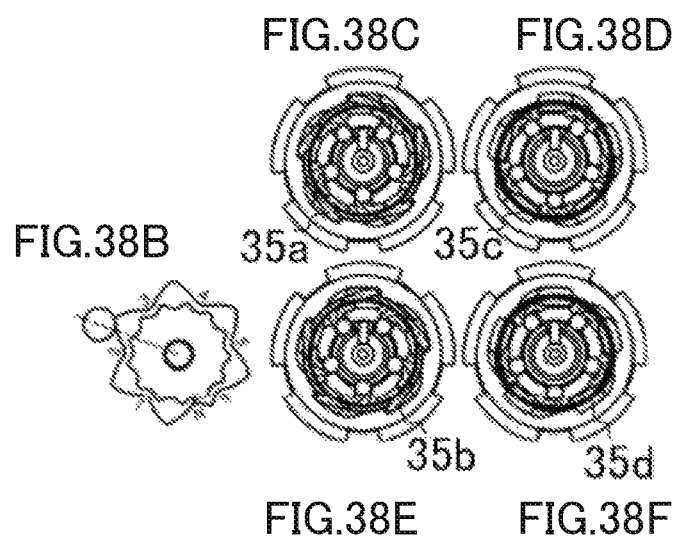

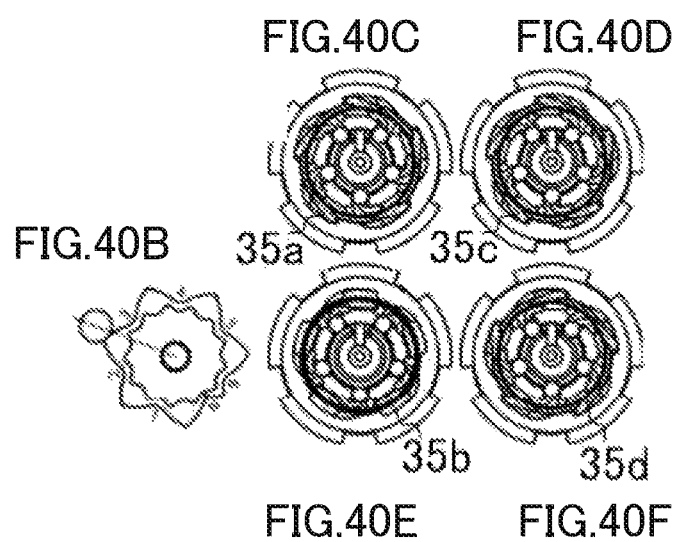

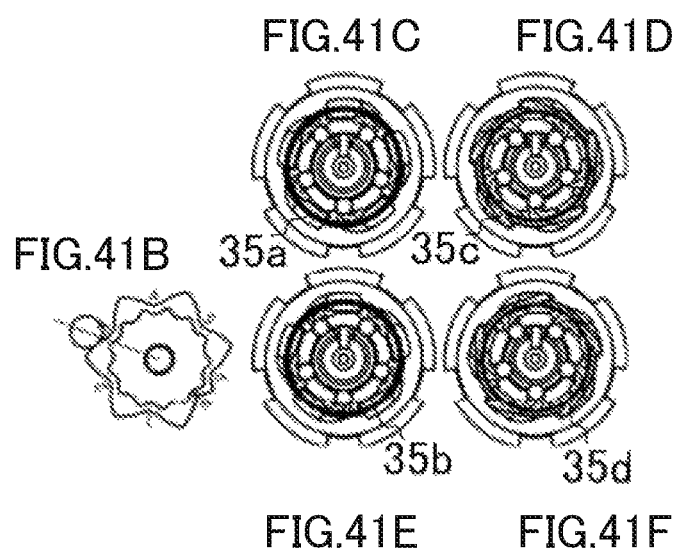

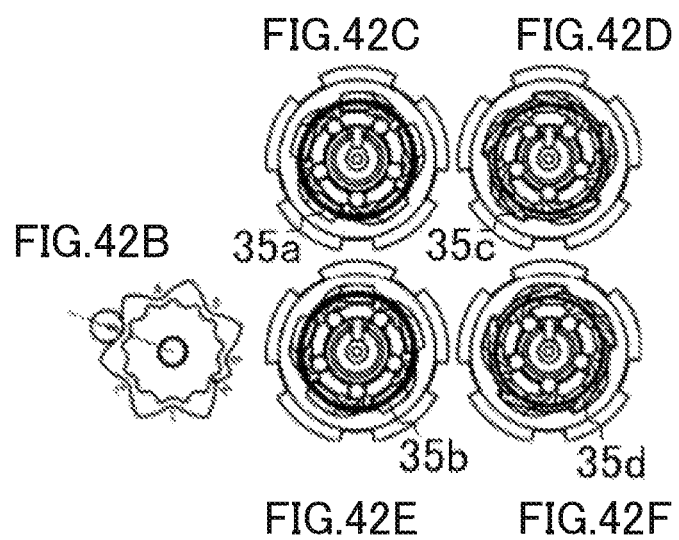

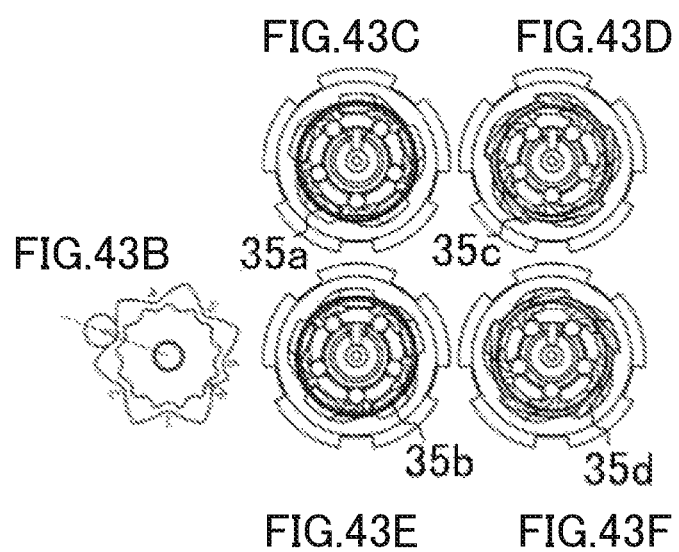

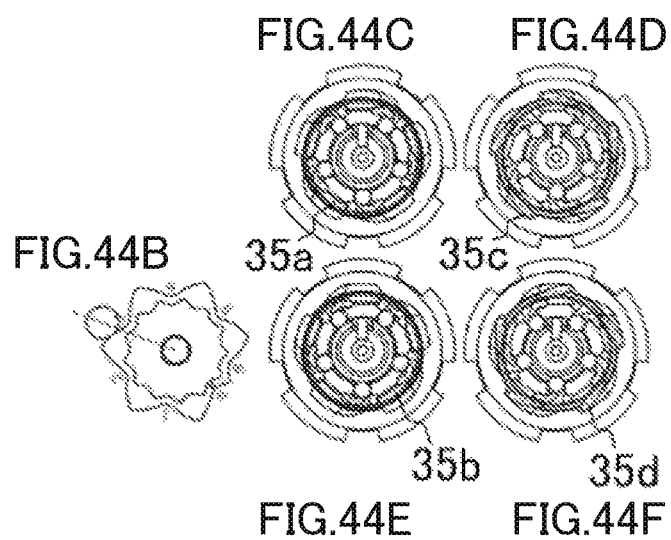

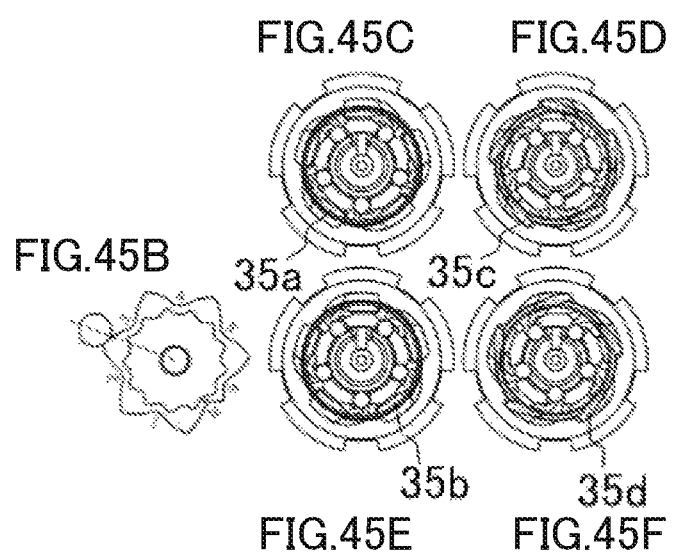

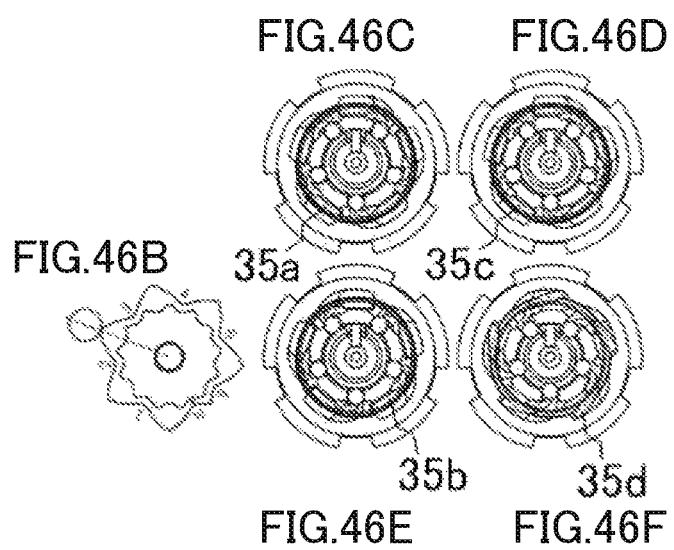

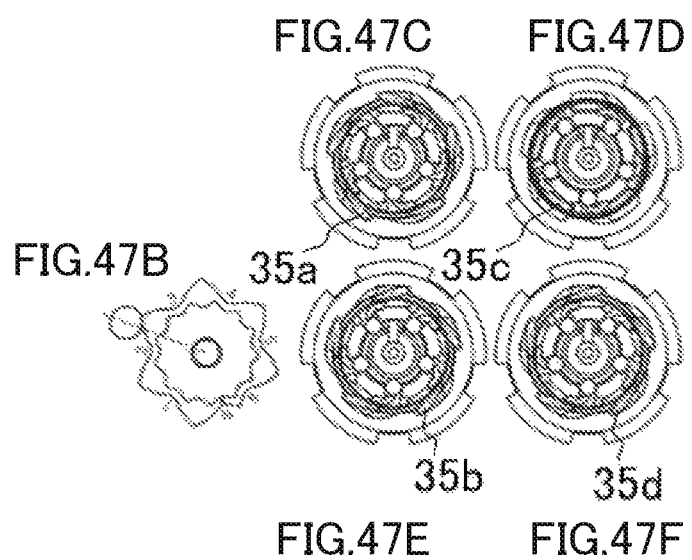

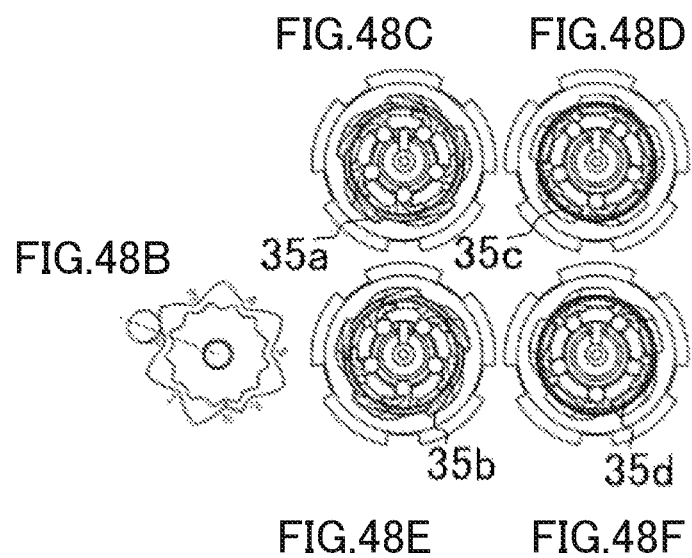

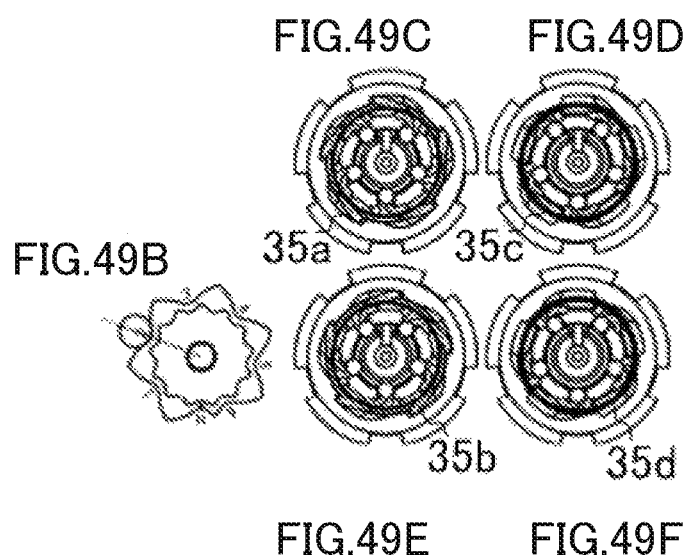

CONSTANT MESH TYPE TRANSMISSION FOR STRADDLED VEHICLE WITH RATCHET MECHANISM

TECHNICAL FIELD

The present teaching relates to a constant-mesh type transmission for straddled vehicle with a ratchet mechanism, the transmission being configured to be mounted on a straddled vehicle and having five or more gear stages in addition to a neutral position.

BACKGROUND

Patent Document 1 discloses a constant-mesh type transmission with a ratchet mechanism. In the transmission of Patent Document 1, first to sixth drive transmission gears that rotate integrally with a main gear shaft are constantly meshed respectively with first to sixth driven transmission gears that are rotatably and pivotally supported on a counter gear shaft.

The counter gear shaft serving as an output shaft has a hollow cylindrical shape. Inside the counter gear shaft, engagement means (engagement claw portions, pin members, compression springs) engageable with the respective driven transmission gears are provided. Inside the counter gear shaft, eight cam rods are provided movably in an axial direction. The eight cam rods are composed of two forward rotation odd-numbered stage cam rods, two forward rotation even-numbered stage cam rods, two reverse rotation odd-numbered stage cam rods, and two reverse rotation even-numbered stage cam rods.

Inside the counter gear shaft, moreover, a control rod is provided movably in the axial direction. When a shift drum, which is disposed outside the counter gear shaft, is rotated by a predetermined amount as a result of a manual operation on a shift select lever, the control rod accordingly moves in the axial direction by a predetermined amount. Consequently, each of the cam rods moves in the axial direction by a predetermined amount. As each of the cam rods moves in the axial direction, the corresponding pin member swings or pivots the corresponding engagement claw portion. Thus, engagement/disengagement between each engagement means and each driven transmission gear is switched. As a result, gear shifting, also referred to as changing speed is implemented.

PRIOR ART DOCUMENTS

Patent Documents

Patent Document 1: Japanese Patent Application Laid-Open No. 2011-33094

SUMMARY OF THE INVENTION

Problems to be Solved by the Invention

In a constant-mesh type transmission for straddled vehicle with a ratchet mechanism, when a pawl is raised, a member associated with power transmission is engaged with an output shaft by the pawl. Power transmission is caused accordingly. When the pawl is lowered or retracted, the engagement between the members is cancelled, so that the power transmission is blocked. A pivoting operation of the pawl is mechanically controlled in this manner in the ratchet mechanism.

Examples of a mechanism for causing power transmission between the members except the ratchet mechanism include a mechanism in which a roll member (so-called roller) is provided between the members. In this mechanism, when the members rotate relative to each other, the roll member gets into a gap between the members. This restricts relative rotation between the members, so that power transmission is caused between the members. When the members rotate relative to each other in opposite directions, the roll member gets out of the gap between the members. This cancels the restriction on the relative rotation between the members, so that the power transmission between the members stops. In this mechanism, movement of the roll member is caused by friction between the roll member and the members, and therefore the strength (depth) by which the roll member is pinched between the members may vary. In a case where the roll member gets strongly into the gap between the members, it might be difficult for the roll member to get out of the gap between the members, which raises a risk that setting or cancellation of power transmission cannot be switched smoothly.

In the ratchet mechanism, on the other hand, the swing operation of the pawl is controlled mechanically, and therefore it is easy to smoothly switch setting or cancellation of power transmission. Accordingly, the constant-mesh type transmission for straddled vehicle with the ratchet mechanism provides a relatively good stability to a gear shifting operation. Adoption of the ratchet mechanism, however, is likely to increase the number of component parts, and thus likely to cause structural complexity.

Particularly for commercial usage, unlike for racing usage, covering not only power-on upshift and power-off downshift but also power-on downshift and power-off upshift, which means covering all gear shifting patterns, is required. It is necessary to enable the pawl to be operated in accordance with each gear shifting pattern, which however tends to cause structural complexity.

A straddled vehicle such as a motorcycle is, due to the vehicle characteristics, generally under severe restriction in terms of its weight and an installation space for the transmission, etc. It therefore is preferable that the constant-mesh type transmission for straddled vehicle is as small and light as possible, that is, has a good mountability to a vehicle. In a transmission having a complicated structure, however, component parts need to be downsized in order to achieve a good mountability to a vehicle. Particularly in a transmission having five or more gear stages in addition to a neutral position, the need to downsize component parts is significant.

Downsizing the component parts, however, raises a problem that a manufacturing process becomes cumbersome. With commercial applications taken into account, the manufacturing process is preferably as least cumbersome as possible.

Downsizing the component parts, moreover, raises a risk that it might be difficult to obtain a sufficient robustness (structural toughness and operation stability). In a transmission for racing usage, a robustness adapted for a race can be obtained by frequently performing maintenance and replacement of the transmission. Thus, a complicated structure which requires a high precision is allowed. For commercial usage, on the other hand, it is necessary to respond to various situations. With commercial applications taken into account, therefore, it is preferable to obtain a sufficient robustness of the transmission itself.

As above, in consideration of commercial usage, it is preferable that a constant-mesh type transmission for straddled vehicle with a ratchet mechanism satisfies covering all gear shifting patterns, ensuring a mountability to a vehicle, reducing structural complexity, making a manufacturing process less cumbersome, and ensuring a robustness. In this respect, the transmission of Patent Document 1 has, inside the counter gear shaft, the engagement means (engagement claw portions, pin members, compression springs) each provided for each driven transmission gear and the eight cam rods in addition to the control rod. It is difficult for the transmission of Patent Document 1 which has a quite complicated structure to satisfy the aforesaid requirements.

It is an objective of the present teaching to provide a constant-mesh type transmission for straddled vehicle with a ratchet mechanism, capable of satisfying covering all gear shifting patterns, ensuring a mountability to vehicle, reducing structural complexity, making a manufacturing process less cumbersome, and ensuring a robustness.

Means for Solving the Problems

To accomplish the objective described above, the present teaching adopts the following configurations.

(1) Embodiments of the present teaching include a constant-mesh type transmission for straddled vehicle with a ratchet mechanism. The transmission is configured to be mounted on a straddled vehicle and includes five or more gear stages in addition to a neutral position. The transmission includes an input shaft disposed in a rotatable manner, and configured to receive power from a crankshaft and five or more drive gears disposed on the input shaft so as to be coaxial with the input shaft, and configured to constantly rotate together with the input shaft or rotate relative to the input shaft, each of the drive gears corresponding to each gear stage of odd-numbered stages and even-numbered stages. An output shaft is disposed in a rotatable manner on an axial parallel to the input shaft, and an odd-numbered stage hub and an even-numbered stage hub that receive the output shaft inside with respect to a diameter direction are supported on the output shaft so as to be coaxial with the output shaft and rotatable relative to the output shaft, the odd-numbered stage hub and the even-numbered stage hub being arranged side by side in an axial direction of the output shaft so as to be rotatable relative to each other. A plurality of odd-numbered stage driven gears are supported on the odd-numbered stage hub so as to be coaxial with the odd-numbered stage hub at a location outside the odd-numbered stage hub with respect to a diameter direction, the plurality of odd-numbered stage driven gears being constantly meshed with corresponding ones of the odd-numbered stage drive gears, the plurality of odd-numbered stage driven gears being configured such that the odd-numbered stage driven gear rotates relative to the odd-numbered stage hub when the corresponding odd-numbered stage drive gear constantly rotates together with the input shaft, and such that the odd-numbered stage driven gear constantly rotates together with the odd-numbered stage hub when the corresponding odd-numbered stage drive gear rotates relative to the input shaft. The constant-mesh type transmission further includes a plurality of even-numbered stage driven gears supported on the even-numbered stage hub so as to be coaxial with the even-numbered stage hub at a location outside the even-numbered stage hub with respect to a diameter direction, the plurality of even-numbered stage driven gears being constantly meshed with corresponding ones of the even-numbered stage drive gears, the plurality of even-numbered stage driven gears being configured such that the even-numbered stage driven gear rotates relative to the even-numbered stage hub when the corresponding even-numbered stage drive gear constantly rotates together with the input shaft, and such that the even-numbered stage driven gear constantly rotates together with the even-numbered stage hub when the corresponding even-numbered stage drive gear rotates relative to the input shaft. The constant-mesh type transmission further includes a dog engagement mechanism that, by dog engagement, selectively sets power transmission active from the input shaft to the odd-numbered stage hub corresponding to one odd-numbered stage or power transmission active from the input shaft to the even-numbered stage hub corresponding to one even-numbered stage, the dog engagement mechanism being configured to restrict either one of relative rotation between the odd-numbered stage driven gear and the odd-numbered stage hub or relative rotation between the odd-numbered stage drive gear and the input shaft when the power transmission from the input shaft to the odd-numbered stage hub corresponding to one odd-numbered stage is set active, and to restrict either one of relative rotation between the even-numbered stage driven gear and the even-numbered stage hub or relative rotation between the even-numbered stage drive gear and the input shaft when the power transmission from the input shaft to the even-numbered stage hub corresponding to one even-numbered stage is set active. The constant-mesh type transmission further includes a ratchet mechanism including an odd-numbered stage accelerating pawl, an odd-numbered stage decelerating pawl, an even-numbered stage accelerating pawl, an even-numbered stage decelerating pawl, and a ratchet control mechanism, the odd-numbered stage accelerating pawl being pivotable so as to, when raised, allow acceleration-directed power to be transmitted between the output shaft and the odd-numbered stage hub and, when lowered, not allow the power to be transmitted therebetween, the odd-numbered stage decelerating pawl being pivotable so as to, when raised, allow deceleration-directed power to be transmitted between the output shaft and the odd-numbered stage hub and, when lowered, not allow the power to be transmitted therebetween, the even-numbered stage accelerating pawl being pivotable so as to, when raised, allow acceleration-directed power to be transmitted between the output shaft and the even-numbered stage hub and, when lowered, not allow the power to be transmitted therebetween, the even-numbered stage decelerating pawl being pivotable so as to, when raised, allow deceleration-directed power to be transmitted between the output shaft and the even-numbered stage hub and, when lowered, not allow the power to be transmitted therebetween, the ratchet control mechanism being configured to mechanically switch raising or lowering of the odd-numbered stage accelerating pawl, the odd-numbered stage decelerating pawl, the even-numbered stage accelerating pawl, and the even-numbered stage decelerating pawl in a case of shifting up and in a case of shifting down such that relative rotation between the output shaft and either one of the odd-numbered stage hub or the even-numbered stage hub is selectively restricted.

The transmission may have five or more gear stages. Since the number of odd-numbered stages is equal to or greater than three, the number of odd-numbered stage driven gears is equal to or greater than three. Since the number of even-numbered stages is equal to or greater than two, the number of even-numbered stage driven gears is equal to or greater than two. The transmission includes the odd-numbered stage hub and the even-numbered stage hub that are supported on the output shaft so as to rotate relative to the output shaft. Of all the odd-numbered stage driven gears, two or more odd-numbered stage driven gears are disposed on the odd-numbered stage hub so as to be rotatable relative to the odd-numbered stage hub. That is, all or part of the odd-numbered stage driven gears are disposed so as to be rotatable relative to the odd-numbered stage hub. In a case where part of the odd-numbered stage driven gears are disposed so as to be rotatable relative to the odd-numbered stage hub, the rest of the odd-numbered stage driven gears is disposed on the odd-numbered stage hub so as to rotate together with the odd-numbered stage hub. Of all the even-numbered stage driven gears, two or more even-numbered stage driven gears are disposed on the even-numbered stage hub so as to be rotatable relative to the even-numbered stage hub. That is, all or part of the even-numbered stage driven gears are disposed so as to be rotatable relative to the even-numbered stage hub. In a case where part of the even-numbered stage driven gears are disposed so as to be rotatable relative to the even-numbered stage hub, the rest of the even-numbered stage driven gears is disposed on the even-numbered stage hub so as to rotate together with the even-numbered stage hub. Thus, a power transmission path from the input shaft to the output shaft in the transmission is divided into paths corresponding to the odd-numbered stages and paths corresponding to the even-numbered stages.

The paths corresponding to the odd-numbered stages extend through "input shaft" →"any one of three or more odd-numbered stage drive gears" →"odd-numbered stage driven gear corresponding to the one odd-numbered stage drive gear" →"odd-numbered stage hub" →"output shaft". The paths corresponding to the even-numbered stages extend through "input shaft" →"any one of two or more even-numbered stage drive gears" →"even-numbered stage driven gear corresponding to the one even-numbered stage drive gear" →"even-numbered stage hub" →"output shaft".

In a case of not shifting gears with any one odd-numbered stage selected, the dog engagement mechanism sets power transmission active through, among the paths corresponding to the odd-numbered stages, the path of "input shaft" →"selected odd-numbered stage drive gear" → "selected odd-numbered stage driven gear" →"odd-numbered stage hub". At this time, the ratchet mechanism sets power transmission active through the path of "odd-numbered stage hub" →"output shaft". In a case of not shifting gears with any one even-numbered stage selected, the dog engagement mechanism sets power transmission active through, among the paths corresponding to the even-numbered stages, the path of "input shaft" →"selected even-numbered stage drive gear" →"selected even-numbered stage driven gear" →"even-numbered stage hub". At this time, the ratchet mechanism sets power transmission active through the path of "even-numbered stage hub" →"output shaft".

In a case of shifting gears, the dog engagement mechanism restricts relative rotation through, of the path of "input shaft" →"selected odd-numbered stage drive gear" → "selected odd-numbered stage driven gear" →"odd-numbered stage hub" and the path of "input shaft" →"selected even-numbered stage drive gear" →"selected even-numbered stage driven gear" →"even-numbered stage hub", the path corresponding to a target gear stage to which the speed is to be changed, while cancelling restriction on relative rotation through the path corresponding to an original gear stage from which the speed is to be changed. At this time, the ratchet mechanism restricts relative rotation through, of the path of "odd-numbered stage hub" →"output shaft" and the path of "even-numbered stage hub" →"output shaft", the path corresponding to the target gear stage to which the speed is to be changed, while cancelling restriction on relative rotation through the path corresponding to the original gear stage from which the speed is to be changed. In this manner, entire power transmission through the power transmission paths from the input shaft to the output shaft is performed by the dog engagement mechanism and the ratchet mechanism.

The ratchet mechanism includes four types of pawls, namely, the odd-numbered stage accelerating pawl, the odd-numbered stage decelerating pawl, the even-numbered stage accelerating pawl, and the even-numbered stage decelerating pawl. The ratchet mechanism includes not only accelerating pawls corresponding to the respective hubs but also decelerating pawls corresponding to the respective hubs. Accordingly, a gear shifting operation for deceleration as well as a gear shifting operation for acceleration can be implemented by the dog engagement mechanism and the ratchet mechanism. The transmission of (1) is able to cover all gear shifting patterns. The gear shifting operation for acceleration is performed in a power-on state where acceleration-directed power is transmitted through the power transmission path. The gear shifting operation for deceleration is performed in a power-off state where deceleration-directed power is transmitted through the power transmission path.

In the transmission, the gear shifting operations for both acceleration and deceleration may be implemented by the ratchet mechanism having the four types of pawls and the dog engagement mechanism. The gear shifting operations for both acceleration and deceleration mean both the gear shifting operation performed in the power-on state and the gear shifting operation performed in the power-off state. The transmission of does not need accelerating pawls and decelerating pawls corresponding to each of the five or more gear stages, that is, ten or more types of pawls. If ten or more types of pawls were provided, disposing the respective types at different positions with respect to the axial direction results in ten or more pawls being arranged side by side in the axial direction. In such a case, it is necessary to increase the size of the transmission with respect to the axial direction, or to reduce the size of the pawl. If different types of pawls are disposed at the same position with respect to the axial direction and different positions with respect to the circumferential direction, a structure for controlling raising or lowering of each pawl is complicated. Increasing the number of pawl types makes it difficult to obtain both ensuring a mountability to vehicle and reducing structural complexity.

In this respect, the transmission may have four types of pawls. Thus, the number of component parts inside the output shaft can be reduced, and structural complexity inside the output shaft can be reduced. It therefore is easy to keep a certain size of each component part inside the output shaft while suppressing a size increase of the entire transmission. Accordingly, the transmission may adequately cover all gear shifting patterns, ensuring a mountability to a vehicle, and reducing structural complexity. The reduction of structural complexity can achieve making a manufacturing process less cumbersome, and ensuring a robustness.

Preferably, the present teaching may further adopt the following configurations.

The transmission may include a synchronization mechanism that mechanically synchronizes an operation of the ratchet mechanism with an operation of the dog engagement mechanism.

In the transmission, an operation of the ratchet mechanism and an operation of the dog engagement mechanism are synchronized with each other in a mechanical manner. This can provide a higher robustness in the operation of the transmission. Here, the synchronization between the operation of the ratchet mechanism and the operation of the dog engagement mechanism means that, to shift gears in accordance with a shift operation inputted, the ratchet mechanism and the dog engagement mechanism operate in coordination with each other in accordance with the shift operation. Thus, it suffices that the operation of the ratchet mechanism and the operation of the dog engagement mechanism are performed in accordance with the same shift operation. They may not always need to be performed at the same timing, and may be performed at different timings.

The dog engagement mechanism of the transmission may include a shift cam having, in an outer peripheral surface thereof, a plurality of cam portions extending in a circumferential direction, the shift cam being in parallel to the output shaft and configured to rotate in a case of shifting up and in a case of shifting down such that a rotation direction in the case of shifting up and a rotation direction in the case of shifting down are opposite to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position in a case of shifting gears.

The ratchet control mechanism may include a rotary cam that is received inside the output shaft with respect to a diameter direction so as to be coaxial with the output shaft, the rotary cam being configured to rotate in a case of shifting up and in a case of shifting down such that a rotation direction in the case of shifting up and a rotation direction in the case of shifting down are reverse to each other, the rotary cam having, in an outer peripheral surface thereof, a plurality of cam portions each corresponding to each of the odd-numbered stage accelerating pawl, the odd-numbered stage decelerating pawl, the even-numbered stage accelerating pawl, and the even-numbered stage decelerating pawl, the plurality of cam portions being for separately controlling raising or lowering of each of the pawls, the rotary cam having set on the outer peripheral surface thereof V odd-numbered stage positions corresponding to the odd-numbered stages and V even-numbered stage positions corresponding to the even-numbered stages, the V odd-numbered stage positions and the V even-numbered stage positions being set at different positions with respect to a circumferential direction.

In one embodiment, V is a positive integer equal to or less than the number of gear stages provided in the transmission, the gear stages provided in the transmission including a neutral position.

The V odd-numbered stage positions and the V even-numbered stage positions may be alternately arranged on the outer peripheral surface of the rotary cam and distant from each other by W° with respect to the circumferential direction, where W satisfies the following expression A:

$$W=360/2V \qquad \text{A.}$$

The dog engagement mechanism may perform a gear shifting operation by rotating the shift cam through the predetermined angle at a time of each one stage shifting, and the ratchet mechanism may perform a gear shifting operation by rotating the rotary cam through W° in coordination with rotation of the shift cam through the predetermined angle via the synchronization mechanism.

Each of the operation of the dog engagement mechanism and the raising or lowering of the respective pawls in the ratchet mechanism may be mechanically controlled by a mechanical element embodied by the shift cam and the rotary cam. In addition, rotations of the shift cam and the rotary cam may be mechanically synchronized by the synchronization mechanism. This can provide a higher robustness in the operation of the transmission.

The rotary cam has, on the outer peripheral surface of the rotary cam, the V odd-numbered stage positions and the V even-numbered stage positions that are alternately arranged and distant from each other by W° with respect to the circumferential direction, and the rotary cam is configured such that its rotation direction differs between in a case of shifting up and in a case of shifting down. The ratchet mechanism performs the gear shifting operation by the rotary cam rotating through W°. When V is one, W is 180(°). When V is two, W is 90(°). When V is three, W is 60(°). In the transmission of (3), the odd-numbered stage positions and the even-numbered stage positions are arranged at regular intervals over the full circumferential range 360° on the outer peripheral surface of the rotary cam. Therefore, as a circumferential length of the rotary cam corresponding to one stage shifting, a long length is obtained. This enables reduction in the diameter of the rotary cam while ensuring a stability in controlling the operation of the pawls by the rotary cam. A higher robustness can be obtained with improvement in mountability to vehicle. V is not particularly limited except that it is a positive integer equal to or less than the number of gear stages provided in the transmission, but preferably V is one or more and three or less, and more preferably V is one. This is because such a condition can provide a longer length as the circumferential length of the rotary cam corresponding to one stage shifting. In a later-described embodiment, V is one.

The dog engagement mechanism of the transmission may sequentially set a gear stage for which power transmission is to be activated in each of the odd-numbered stages and the even-numbered stages by the shapes of the cam portions of the shift cam and the phase angle of the shift cam. The transmission may include a phase-holding mechanism that holds the shift cam at the gear stage position corresponding to any one gear stage among the five or more gear stages in a case of not shifting gears. The rotary cam may be held at the odd-numbered stage position or the even-numbered stage position corresponding to the one gear stage by the phase-holding mechanism via the synchronization mechanism in a case of not shifting gears.

The synchronization mechanism may mechanically achieve synchronization between the holding of the gear stage by the dog engagement mechanism and the holding of the raised or lowered state of each pawl in the ratchet mechanism. This provides a higher robustness in the operation of the transmission. Since there is no need to separately provide means for holding the raised or lowered state of each pawl, structural complexity can be suppressed.

The output shaft may have, on one end side thereof with respect to the axial direction of the output shaft, a power output part that outputs power to a drive wheel of the straddled vehicle, and the synchronization mechanism may couple the dog engagement mechanism and the ratchet mechanism to each other on the other end side of the output shaft with respect to the axial direction.

The power output part and the synchronization mechanism may be separately disposed on the respective end sides of the output shaft with respect to the axial direction. This can suppress structural complexity while suppressing a size increase of the transmission, as compared with disposing the power output part and the synchronization mechanism on one end side of the output shaft with respect to the axial direction.

The dog engagement mechanism may include a shift cam having, in an outer peripheral surface thereof, a plurality of cam portions extending in a circumferential direction, the shift cam being in parallel to the output shaft and configured to rotate in a case of shifting up and in a case of shifting down such that a rotation direction in the case of shifting up and a rotation direction in the case of shifting down are reverse or opposite to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position in a case of shifting gears. At least one dog ring may be configured to be in dog engagement with any one of the drive gears or any one of the driven gears, as a result of moving in the axial direction of the output shaft. At least one shift fork may be engaged with the cam portion of the shift cam so as to be moved in the axial direction by the cam portion of the shift cam, and engaged with the dog ring with respect to the axial direction, the at least one shift fork being configured to move the dog ring in the axial direction by being moved in the axial direction by the cam portion of the shift cam. A fork guide shaft may support the shift fork so as to guide movement of the shift fork in the axial direction, and the synchronization mechanism may include a plurality of speed-increasing gears, at least one of the speed-increasing gears being disposed coaxially with the fork guide shaft.

In the transmission of (6), the at least one speed-increasing gear included in the synchronization mechanism is disposed coaxially with the fork guide shaft. This can suppress structural complexity.

In a case of shifting gears, the dog engagement mechanism may simultaneously restrict relative rotation of at most two gear stages corresponding to the one odd-numbered stage and the one even-numbered stage.

While relative rotations in one odd-numbered stage and one even-numbered stage are simultaneously restricted by the dog engagement mechanism, the ratchet mechanism can switch a path for which relative rotation is to be restricted, between the path from the odd-numbered stage hub to the output shaft and the path from the even-numbered stage hub to the output shaft. This enables the gear shifting operation to be performed more smoothly. Adoption of a structure enabling such a smooth gear shifting operation can provide a higher robustness.

The dog engagement mechanism may include a first dog ring disposed outside the odd-numbered stage hub with respect to a diameter direction such that relative rotation between the first dog ring and the odd-numbered stage hub is restricted and the first dog ring is movable in an axial direction of the odd-numbered stage hub, the first dog ring being configured to move in the axial direction of the odd-numbered stage hub to come into dog engagement with one of the plurality of odd-numbered stage driven gears, to restrict relative rotation between the one of the plurality of odd-numbered stage driven gears and the odd-numbered stage hub. A second dog ring may be disposed outside the even-numbered stage hub with respect to a diameter direction such that relative rotation between the second dog ring and the even-numbered stage hub is restricted and the second dog ring is movable in an axial direction of the even-numbered stage hub, the second dog ring being configured to move in the axial direction of the even-numbered stage hub to come into dog engagement with one of the plurality of even-numbered stage driven gears, to restrict relative rotation between the one of the plurality of even-numbered stage driven gears and the even-numbered stage hub. A third dog ring may be disposed outside the input shaft with respect to a diameter direction such that relative rotation between the third dog ring and the input shaft is restricted and the third dog ring is movable in an axial direction of the input shaft, the third dog ring being configured to move in the axial direction of the input shaft to come into dog engagement with, among the odd-numbered stage drive gears, one drive gear that is rotatable relative to the input shaft, to restrict relative rotation between the drive gear and the input shaft. A fourth dog ring is disposed outside the input shaft with respect to a diameter direction such that relative rotation between the fourth dog ring and the input shaft is restricted and the fourth dog ring is movable in the axial direction of the input shaft, the fourth dog ring being configured to move in the axial direction of the input shaft to come into dog engagement with, among the even-numbered stage drive gears, one drive gear that is rotatable relative to the input shaft, to restrict relative rotation between the drive gear and the input shaft. A shift cam may have, in an outer peripheral surface thereof, a plurality of cam portions extending in a circumferential direction, the shift cam being in parallel to the output shaft and configured to rotate in a case of shifting up and in a case of shifting down such that a rotation direction in the case of shifting up and a rotation direction in the case of shifting down are reverse or opposite to each other, the shift cam having a plurality of gear stage positions arranged apart from one another by a predetermined angle with respect to the circumferential direction such that each of the plurality of gear stage positions corresponds to each of the plurality of gear stages, the shift cam being configured to rotate through the predetermined angle from one gear stage position among the plurality of gear stage positions to a gear stage position adjacent to the one gear stage position in a case of shifting gears. A first shift fork may be engaged with the cam portion of the shift cam so as to be moved in the axial direction by the cam portion of the shift cam, and engaged with the first dog ring with respect to the axial direction, the first shift fork being configured to move the first dog ring in the axial direction by being moved in the axial direction by the cam portion of the shift cam. A second shift fork may be engaged with the cam portion of the shift cam so as to be moved in the axial direction by the cam portion of the shift cam, and engaged with the second dog ring with respect to the axial direction, the second shift fork being configured to move the second dog ring in the axial direction by being moved in the axial direction by the cam portion of the shift cam. A third shift fork may be engaged with the cam portion of the shift cam so as to be moved in the axial direction by the cam portion of the shift cam, and engaged with the third dog ring with respect to the axial direction, the third shift fork being configured to move the third dog ring in the axial direction by being moved in the axial direction by the cam portion of the shift cam. A fourth shift fork may be engaged with the cam portion of the shift cam so as to be moved in the axial direction by the cam portion of the shift cam, and engaged with the fourth dog ring with respect to the axial direction, the fourth shift fork being configured to move the fourth dog ring in the axial direction by being moved in the axial direction by the cam portion of the shift cam.

The first dog ring, the second dog ring, the shift cam, the first shift fork, and the second shift fork may cause relative rotation between any one hub and at most any one driven gear to be mechanically restricted, while a combination of the hub and the driven gear between which relative rotation is restricted is mechanically switched. Furthermore, by the third dog ring, the fourth dog ring, the shift cam, the third shift fork, and the fourth shift fork, relative rotation between the input shaft and the drive gear that is rotatable relative to the input shaft is mechanically restricted, while a combination of the input shaft and the drive gear between which relative rotation is restricted is mechanically switched. This can provide a higher robustness.

The first dog ring moves in the axial direction of the odd-numbered stage hub to come into dog engagement with a first-speed driven gear or a third-speed driven gear, to restrict relative rotation between the first-speed driven gear and the odd-numbered stage hub or between the third-speed driven gear and the odd-numbered stage hub. The second dog ring moves in the axial direction of the even-numbered stage hub to come into dog engagement with a second-speed driven gear or a fourth-speed driven gear, to restrict relative rotation between the second-speed driven gear and the even-numbered stage hub or between the fourth-speed driven gear and the even-numbered stage hub. The third dog ring moves in the axial direction of the input shaft to come into dog engagement with a fifth-speed drive gear, to restrict relative rotation between the fifth-speed drive gear and the input shaft, and the fourth dog ring moves in the axial direction of the input shaft to come into dog engagement with a sixth-speed drive gear, to restrict relative rotation between the sixth-speed drive gear and the input shaft.

The driven gears corresponding to first to fourth speed gear stages may have dogs that are dog-engageable with the dog rings. The drive gears corresponding to first to fourth speed gear stages have no dog. It therefore is not necessary to increase the diameter of the drive gears corresponding to the first to fourth speed gear stages because no dog need be provided. Since a size increase of the diameter of the drive gear can be prevented or suppressed, it is possible to obtain a ratio of the diameter of the driven gear to the diameter of the drive gear while preventing or suppressing a size increase of the driven gear. Accordingly, a speed reduction ratio suitable to a low-speed stage can be obtained with prevention or suppression of a size increase of the transmission. As a result, a higher mountability to a vehicle can be obtained.

The ratchet control mechanism may include a rotary cam that is received inside the output shaft with respect to a diameter direction so as to be coaxial with the output shaft, the rotary cam being configured to rotate in a case of shifting up and in a case of shifting down such that a rotation direction in the case of shifting up and a rotation direction in the case of shifting down are reverse or opposite to each other, the rotary cam having, in an outer peripheral surface thereof, a plurality of cam portions each corresponding to each of the odd-numbered stage accelerating pawl, the odd-numbered stage decelerating pawl, the even-numbered stage accelerating pawl, and the even-numbered stage decelerating pawl, the plurality of cam portions being for separately controlling raising or lowering of each of the pawls, the rotary cam having set on the outer peripheral surface thereof V odd-numbered stage positions corresponding to the odd-numbered stages and V even-numbered stage positions corresponding to the even-numbered stages, the V odd-numbered stage positions and the V even-numbered stage positions being set at different positions with respect to a circumferential direction. The ratchet control mechanism may further include a plurality of sliders each corresponding to each of the odd-numbered stage accelerating pawl, the odd-numbered stage decelerating pawl, the even-numbered stage accelerating pawl, and the even-numbered stage decelerating pawl, the plurality of sliders being disposed so as to be movable in an axial direction of the rotary cam, the plurality of sliders having guide object parts that are guided by the cam portions and, by the guide object parts guided by the cam portions, moving between a pawl-raising position and a pawl-lowering position that are set with respect to the axial direction of the rotary cam, the plurality of sliders being configured such that, when the slider moves to the pawl-raising position, the corresponding pawl is raised and, when the slider moves to the pawl-lowering position, the corresponding pawl is lowered. In one embodiment, V is a positive integer equal to or less than the number of gear stages provided in the transmission, the gear stages provided in the transmission including a neutral position.

A control concerning the raising or lowering of the four types of pawls may be mechanically performed by the rotary cam and the plurality of sliders. This can provide a higher robustness. As for V, the foregoing description applies.

The ratchet control mechanism may include a guide shaft that receives the rotary cam inside with respect to the diameter direction and holds the rotary cam such that the guide shaft is rotatable relative to the rotary cam, the guide shaft being received inside the output shaft with respect to the diameter direction, and the plurality of sliders may be provided to an outer peripheral surface of the guide shaft, and configured to move in the axial direction of the rotary cam as a result of relative rotation between the rotary cam and the guide shaft.

The control concerning the raising or lowering of the four types of pawls may be mechanically performed by the guide shaft in addition to the rotary cam and the plurality of sliders. This can provide a further higher robustness.

The plurality of cam portions of the rotary cam may be a plurality of cam grooves, each of the cam grooves having a lowered-direction drive surface and a raised-direction drive surface, the lowered-direction drive surface allowing the corresponding slider to move from the pawl-raising position to the pawl-lowering position by relative rotation between the rotary cam and the guide shaft, the raised-direction drive surface allowing the corresponding slider to move from the pawl-lowering position to the pawl-raising position by relative rotation between the rotary cam and the guide shaft. The guide shaft may have a plurality of guide holes each corresponding to each of the plurality of cam grooves, the plurality of guide holes being formed as elongated holes elongated in an axial direction and penetrating through the guide shaft in a diameter direction, and
the guide object part may extend in the diameter direction so as to pass through the guide hole and be received in the cam groove. The output shaft may have a plurality of through holes each corresponding to each of the pawls, the plurality of through holes being formed so as to penetrate through the output shaft in the diameter direction. The ratchet control mechanism may include a plurality of balls each received in the through hole of the output shaft, the plurality of balls being configured such that, when the slider moves to the pawl-lowering position, the ball abuts against the slider and moves outward with respect to the diameter direction so that the corresponding pawl is lowered and, when the slider moves to the pawl-raising position, the ball moves inward with respect to the diameter direction so that the corresponding pawl is raised.

The rotary cam may be configured to move the guide object part of the slider in the axial direction by the lowered-direction drive surface and the raised-direction drive surface of the cam groove. Along with the movement of the guide object part, the slider moves in the axial direction. Along with the movement of the slider in the axial direction, the ball moves in the diameter direction of the output shaft within the through hole formed in the output shaft. The movement of the ball in the diameter direction of the output shaft controls the raising or lowering of the corresponding pawl. Here, the ball and the slider are not engaged with respect to the diameter direction of the output shaft. Accordingly, the state where the output shaft is rotatable is maintained irrespective of raising or lowering of the pawl. Since the raising or lowering of the pawl can be controlled while the state where the output shaft is rotatable is maintained with a simple configuration, a higher robustness can be obtained regarding the raising or lowering of the pawl.

The output shaft may have, on one end side thereof with respect to the axial direction of the output shaft, a power output part that outputs power to a drive wheel of the straddled vehicle, and one end portion of the rotary cam and the guide shaft may protrude from the other end side of the output shaft in the axial direction of the output shaft. The transmission may include a casing that rotatably supports at least each of the input shaft and the output shaft and a cover member that at least partially covers, from outside of the casing, a shaft bearing and a shaft bearing hole thereof, the shaft bearing supporting the other end side of the output shaft in the casing. The transmission may have an oil passage provided in the casing, the oil passage opening into a space formed between the shaft bearing that supports the other end side of the output shaft and the cover member, and the rotary cam and the guide shaft may have oil introduction holes formed such that a lubricant supplied from the oil passage through the space is distributed to surroundings of the output shaft.

A lubricant can be supplied to surroundings of the output shaft easily and smoothly, which can provide a higher robustness.

The plurality of cam portions of the rotary cam may be formed so as to position the respective guide object parts such that the plurality of sliders raise an accelerating pawl and a decelerating pawl corresponding to a selected gear stage and lower an accelerating pawl and a decelerating pawl corresponding to a non-selected gear stage, either in a case of not shifting gears with the odd-numbered stage selected or in a case of not shifting gears with the even-numbered stage selected. The plurality of cam portions may further be formed so as to provide movement paths through which the guide object parts move in the cam portions, the movement paths being different between shifting-up and shifting-down to and from the odd-numbered stage and the even-numbered stage, the movement paths being provided such that, either in a case of shifting up or in a case of shifting down to and from the odd-numbered stage and the even-numbered stage, the plurality of sliders operate the pawls in a sequence of lowering of a pawl not allowing power transmission among an accelerating pawl and a decelerating pawl corresponding to an original gear stage from which the speed is to be changed, raising of an accelerating pawl and a decelerating pawl corresponding to a target gear stage to which the speed is to be changed, and lowering of the other pawl among the accelerating pawl and the decelerating pawl corresponding to the original gear stage from which the speed is to be changed.

As for a sequence of operating each pawl, a sequence for performing seamless shifting is adopted in each of shifting-up and shifting-down. In both of the sequences, the respective pawls in a case of not shifting gears commonly have the following conditions (I) and (II). Here, the seamless shifting means changing the gear stage without, even for a moment, interrupting a drive torque by disengaging a clutch, adjusting an engine output, or the like.

(I) The accelerating pawl and the decelerating pawl corresponding to the selected gear stage are raised.

(II) The accelerating pawl and the decelerating pawl corresponding to the non-selected gear stage are lowered.

According to one embodiment, in the sequence for performing seamless shifting in a case of shifting up, firstly, the decelerating pawl corresponding to the original gear stage from which the speed is to be changed is lowered. Then, the accelerating pawl and the decelerating pawl corresponding to the target gear stage to which the speed is to be changed are raised. Finally, the accelerating pawl corresponding to the original gear stage from which the speed is to be changed is lowered. In the sequence for performing seamless shifting in a case of shifting down, firstly, the accelerating pawl corresponding to the original gear stage from which the speed is to be changed is lowered. Then, the accelerating pawl and the decelerating pawl corresponding to the target gear stage to which the speed is to be changed are raised. Finally, the decelerating pawl corresponding to the original gear stage from which the speed is to be changed is lowered. These sequences have in common that the pawls are operated in the sequence of (i) to (iii) below.

(i) Of the accelerating pawl and the decelerating pawl corresponding to the original gear stage from which the speed is to be changed, the pawl not allowing power transmission is lowered;

(ii) The accelerating pawl and the decelerating pawl corresponding to the target gear stage to which the speed is to be changed are raised; and (iii) Of the accelerating pawl and the decelerating pawl corresponding to the original gear stage from which the speed is to be changed, the other pawl is lowered.

For example, in a case of shifting up from the second speed to the third speed, the original gear stage from which the speed is to be changed is a second speed, and the target gear stage to which the speed is to be changed is a third speed. In a case of shifting down from the third speed to the second speed, the original gear stage from which the speed is to be changed is the third speed, and the target gear stage to which the speed is to be changed is the second speed. In the preceding (ii), the raising of the accelerating pawl and the decelerating pawl may be performed simultaneously, or may be performed at different timings.

According to one embodiment, the above-described sequences are implemented as a reversible sequence by the rotary cam. The rotary cam has, on its outer peripheral surface, the odd-numbered stage positions and the even-numbered stage positions arranged at different positions with respect to the circumferential direction. The rotary cam has cam portions each corresponding to each pawl. The plurality of sliders each corresponding to each pawl are moved in the axial direction by the corresponding cam portions. The raising or lowering of each pawl is controlled by the corresponding slider. In this manner, the raising or lowering of each pawl is controlled by mechanical transmission of a rotate operation of the rotary cam. A timing of raising or lowering each pawl is determined by the shape of each cam portion. The rotary cam is configured such that its rotation direction in a case of shifting up and its rotation direction in a case of shifting down are reverse or opposite to each other. The plurality of cam portions formed in the rotary cam guide the plurality of guide object parts in the following manner. Here, the rotation direction in the case of shifting up will be referred to as a shift-up direction, and the rotation direction in the case of shifting down will be referred to as a shift-down direction.

In a case of shifting up from an even-numbered stage to an odd-numbered stage, the plurality of guide object parts pass through a region (first region) extending in the shift-up direction from the even-numbered stage position to the odd-numbered stage position with respect to a circumferential direction of the rotary cam. In a case of shifting down from the odd-numbered stage to the even-numbered stage as well, the plurality of guide object parts pass through the first region. Here, the direction in which the plurality of guide object parts pass through the first region differs between in the case of shifting up from the even-numbered stage to the odd-numbered stage and in the case of shifting down from the odd-numbered stage to the even-numbered stage. This way, the plurality of cam portions guide the plurality of guide object parts such that the plurality of guide object parts pass through the same region (first region) in different directions in the case of shifting up from the even-numbered stage to the odd-numbered stage and in the case of shifting down from the odd-numbered stage to the even-numbered stage.

In a case of shifting down from an even-numbered stage to an odd-numbered stage, the plurality of guide object parts pass through a region (second region) extending in the shift-down direction from the even-numbered stage position to the odd-numbered stage position with respect to the circumferential direction of the rotary cam. The second region is a region different from the first region. In a case of shifting up from the odd-numbered stage to the even-numbered stage as well, the plurality of guide object parts pass through the second region. Here, the direction in which the plurality of guide object parts pass through the second region differs between in the case of shifting down from the even-numbered stage to the odd-numbered stage and in the case of shifting up from the odd-numbered stage to the even-numbered stage. This way, the plurality of cam portions guide the plurality of guide object parts such that the plurality of guide object parts pass through the same region (second region) in different directions in the case of shifting down from the odd-numbered stage to the even-numbered stage and in the case of shifting up from the even-numbered stage to the odd-numbered stage.

Thus, the plurality of cam portions guide the plurality of guide object parts such that the plurality of guide object parts pass through the same region of the rotary cam in cases of shifting up and shifting down between the odd-numbered stage and the even-numbered stage. The direction in which the plurality of guide object parts pass through the region of the rotary cam when the rotary cam rotates in the shift-up direction is reverse or opposite to that when the rotary cam rotates in the shift-down direction. Moreover, a path through which the guide object part passes in the cam portion is different between a forward path and a reverse path, like a hysteresis curve for example. The above-described sequence of (i) to (iii) is implemented as a reversible sequence enabled by the movement path of the guide object part providing different forward and reverse paths. That is, the above-described sequence of (i) to (iii) is performed in both cases where the rotary cam is rotated in the shift-up direction and the shift-down direction. The above-described sequence of (i) to (iii) allows each of power-on upshift and power-off downshift to be performed seamlessly. The above-described sequence of (i) to (iii) is also applicable to power-off upshift and power-on downshift. That is, the above-described sequence of (i) to (iii) can also be used to perform power-off upshift and power-on downshift. The power-on upshift means shifting-up performed in the power-on state. The power-on downshift means shifting-down performed in the power-on state. The power-off downshift means shifting-down performed in the power-off state. The power-off upshift means shifting-up performed in the power-off state.

According to one embodiment, as described above, irrespective of whether shifting is power-on upshift or power-off upshift, the pawls are operated in the sequence of (i) to (iii) above, thus achieving a gear shifting either for power-on upshift or for power-off upshift. In other words, since each pawl is operated in the sequence of (i) to (iii) above, both power-on upshift and power-off upshift can be achieved easily and smoothly. The sequence of operating each pawl is standardized, and therefore a change of the gear shifting pattern in a case of shifting up is allowed easily and smoothly. The change of the gear shifting pattern in a case of shifting up means that the gear shifting pattern is changed from one of power-on upshift and power-off upshift to the other during a shift-up operation.

In a case of shifting down as well, irrespective of whether shifting is power-on downshift or power-off downshift, the pawls are operated in the sequence of (i) to (iii) above, thus achieving a gear shifting either for power-on downshift or for power-off downshift. In other words, since each pawl is operated in the sequence of (i) to (iii) above, both power-on downshift and power-off downshift can be achieved easily and smoothly. The sequence of operating each pawl is standardized, and therefore a change of the gear shifting pattern in a case of shifting down is allowed easily and smoothly. The change of the gear shifting pattern in a case of shifting down means that the gear shifting pattern is changed from one of power-on downshift and power-off downshift to the other during a shift-down operation.

According to one embodiment, the transmission is able to easily and smoothly achieve a change of the gear shifting pattern during a gear shifting operation, either in a case of shifting up or in a case of shifting down. The rotation direction of the rotary cam differs between shifting-up and shifting-down, and the reversible sequence is performed that is enabled by the movement path of the guide object part providing different forward and reverse paths due to the shape of the cam portion. The sequences of operating the pawls in power-on upshift and power-off upshift and in power-on downshift and power-off downshift have in common as described above. Since the sequence of operating the pawls in each gear shifting pattern is standardized by a mechanical configuration, the gear shifting operation can be easily controlled.

Thus, all gear shifting patterns can be covered more easily and smoothly, while a higher robustness concerning the gear shifting operation can be obtained. In addition, structural complexity can be reduced, and therefore making a manufacturing process less cumbersome and ensuring a robustness can be achieved at a higher level.

According to one embodiment, the rotary cam has, on the outer peripheral surface thereof, the odd-numbered stage positions and the even-numbered stage positions that are distant from each other by $W°$ with respect to the circumferential direction, the rotary cam being rotatable in both directions of a shift-up direction and a shift-down direction reverse or opposite to the shift-up direction, where W satisfies the following expression A:

$$W = 360/2V \qquad\qquad A,$$

V is a positive integer equal to or less than the number of gear stages provided in the transmission, the gear stages provided in the transmission including a neutral position.

According to one embodiment, the rotary cam is configured to, in a case of not shifting gears with the odd-numbered stage selected, be held at the odd-numbered stage position, thus creating an odd-numbered stage state in which the odd-numbered stage accelerating pawl and the odd-numbered stage decelerating pawl are raised while the even-numbered stage accelerating pawl and the even-numbered stage decelerating pawl are lowered.

In a case of not shifting gears with the even-numbered stage selected, be held at the even-numbered stage position, thus creating an even-numbered stage state in which the even-numbered stage accelerating pawl and the even-numbered stage decelerating pawl are raised while the odd-numbered stage accelerating pawl and the odd-numbered stage decelerating pawl are lowered.

In a case of shifting up from the odd-numbered stage to the even-numbered stage, rotate in the shift-up direction from the odd-numbered stage position to the even-numbered stage position, thus performing a ratchet operation A of firstly lowering the odd-numbered stage decelerating pawl, then raising the even-numbered stage accelerating pawl and the even-numbered stage decelerating pawl, and finally lowering the odd-numbered stage accelerating pawl.

In a case of shifting down from the odd-numbered stage to the even-numbered stage, rotate in the shift-down direction from the odd-numbered stage position to the even-numbered stage position, thus performing a ratchet operation B of firstly lowering the odd-numbered stage accelerating pawl, then raising the even-numbered stage accelerating pawl and the even-numbered stage decelerating pawl, and finally lowering the odd-numbered stage decelerating pawl.

In a case of shifting up from the even-numbered stage to the odd-numbered stage, rotate in the shift-up direction from the even-numbered stage position to the odd-numbered stage position, thus performing a ratchet operation C of firstly lowering the even-numbered stage decelerating pawl, then raising the odd-numbered stage accelerating pawl and the odd-numbered stage decelerating pawl, and finally lowering the even-numbered stage accelerating pawl.

In a case of shifting down from the even-numbered stage to the odd-numbered stage, rotate in the shift-down direction from the even-numbered stage position to the odd-numbered stage position, thus performing a ratchet operation D of firstly lowering the even-numbered stage accelerating pawl, then raising the odd-numbered stage accelerating pawl and the odd-numbered stage decelerating pawl, and finally lowering the even-numbered stage decelerating pawl.

The ratchet mechanism performs the gear shifting operation by rotating the rotary cam by 180°. Therefore, as a circumferential length of the rotary cam corresponding to one stage shifting, a long length is obtained. This enables reduction in the diameter of the rotary cam while ensuring a stability in controlling the operation of the pawls by the rotary cam. Thus, improving mountability to vehicle, reducing structural complexity, and ensuring a robustness concerning the gear shifting operation can be satisfied at a higher level. Furthermore, the odd-numbered stage state and the even-numbered stage state have in common the conditions (I) and (II) above, and the ratchet operations A to D have in common the operation sequence of (i) to (iii) above. The gear shifting operation can be easily controlled, so that the robustness concerning the gear shifting operation can increase. Accordingly, covering all gear shifting patterns, improving mountability to a vehicle, reducing structural complexity, making a manufacturing process less cumbersome, and ensuring a robustness can be achieved at a higher level. As for V and W, the foregoing description applies.

According to one embodiment, the transmission includes a synchronization mechanism that mechanically synchronizes an operation of the ratchet mechanism with an operation of the dog engagement mechanism.

According to one embodiment, the dog engagement mechanism includes a first dog ring disposed outside the odd-numbered stage hub with respect to a diameter direction such that relative rotation between the first dog ring and the odd-numbered stage hub is restricted and the first dog ring is movable in an axial direction of the odd-numbered stage hub, the first dog ring being configured to move in the axial direction of the odd-numbered stage hub to come into dog engagement with one of the plurality of odd-numbered stage driven gears, to restrict relative rotation between the one of the plurality of odd-numbered stage driven gears and the odd-numbered stage hub.

A second dog ring may be disposed outside the even-numbered stage hub with respect to a diameter direction such that relative rotation between the second dog ring and the even-numbered stage hub is restricted and the second dog ring is movable in an axial direction of the even-numbered stage hub, the second dog ring being configured to move in the axial direction of the even-numbered stage hub to come into dog engagement with one of the plurality of even-numbered stage driven gears, to restrict relative rotation between the one of the plurality of even-numbered stage driven gears and the even-numbered stage hub.

A third dog ring may be disposed outside the input shaft with respect to a diameter direction such that relative rotation between the third dog ring and the input shaft is restricted and the third dog ring is movable in an axial direction of the input shaft, the third dog ring being configured to move in the axial direction of the input shaft to come into dog engagement with, among the odd-numbered stage drive gears, one drive gear that is rotatable relative to the input shaft, to restrict relative rotation between the drive gear and the input shaft, the one drive gear being constantly meshed with an odd-numbered stage driven gear that is fixed to the odd-numbered stage hub so as to constantly rotate together with the odd-numbered stage hub.

A fourth dog ring may be disposed outside the input shaft with respect to a diameter direction such that relative rotation between the fourth dog ring and the input shaft is restricted and the fourth dog ring is movable in the axial direction of the input shaft, the fourth dog ring being configured to move in the axial direction of the input shaft to come into dog engagement with, among the even-numbered stage drive gears, one drive gear that is rotatable relative to the input shaft, to restrict relative rotation between the drive gear and the input shaft, the one drive gear being constantly meshed with an even-numbered stage driven gear that is fixed to the even-numbered stage hub so as to constantly rotate together with the even-numbered stage hub.

According to one embodiment, a shift cam has, in an outer peripheral surface thereof, a plurality of cam portions extending in a circumferential direction, the shift cam being in parallel to the output shaft and configured to rotate in a case of shifting up and in a case of shifting down such that a rotation direction in the case of shifting up and a rotation direction in the case of shifting down are reverse to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position in a case of shifting gears.

A first shift fork may be engaged with the cam portion of the shift cam so as to be moved in the axial direction by the cam portion of the shift cam, and engaged with the first dog ring with respect to the axial direction, the first shift fork being configured to move the first dog ring in the axial direction by being moved in the axial direction by the cam portion of the shift cam.

A second shift fork may be engaged with the cam portion of the shift cam so as to be moved in the axial direction by the cam portion of the shift cam, and engaged with the second dog ring with respect to the axial direction, the second shift fork being configured to move the second dog ring in the axial direction by being moved in the axial direction by the cam portion of the shift cam.

A third shift fork may be engaged with the cam portion of the shift cam so as to be moved in the axial direction by the cam portion of the shift cam, and engaged with the third dog ring with respect to the axial direction, the third shift fork being configured to move the third dog ring in the axial direction by being moved in the axial direction by the cam portion of the shift cam.

A fourth shift fork may be engaged with the cam portion of the shift cam so as to be moved in the axial direction by the cam portion of the shift cam, and engaged with the fourth dog ring with respect to the axial direction, the fourth shift fork being configured to move the fourth dog ring in the axial direction by being moved in the axial direction by the cam portion of the shift cam.

In a case of not shifting gears with the odd-numbered stage selected, the dog engagement mechanism may set power transmission active from the input shaft to the odd-numbered stage hub corresponding to the one odd-numbered stage by the first shift fork and the third shift fork, while the ratchet mechanism creates the odd-numbered stage state, so that power transmission from the input shaft to the output shaft in the one odd-numbered stage is set active.

In a case of not shifting gears with the even-numbered stage selected, the dog engagement mechanism may set power transmission active from the input shaft to the even-numbered stage hub corresponding to the one even-numbered stage by the second shift fork and the fourth shift fork, while the ratchet mechanism creates the even-numbered stage state, so that power transmission from the input shaft to the output shaft in the one even-numbered stage is set active.

In a process of shifting up from the odd-numbered stage to the even-numbered stage, firstly, the dog engagement mechanism may set, by dog engagement, power transmission active from the input shaft to the even-numbered stage hub corresponding to the even-numbered stage by the second shift fork and the fourth shift fork along with rotation of the shift cam in the rotation direction in the case of shifting up. Then, further rotation of the shift cam in the rotation direction in the case of shifting up may be transmitted via the synchronization mechanism so that the rotary cam is rotated in the rotation direction in the case of shifting up from the odd-numbered stage position to the even-numbered stage position, and the ratchet mechanism may perform the ratchet operation A. Then, along with further rotation of the shift cam in the rotation direction in the case of shifting up, the dog engagement mechanism may cancel dog engagement in which power transmission from the input shaft to the odd-numbered stage hub corresponding to the odd-numbered stage is set active by the first shift fork and the third shift fork.

In a process of shifting down from the odd-numbered stage to the even-numbered stage, firstly, the dog engagement mechanism may set, by dog engagement, power transmission active from the input shaft to the even-numbered stage hub corresponding to the even-numbered stage by the second shift fork and the fourth shift fork along with rotation of the shift cam in the rotation direction in the case of shifting down. Then, further rotation of the shift cam in the rotation direction in the case of shifting down is transmitted via the synchronization mechanism so that the rotary cam is rotated in the rotation direction in the case of shifting down from the odd-numbered stage position to the even-numbered stage position, and the ratchet mechanism performs the ratchet operation B. Then, along with further rotation of the shift cam in the rotation direction in the case of shifting down, the dog engagement mechanism cancels dog engagement in which power transmission from the input shaft to the odd-numbered stage hub corresponding to the odd-numbered stage is set active by the first shift fork and the third shift fork.

In a process of shifting up from the even-numbered stage to the odd-numbered stage, firstly, the dog engagement mechanism may set, by dog engagement, power transmission active from the input shaft to the odd-numbered stage hub corresponding to the odd-numbered stage by the first shift fork and the third shift fork along with rotation of the shift cam in the rotation direction in the case of shifting up. Then, further rotation of the shift cam in the rotation direction in the case of shifting up is transmitted via the synchronization mechanism so that the rotary cam is rotated in the rotation direction in the case of shifting up from the even-numbered stage position to the odd-numbered stage position, and the ratchet mechanism performs the ratchet operation C. Then, along with further rotation of the shift cam in the rotation direction in the case of shifting up, the dog engagement mechanism cancels dog engagement in which power transmission from the input shaft to the even-numbered stage hub corresponding to the even-numbered stage is set active by the second shift fork and the fourth shift fork.

In a process of shifting down from the even-numbered stage to the odd-numbered stage, firstly, the dog engagement mechanism may set, by dog engagement, power transmission active from the input shaft to the odd-numbered stage hub corresponding to the odd-numbered stage by the first shift fork and the third shift fork along with rotation of the shift cam in the rotation direction in the case of shifting down. Then further rotation of the shift cam in the rotation direction in the case of shifting down is transmitted via the synchronization mechanism so that the rotary cam is rotated in the rotation direction in the case of shifting down from the even-numbered stage position to the odd-numbered stage position, and the ratchet mechanism performs the ratchet operation D. Then, along with further rotation of the shift cam in the rotation direction in the case of shifting down, the dog engagement mechanism cancels dog engagement in which power transmission from the input shaft to the even-numbered stage hub corresponding to the even-numbered stage is set active by the second shift fork and the fourth shift fork.

According to one embodiment, in the transmission, both in a case of not shifting gears with the odd-numbered stage selected and in a case of not shifting gears with the even-numbered stage selected, the dog engagement mechanism sets power transmission active from the input shaft to the hub (the odd-numbered stage hub or the even-numbered stage hub) corresponding to the selected gear stage, and the ratchet mechanism creates a state that satisfies the above conditions (I) and (II). This way, in a case of not shifting gears with the odd-numbered stage selected and in a case of not shifting gears with the even-numbered stage selected, the gear shifting operations performed by the ratchet mechanism and the dog engagement mechanism have common gear shifting operation.

In any of the process of shifting up from the odd-numbered stage to the even-numbered stage, the process of shifting down from the odd-numbered stage to the even-numbered stage, the process of shifting up from the even-numbered stage to the odd-numbered stage, and the process of shifting down from the even-numbered stage to the odd-numbered stage, firstly, the dog engagement mechanism sets power transmission active from the input shaft to the hub corresponding to the target gear stage to which the speed is to be changed, then the ratchet mechanism operates the pawls in the sequence of (i) to (iii) above, and then the dog engagement mechanism cancels dog engagement in which power transmission from the input shaft to the hub corresponding to the original gear stage from which the speed is to be changed is set active. In the process of shifting up from the odd-numbered stage to the even-numbered stage, in the process of shifting down from the odd-numbered stage to the even-numbered stage, in the process of shifting up from the even-numbered stage to the odd-numbered stage, and in the process of shifting down from the even-numbered stage to the odd-numbered stage, the gear shifting operations performed by the ratchet mechanism and the dog engagement mechanism have common gear shifting operation. The gear shifting operations having in common are mechanically implemented by rotations of the rotary cam and the shift cam. The gear shifting operation can be easily controlled, so that the robustness concerning the gear shifting operation can further increases.

In one embodiment, the ratchet mechanism performs a gear shifting operation for setting a gear stage to an even-numbered stage, as a gear shifting operation for setting a gear stage to a neutral position.

The ratchet mechanism need not be provided with a mechanical mechanism that performs a gear shifting operation for setting the gear stage to the neutral position, in addition to a mechanical mechanism that performs a gear shifting operation for setting the gear stage to an odd-numbered stage or an even-numbered stage. This can reduce structural complexity.

According to one embodiment, the ratchet mechanism has an odd-numbered stage accelerating pawl group including a plurality of the odd-numbered stage accelerating pawls; an odd-numbered stage decelerating pawl group including a plurality of the odd-numbered stage decelerating pawls; an even-numbered stage accelerating pawl group including a plurality of the even-numbered stage accelerating pawls; and an even-numbered stage decelerating pawl group including a plurality of the even-numbered stage decelerating pawls. According to one embodiment, the respective pawl groups are disposed at different positions with respect to an axial direction of the output shaft, and provided such that a plurality of pawls included in each pawl group are arranged side by side with respect to a circumferential direction of the output shaft.

According to one embodiment, the transmission has five or more gear stages, but the number of pawls arranged in the axial direction can be as small as four. With respect to the axial direction of the output shaft, a width of the pawl can be obtained while an increase in the length of the output shaft is suppressed. When the plurality of pawls arranged side by side with respect to the circumferential direction are engaged with the output shaft, a force received from the output shaft is distributed among the pawls, and therefore a load that one pawl receives from the output shaft is reduced. Moreover, the plurality of pawls included in each pawl group are operated at the same time. Since the plurality of pawls configured to be operated at the same time are arranged side by side with respect to the circumferential direction, the operations of the plurality of pawls can be easily controlled. Accordingly, ensuring a mountability to a vehicle, reducing structural complexity, and ensuring a robustness can be satisfied at a higher level.

The output shaft may have, on one end side thereof with respect to the axial direction of the output shaft, a power output part that outputs power to a drive wheel of the straddled vehicle.

The transmission may include a casing that rotatably supports at least each of the input shaft and the output shaft; a cover member that at least partially covers, from outside of the casing, a shaft bearing and a shaft bearing hole thereof, the shaft bearing supporting the other end side of the output shaft in the casing; a shaft bearing that supports one end side of the input shaft in the casing; a clutch drive gear provided on the other end side of the output shaft with respect to the axial direction and disposed in an end portion of the input shaft so as to be coaxial with the input shaft, the clutch drive gear being configured to transmit power received from the crankshaft to the input shaft; an oil pump drive gear disposed between the shaft bearing and the clutch drive gear with respect to the axial direction of the input shaft so as to be coaxial with the input shaft, the oil pump drive gear being coupled to the clutch drive gear to rotate together with the clutch drive gear; an oil pump positioned lower than the input shaft and the output shaft in the straddled vehicle in an upright state; and a pump drive chain that transmits rotational power from the oil pump drive gear to the oil pump.

The pump drive chain may be bent by a chain guide part provided on the cover member.

The chain guide part that bends the pump drive chain may be provided on the cover member that at least partially covers the shaft bearing and its shaft bearing hole of the output shaft. This can further reduce structural complexity.

The present teaching may further adopt the following configurations.

According to one embodiment, the transmission has six gear stages.

According to one embodiment, the transmission may be part of a straddled vehicle.

According to one embodiment, the transmission may be part of a motorcycle.

Effects of the Invention

The present teaching can provide a constant-mesh type transmission for straddled vehicle with a ratchet mechanism, capable of adequately covering all gear shifting patterns, ensuring a mountability to a vehicle, and reducing structural complexity, and also capable of making a manufacturing process less cumbersome and ensuring a robustness.

BRIEF DESCRIPTION OF THE DRAWINGS

FIGS. 14A-14D are explanatory diagrams showing the shift mechanism in the process of shifting from the second speed to the third speed.

FIGS. 15A-15D are explanatory diagrams showing the shift mechanism in the process of shifting from the second speed to the third speed.

FIGS. 16A-16D are explanatory diagrams showing the shift mechanism in the process of shifting from the second speed to the third speed.

FIGS. 17A-17D are explanatory diagrams showing the shift mechanism in the process of shifting from the second speed to the third speed.

FIGS. 18A-18D are explanatory diagrams showing the shift mechanism in the process of shifting from the second speed to the third speed.

FIGS. 19A-19D are explanatory diagrams showing the shift mechanism in the process of shifting from the second speed to the third speed.

FIG. 35AA is a cross-sectional view schematically showing a shift cam; BFIG. 35B is a development diagram schematically showing the shapes of grooves of the shift cam; and CFIG. 35C is a schematic diagram for explanation of movement of the shift cam.

FIGS. 36A-36H are explanatory diagrams showing a transmission mechanism at step 0 in the process of shifting from the second speed to the third speed.

FIGS. 37A-37H are explanatory diagrams showing the transmission mechanism at step 1 in the process of shifting from the second speed to the third speed.

FIGS. 38A-38H are explanatory diagrams showing the transmission mechanism at step 2 in the process of shifting from the second speed to the third speed.

FIGS. 40A-40H are explanatory diagrams showing the transmission mechanism at step 4 in the process of shifting from the second speed to the third speed.

FIGS. 41A-41H are explanatory diagrams showing the transmission mechanism at step 5 in the process of shifting from the second speed to the third speed.

FIGS. 42A-42H are explanatory diagrams showing the transmission mechanism at step 6 in the process of shifting from the second speed to the third speed.

FIGS. 43A-43H are explanatory diagrams showing the transmission mechanism at step 0 in the process of shifting from the third speed to the second speed.

FIGS. 44A-44H are explanatory diagrams showing the transmission mechanism at step 1 in the process of shifting from the third speed to the second speed.

FIGS. 45A-45H are explanatory diagrams showing the transmission mechanism at step 2 in the process of shifting from the third speed to the second speed.

FIGS. 46A-46H are explanatory diagrams showing the transmission mechanism at step 3 in the process of shifting from the third speed to the second speed.

FIGS. 47A-47H are explanatory diagrams showing the transmission mechanism at step 4 in the process of shifting from the third speed to the second speed.

FIGS. 48A-48H are explanatory diagrams showing the transmission mechanism at step 5 in the process of shifting from the third speed to the second speed.

FIGS. 49A-49H are explanatory diagrams showing the transmission mechanism at step 6 in the process of shifting from the third speed to the second speed.

DETAILED DESCRIPTION

In the following, some embodiments of the present teaching will be described in detail with reference to the drawings.

<<Motorcycle>>

Figure 1:
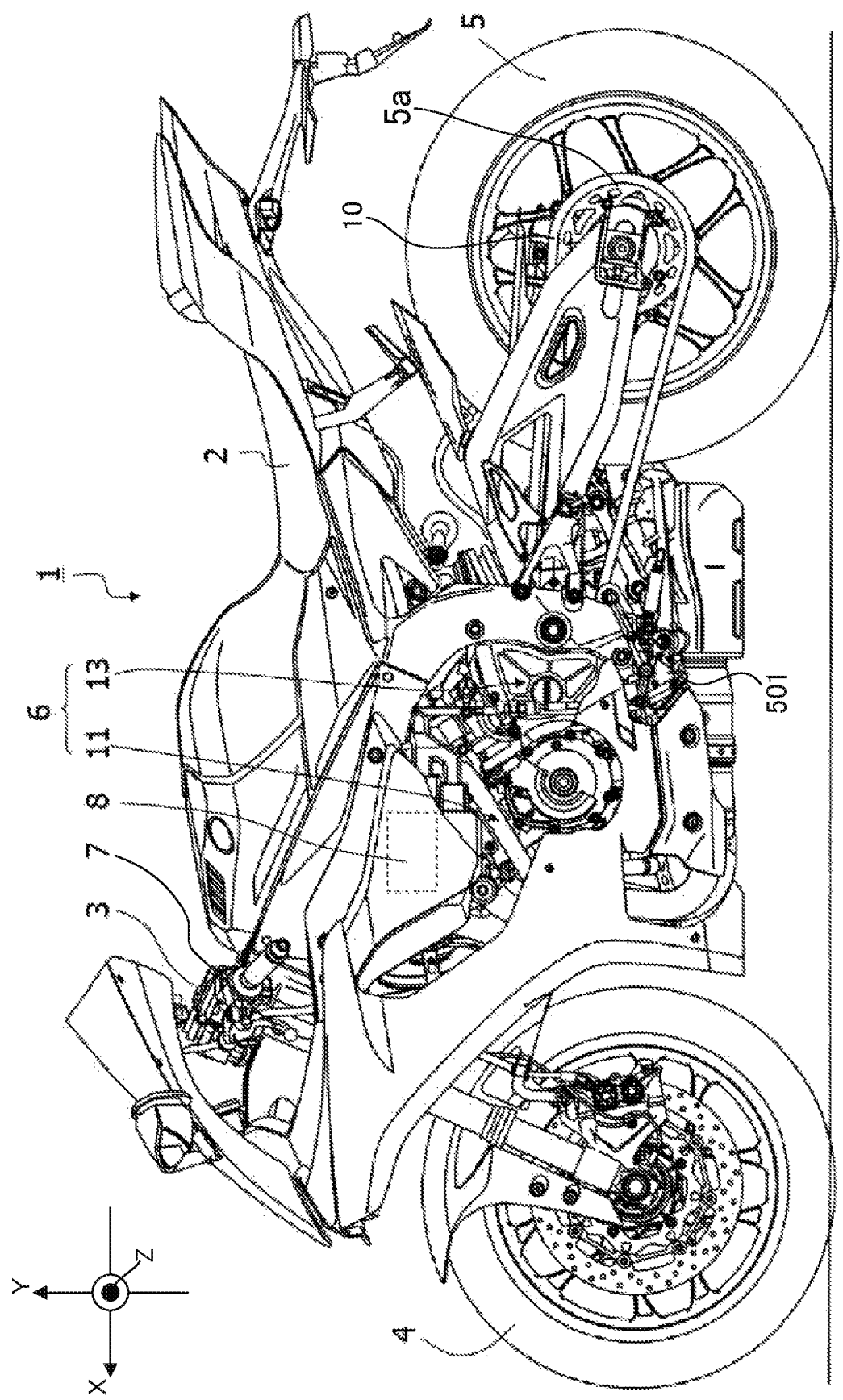
FIG. 1 is a side view schematically showing a motorcycle equipped with a transmission according to an embodiment of the present teaching.

A motorcycle 1 equipped with a transmission 13 according to an embodiment will be described with reference to FIG. 1. The direction X represents the front-rear direction of the motorcycle 1. The direction Y represents the vertical direction of the motorcycle 1. The direction Z represents the vehicle width direction of the motorcycle 1. The direction Z is the direction coming out of or going into the drawing sheet of FIG. 1.

The motorcycle 1 is an example of a straddled vehicle, but embodiments of the invention are not limited to a motorcycle. The straddled vehicle means a type of vehicle in which a driver strides a saddle when seated. Scooters, mopeds, off-road two- and four-wheeled vehicles, and on-road type motorcycles may be straddled vehicles. Additional examples of straddled vehicles include a three-wheeled or four-wheeled buggy called ATV (All Terrain Vehicle), a snowmobile, or the like.

The motorcycle 1 includes a seat 2, a handlebar 3, a front wheel 4, a rear wheel 5, an engine unit 6, a clutch lever 7, an ECU (Engine Control Unit) 8, and a shift pedal 501. The engine unit 6 includes an engine 11 and a transmission 13. The clutch lever 7 is provided to the handlebar 3 so as to be operable with a driver's hand. The shift pedal 501 is provided so as to be operable with a driver's foot. An operation performed on the shift pedal 501 by the driver is inputted as a shift operation to the transmission 13.

The shift pedal 501 is one example of an operation element for inputting the shift operation to the transmission 13. The operation element for inputting the shift operation to the transmission is not limited to this example, and may be configured as a button, a switch, a lever, or the like. The operation element for inputting the shift operation to the transmission 13 is operable by a driver. In an example, the operation element may be configured to be operated by a driver's foot, or may be configured to be operated by a driver's hand. The position where the operation element is installed is not particularly limited, and it can be set as appropriate depending on the type of the operation element, etc.

The shift operation received by the operation element may be mechanically transmitted and inputted to the transmission, as illustrated in this embodiment. Alternatively, the shift operation received by the operation element may be detected by a sensor or the like and inputted to the transmission by an actuator that is configured to operate in accordance with a result of the detection. It is not always necessary that the shift operation is inputted by a driver. The shift operation may be inputted to the transmission by an actuator that is controlled by a control device (e.g., an ECU) mounted on the straddled vehicle. No particular limitation is put on a mechanism that inputs the shift operation to the transmission.

<<Overall Configuration of Transmission>>

An overall configuration of the transmission 13 according to this embodiment will be described with reference to FIG. 2 to FIG. 8.

Figure 2:
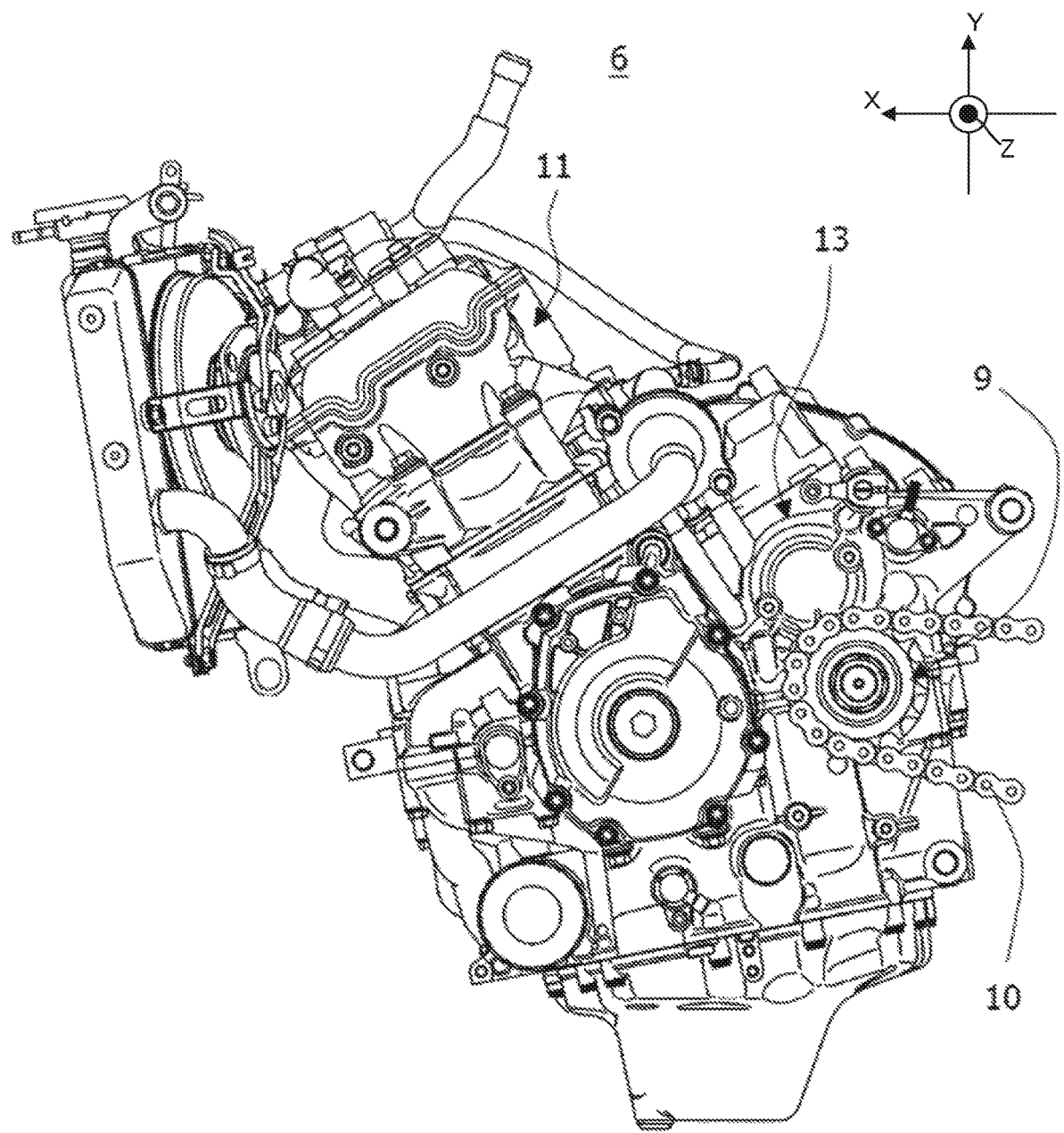
FIG. 2 is a left side view schematically showing an engine unit including the transmission according to the embodiment of the present teaching.
Figure 3:
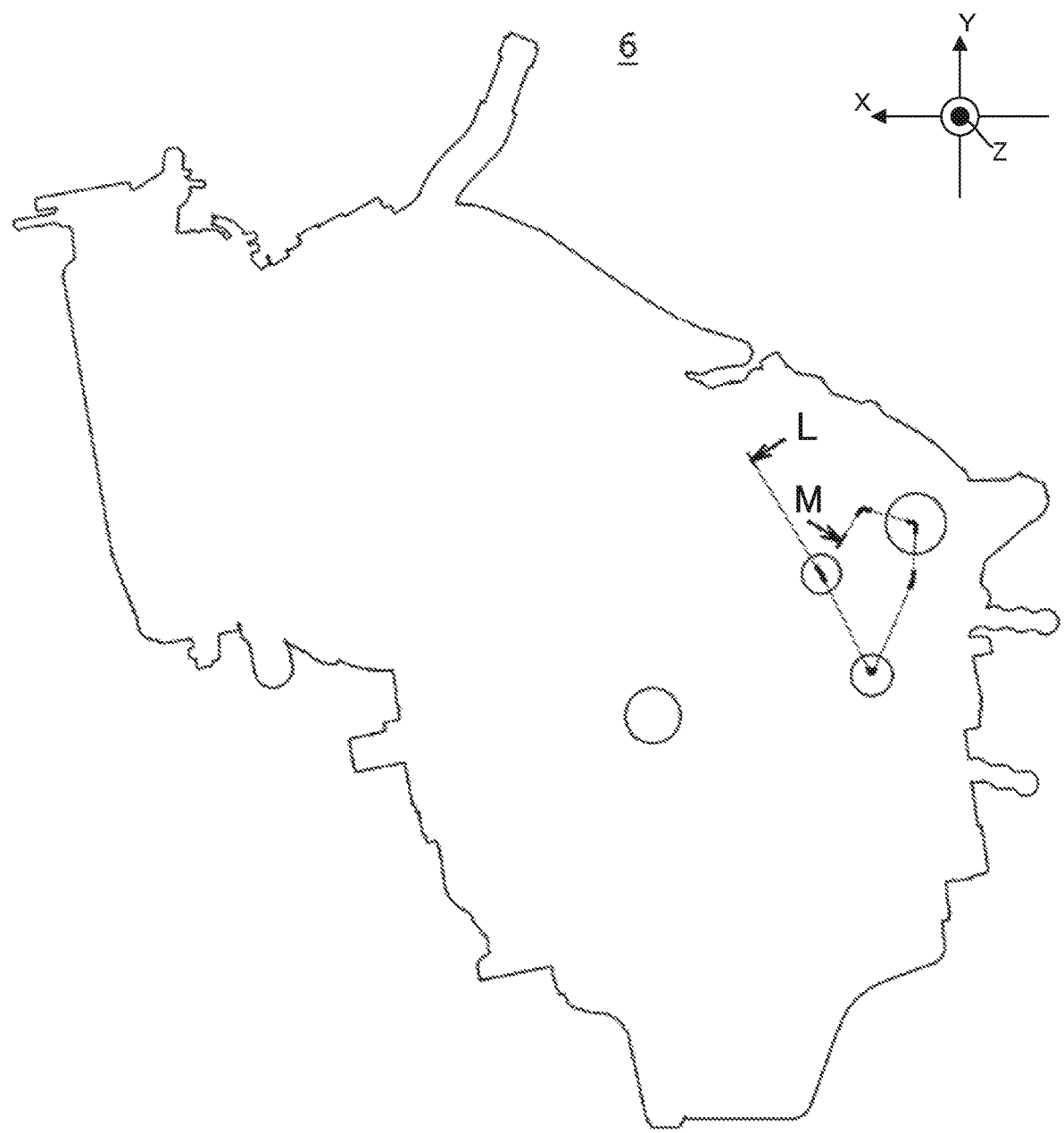
FIG. 3 is a left side view schematically showing an outer shape of the engine unit shown in FIG. 2, and indicating a cross-sectioned position corresponding to FIG. 20.
Figure 6:
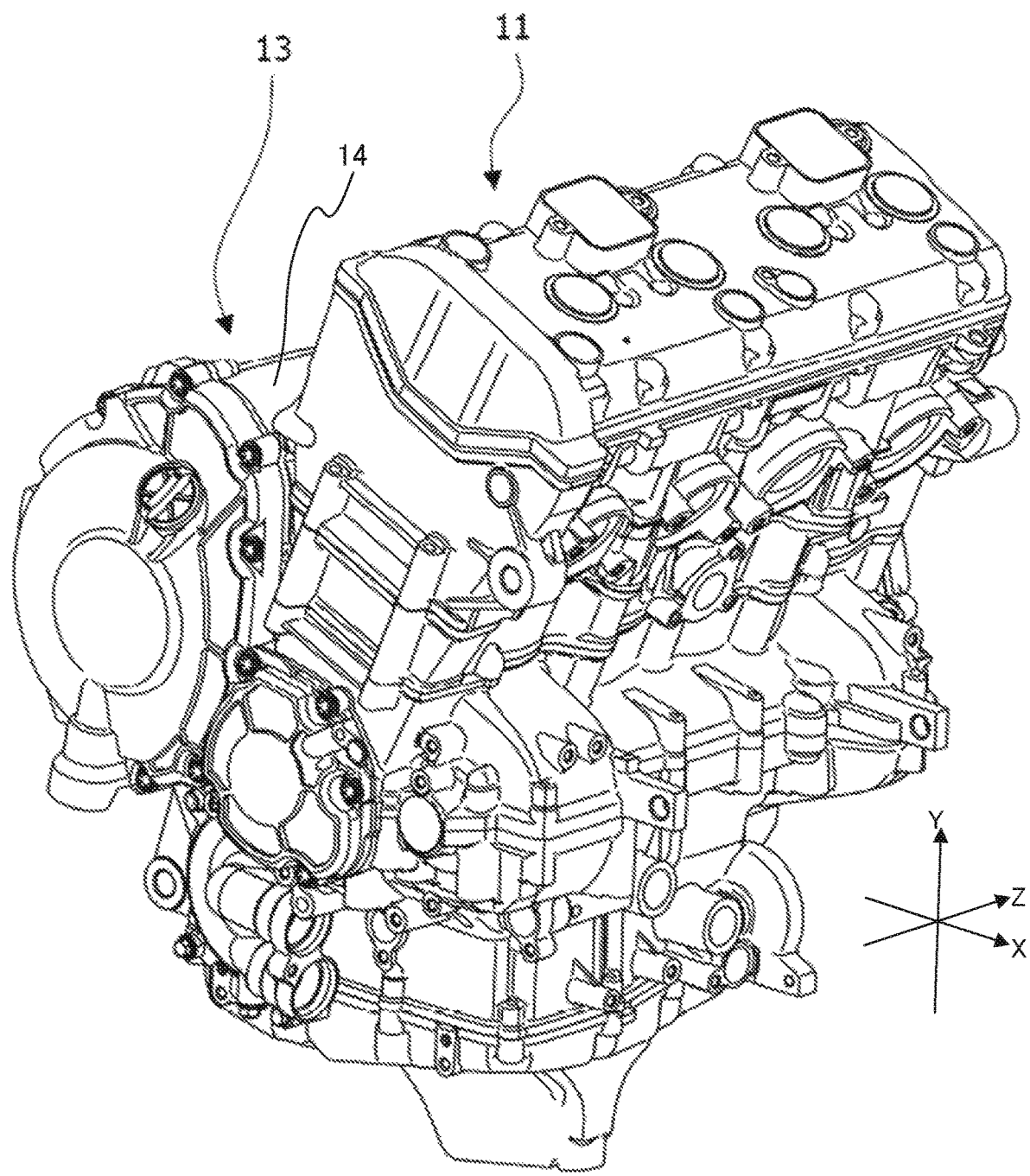
FIG. 6 is a perspective view schematically showing the engine unit shown in FIG. 2.

As shown in FIG. 2 and FIG. 6, the engine unit 6 includes the engine 11 and the transmission 13. In the engine unit 6, power of the engine 11 is transmitted to an output shaft 30 (see FIG. 4 and FIG. 21) of the transmission 13. The power transmitted to the output shaft 30 is transmitted to the rear wheel 5 (see FIG. 1) via a drive sprocket 9, a drive chain 10, and a rear wheel driving sprocket 5a (see FIG. 1). As a result, the rear wheel 5 is driven, so that the motorcycle 1 travels.

Figure 4:
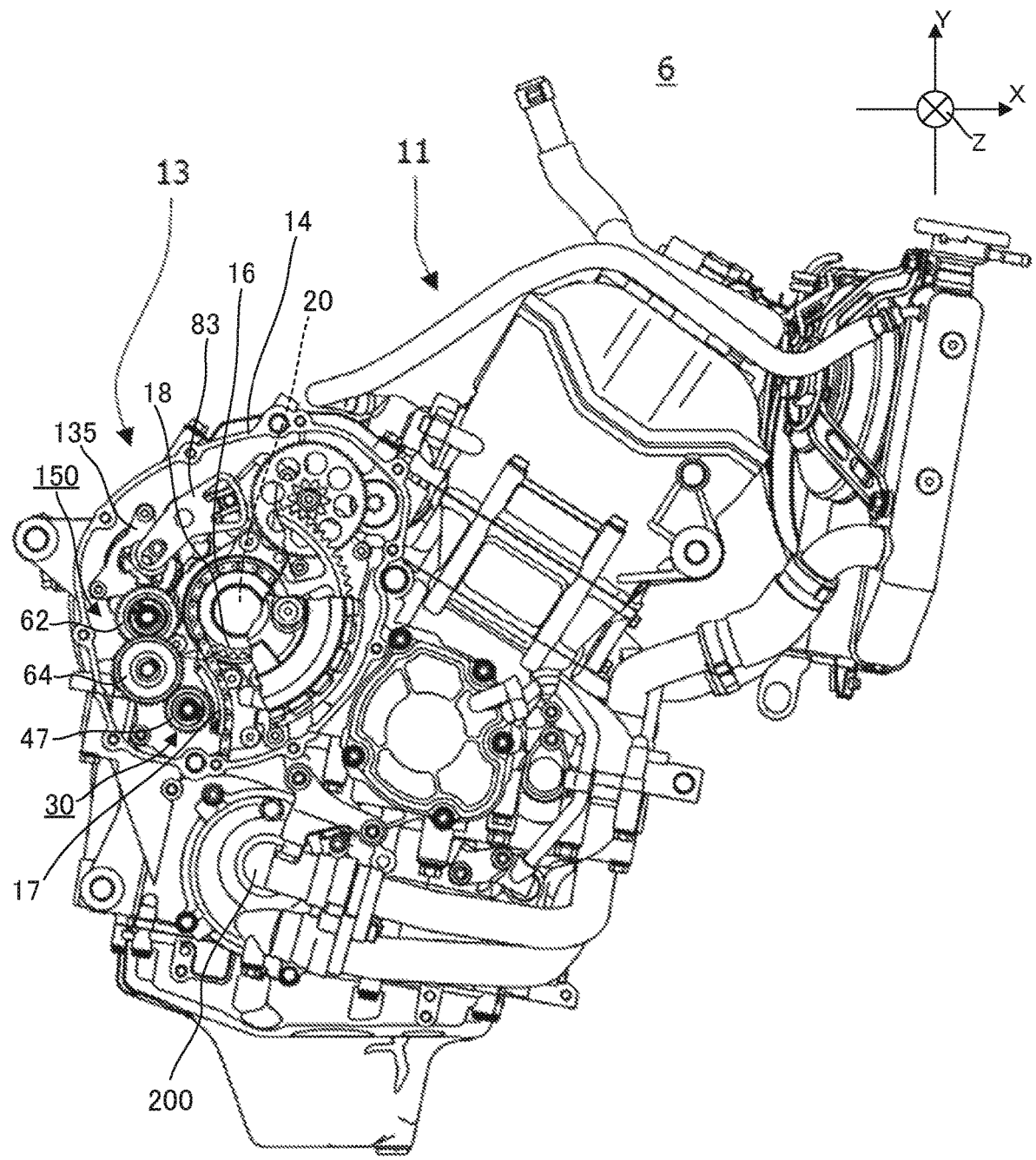
FIG. 4 is a right side view schematically showing the engine unit shown in FIG. 2, and schematically showing the interior of a part of the engine unit.
Figure 5:
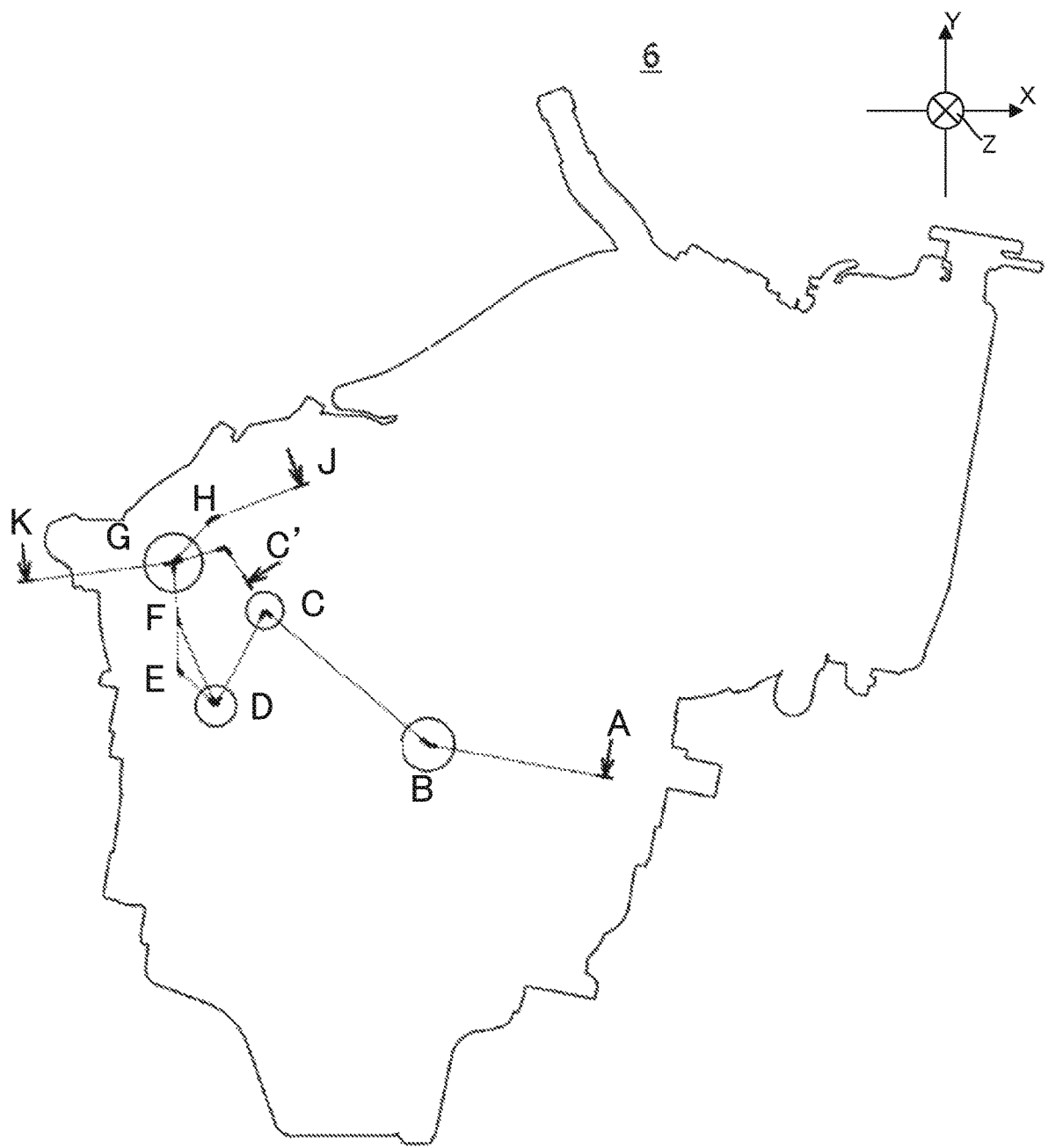
FIG. 5 is a right side view schematically showing an outer shape of the engine unit shown in FIG. 4, and indicating a cross-sectioned position corresponding to FIG. 9 and FIG. 20.
Figure 7:
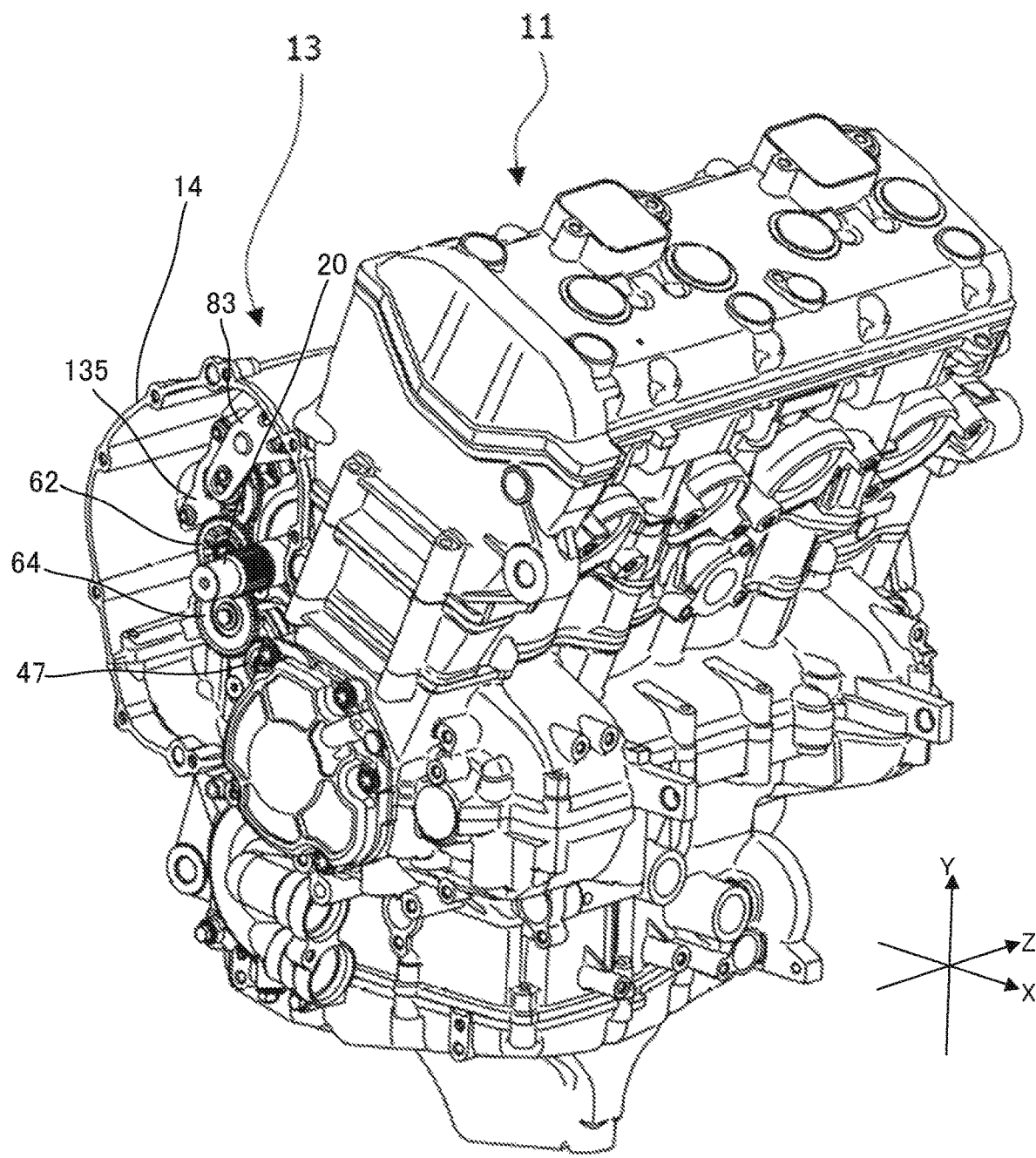
FIG. 7 is a perspective view showing a part of the transmission included in the engine unit shown in FIG. 6.
Figure 20:
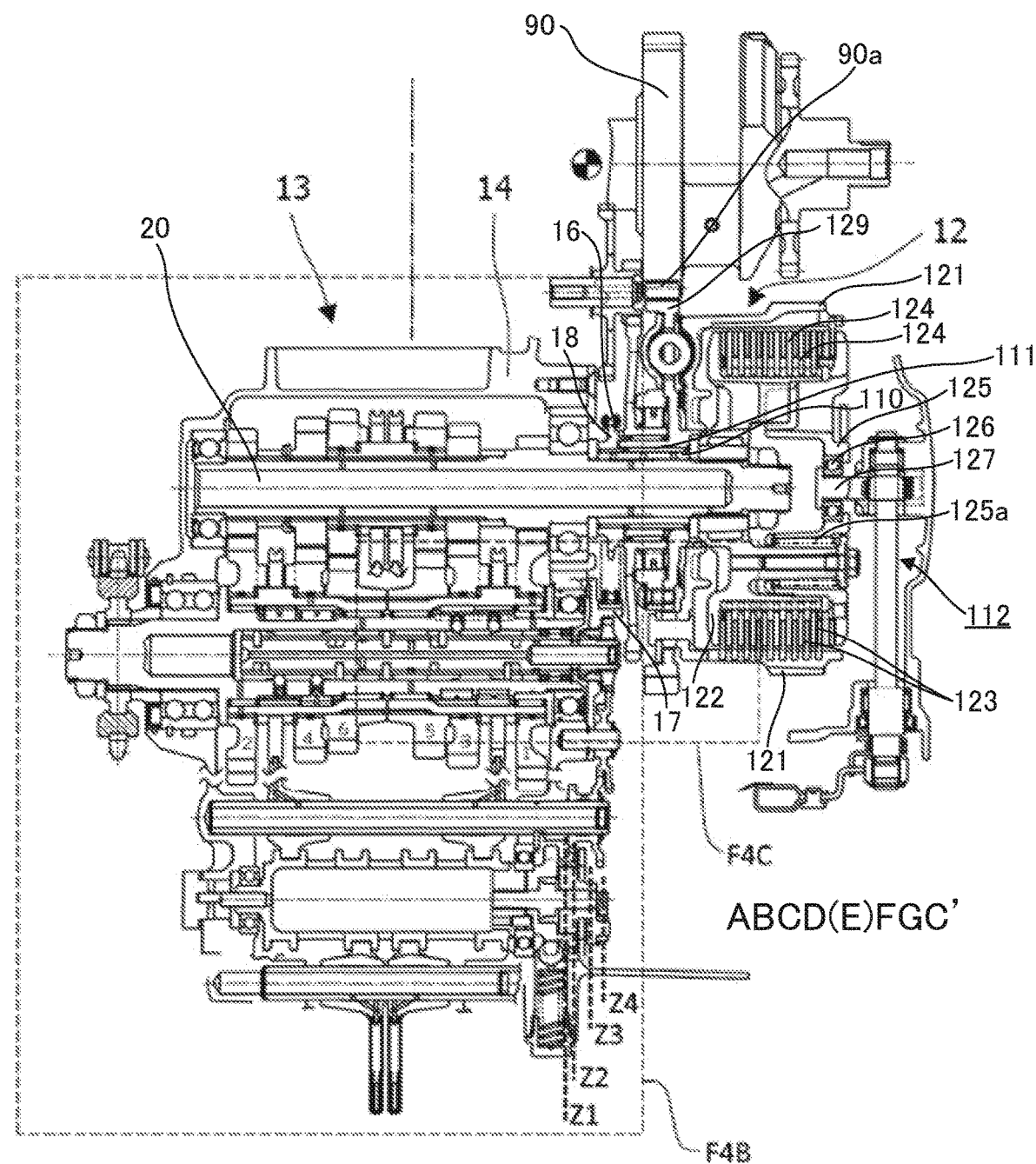
FIG. 20 is a cross-sectional development diagram as taken along the line L-M of FIG. 3 and the line A-B-C-D-E-F-G-C' of FIG. 5.

As shown in FIG. 4 and FIG. 7, the transmission 13 is provided in a casing 14 of the engine 11. In FIG. 4, a shift arm 83, a guide plate 135, idle gears 62, 64, and a follower gear 47 are illustrated as a part of the transmission 13. An oil pump 200 is provided within the casing 14. As shown in FIG. 4, the oil pump 200 is positioned lower than an input shaft 20 and the output shaft 30 when the motorcycle 1 equipped with the transmission 13 is in an upright state. As shown in FIG. 4, the oil pump 200 is disposed so as to partially or entirely overlap at least one of the input shaft 20 and the output shaft 30 with respect to the vertical direction, when viewed in the axial direction of the input shaft 20 and the output shaft 30 (i.e., in the direction Z). Referring to FIG. 4, an oil pump drive gear 18 is rotatably provided on the near side of the input shaft 20. The oil pump drive gear 18 is a chain sprocket. The oil pump drive gear 18 is wound with a pump drive chain 16 for driving the oil pump 200. The pump drive chain 16 is bent by a chain guide part 17 provided on a cover member 15. The pump drive chain 16 is bent so as to avoid interference with a gear (e.g., the follower gear 47) provided in an end portion of the output shaft 30. The pump drive chain 16 is bent so as to avoid interference with a synchronization mechanism 150 which will be described later. The chain guide part 17 bends a slack side of the pump drive chain 16. A cross-section as taken along the line L-M of FIG. 3 and a cross-section as taken along the line A-B-C-D-(E)-F-G-C' of FIG. 5 are shown in FIG. 20 as will be described later.

Figure 8:
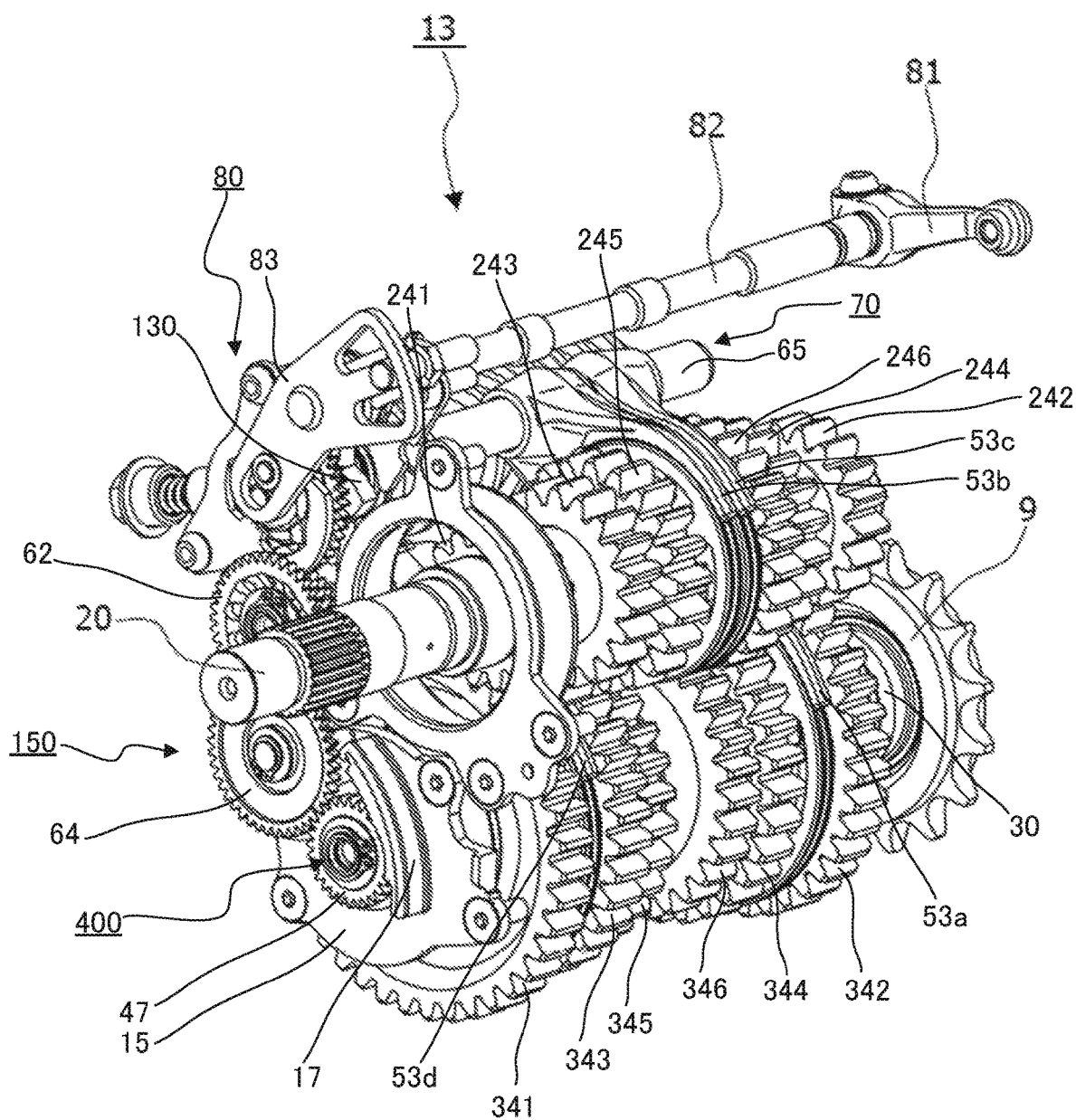
FIG. 8 is a perspective view schematically showing the transmission according to the embodiment of the present teaching.

Referring to FIG. 8, the transmission 13 includes the input shaft 20 and the output shaft 30. The input shaft 20 is rotatably provided, and configured to receive power of a crankshaft 90 (see FIG. 20). To be specific, when a clutch 12 (not shown) is engaged, the input shaft 20 receives the power of the crankshaft 90. The clutch 12 is, though not illustrated in FIG. 8, provided in a left end portion of the input shaft 20 in FIG. 8. The clutch 12 will be described later with reference to FIG. 20 and FIG. 21.

As shown in FIG. 8, a plurality of drive gears 241 to 246 are provided to the input shaft 20. The plurality of drive gears 241 to 246 have a first-speed drive gear 241, a third-speed drive gear 243, a fifth-speed drive gear 245, a sixth-speed drive gear 246, a fourth-speed drive gear 244, and a second-speed drive gear 242 which are arranged in this sequence from the left end portion of the input shaft 20 in FIG. 8. The first-speed drive gear 241, the third-speed drive gear 243, and the fifth-speed drive gear 245 are odd-numbered stage drive gears. The sixth-speed drive gear 246, the fourth-speed drive gear 244, and the second-speed drive gear 242 are even-numbered stage drive gears.

The output shaft 30 is disposed on an axis line parallel to the input shaft 20. The output shaft 30 is provided with a plurality of driven gears 341 to 346. The plurality of driven gears 341 to 346 have a first-speed driven gear 341, a third-speed driven gear 343, a fifth-speed driven gear 345, a sixth-speed driven gear 346, a fourth-speed driven gear 344, and a second-speed driven gear 342 which are arranged in this sequence from a left end portion of the output shaft 30 in FIG. 8. The first-speed driven gear 341, the third-speed driven gear 343, and the fifth-speed driven gear 345 are odd-numbered stage driven gears. The sixth-speed driven gear 346, the fourth-speed driven gear 344, and the second-speed driven gear 342 are even-numbered stage driven gears. The drive gears 241 to 246 and the driven gears 341 to 346 are disposed such that each pair of a drive gear and a driven gear corresponding to the same gear stage are meshed with each other at the same position with respect to the axial direction of the input shaft 20 and the output shaft 30. In the present specification and claims, the term "meshed" means teeth of one gear engage teeth of the other gear. In addition, the term "constantly meshed" means that the gears are positioned in such a way that the gears remained meshed with each other. In embodiments in which gears may be selectively utilized, such as when there are two or more driven gears, but only one at a time is fixedly connected to the output shaft so as to drive the output shaft, the others may remain meshed with corresponding drive gears, even though the others do not transmit force or power to the output shaft.

An even-numbered stage gear group is provided on one end side (on the right end side in FIG. 8) of the input shaft 20 and the output shaft 30, and an odd-numbered stage gear group is provided on the other end side (on the left end side in FIG. 8) of the input shaft 20 and the output shaft 30, with respect to the axial direction of the input shaft 20 and the output shaft 30.

In each of the odd-numbered stage gear group and the even-numbered stage gear group, the gears at the respective gear stages are arranged from low to high gear stages in the axial direction. In each of the odd-numbered stage gear group and the even-numbered stage gear group, the gears at the respective gear stages are arranged such that a gear at a lower gear stage is closer to the ends of the input shaft 20 and the output shaft 30. In this embodiment, the odd-numbered stage gear group includes the odd-numbered stage drive gears 241, 243, 245 and driven gears 341, 343, 345. The even-numbered stage gear group includes even-numbered stage drive gears 242, 244, 246 and driven gears 342, 344, 346.

The transmission 13 is configured to activate a power transmission from the input shaft 20 to the output shaft 30 via the drive gear and the driven gear in a pair corresponding to any one gear stage. The transmission 13 includes a shift mechanism 80, a dog engagement mechanism 70, a ratchet mechanism 400, and a synchronization mechanism 150. These mechanisms, which will be detailed later with reference to the drawings, are outlined as follows.

As shown in FIG. 8, the shift mechanism 80 receives a shift operation (load) inputted from the driver via a shift rod assembly 500 (see FIG. 9), and transmits the shift operation (load) to the dog engagement mechanism 70. In the shift mechanism 80, a shift arm 81 is rotated about a shift shaft 82 upon transmission of the shift operation to the shift arm 81. The rotation of the shift arm 81 is transmitted to the shift arm 83 via the shift shaft 82, so that the shift arm 83 is rotated. As a result, an index cam 130 is rotated through a predetermined angle. The rotation of the index cam 130 is transmitted to the dog engagement mechanism 70.

Figure 10:
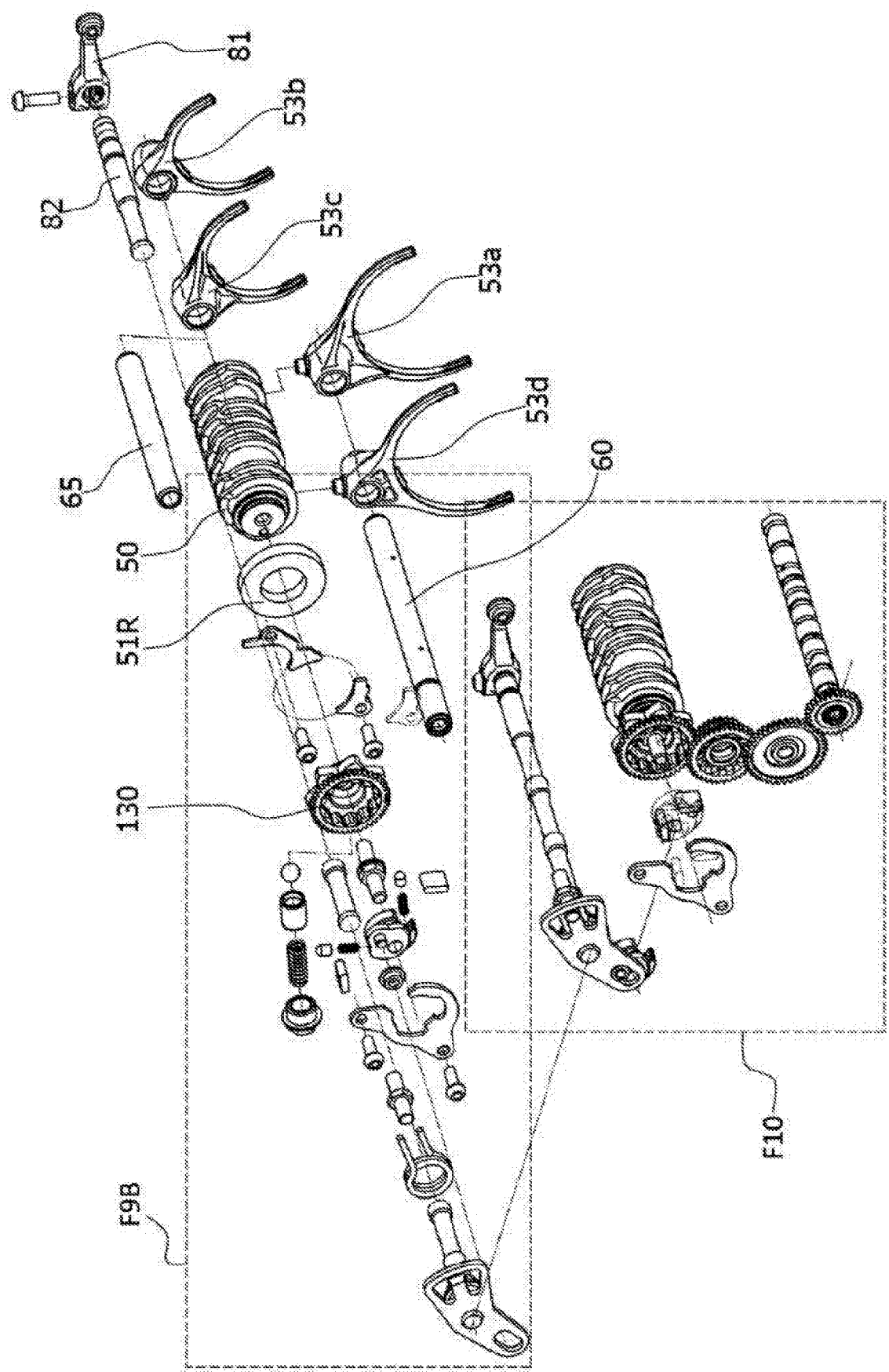
FIG. 10 is an exploded perspective view schematically showing a shift mechanism.
Figure 21:
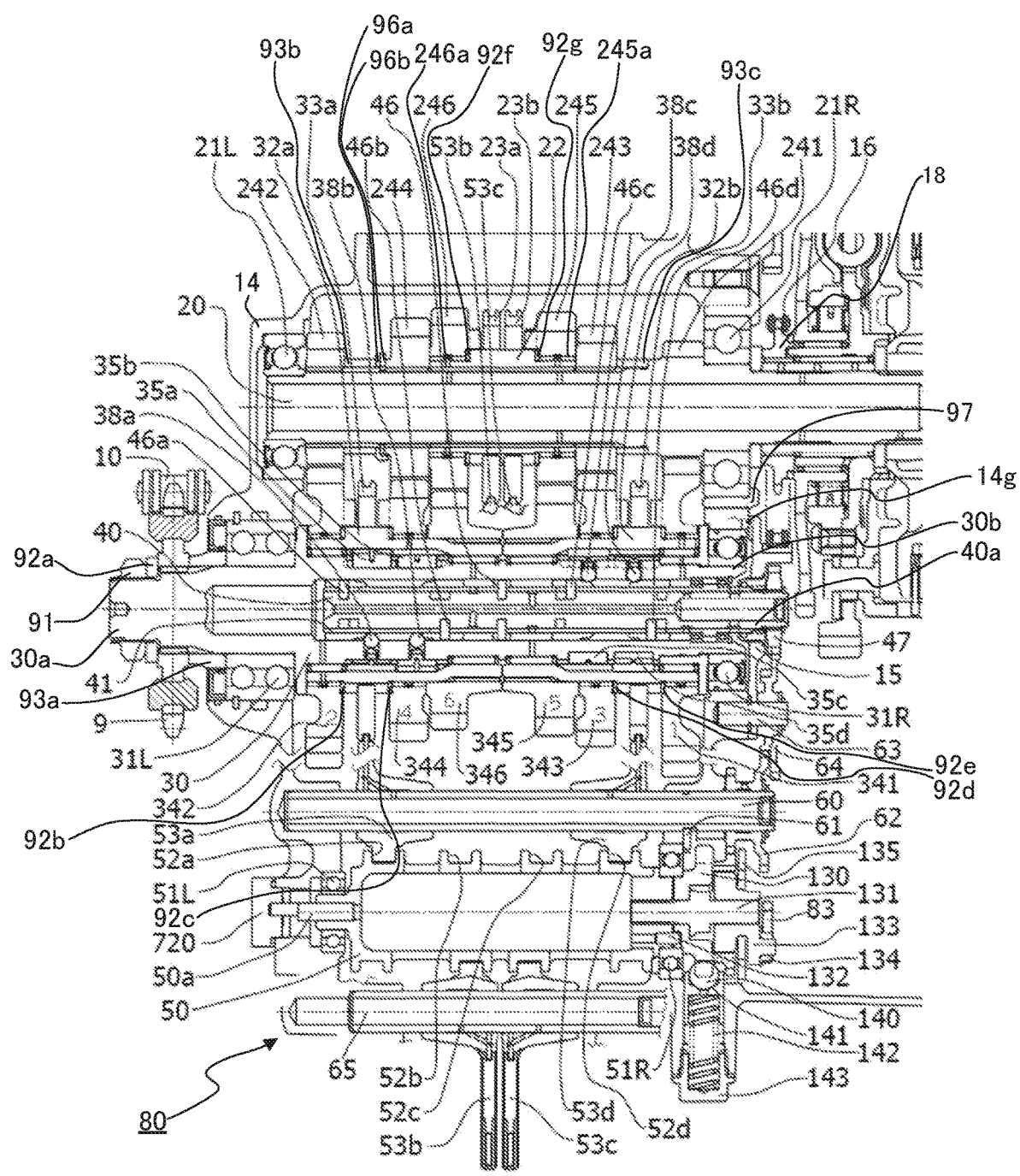
FIG. 21 is a diagram showing, on an enlarged scale, a part corresponding to a region F4B of FIG. 20.

The dog engagement mechanism 70 is operated in accordance with the shift operation received from the shift mechanism 80, and activates the power transmission from the input shaft 20 to a driven gear at any one of the gear stages via the drive gear and a corresponding driven gear. Referring to FIG. 8, FIG. 10, and FIG. 21, a fork guide shaft 60 and shift forks 53b, 53c which are slidably provided to the fork guide shaft 60 are component parts of the dog engagement mechanism 70. Shift forks 53a, 53d are also component parts of the dog engagement mechanism 70. Dog rings 23a, 23b, 32a, 32b are also component parts of the dog engagement mechanism 70, and engageable with dogs (protrusions) formed on side surfaces of the drive gears or the driven gears. A manner of dog engagement is not limited to this example. In another example, recess portions may be formed on the side surfaces of the drive gears or the driven gears and the dog rings may be configured such that dogs (protrusions) formed on side surfaces (surfaces facing the drive gears or the driven gears) of the dog rings are in dog engagement with the recess portions.

Figure 12:
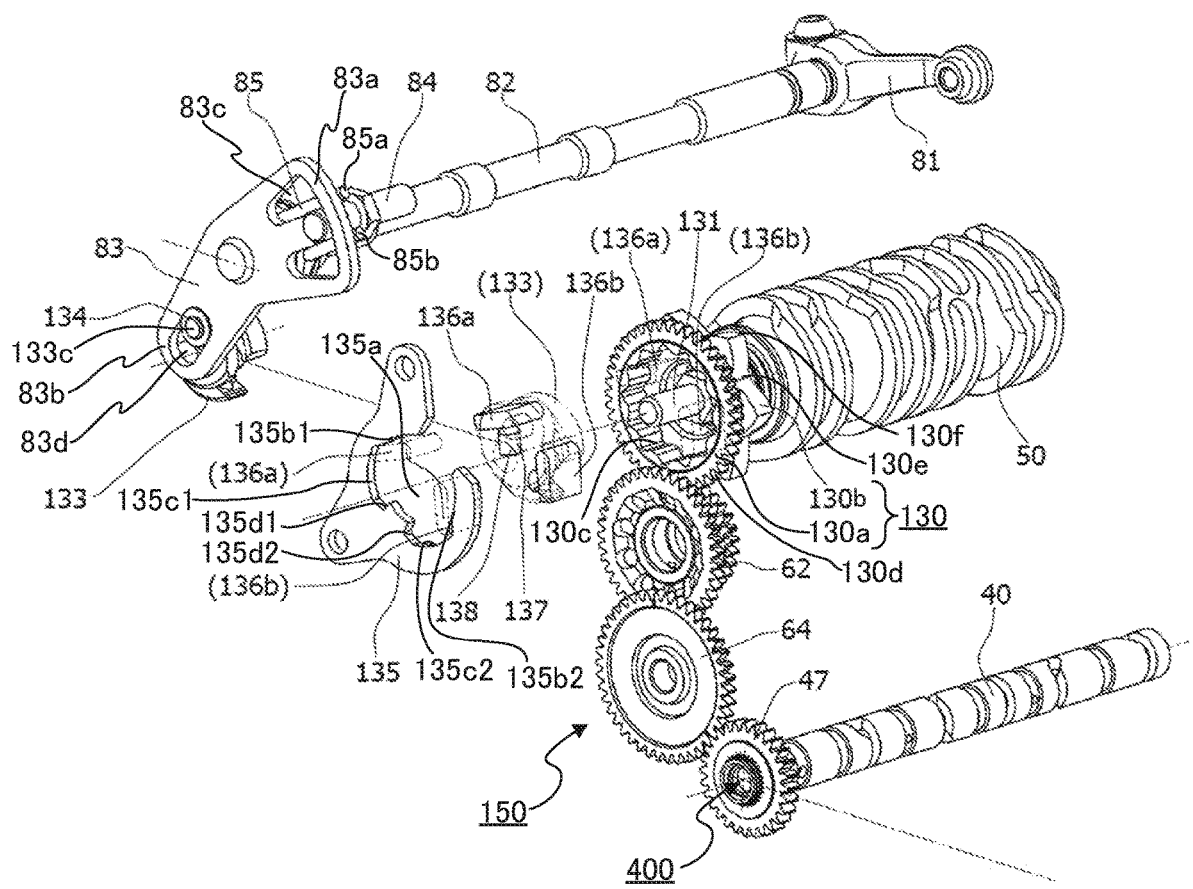
FIG. 12 is a diagram showing, on an enlarged scale, a part corresponding to a region F10 of FIG. 10.

Referring to FIG. 8 and FIG. 12, the synchronization mechanism 150 mechanically transmits the shift operation inputted by the driver to the ratchet mechanism 400 such that an operation of the ratchet mechanism 400 is synchronized with an operation of the dog engagement mechanism 70. The synchronization mechanism 150 includes the idle gears 62, 64 and the follower gear 47.

Each of the idle gears 62, 64 is a two-stage gear including two disk gears with different diameters (see FIG. 12 and FIG. 21). The idle gear 62 includes: a small-diameter gear that is meshed with a gear portion 130d provided on an outer periphery of an annular portion 130a of the index cam 130;

and a large-diameter gear that is meshed with a small-diameter gear of the idle gear 64. The idle gear 64 includes: the small-diameter gear that is meshed with the large-diameter gear of the idle gear 62; and a large-diameter gear that is meshed with the follower gear 47. Thus, the idle gears 62, 64 function as a speed-increasing gear.

Rotation of the follower gear 47 is transmitted to the ratchet mechanism 400. This way, the synchronization mechanism 150 mechanically transmits the shift operation inputted to the synchronization mechanism 150 within the synchronization mechanism 150, and transmits the shift operation to the ratchet mechanism 400.

The ratchet mechanism 400 is operated in accordance with the shift operation, and sets power transmission active from any of the odd-numbered stage driven gears or even-numbered stage driven gears to the output shaft 30.

In the transmission 13, as described above, the shift operation (load) that the driver inputted to the shift mechanism 80 is transmitted to the dog engagement mechanism 70, and transmitted to the ratchet mechanism 400 via the synchronization mechanism 150. Accordingly, the operation of the dog engagement mechanism 70 and the operation of the ratchet mechanism 400 are synchronized with each other. The dog engagement mechanism 70 activates the power transmission active from the input shaft 20 to a driven gear at any one of the gear stages via the driven gear and a corresponding drive gear. The ratchet mechanism 400 activates the power transmission active from any of the odd-numbered stage driven gears or even-numbered stage driven gears to the output shaft 30. As a result, the driver, when driving, is able to switch the gear ratio of the constant-mesh type transmission 13 (the rotation ratio between the input shaft 20 and the output shaft 30) by inputting a shift operation.

<<Shift Mechanism>>

The shift mechanism 80 will be described with reference to FIG. 9 to FIG. 19. The shift mechanism 80 and the shift rod assembly 500 are one example of a mechanism for inputting the shift operation to the transmission 13. The mechanism for inputting the shift operation to the transmission 13 is not limited to this example.

<Configuration of Shift Mechanism>

Figure 9:
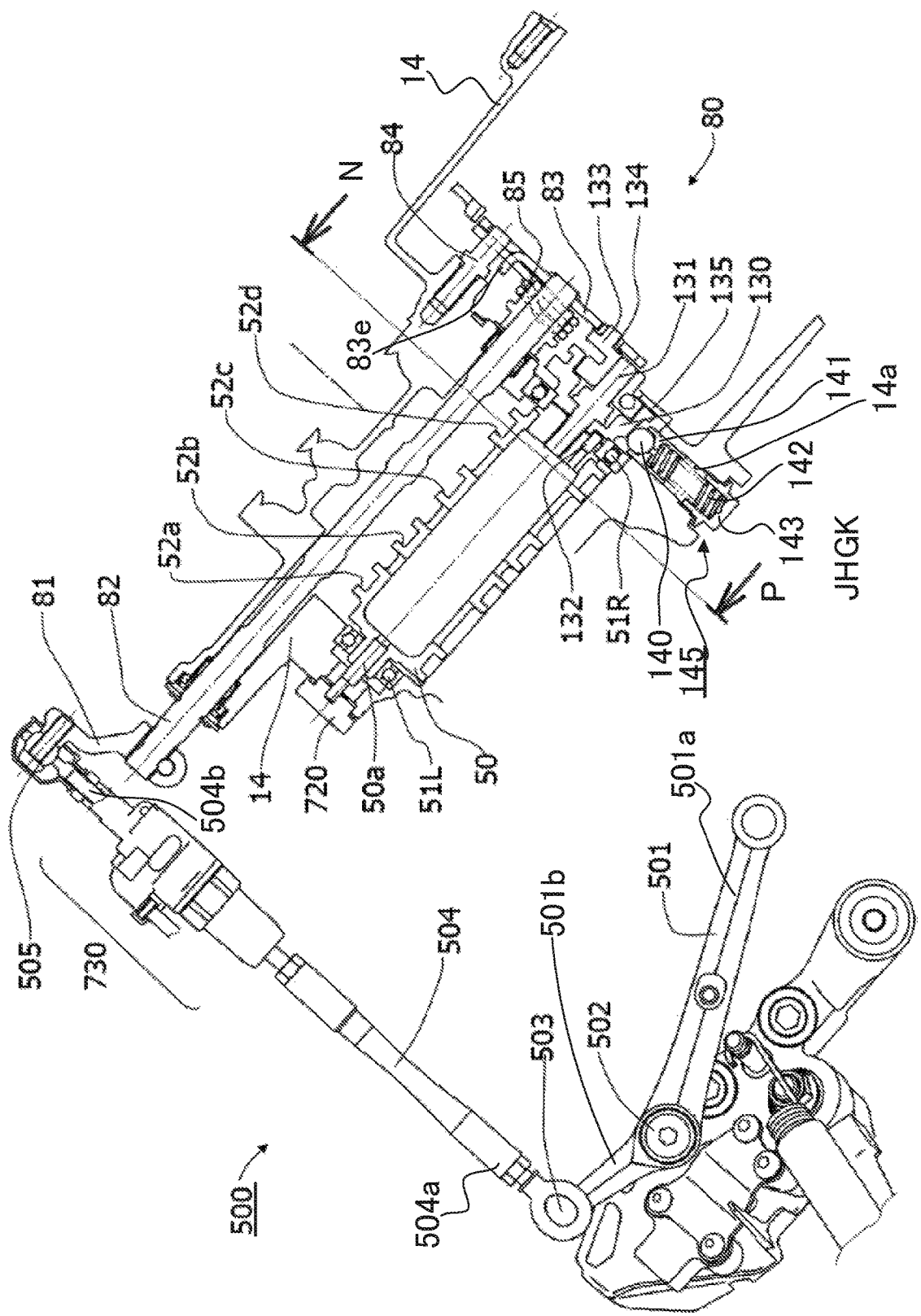
FIG. 9 is a cross-sectional development diagram as taken along the line J-H-G-K of FIG. 5, and indicating a cross-sectioned position corresponding to FIG. 29.

FIG. 9 shows the shift rod assembly 500 as well as the shift mechanism 80. The shift rod assembly 500 receives a load inputted by the driver operating the shift pedal 501, and transmits the load to the shift mechanism 80. The shift rod assembly 500 includes the shift pedal 501, a pedal pivot 502, pillow balls 503, 505 (spherical joints), a shift rod 504, and a shift load sensor 730.

As shown in FIG. 9, the shift pedal 501 is supported on the pedal pivot 502 so as to be pivotable about the pedal pivot 502. The shift pedal 501 is pivotable clockwise or counterclockwise in FIG. 9. The shift pedal 501 is configured such that one end portion 501a (in FIG. 9, a right end portion) thereof can be operated both clockwise and counterclockwise from its initial position by the driver's foot and can return to the initial position upon completion of the operation.

The other end portion 501b (in FIG. 9, a left end portion) of the shift pedal 501 is coupled to one end portion 504a (in FIG. 9, a lower end portion) of the shift rod 504 via the pillow ball 503. The shift rod 504 is movable in a longitudinal direction of the shift rod 504. The other end portion 504b (in FIG. 9, an upper end portion) of the shift rod 504 is coupled to the shift arm 81 via the pillow ball 505.

As shown in FIG. 9, FIG. 10, and FIG. 12, the shift arm 81 is rotatable together with the shift shaft 82 about the shift shaft 82. Referring to FIG. 9, the shift load sensor 730 is provided between the one end portion 504a and the other end portion 504b of the shift rod 504. The shift load sensor 730 is configured to detect a load that the driver applies to the shift rod 504 via the shift pedal 501.

When the one end portion 501a of the shift pedal 501 is operated from down to up in FIG. 9 by the driver's foot, the other end portion 501b of the shift pedal 501 is rotated counterclockwise in FIG. 9 about the pedal pivot 502. The counterclockwise rotation of the pedal pivot 502 is converted into longitudinally downward movement of the shift rod 504 by the pillow ball 503. A load applied to the shift rod 504 is detected by the shift load sensor 730. The longitudinally downward movement of the shift rod 504 is converted into downward (counterclockwise) rotation of the shift arm 81 by the pillow ball 505. If the driver's operation on the shift pedal 501 is cancelled, the respective elements return to their original positions.

When the one end portion 501a of the shift pedal 501 is operated from up to down by the driver's foot, the other end portion 501b of the shift pedal 501 is rotated clockwise in FIG. 9 about the pedal pivot 502. The clockwise rotation of the pedal pivot 502 is converted into longitudinally upward movement of the shift rod 504 by the pillow ball 503. A load applied to the shift rod 504 is detected by the shift load sensor 730. The longitudinally upward movement of the shift rod 504 is converted into upward (clockwise) rotation of the shift arm 81 by the pillow ball 505. If the driver's operation on the shift pedal 501 is cancelled, the respective elements return to their original positions.

This is how the shift rod assembly 500 transmits to the shift mechanism 80 a shift operation inputted to the shift pedal 501 by the driver's foot. Although this embodiment adopts a rod for transmitting the shift operation, it may be transmitted by a wire, for example. As mentioned above, the mechanism for inputting the shift operation to the transmission is not particularly limited.

Figure 11:
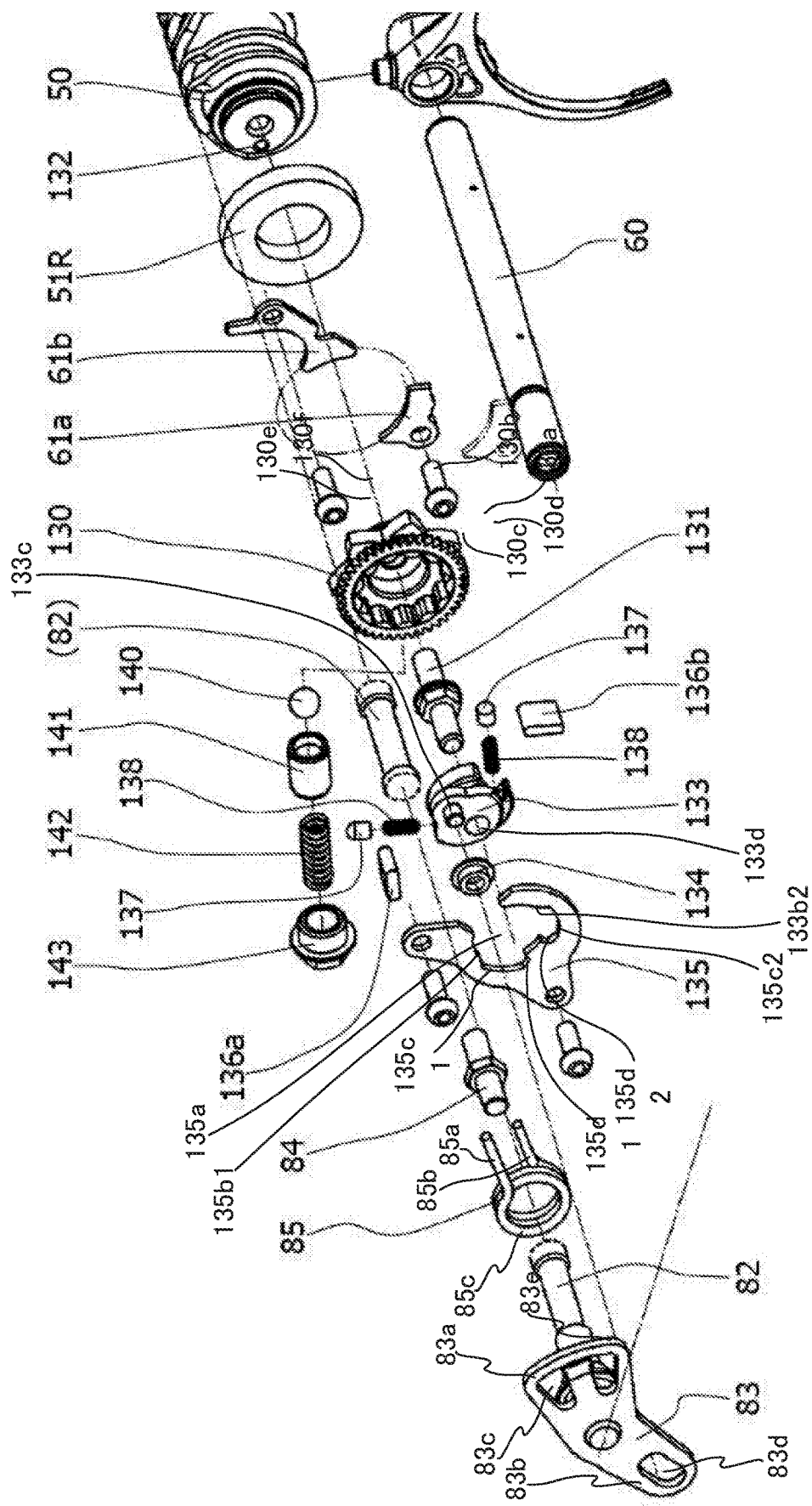
FIG. 11 is a diagram showing, on an enlarged scale, a part corresponding to a region F9B of FIG. 10.

In the shift mechanism 80, as shown in FIG. 9 and FIG. 12, upward or downward rotation of the shift arm 81 about the shift shaft 82 is transmitted as a rotational force (torque) to the shift shaft 82. The shift shaft 82 has the shift arm 81 in one end portion thereof, and the shift arm 83 in the other end portion thereof. As shown in FIG. 11 and FIG. 12, the shift arm 83 is in the shape of a flat plate flaring in a direction perpendicular to the shift shaft 82 and extending in the diameter direction of the shift shaft 82. The shift arm 83 has, in its one end portion 83a, an opening 83c through which a pin 84 is inserted. As shown in FIG. 9, the pin 84 is fixed to the casing 14, and not moved relative to the casing 14.

As shown in FIG. 12, the opening 83c of the shift arm 83, which has a fan-like shape flaring in a circumferential direction of the shift shaft 82, is formed so as to allow the shift arm 83 to rotate about the shift shaft 82 with the pin 84 inserted through the opening 83c. The shift arm 83 has an opening 83d in the other end portion 83b thereof. Inserted through the opening 83d is a projecting portion 133c of a rotor 133 together with a collar 134 attached to the projecting portion 133c. The opening 83d of the shift arm 83, which has a shape extending in the diameter direction of the shift shaft 82, is formed such that, when the shift arm 83 rotates about the shift shaft 82, the rotor 133 is rotated in a direction opposite to the rotation direction of the shift arm 83 while the projecting portion 133c as well as the collar 134 is moving within the opening 83d.

As shown in FIG. 9, FIG. 11, and FIG. 12, the shift shaft 82 is provided with a torsion spring 85 serving as a force storage part. As shown in FIG. 11, the torsion spring 85 includes a coil portion 85c, a first latch portion 85a constituted of one end portion extending out of the coil portion 85c, and a second latch portion 85b constituted of the other end portion extending out of the coil portion 85c. The shift shaft 82 is fitted within the inner diameter of the coil portion 85c, so that the torsion spring 85 is rotatably supported on the shift shaft 82. The shift arm 83 has, in its opening 83c, a latch portion 83e that is parallel to the pin 84. The latch portion 83e and the pin 84 fixed to the casing 14 are pinched by the first latch portion 85a and the second latch portion 85b and given an initial tension with respect to the circumferential direction of the shift shaft 82, as shown in FIG. 12 and FIG. 13.

Referring to FIG. 12, when the shift arm 83 is rotated in the circumferential direction of the shift shaft 82 along with application of a rotational force to the shift shaft 82, the latch portion 83e and the pin 84 are rotationally moved relative to each other, so that the interval between the first latch portion 85a and the second latch portion 85b is increased. As a result, in addition to the initial tension, a biasing force occurs in the torsion spring 85 so as to reduce the interval between the first latch portion 85a and the second latch portion 85b. Due to the biasing force, the shift arm 83 as well as the torsion spring 85 returns to the original position when the shift shaft 82 no longer receives the rotational force caused by input of the shift operation.

Moreover, when the shift arm 83 is rotated in the circumferential direction of the shift shaft 82 along with application of a rotational force to the shift shaft 82, the rotor 133 is rotated in the direction opposite to the rotation direction of the shift arm 83 while the projecting portion 133c as well as the collar 134 is guided by the opening 83d formed in the other end portion 83b of the shift arm 83 and moving within the opening 83d.

As shown in FIG. 11, the rotor 133 has a through hole 133d extending in the axial direction of a shaft 131 which will be described later. The rotor 133 is rotatably provided to the shaft 131 by the shaft 131 being received in the through hole 133d. The projecting portion 133c of the rotor 133 protrudes in the direction parallel to the axial direction of the shaft 131, at a position distant from the shaft 131 with respect to the diameter direction of the shaft 131. As shown in FIG. 12, the projecting portion 133c as well as the collar 134 is inserted through the opening 83d. While the projecting portion 133c is moving within the opening 83d, the rotor 133 is rotated about the shaft 131 in the direction opposite to the rotation direction of the shift arm 83, as described above.

Figures 13A, 13B, 13C:
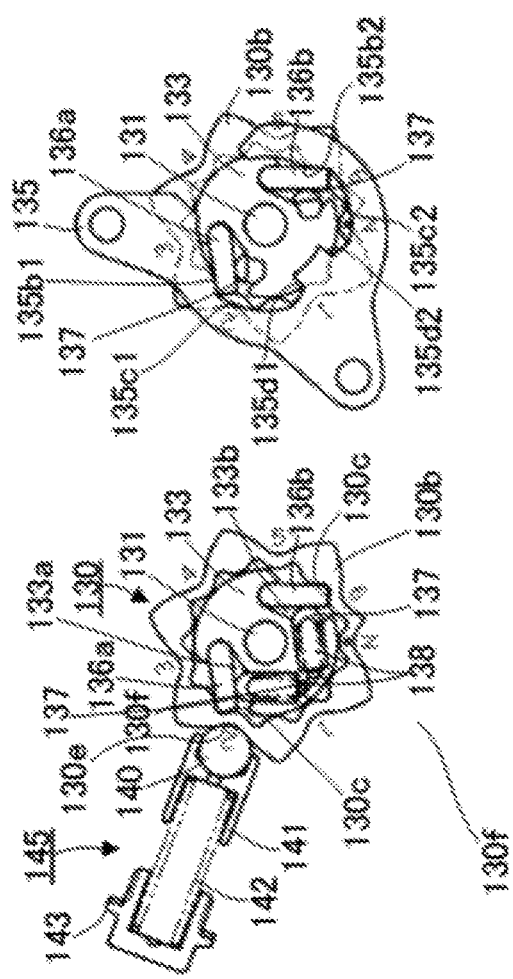
FIGS. 13A-13D are explanatory diagrams showing the shift mechanism in the process of shifting from a second speed to a third speed.

As shown in FIG. 13A, the rotor 133 has a first recess portion 133a and a second recess portion 133b provided at positions distant from the shaft 131 with respect to the diameter direction of the shaft 131, the first recess portion 133a and the second recess portion 133b being formed by an outer edge of the rotor 133 with respect to the diameter direction being recessed inward with respect to the diameter direction. The first recess portion 133a and the second recess portion 133b are planarly symmetrical to each other in a plane containing a center line of the through hole 133d and a center line of the projecting portion 133c. In the first recess portion 133a, a first claw portion 136a is disposed pivotably about one end portion of the first claw portion 136a. In the second recess portion 133b, a second claw portion 136b is disposed pivotably about one end portion of the second claw portion 136b. The one end portions of the first claw portion 136a and the second claw portion 136b will be referred to also as axial portions. The other end portion of the first claw portion 136a and the second claw portion 136b will be referred to also as distal end portions.

The axial portions of the first claw portion 136a and the second claw portion 136b are parallel to the axial direction of the shaft 131. In the first recess portion 133a, as shown in FIG. 13A, a compression spring 138 with a cap 137 is disposed so as to bias the distal end portion of the first claw portion 136a in a direction from the shaft 131 toward the outside with respect to the diameter direction of the shaft 131. In the second recess portion 133b, a compression spring 138 with a cap 137 is disposed so as to bias the distal end portion of the second claw portion 136b in a direction from the shaft 131 toward the outside with respect to the diameter direction of the shaft 131.

The first claw portion 136a, when biased by the compression spring 138, pivots clockwise in FIG. 13A about the axial portion of the first claw portion 136a, to be raised outward with respect to the diameter direction of the shaft 131, as shown in FIG. 13A. The second claw portion 136b, when biased by the compression spring 138, pivots counterclockwise in FIG. 13A about the axial portion of the second claw portion 136b, to be raised outward with respect to the diameter direction of the shaft 131, as shown in FIG. 13A. In this manner, the second claw portion 136b is configured to pivot in a direction opposite to a pivoting direction of the first claw portion 136a.

As shown in FIG. 12, the rotor 133 as well as the first claw portion 136a and the second claw portion 136b is received in the annular portion 130a of the index cam 130, and also received in an opening 135a of the guide plate 135. The first claw portion 136a and the second claw portion 136b are disposed so as to span the guide plate 135 and the annular portion 130a of the index cam 130 with respect to the axial direction of the shaft 131.

As shown in FIG. 9, the index cam 130 is fixed to one end portion of a shift cam 50 with interposition of the shaft 131 such that the index cam 130 is coaxial with the shift cam 50. As shown in FIG. 9, the one end portion of the shift cam 50 is rotatably supported on the casing 14 via a bearing 51R. Relative rotation between the shift cam 50 and the index cam 130 in the circumferential direction is restricted by a pin 132 that is provided in the axial direction of the shift cam 50 and the index cam 130. Thus, the shift cam 50 rotates together with the index cam 130 about the shaft 131.

The other end portion of the shift cam 50 is rotatably supported on the casing 14 via a bearing 51L. In addition, the other end portion of the shift cam 50 is provided with a detection object shaft 50a that is coaxial with the shift cam 50. In the casing 14, a shift cam phase sensor 720 is disposed at a position distant from the other end portion of the shift cam 50 with respect to the axial direction of the shift cam 50. The shift cam phase sensor 720 is configured to detect the phase (the rotation position with respect to the circumferential direction) of the shift cam 50 by detecting the detection object shaft 50a.

As shown in FIG. 12, the index cam 130 includes an annular portion 130a having an annular shape and a star-shaped portion 130b having a starlike shape. The annular portion 130a and the star-shaped portion 130b are fixed adjacent to each other with respect to the axial direction of the shaft 131. In an inner peripheral surface of the annular portion 130a with respect to the diameter direction, a plurality of recess portions 130c are arranged at regular intervals in the circumferential direction.

The gear portion 130d is formed throughout an outer peripheral surface of the annular portion 130a with respect to the diameter direction. The gear portion 130d is disposed so as to be meshed with the idle gear 62 of the synchronization mechanism 150. Rotation of the gear portion 130*d* is transmitted to the ratchet mechanism 400 via the idle gears 62, 64 and the follower gear 47 of the synchronization mechanism 150.

An outer peripheral surface of the star-shaped portion 130*b* with respect to the diameter direction has concave and convex shapes that are concaved and convexed in the diameter direction and that are continuous in the circumferential direction. The positions of a plurality of recess portions 130*e* forming concave portions of the concave and convex shapes serve as gear stage positions of the respective gear stages of the shift cam 50. Each gear stage position corresponds to each gear position. In this embodiment, the transmission 13 is a six-speed transmission of bottom-neutral type. A sixth-speed gear position is a maximum-speed gear position. A later-described phase-holding mechanism 145 presses a ball 140 to a recess portion 130*e*, to hold the shift cam 50 at a gear stage position corresponding to the recess portion 130*e*. That is, the recess portions 130*e* are provided so as to define phases of the shift cam 50 corresponding to the gear stages.

Referring to FIG. 13A to FIG. 19D, the respective recess portions 130*e* are given the reference signs "N", "1", "2, "3", "4", "5", and "6" which correspond to the gear stages. The reference sign "N" denotes the neutral position.

In a shift pattern of the transmission according to this embodiment, the neutral position is located on the lower side of the first-speed gear position. As shown in FIG. 13A, therefore, the plurality of recess portions 130*e* in an outer peripheral portion of the star-shaped portion 130*b* of the index cam 130 are associated with the respective gear positions in a clockwise sequence of the neutral position, the first-speed gear position, the second-speed gear position, the third-speed gear position, the fourth-speed gear position, the fifth-speed gear position, and the sixth-speed gear position.

In the index cam 130, the rotation angle between the respective gear stage positions is constant, as shown in FIG. 13A.

The angle between the sixth-speed gear stage position and the neutral gear stage position is smaller than the rotation angle. In other words, the rotation angle (R2) between a pair of adjacent recess portions 130*e* among the plurality of recess portions 130*e* is constant, and the angle (R1) between the maximum-speed gear stage position and the neutral gear stage position is smaller than the rotation angle (R2). In the star-shaped portion 130*b* of the index cam 130 of the bottom-neutral type transmission according to the present teaching, the angle (R1) and the rotation angle (R2) circumferentially from the neutral position to the maximum-speed stage through the first-speed stage are represented by the following expressions (3) and (4), in relation to the plurality of recess portions 130*c*, 130*e*.

$$M = Q \times K - S \quad (1)$$

$$P = 360° \div M \quad (2)$$

$$R2 = P \times Q \quad (3)$$

$$R1 = P \times S \quad (4)$$

K represents the number of recess portions 130*e* arranged in the outer peripheral surface of the star-shaped portion 130*b* of the index cam 130. The value of K corresponds to the number of gear stages of the transmission 13. The number of gear stages herein includes the neutral position. M represents the number of recess portions 130*c* arranged in the inner peripheral surface of the star-shaped portion 130*b* of the index cam 130. 360° represents the full rotation angle of the shift cam. P represents the angle of the interval at which the recess portions 130*e* are arranged in the circumferential direction. Q is a natural number representing the number of intervals of recess portions 130*c* corresponding to an angle through which the index cam 130 is rotated per one stage shifting. In other words, by Q, a distance over which the first claw portion 136*a* or the second claw portion 136*b* moves per one stage shifting is indicated as the number of the recess portions 130*c* corresponding to the distance. Q is, though not particularly limited, preferably 2. S represents the number of recess portions 130*c* included in the angle R1. S is a natural number smaller than Q. In a case where Q is 2, S is 1.

In this embodiment, each variable is as follows. Q is 2. K is 6+1=7. S is 1. According to the expression (1), M is 2×7−1=13. According to the expression (2), P is 360°÷13=27.69°. According to the expression (3), R2 is 27.69°×2=55.38°. According to the expression (4), R1 is 27.69°×1=27.69°.

When the rotor 133 rotates, the recess portion 130*c* is engaged with the distal end portion of the first claw portion 136*a* or the second claw portion 136*b* raised in the rotor 133. As a result, the index cam 130 is rotated along with rotation of the rotor 133. In this embodiment, the number (M) of recess portions 130*c* is 13.

The M recess portions 130*c* are arranged at regular intervals in the circumferential direction. In each one stage shifting, the index cam 130 is rotated through a rotation angle corresponding to the Q recess portions 130*c*. Consequently, the recess portion 130*e* to which the ball 140 is pressed is changed to an adjacent recess portion 130*e*.

As shown in FIG. 13A, the phase-holding mechanism 145 is disposed outside the star-shaped portion 130*b* of the index cam 130 with respect to the diameter direction of the shaft 131. The phase-holding mechanism 145 is a mechanism for holding the phase of the index cam 130. The phase-holding mechanism 145 holds the shift cam 50 at a phase corresponding to each fixed rotation angle, that is, at a gear stage position in a case of not shifting gears. As shown in FIG. 9, the phase-holding mechanism 145 includes the ball 140, a retainer 141, a compression spring 142 and a plug 143.

In a case of not shifting gears where the phase-holding mechanism 145 holds the shift cam 50 at a gear stage position corresponding to any one of the gear stages, the control cam shaft 40 is held at an odd-numbered stage position or an even-numbered stage position corresponding to the one of the gear stages by the phase-holding mechanism 145 via the synchronization mechanism 150. The synchronization mechanism 150 mechanically achieves synchronization between the holding of the gear stage by the dog engagement mechanism 70 and the holding of the raised or lowered state of each of pawls 35*a* to 35*d* in the ratchet mechanism 400. This provides a higher robustness in the operation of the transmission 13. The synchronization mechanism 150 holds the raised or lowered state of each of the pawls 35*a* to 35*d*. Since the synchronization mechanism 150 serves to hold the posture of the pawls 35*a* to 35*d*, structural complexity can be suppressed.

As shown in FIG. 9, the compression spring 142 is disposed in a hole portion 14*a* formed in the casing 14. The hole portion 14*a*, which opens toward the outer peripheral surface of the star-shaped portion 130*b* of the index cam 130 (see FIG. 13A), is disposed so as to intersect (perpendicularly) with the rotation axis line of the shift cam 50. The hole portion 14*a* is closed by the plug 143 from the outside of the casing 14 such that the compression spring 142 is positioned in the hole portion 14a. One end of the compression spring 142 is in abutment with the plug 143. The other end of the compression spring 142 is provided with the retainer 141 such that the retainer 141 is movable along with expansion and contraction of the compression spring 142 in a direction in which the compression spring 142 expands or contracts.

The ball 140 is provided between the retainer 141 and the outer peripheral surface of the star-shaped portion 130b with the concave and convex shapes. The ball 140 is biased toward the rotation axis line of the shift cam 50 by the compression spring 142 via the retainer 141. The phase of the shift cam 50 can be held by the ball 140, the retainer 141, the compression spring 142, the recess portions 130e, and peak portions 130f.

As shown in FIG. 11 and FIG. 12, the guide plate 135 is a plate-shaped member disposed in parallel to the diameter direction of the shaft 131, and fixed to the casing 14 such that its positional relationship relative to the casing 14 (see, for example, FIG. 4) is fixed. Thus, the guide plate 135 is not displaced along with rotation of the rotor 133 and the index cam 130. The guide plate 135 is also not displaced along with rotation of the shift arm 83.

As shown in FIG. 11 and FIG. 12, the guide plate 135 has the opening 135a recessed inward with respect to the diameter direction. In the opening 135a, the rotor 133 as well as the first claw portion 136a and the second claw portion 136b is received in a rotatable manner. As shown in FIG. 12, an inner peripheral surface of the guide plate 135 confronting the opening 135a has a first guide surface 135b1, a first allowing surface 135c1, and a first stop surface 135d1, and also has a second guide surface 135b2, a second allowing surface 135c2, and a second stop surface 135d2.

As shown in FIG. 12, the first allowing surface 135c1 is configured to allow the first claw portion 136a to be raised as a result of being pushed out in the diameter direction of the shaft 131 by the compression spring 138 when the first claw portion 136a is in a position corresponding to the first allowing surface 135c1. The first allowing surface 135c1 is located outside the first guide surface 135b1 and the first stop surface 135d1 with respect to the diameter direction of the shaft 131.

The second allowing surface 135c2 is configured to allow the second claw portion 136b to be raised as a result of being pushed out in the diameter direction of the shaft 131 by the compression spring 138 when the second claw portion 136b is in a position corresponding to the second allowing surface 135c2. The second allowing surface 135c1 is located outside the second guide surface 135b2 and the second stop surface 135d2 with respect to the diameter direction of the shaft 131.

As shown in FIG. 12, the first guide surface 135b1 is configured to contact the first claw portion 136a and make the first claw portion 136a lowered inward with respect to the diameter direction of the shaft 131 while the first claw portion 136a is moving from a position corresponding to the first allowing surface 135c1 to a position corresponding to the first guide surface 135b1 along with rotation of the rotor 133.

The second guide surface 135b2 is configured to contact the second claw portion 136b and make the second claw portion 136b lowered inward with respect to the diameter direction of the shaft 131 while the second claw portion 136b is moving from a position corresponding to the second allowing surface 135c2 to a position corresponding to the second guide surface 135b2 along with rotation of the rotor 133.

As shown in FIG. 12, the first stop surface 135d1 is configured to abut against the distal end portion of the raised first claw portion 136a so as to stop rotation of the rotor 133 relative to the guide plate 135 while the first claw portion 136a is moving from a position corresponding to the first allowing surface 135c1 to a position corresponding to the first stop surface 135d1 along with rotation of the rotor 133.

The second stop surface 135d2 is configured to abut against the distal end portion of the raised second claw portion 136b so as to stop rotation of the rotor 133 relative to the guide plate 135 while the second claw portion 136b is moving from a position corresponding to the second allowing surface 135c2 to a position corresponding to the second stop surface 135d2 along with rotation of the rotor 133.

<Operation of Shift Mechanism>

Next, operations of the shift mechanism 80 will be described with reference to FIG. 13A to FIG. 19D. In FIG. 13A to FIG. 19D, the drawings labeled A are cross-sectional views obtained when the shift mechanism 80 is viewed in the axial direction, showing a position including the star-shaped portion 130b of the index cam 130 and the phase-holding mechanism 145. These drawings correspond to a cross section Z1 of FIG. 20. The drawings labeled 13B-19B are cross-sectional views obtained when the shift mechanism 80 is viewed in the axial direction, showing a position including the first and second claw portions 136a, 136b of the rotor 133 and the guide plate 135. These drawings correspond to a cross section Z2 of FIG. 20. The drawings labeled 13C-19C are cross-sectional views obtained when the shift mechanism 80 is viewed in the axial direction, showing a position including the torsion spring 85. These drawings correspond to a cross section Z3 of FIG. 20. The drawings labeled 13D-19D are cross-sectional views obtained when the shift mechanism 80 is viewed in the axial direction, showing a position including the shift arm 83. These drawings correspond to a cross section Z4 of FIG. 20. In FIG. 13A to FIG. 19D, drawings labeled the same number show the cross sections obtained at the same moment. Some of the elements already described with reference to FIG. 9 to FIG. 12 are given the reference signs on the drawings, though descriptions thereof will be omitted below.

FIG. 13A to FIG. 19D are explanatory diagrams showing the shift mechanism 80 in the process of shifting from the second speed to the third speed. More specifically, FIG. 13A to FIG. 19D show a gear shifting operation from a second-speed neutral state to a third-speed neutral state. The second-speed neutral state means a state where the phase of the index cam 130 is held at the recess portion 130e corresponding to the second speed "2" while the shift arms 81, 83 and the shift shaft 82 are in a neutral position before starting the gear shifting operation. The third-speed neutral state means a state where the phase of the index cam 130 is held at the recess portion 130e corresponding to the third speed "3" while the shift arms 81, 83 and the shift shaft 82 are in the neutral position before starting the gear shifting operation.

FIG. 13A to FIG. 13D shows the second-speed neutral state. In the second-speed neutral state, as shown in FIG. 13A, the phase-holding mechanism 145 presses the ball 140 to the recess portion 130e corresponding to the second speed "2". Thus, the index cam 130 is held at the second-speed gear position.

Figure 13D:
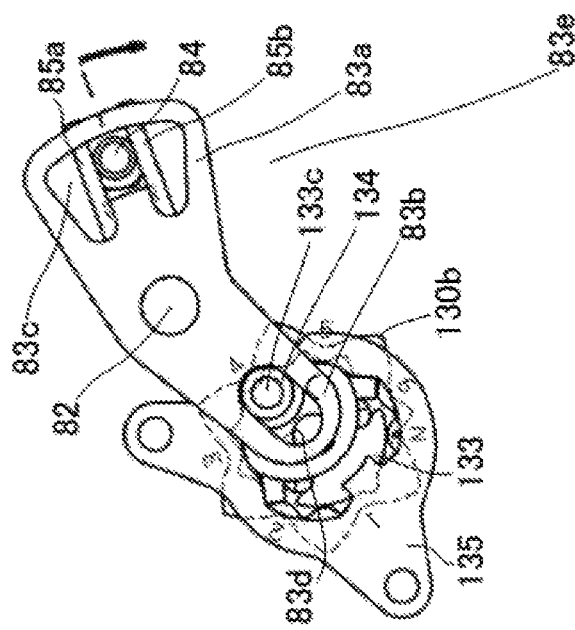

As shown in FIG. 13C, the rotor 133 is disposed such that the projecting portion 133c is located between the shaft 131 and the shift shaft 82. As shown in FIG. 13D, the projecting portion 133c of the rotor 133 is within the opening 83d formed in the shift arm 83 so as to extend in the diameter direction of the shift shaft 82, and at a position close to the shift shaft 82. As shown in FIG. 13D, the pin 84 is located substantially at the center within the opening 83c with respect to the circumferential direction of the shift shaft 82.

As shown in FIG. 13C, the latch portion 83e and the pin 84 are pinched in the circumferential direction of the shift shaft 82 due to the initial tension given to the first latch portion 85a and the second latch portion 85b of the torsion spring 85. As shown in FIG. 13A and FIG. 13B, the first claw portion 136a which is at a position corresponding to the first allowing surface 135c1 is pushed outward with respect to the diameter direction by the compression spring 138, and thus raised. The distal end portion of the first claw portion 136a is engaged with a recess portion 130c. As shown in FIG. 13A and FIG. 13B, the second claw portion 136b which is at a position corresponding to the second allowing surface 135c2 is pushed outward with respect to the diameter direction by the compression spring 138, and thus raised. The distal end portion of the second claw portion 136b is engaged with another recess portion 130c. This way, the first claw portion 136a and the second claw portion 136b are arranged such that their respective distal end portions are simultaneously engaged with different recess portions 130c.

FIG. 14A to FIG. 14D show a state where the shift arm 83 is slightly rotated clockwise from the second-speed neutral state. As shown in FIG. 14D, the shift arm 83 is rotated clockwise about the shift shaft 82. Since the pin 84 is fixed to the casing 14, the latch portion 83e is displaced relative to the pin 84 along with rotation of the shift arm 83, so that the interval between the first latch portion 85a and the second latch portion 85b of the torsion spring 85 increases, as shown in FIG. 14C. As a result, a biasing force (torque) directed to reduction of the interval between the first latch portion 85a and the second latch portion 85b is stored in the torsion spring 85.

As shown in FIG. 14D, the projecting portion 133c of the rotor 133 is guided by the opening 83d of the shift arm 83 which is rotated clockwise, to move together with the collar 134 within the opening 83d of the shift arm 83. At this time, as shown in FIG. 14C, the rotor 133 is rotated counterclockwise about the shaft 131. The distal end portion of the first claw portion 136a which is at a position corresponding to the first allowing surface 135c1 is engaged with the recess portion 130c. Accordingly, the index cam 130 is rotated counterclockwise as the rotor 133 is rotated counterclockwise.

As the rotor 133 is rotated counterclockwise, the second claw portion 136b moves from a position corresponding to the second allowing surface 135c2 to a position corresponding to the second guide surface 135b2, contacts the second guide surface 135b2, and is lowered inward with respect to the diameter direction of the shaft 131 by the second guide surface 135b2. As a result, the engagement between the second claw portion 136b and the recess portion 130c is cancelled. As the index cam 130 is rotated counterclockwise, the peak portion 130f interposed between the recess portion 130e corresponding to "2" and the recess portion 130e corresponding to "3" in the outer peripheral surface of the star-shaped portion 130b of the index cam 130 moves in the circumferential direction, to approach a position contacted by the ball 140, as shown in FIG. 14A. At this time, the peak portion 130f interposed between the recess portion 130e corresponding to "2" and the recess portion 130e corresponding to "3" pushes the ball 140 outward with respect to the diameter direction of the shaft 131.

Figure 15D:
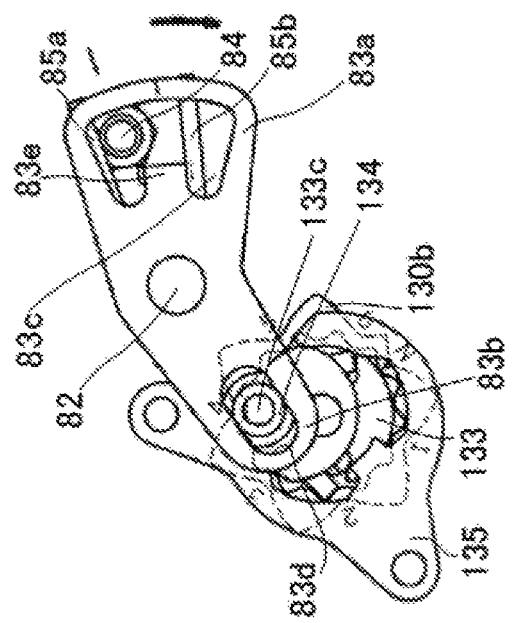

FIG. 15A to FIG. 15D show a state where the shift arm 83 is further rotated clockwise. As the shift arm 83 is further rotated, the interval between the first latch portion 85a and the second latch portion 85b of the torsion spring 85 further increases, as shown in FIG. 15C. Consequently, the biasing force stored in the torsion spring 85 increases.

As shown in FIG. 15C, the rotor 133 is further rotated counterclockwise about the shaft 131. The distal end portion of the first claw portion 136a causes the index cam 130 to be further rotated counterclockwise. The second claw portion 136b is further rotated counterclockwise while being lowered inward with respect to the diameter direction of the shaft 131 by the second guide surface 135c2, as shown in FIG. 15B.

As the index cam 130 is further rotated counterclockwise, the peak portion 130f interposed between the recess portion 130e corresponding to "2" and the recess portion 130e corresponding to "3" in the outer peripheral surface of the star-shaped portion 130b of the index cam 130 moves in the circumferential direction, to pass through the position contacted by the ball 140, as shown in FIG. 15A. At this time, the ball 140 climbs over the peak portion 130f interposed between the recess portion 130e corresponding to "2" and the recess portion 130e corresponding to "3", and moves inward with respect to the diameter direction of the shaft 131 so as to approach the recess portion 130e corresponding to "3".

FIG. 16A to FIG. 16D show a state where the shift arm 83 is rotated to the maximum limit of its movable range.

Figure 16D:
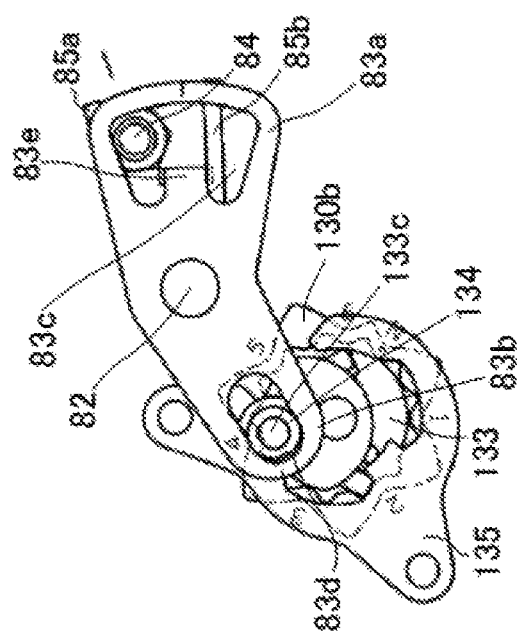

As the shift arm 83 is further rotated clockwise, the pin 84 fixed to the casing 14 abuts against an inner peripheral edge of the opening 83c of the shift arm 83, as shown in FIG. 16D. Now that the rotation of the shift arm 83 reaches the maximum limit of the movable range, the clockwise rotation of the shift arm 83 stops. At this time, the biasing force directed to reduction of the interval between the first latch portion 85a and the second latch portion 85b is stored in the torsion spring 85.

Along with rotation of the rotor 133, the first claw portion 136a moves from a position corresponding to the first allowing surface 135c1 to a position corresponding to the first stop surface 135d1, as shown in FIG. 16B. At this time, the distal end portion of the first claw portion 136a abuts against the first stop surface 135d1 to stop the rotation of the rotor 133 relative to the guide plate 135. In the outer peripheral surface of the star-shaped portion 130b of the index cam 130, the recess portion 130e corresponding to "3" moves in the circumferential direction and reaches the position contacted by the ball 140, as shown in FIG. 16A. The ball 140 moves inward with respect to the diameter direction of the shaft 131, and held in the recess portion 130e corresponding to "3".

Figure 18D:
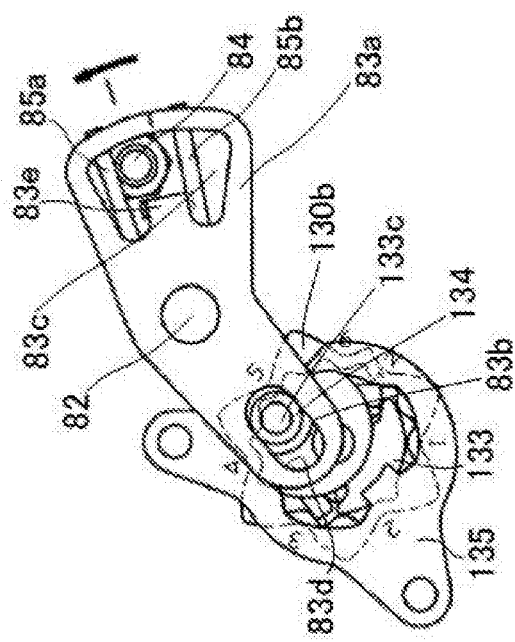
Figure 19D:
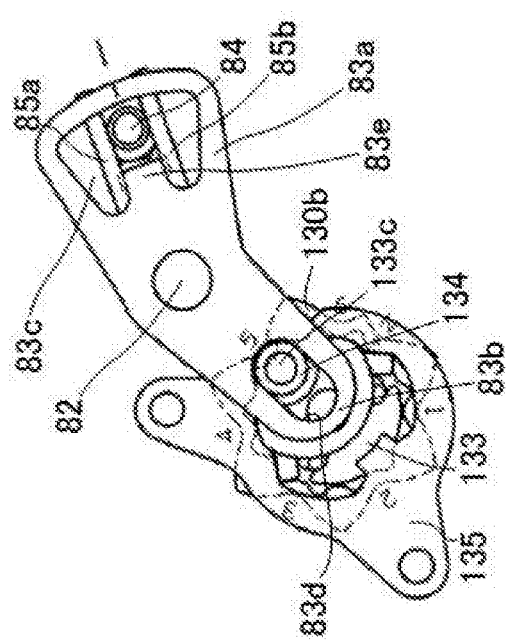

Then, upon cancellation of the load inputted to the shift pedal 501 which means the shift operation, the shift arm 83 is rotated counterclockwise by the biasing force stored in the torsion spring 85, as shown in FIG. 17D, FIG. 18D, and FIG. 19D. This reduces the interval between the first latch portion 85a and the second latch portion 85b of the torsion spring 85.

As shown in FIG. 17D, FIG. 18D, and FIG. 19D, the projecting portion 133c of the rotor 133 is guided by the opening 83d of the shift arm 83 which is rotated counterclockwise, to move together with the collar 134 within the opening 83d of the shift arm 83. At this time, as shown in FIG. 17C, FIG. 18C, and FIG. 19C, the rotor 133 is rotated clockwise about the shaft 131.

As shown in FIG. 17B, FIG. 18B, and FIG. 19B, the first claw portion 136a which is at a position corresponding to the first allowing surface 135c1 is pushed outward with respect to the diameter direction by the compression spring 138, and thus raised. In clockwise rotation of the rotor 133, however, the distal end portion of the first claw portion 136a is not engaged with the recess portion 130c because the distal end portion of the first claw portion 136a is rotated together with the rotor 133 while being displaced along the unevenness of the recess portions 130c due to a biasing force given from the compression spring 138. Under a condition shown in FIG. 17B and FIG. 18B, the second claw portion 136b is rotated clockwise while being lowered inward with respect to the diameter direction of the shaft by the second guide surface 136c2.

As the rotor 133 is further rotated clockwise, the second claw portion 136b moves from a position corresponding to the second guide surface 136c2 to a position corresponding to the second allowing surface 135c2, as shown in FIG. 19B. At this time, the second claw portion 136b is pushed outward with respect to the diameter direction by the compression spring 138, and thus raised. Since the rotation of the rotor 133 stops at a time point when the second claw portion 136b is raised, the second claw portion 136b is not rotated in a state of being engaged with the recess portion 130c.

This way, in a process from when the shift arm 83 is rotated to the maximum limit of the movable range (FIG. 16A to FIG. 16D) to when the shift arm 83 returns to the neutral position (FIG. 19A to FIG. 19D), the rotor 133 rotates while both the first claw portion 136a and the second claw portion 136b are not engaged with the recess portion 130c. Thus, transmission of a rotational force from the rotor 133 to the index cam 130 does not occur in the process from when the shift arm 83 is rotated to the maximum limit of the movable range to when the shift arm 83 returns to the neutral position. Accordingly, the phase-holding mechanism 145 holds the index cam 130 with the ball 140 pressed to the recess portion 130e corresponding to the third speed "3". That is, the index cam 130 is held at the third-speed gear position.

As thus far described above, in the shift mechanism 80, for shifting gears, the shift arm 83 firstly moves from the neutral position to the maximum level of the movable range. At this time, the shift mechanism 80 rotates the rotor 133, and also transmits the rotation of the rotor 133 to the index cam 130 via the first claw portion 136a (or the second claw portion 136b), to rotate the index cam 130 through a predetermined angle. As a result, the shift cam 50 is rotated through the predetermined angle.

Then, in the shift mechanism 80, the shift arm 83 returns from the maximum level of the movable range to the neutral position. At this time, the shift mechanism 80 rotates the rotor 133 in the reverse direction such that the rotor 133 returns to the neutral position, but the rotation of the rotor 133 is not transmitted to the index cam 130. The phase of the index cam 130 and the shift cam 50 is held by the phase-holding mechanism 145.

In this manner, after shifting the gear stage, each element of the shift mechanism 80 returns to the neutral position, and comes into a standby state. Here, a shift-up operation for each shift of the gear stage of first speed→second speed→third speed→fourth speed→fifth speed→sixth speed is performed in the same manner as the shift-up operation for second speed→third speed described above. A shift-down operation for each shift of sixth speed→fifth speed→fourth speed→third speed→second speed→first speed→N is performed by each element of the shift mechanism 80 operating in a direction reverse to the direction in which the element operates in the shift-up operation.

<<Input Shaft, Output Shaft, etc.>>

Figure 22:
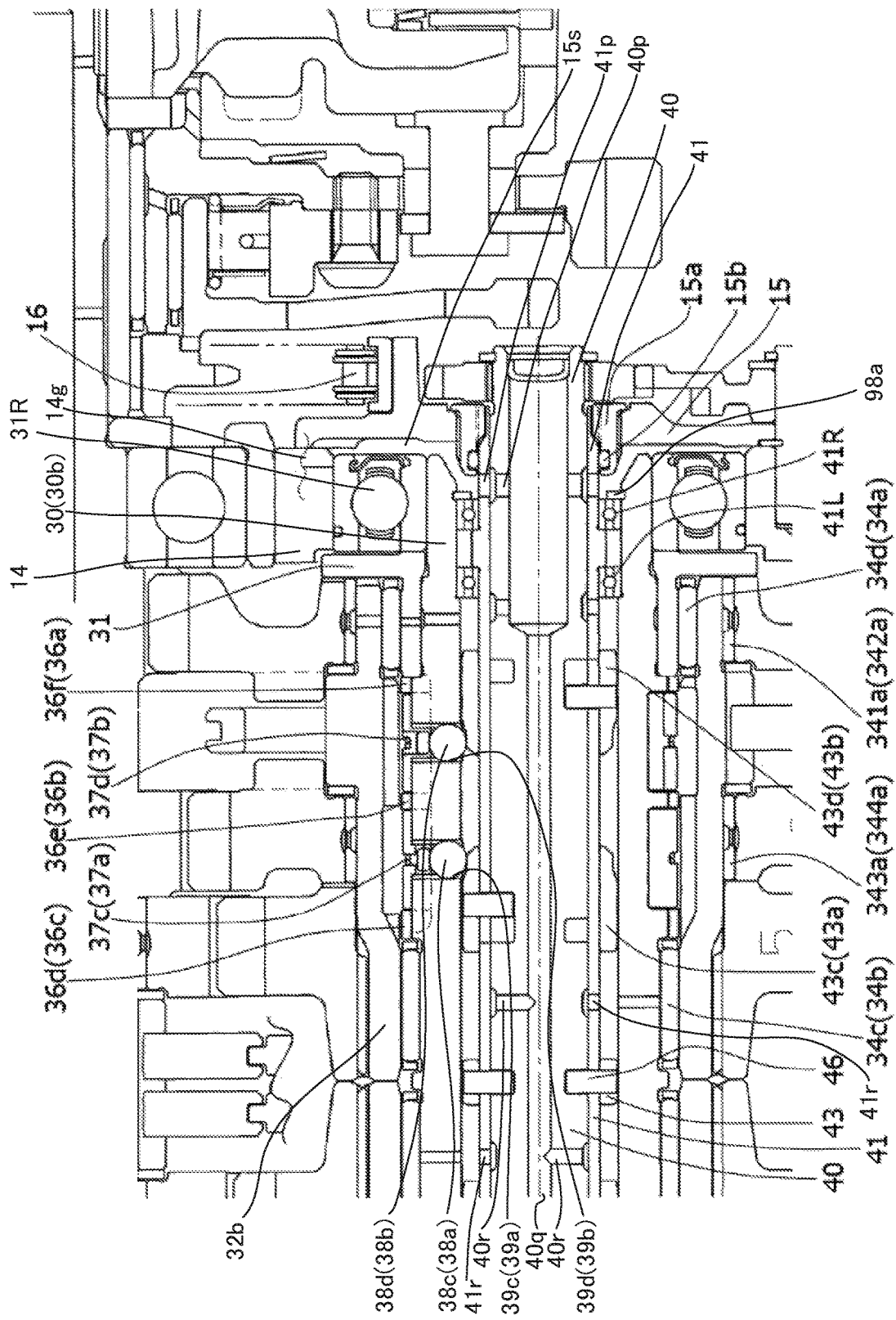
FIG. 22 is a diagram showing, on an enlarged scale, a part corresponding to a region F4C of FIG. 20.
Figure 23:
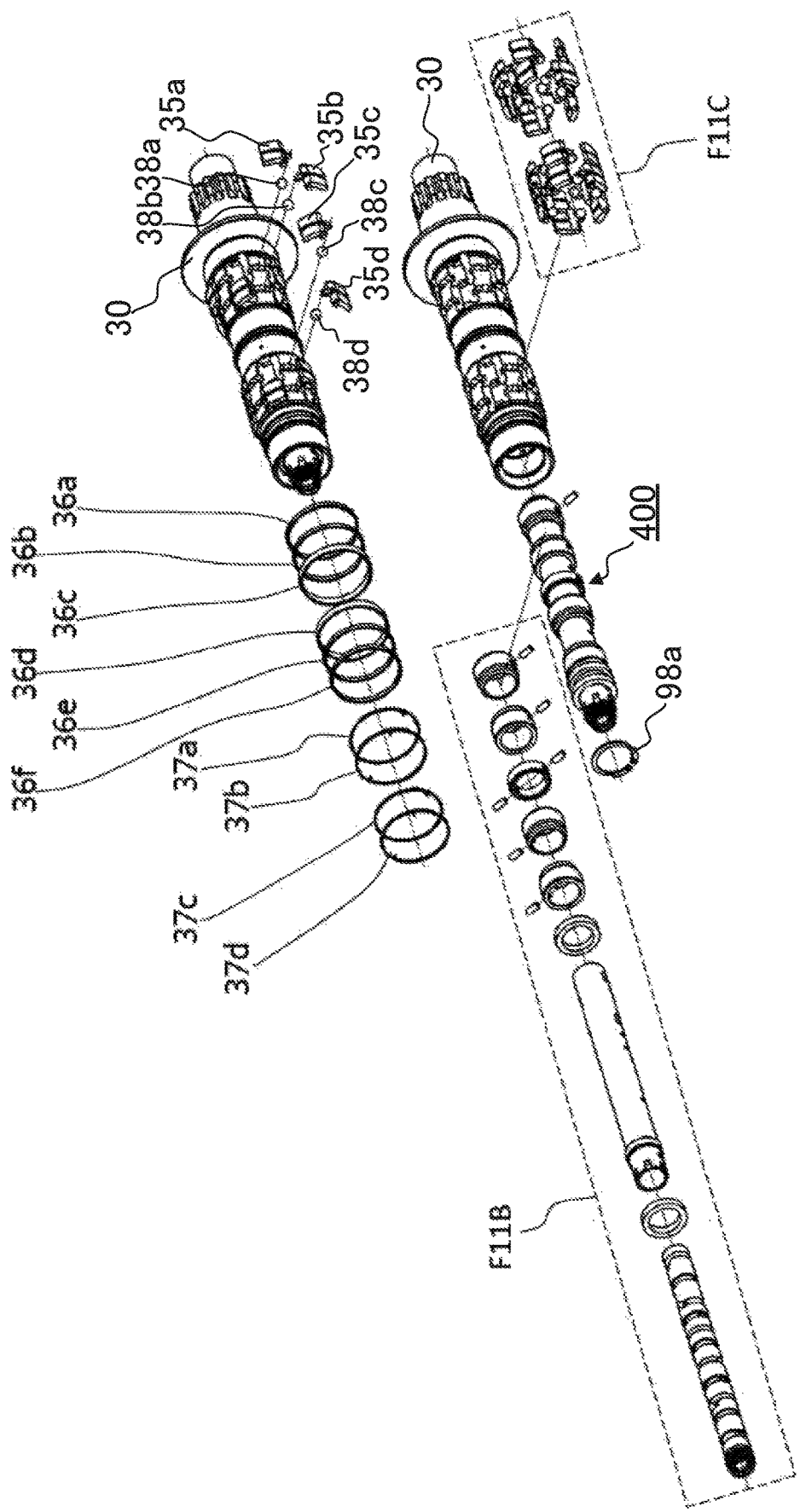
FIG. 23 is an exploded perspective view schematically showing a ratchet mechanism.

Next, each shaft and its peripheral configurations will be described with reference to FIG. 20 to FIG. 22. FIG. 20 is a cross-sectional development diagram as taken along the line L-M of FIG. 3 and the line A-B-C-D-(E)-F-G-C' of FIG. 5. FIG. 21 is a diagram showing, on an enlarged scale, a part corresponding to a region F4B of FIG. 20. FIG. 22 is a diagram showing, on an enlarged scale, a part corresponding to a region F4C of FIG. 20. In FIG. 22, each element provided to a hub 32b is given a reference sign, and in addition, an element corresponding to the element provided to the hub 32a is given a reference sign in parenthesis. FIG. 23 to FIG. 28 which are exploded perspective views of the shafts are also referred to in the following description.

In FIG. 20, the clutch 12 is disposed in a right end portion of the input shaft 20. The clutch 12 is a multi-plate friction clutch. The clutch 12 includes a clutch housing 121, a clutch boss 122, a plurality of friction plates 123, a plurality of clutch plates 124, and a pressure plate 125. The clutch 12 also includes a clutch drive gear 129 configured to be meshed with a gear 90a formed in the crankshaft 90 of the engine 11.

When the clutch is engaged, the clutch drive gear 129 transmits power received from the crankshaft 90 to the input shaft 20. The clutch drive gear 129 is supported on a collar 110 provided in an outer periphery of the input shaft 20 with interposition of a needle bearing 111. The collar 110 is fitted in the outer periphery of the input shaft 20. The clutch drive gear 129 is disposed coaxially with the input shaft 20, and rotatable relative to the input shaft 20. The clutch drive gear 129, which is meshed with the gear 90a of the crankshaft 90, rotates together with the crankshaft 90. The clutch housing 121 is configured to rotate together with the clutch drive gear 129. Thus, the clutch housing 121 rotates together with the crankshaft 90.

The clutch housing 121 has a bottomed cylindrical shape. The clutch housing 121 is coaxial with the input shaft 20, and rotatable relative to the input shaft 20. In an inner peripheral surface of the clutch housing 121, a plurality of grooves (not shown) extending in the axial direction of the input shaft 20 are formed at intervals and arranged side by side in the circumferential direction of the input shaft 20. The plurality of friction plates 123 are arranged inside the clutch housing 121 with respect to its diameter direction. Each of the plurality of friction plates 123 is in the shape of an annular plate.

In an outer periphery of each friction plate 123, a plurality of teeth (not shown) are formed at intervals and arranged side by side in the circumferential direction of the input shaft 20. Each friction plate 123, with the teeth formed in the outer periphery thereof being engaged with the plurality of grooves formed in the inner peripheral surface of the clutch housing 121, rotates together with the clutch housing 121. Each friction plate 123 is movable relative to the clutch housing 121 in the axial direction of the input shaft 20.

The clutch boss 122 has a cylindrical shape. The clutch boss 122 is disposed inside the clutch housing 121 with respect to the diameter direction of the input shaft 20. The clutch boss 122 rotates together with the input shaft 20. In an outer peripheral surface of the clutch boss 122, a plurality of grooves (not shown) extending in the axial direction of the input shaft 20 are formed at intervals and arranged side by side in the circumferential direction of the input shaft 20. The plurality of clutch plates 124 are arranged outside the clutch boss 122 with respect to the diameter direction. Each clutch plate 124 is in the shape of an annular plate.

Each clutch plate 124, with a plurality of teeth (not shown) formed in an inner periphery thereof being engaged with the plurality of grooves formed in the outer peripheral surface of the clutch boss 122, rotates together with the clutch boss 122. Each clutch plate 124 is movable relative to the clutch boss 122 in the axial direction of the input shaft 20.

Each friction plate 123 is provided to the clutch housing 121 such that a board surface of the friction plate 123 is substantially at right angles to the axial direction of the input shaft 20. Each clutch plate 124 is provided to the clutch boss 122 such that a board surface of the clutch plate 124 is substantially at right angles to the axial direction of the input shaft 20. The friction plates 123 and the clutch plates 124 are arranged alternately with respect to the axial direction of the input shaft 20.

The pressure plate 125 is disposed at an interval from the clutch boss 122 with respect to the axial direction of the input shaft 20. The pressure plate 125 is biased toward the clutch boss 122 (leftward in FIG. 20) by a clutch spring 125*a*. The pressure plate 125 is supported on a pull rod 127 with interposition of a bearing 126. The pull rod 127 is configured to move in the axial direction of the input shaft 20 by rotation of a release shaft 112. The release shaft 112 is rotated by the driver operating the clutch lever 7 (see FIG. 1).

Rotation of the release shaft 112 causes the pull rod 127 to move away (rightward in FIG. 20) from the clutch boss 122 against a biasing force of the clutch spring 125*a*, so that the pressure plate 125 moves away from the clutch boss 122. This makes the pressure plate 125 lose a force for pressing the friction plate 123 and the clutch plate 124 to each other. As a result, the clutch 12 is disengaged. When the clutch 12 is disengaged, power of the crankshaft 90 is not inputted to the input shaft 20.

Cancellation of the rotation of the release shaft 112 causes the pull rod 127 to move toward the clutch boss 122 due to the biasing force of the clutch spring 125*a*, so that the pressure plate 125 moves toward the clutch boss 122. This makes the pressure plate 125 press the friction plate 123 and the clutch plate 124 to each other. As a result, the clutch 12 is engaged. When the clutch 12 is engaged, power of the crankshaft 90 is inputted to the input shaft 20 via the clutch 12.

As shown in FIG. 21, the input shaft 20 is rotatably supported on the casing 14 via bearings 21L, 21R. The bearing 21R is disposed in a bearing housing 97, as shown in FIG. 21. The bearing housing 97 is fitted in the casing 14. The input shaft 20 is rotatably disposed on an axis line parallel to the crankshaft 90 (see FIG. 20).

The input shaft 20 is provided with the oil pump drive gear 18 which is coaxial with the input shaft 20. The oil pump drive gear 18 is disposed between the clutch drive gear 129 and the bearing 21R which is closer to the clutch 12 with respect to the axial direction of the input shaft 20. The oil pump drive gear 18 is coupled to the clutch drive gear 129 so as to rotate together with the clutch drive gear 129.

A hub 22 is provided to the outer periphery of the input shaft 20 by spline-fitting. The hub 22 does not rotate relative to the input shaft 20, but rotates together with the input shaft 20. The hub 22 may be omitted. In an outer periphery of the hub 22, dog rings 23*a*, 23*b* are provided so as to be movable in the axial direction. The dog rings 23*a*, 23*b* are disposed between the fifth-speed drive gear 245 and the sixth-speed drive gear 246. The fifth-speed drive gear 245 has, in its side surface adjacent to the dog ring 23*b*, a dog engageable with the dog ring 23*b*. The sixth-speed drive gear 246 has, in its side surface adjacent to the dog ring 23*a*, a dog engageable with the dog ring 23*a*.

Figure 27:
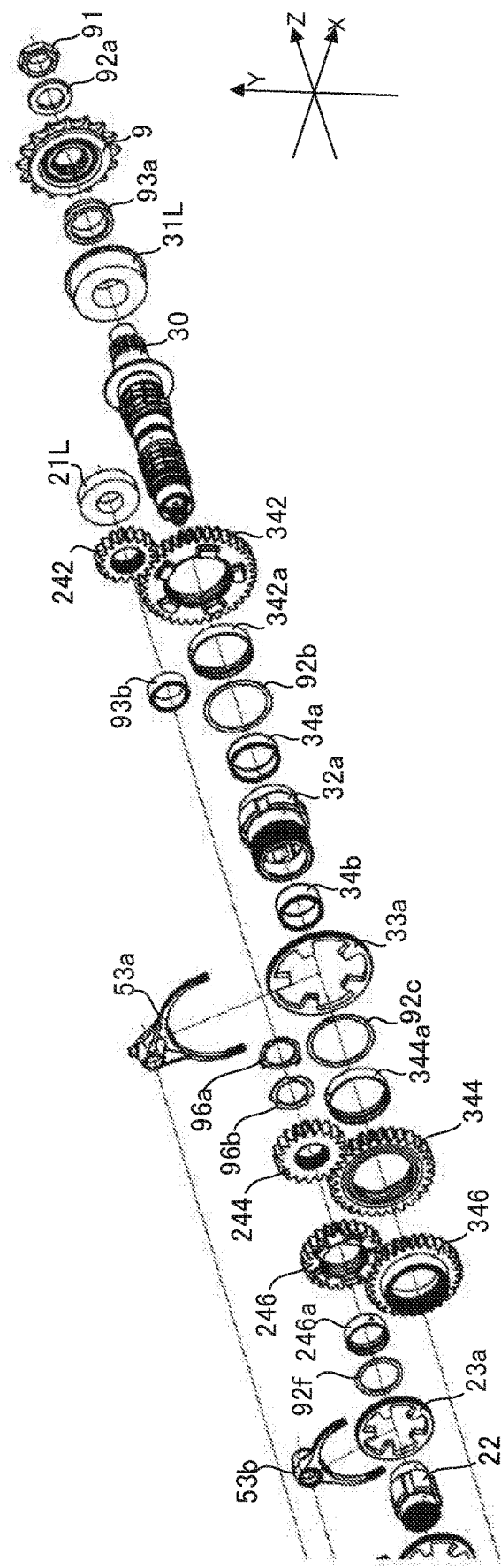
FIG. 27 is an exploded perspective view schematically showing a mechanism for an input shaft and an output shaft.
Figure 28:
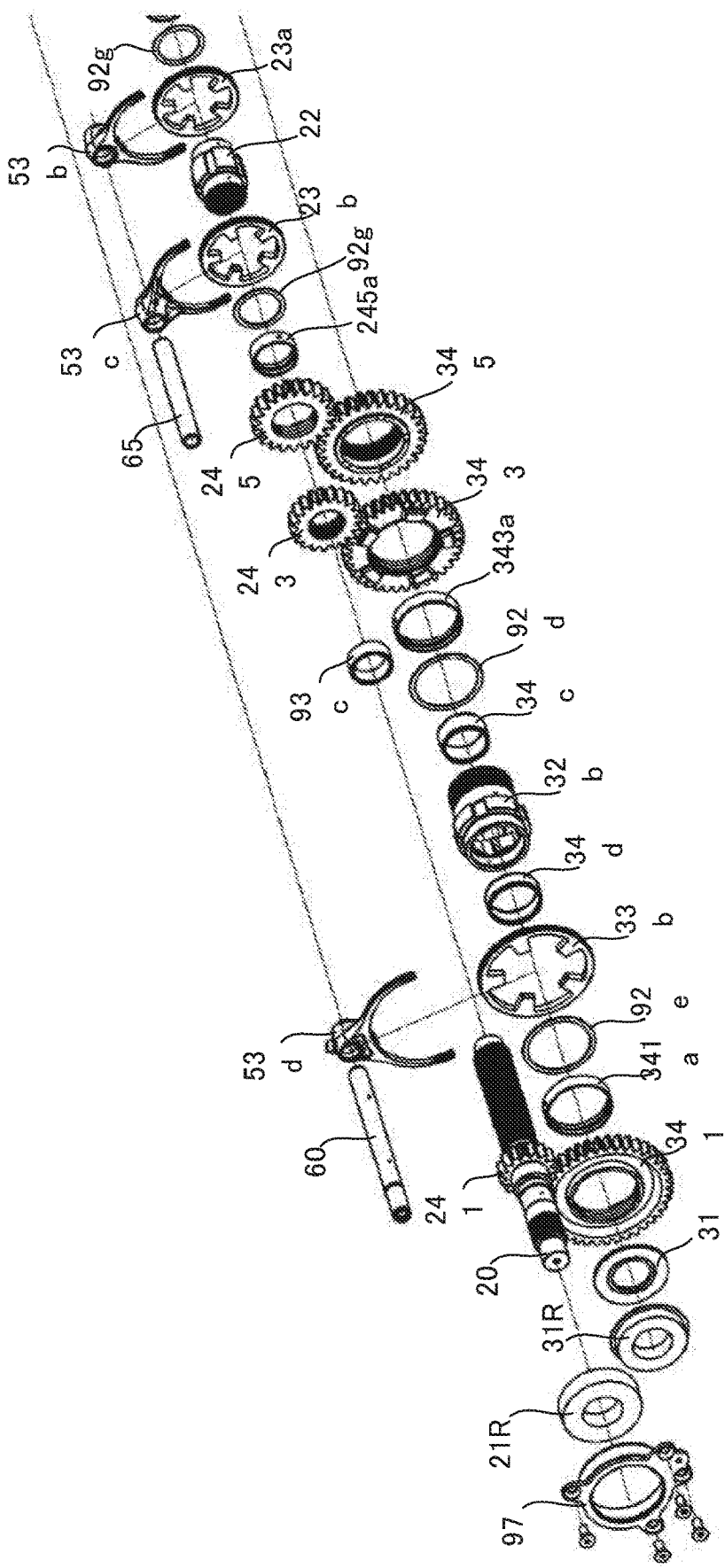
FIG. 28 is an exploded perspective view schematically showing the mechanism for the input shaft and the output shaft.

The input shaft 20 is provided with a plurality of (six) drive gears 241 to 246 (see FIG. 27 and FIG. 28). The first-speed drive gear 241 is integrated with the input shaft 20. To be specific, the drive gear 241 is fixed to the input shaft 20 so as to rotate together with the input shaft 20. The second-speed drive gear 242, the third-speed drive gear 243, and the fourth-speed drive gear 244 are provided to the input shaft 20 by spline-fitting. In this manner, the drive gears 241 to 244 are engaged with the input shaft 20 so as to rotate together with the input shaft 20. A collar 93*b* is disposed adjacent to the second-speed drive gear 242. Claw washers 96*a*, 96*b* are disposed between the collar 93*b* and the fourth-speed drive gear 244. A collar 93*c* is disposed adjacent to the third-speed drive gear 243.

The fifth-speed drive gear 245 is provided to the hub 22 in a relatively rotatable manner via a metal bearing 245*a*. The sixth-speed drive gear 246 is provided to the hub 22 in a relatively rotatable manner via a metal bearing 246*a*. The hub 22 does not rotate relative to the input shaft 20 but rotates together with the input shaft 20. Thus, as for the relationship between the drive gears 245, 246 and the input shaft 20, providing the drive gears 245, 246 to the hub 22 in a relatively rotatable manner is substantially equivalent to providing them to the input shaft 20 in a relatively rotatable manner. Hereinafter, providing to the hub 22 may sometimes be expressed as providing to the input shaft 20.

Engagement of the dog ring 23*a* with the dog of the sixth-speed drive gear 246 makes the sixth-speed drive gear 246 rotate together with the input shaft 20. In other words, the sixth-speed drive gear 246 is engaged with the input shaft 20 by the dog ring 23*a* such that the sixth-speed drive gear 246 rotates together with the input shaft 20. Engagement of the dog ring 23*b* with the dog of the fifth-speed drive gear 245 makes the fifth-speed drive gear 245 rotate together with the input shaft 20. In other words, the fifth-speed drive gear 245 is engaged with the input shaft 20 by the dog ring 23*b* such that the fifth-speed drive gear 245 rotates together with the input shaft 20. A washer 92*f* is disposed adjacent to the sixth-speed drive gear 246. A washer 92*g* is disposed adjacent to the fifth-speed drive gear 245.

As shown in FIG. 21, the output shaft 30 is rotatably supported on the casing 14 via bearings 31L, 31R. The output shaft 30 is rotatably disposed on an axis line parallel to the input shaft 20. As shown in FIG. 21, and FIG. 26 to FIG. 28, hubs 32*a*, 32*b* are provided in an outer periphery of the output shaft 30. Each of the hubs 32*a*, 32*b* has a cylindrical shape. The hubs 32*a*, 32*b* receive the output shaft 30 inside with respect to the diameter direction. The hubs 32*a*, 32*b* are rotatably supported on the output shaft 30 and coaxial with the output shaft 30. The hubs 32*a*, 32*b* are disposed so as to be rotatable relative to each other such that their end surfaces with respect to the axial direction face each other in the axial direction. A flange 31 (see FIG. 22 and FIG. 28) is disposed between the bearing 31R and the hub 32*b* with respect to the axial direction of the output shaft 30, at a location outside the output shaft 30 with respect to the diameter direction.

The hub 32*a* is provided with a dog ring 33*a* that is disposed between the second-speed driven gear 342 and the fourth-speed driven gear 344 so as to be movable in the axial direction (see FIG. 27 and FIG. 28). The second-speed driven gear 342 has, in its side surface adjacent to the dog ring 33*a*, a dog engageable with the dog ring 33*a*. The fourth-speed driven gear 344 has, in its side surface adjacent to the dog ring 33*a*, a dog engageable with the dog ring 33*a*. A washer 92*b* is disposed adjacent to the second-speed driven gear 342. A washer 92*c* is disposed adjacent to the fourth-speed driven gear 344. The hub 32a is an "even-numbered stage hub", which corresponds to an even-numbered gear stage.

The hub 32b is provided with a dog ring 33b that is disposed between the first-speed driven gear 341 and the third-speed driven gear 343 so as to be movable in the axial direction (see FIG. 27 and FIG. 28). The first-speed driven gear 341 has, in its side surface adjacent to the dog ring 33b, a dog engageable with the dog ring 33b. The third-speed driven gear 343 has, in its side surface adjacent to the dog ring 33b, a dog engageable with the dog ring 33b. A washer 92e is disposed adjacent to the first-speed driven gear 341. A washer 92d is disposed adjacent to the third-speed driven gear 343. The hub 32b is an "odd-numbered stage hub", which corresponds to an odd-numbered gear stage.

One end portion 30a of the output shaft 30 penetrates through the bearing 31L, and protrudes out of the casing 14. The one end portion 30a of the output shaft 30 is provided with the drive sprocket 9. The drive sprocket 9 is one example of the power output part. On the other end portion 30b side of the output shaft 30, the synchronization mechanism 150 including the follower gear 47 is provided. Since the drive sprocket 9 and the synchronization mechanism 150 are separately provided on the respective end sides of the output shaft 30, a size increase of the transmission 13 is suppressed while structural complexity is suppressed.

The drive chain 10 is wound on the drive sprocket 9. The drive chain 10 is wound on the sprocket 5a of the rear wheel 5 (see FIG. 1). Rotational power of the output shaft 30 is transmitted to the rear wheel 5 via the drive chain 10. The motorcycle 1 travels accordingly. In the one end portion 30a of the output shaft 30, a washer 92a and a collar 93a are provided on the respective sides of the drive sprocket 9. In the one end portion 30a of the output shaft 30, a nut 91 is disposed adjacent to the washer 92a.

As shown in FIG. 21, the output shaft 30 is provided with the driven gears 341 to 346. The first-speed driven gear 341 and the third-speed driven gear 343, which receive the hub 32b inside with respect to the diameter direction, are rotatably provided to the hub 32b and coaxial with the hub 32b. The fifth-speed driven gear 345, which receives the hub 32b inside with respect to the diameter direction, is provided so as to rotate coaxially with the hub 32b. The first-speed driven gear 341 is provided to the hub 32b in a relatively rotatable manner via a metal bearing 341a. Engagement of the dog ring 33b with the dog of the first-speed driven gear 341 restricts rotation of the first-speed driven gear 341 relative to the hub 32b, thus setting the first-speed driven gear 341 engaged with the hub 32b. The third-speed driven gear 343 is rotatably provided to the hub 32b via a metal bearing 343a. Engagement of the dog ring 33b with the dog of the third-speed driven gear 343 restricts rotation of the third-speed driven gear 343 relative to the hub 32b, thus setting the third-speed driven gear 343 engaged with the hub 32b. The fifth-speed driven gear 345 is provided to the hub 32b by spline-fitting. In this manner, the fifth-speed driven gear 345 is engaged with the hub 32b, so that the fifth-speed driven gear 345 is rotatable together with the hub 32b while its rotation relative to the hub 32b is restricted.

The second-speed driven gear 342 and the fourth-speed driven gear 344, which receive the hub 32a inside with respect to the diameter direction, are rotatably provided to the hub 32a and coaxial with the hub 32a. The sixth-speed driven gear 346, which receives the hub 32a inside with respect to the diameter direction, is provided so as to rotate coaxially with the hub 32a. The second-speed driven gear 342 is rotatably provided to the hub 32a via a metal bearing 342a. Engagement of the dog ring 33a with the dog of the second-speed driven gear 342 restricts rotation of the second-speed driven gear 342 relative to the hub 32a, thus setting the second-speed driven gear 342 engaged with the hub 32a. The fourth-speed driven gear 344 is rotatably provided to the hub 32a via a metal bearing 344a. Engagement of the dog ring 33a with the dog of the fourth-speed driven gear 344 restricts rotation of the fourth-speed driven gear 344 relative to the hub 32a, thus setting the fourth-speed driven gear 344 engaged with the hub 32a. The sixth-speed driven gear 346 is provided to the hub 32a by spline-fitting. In this manner, the sixth-speed driven gear 346 is engaged with the hub 32a, so that the sixth-speed driven gear 346 is rotatable together with the hub 32a while its rotation relative to the hub 32a is restricted.

<<Structure of Ratchet Mechanism>>

The ratchet mechanism 400 is configured to selectively restrict relative rotation between the output shaft 30 and the hubs 32a, 32b. The ratchet mechanism 400 includes the pawls 35a to 35d and a ratchet control mechanism. The ratchet control mechanism is configured to mechanically switch the raised or lowered states of the pawls 35a to 35d in a case of shift-up or in a case of shift-down. The switching of the raised or lowered state of each of the pawls 35a to 35d is implemented by power inputted to the ratchet mechanism being mechanically transmitted within the ratchet mechanism. The ratchet control mechanism includes a guide shaft 41, the control cam shaft 40, sliders 43, 43a to 43d, engagement pins 46, 46a to 46d, and balls 38a to 38d.

An even-numbered stage accelerating pawl group including a plurality of even-numbered stage accelerating pawls 35a and an even-numbered stage decelerating pawl group including a plurality of even-numbered stage decelerating pawls 35b are provided between the outer periphery of the output shaft 30 and the inner periphery of the hub 32a. The plurality of even-numbered stage accelerating pawls 35a are disposed so as to entirely or partially overlap one another with respect to the circumferential direction of the output shaft 30. The plurality of even-numbered stage decelerating pawls 35b are disposed so as to entirely or partially overlap one another with respect to the circumferential direction of the output shaft 30. Three collars 36a to 36c are provided between the outer periphery of the output shaft 30 and the inner periphery of the hub 32a, and arranged at intervals with respect to the axial direction. Each of the pawls 35a, 35b is disposed between ones of the collars 36a to 36c.

An odd-numbered stage accelerating pawl group including a plurality of odd-numbered stage accelerating pawls 35c and an odd-numbered stage decelerating pawl group including a plurality of odd-numbered stage decelerating pawls 35d are provided between the outer periphery of the output shaft 30 and the inner periphery of the hub 32b. The plurality of odd-numbered stage accelerating pawls 35c are disposed so as to entirely or partially overlap one another with respect to the circumferential direction of the output shaft 30. The plurality of odd-numbered stage decelerating pawls 35d are disposed so as to entirely or partially overlap one another with respect to the circumferential direction of the output shaft 30. Three collars 36d to 36f are provided between the outer periphery of the output shaft 30 and the inner periphery of the hub 32b, and arranged at intervals with respect to the axial direction. Each of the pawls 35c, 35d is disposed between ones of the collars 36d to 36f.

As for the even-numbered stage accelerating pawl group, the even-numbered stage decelerating pawl group, the odd-numbered stage accelerating pawl group, and the odd-numbered stage decelerating pawl group, the respective pawl groups are disposed at different positions in the axial direction of the output shaft 30. The plurality of pawls 35*a* to 35*d* included in each pawl group are arranged side by side in the circumferential direction of the output shaft 30. Although each pawl group includes five pawls in this embodiment, the number of pawls is not particularly limited. The pawls 35*a* to 35*d* have circlips 37*a* to 37*d*, respectively. The circlips 37*a* to 37*d* are configured to give a force directed inward with respect to the diameter direction to the pawls 35*a* to 35*d* so as to raise the pawls 35*a* to 35*d*. One circlip gives a plurality of pawls included in one pawl group a force directed to raising of the pawls.

As shown in FIG. 22, the output shaft 30 has holes 39*a* to 39*d* penetrating therethrough in the diameter direction, at positions corresponding to the pawls 35*a* to 35*d*. Balls 38*a* to 38*d* are provided in the holes 39*a* to 39*d*, respectively, so as to be movable in the diameter direction of the output shaft 30. The balls 38*a* to 38*d* are rollable within the holes 39*a* to 39*d* irrespective of a position with respect to the diameter direction of the output shaft 30, and do not hinder rotation of the output shaft 30.

Figure 26:
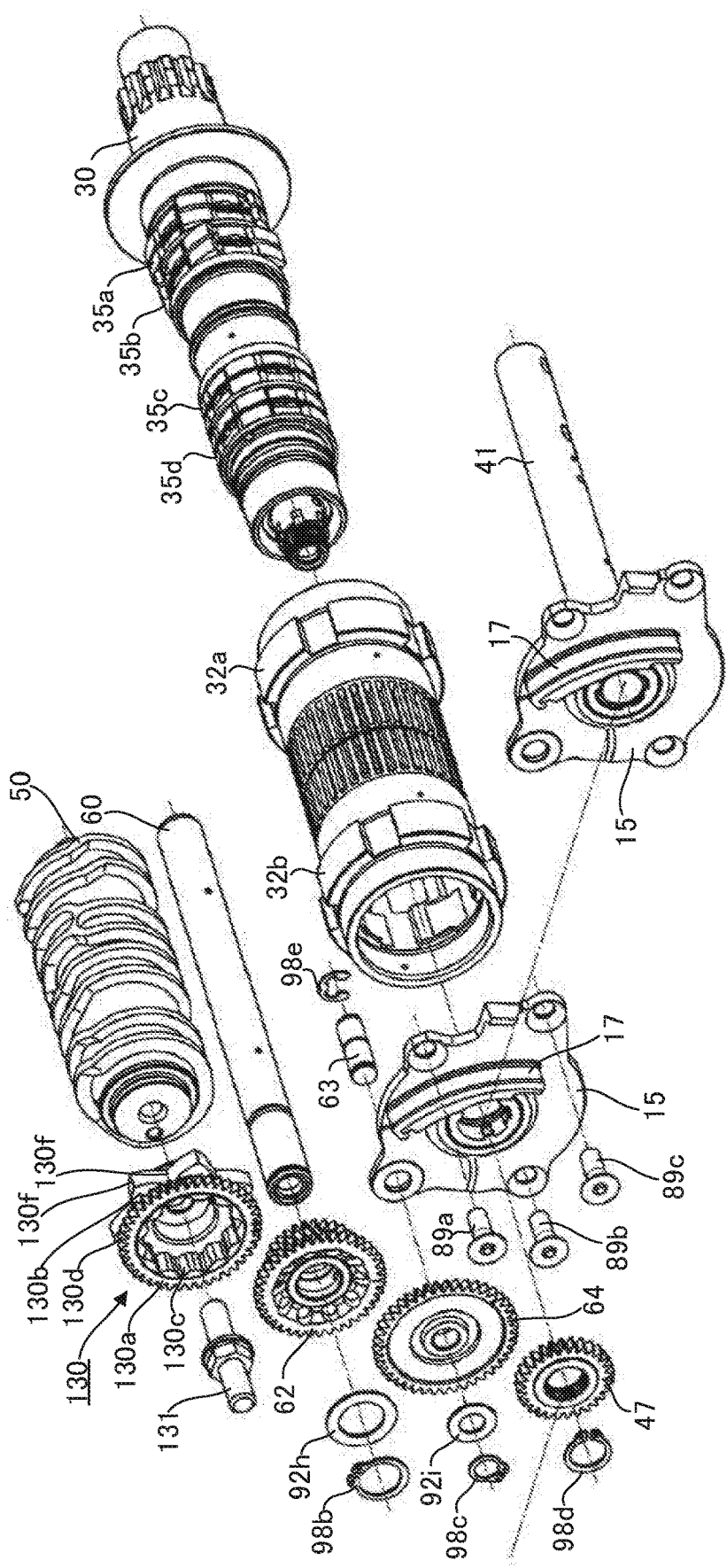
FIG. 26 is an exploded perspective view schematically showing a synchronization mechanism.

The guide shaft 41 (outer shaft) has a cylindrical shape (FIG. 26). As shown in FIG. 21 and FIG. 22, the guide shaft 41 is received inside the output shaft 30 with respect to the diameter direction, and rotation of the guide shaft 41 relative to the casing 14 is restricted via the cover member 15. A bush 15*a* having a circular cylindrical shape is provided between the guide shaft 41 and the cover member 15. Thus, the position (phase) of the guide shaft 41 relative to the cover member 15 with respect to the circumferential direction is fixed. An O-ring 15*b* is provided inside the bush 15*a* with respect to the diameter direction. The O-ring 15*b* seals a space between the bush 15*a* and the guide shaft 41. Bearings 41L, 41R for enabling rotation of the output shaft 30 and the guide shaft 41 relative to each other are provided between an outer side of the guide shaft 41 with respect to the diameter direction and an inner side of the output shaft 30 with respect to the diameter direction. A circlip 98*a* is provided inside the output shaft 30 with respect to the diameter direction. This restricts the position of the guide shaft 41 relative to the output shaft 30 in the axial direction.

Figure 24:
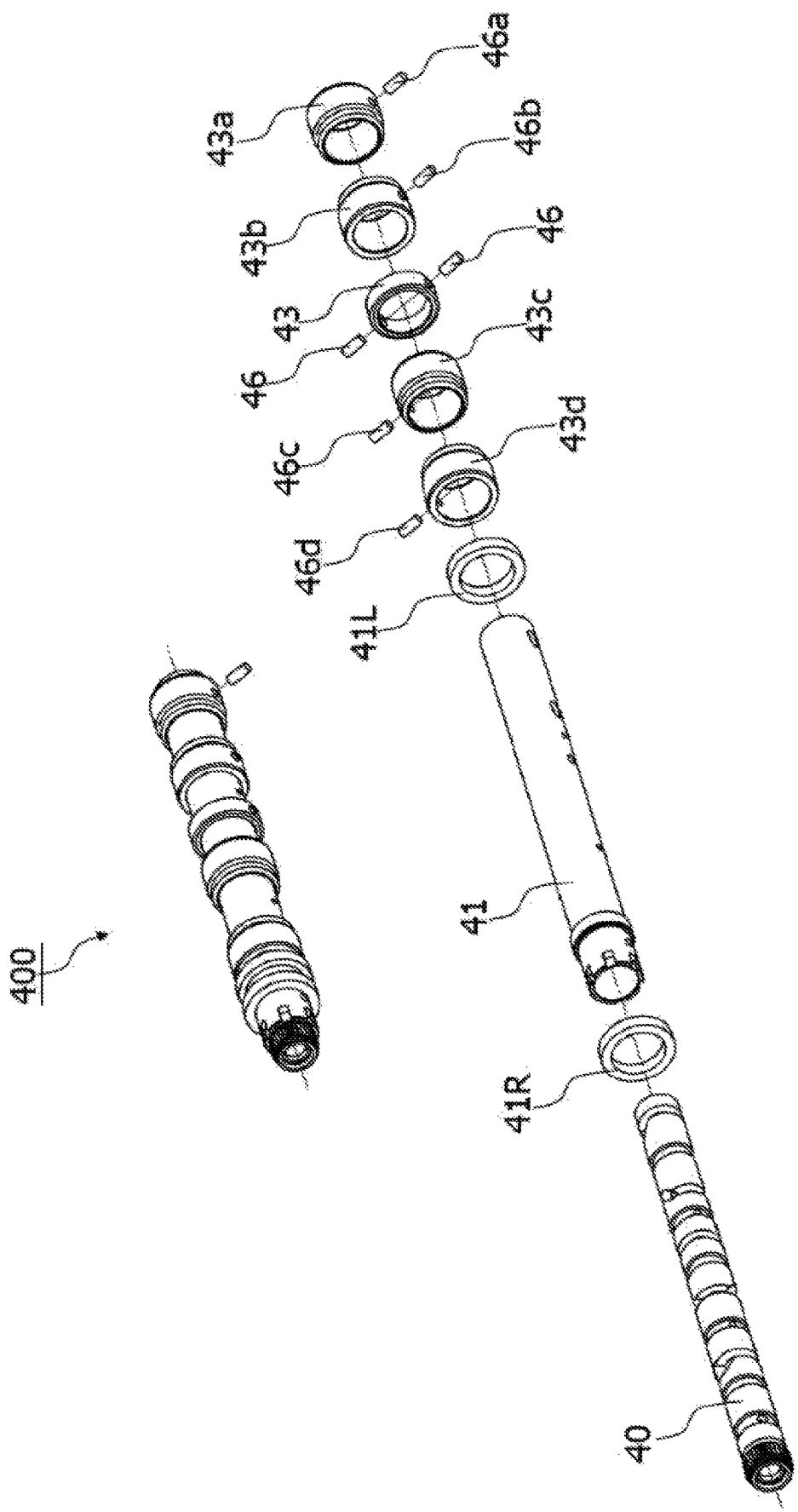
FIG. 24 is a diagram showing, on an enlarged scale, a part corresponding to a region FHB of FIG. 23.
Figure 25:
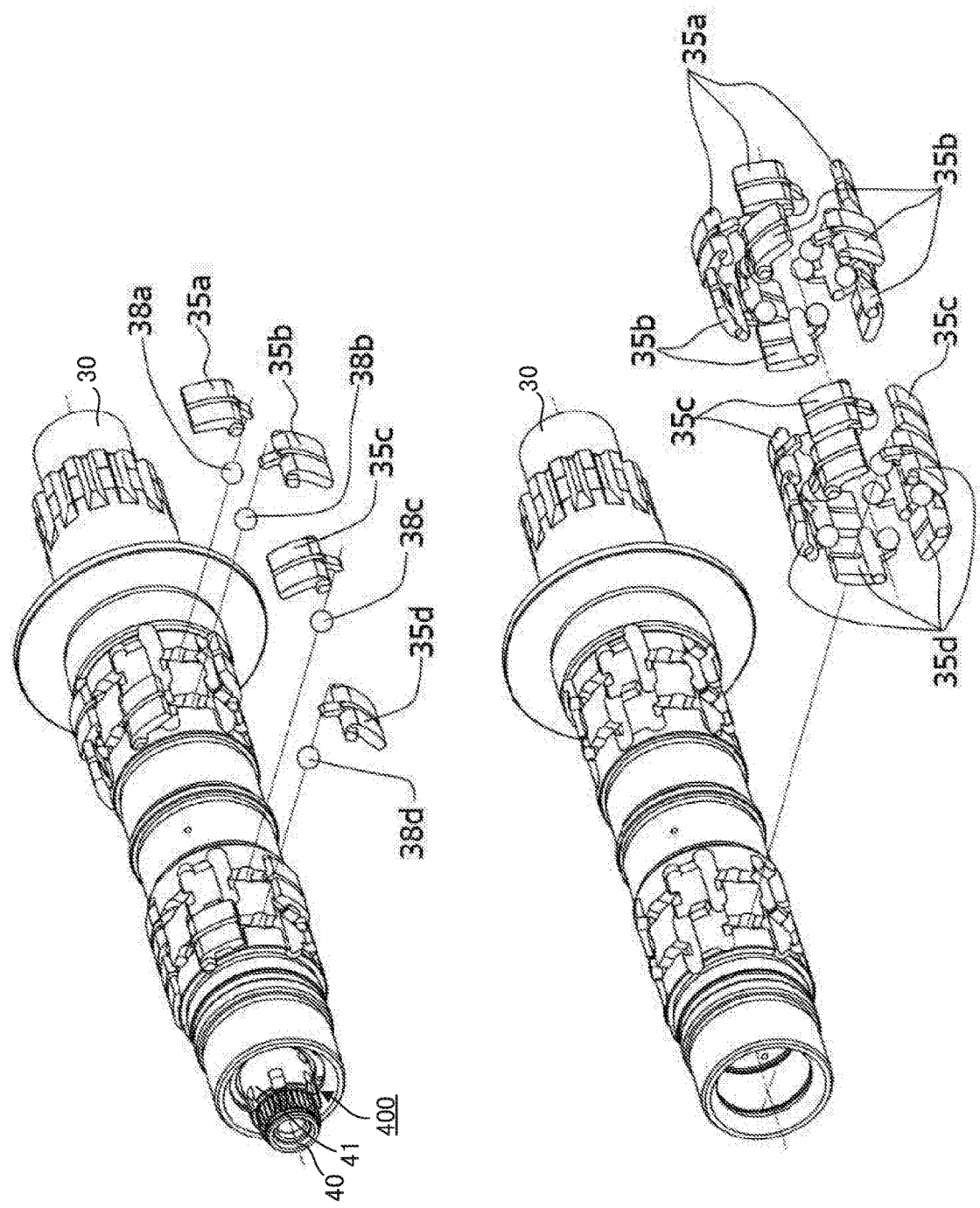
FIG. 25 is a diagram showing, on an enlarged scale, a part corresponding to a region F11C of FIG. 23.

The control cam shaft 40 (inner shaft) is received inside the guide shaft 41 with respect to the diameter direction (FIG. 24). In the transmission 13, a control for transmitting power of the hubs 32*a*, 32*b* to the output shaft 30 is implemented by rotation of the control cam shaft 40. The control cam shaft 40 is one example of the rotary cam.

Figures 31A, 31B, 31C:
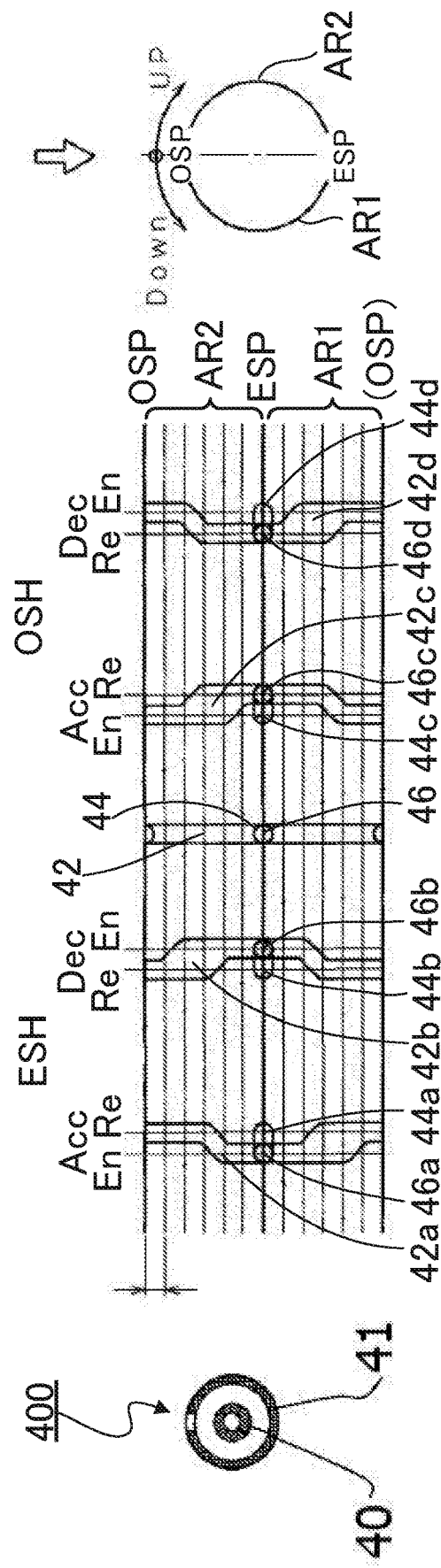
FIG. 31AA is a cross-sectional view schematically showing a control cam shaft and a guide shaft; BFIG. 31B is a development diagram schematically showing the shapes of cam grooves of the control cam shaft; and CFIG. 31C is a schematic diagram for explanation of movement of the control cam shaft.

The control cam shaft 40 is provided so as to be rotatable relative to an inner peripheral surface of the guide shaft 41. The guide shaft 41 is provided inside the output shaft 30 with respect to the diameter direction. The control cam shaft 40, the guide shaft 41, and the output shaft 30 are coaxial. As shown in FIG. 31C, a rotation direction of the control cam shaft 40 in a case of shift-up is reverse to a rotation direction of the control cam shaft 40 in a case of shift-down.

The control cam shaft 40 has, in an outer peripheral surface thereof, cam grooves 42, 42*a* to 42*d* (FIG. 31B). The cam grooves 42*a* to 42*d* correspond to the pawls 35*a* to 35*d*, respectively. The cam groove is one example of the cam portion. The cam portion is not limited to the cam groove. The shape of the cam portion is not particularly limited. The cam portion may be, for example, a cam projection.

The guide shaft 41 has guide holes 44, 44*a* to 44*d* (FIG. 35). The guide holes 44, 44*a* to 44*d* are formed at positions corresponding to the cam grooves 42, 42*a* to 42*d*, respectively. In the guide holes 44*a* to 44*d*, elongated holes elongated in the axial direction are formed (FIG. 31B).

In an outer periphery of the guide shaft 41, the sliders 43, 43*a* to 43*d* having annular shapes are provided (FIG. 22 and FIG. 24). Each of the sliders 43, 43*a* to 43*d* has a hole (not shown) penetrating therethrough in the diameter direction. In the hole of each of the sliders 43, 43*a* to 43*d*, one end of each of the engagement pins 46, 46*a* to 46*d* extending in the diameter direction is fitted. Thus, the one end of each of the engagement pins 46, 46*a* to 46*d* is fixed to each of the sliders 43, 43*a* to 43*d*. The other end of each of the engagement pins 46, 46*a* to 46*d* passes through each of the guide holes 44, 44*a* to 44*d*, and is received in each of the cam grooves 42, 42*a* to 42*d* (FIG. 22 and FIG. 24).

Movement of each of the engagement pins 46*a* to 46*d* in each of the guide holes 44*a* to 44*d* causes each of the sliders 43*a* to 43*d* to move in the axial direction of the guide shaft 41 (FIG. 24 and FIG. 31B). The engagement pin is one example of the guide object part provided in the slider. The engagement pin is a member separate from the slider, and attached to the slider. The guide object part is not limited to this example, and may be integrated with the slider, for example.

The balls 38*a* to 38*d* are received in the holes 39*a* to 39*d* that are formed in the output shaft 30 so as to penetrate through the output shaft 30 in the diameter direction. The balls 38*a* to 38*d* are movable in the diameter direction within the holes 39*a* to 39*d*. Each of the pawls 35*a* to 35*d* is pivotably provided to the output shaft 30 and disposed at a position corresponding to each of the balls 38*a* to 38*d*. When the ball 38*a* in the hole 39*a* is positioned inward with respect to the diameter direction, the pawl 35*a* is raised outward with respect to the diameter direction. When the ball 38*a* in the hole 39*a* is positioned outward with respect to the diameter direction, the pawl 35*a* is lowered inward with respect to the diameter direction. The same applies to the other pawls 35*b* to 35*d*. Operations of the ratchet mechanism will be described later.

As shown in FIG. 22, the output shaft 30 has, in its other end portion 30*b*, the bearing 31R provided outside the output shaft 30 with respect to the diameter direction. The casing 14 has the cover member 15. The cover member 15 is disposed so as to at least partially cover the bearing 31R and its inner diameter hole from outside of the casing 14. A space 15*s* is formed between the cover member 15 and the bearing 31L. The casing 14 has an oil passage 14*g* that opens into the space 15*s*. The oil passage 14*g* is, for example, a groove formed in a surface of the casing 14. The oil passage 14*g* extends from a position not covered with the cover member 15 to a position covered with the cover member 15. The shape of the oil passage is not particularly limited. In an example, in a case where the casing has a split structure made up of a plurality of members, the oil passage is formed along mating surfaces of the members. In another example, in a case where the casing is a crank case of an engine having a split structure, the oil passage is formed along mating surfaces of the crank case. The oil passage may not always need to be formed in the casing, but may be formed in the cover member, for example.

As shown in FIG. 22, the control cam shaft 40 has oil introduction holes 40*p*, 40*q*, 40*r*. The guide shaft 41 has oil introduction holes 41*p*, 41*r*. The oil introduction hole 40*p* is formed along the diameter direction of the control cam shaft 40 so as to communicate with the oil introduction holes 41*p*, 40*q*. The oil introduction hole 40*q* is formed along the axial direction of the control cam shaft 40 so as to communicate with the oil introduction holes 40*p*, 40*r*. The oil introduction hole 40*r* is formed along the diameter direction of the control cam shaft 40 so as to communicate with the oil introduction holes 41r, 40q. The oil introduction hole 41p is formed along the diameter direction of the control cam shaft 40 so as to communicate with the space 15s and the oil introduction hole 40p. The oil introduction hole 41r communicates with the oil introduction hole 40r, and opens to outside with respect to the diameter direction of the guide shaft 41. A lubricant sequentially passes through the oil passage 14g, the space 15s, and oil introduction holes 41p, 40p, 40q, 40r, 41r, to be distributed to surroundings of the output shaft 30. This way, the control cam shaft 40 and the guide shaft 41 are provided with oil introduction passages 40p, 40q, 40r, 41p, 41r formed so as to distribute the lubricant supplied from the oil passage 14g through the space 15s to the surroundings of the output shaft 30. As shown in FIG. 22, the control cam shaft 40 and the guide shaft 41 protrude beyond the other end side of the output shaft 30 (on the side where the other end portion 30b of the output shaft 30 is positioned) in the axial direction of the output shaft 30.

<<Synchronization Mechanism>>

The synchronization mechanism 150 includes the idle gears 62, 64 and the follower gear 47. As shown in FIG. 21 and FIG. 26, the follower gear 47 is rotatably provided to one end portion 40a of the control cam shaft 40. As shown in FIG. 21, the one end portion 40a of the control cam shaft 40 protrudes from the casing 14. The follower gear 47 is spline-fitted to the control cam shaft 40, and the control cam shaft 40 has a circlip 98e disposed adjacent to the follower gear 47. Thus, the follower gear 47 is fixed to the control cam shaft 40. The follower gear 47 is meshed with the idle gear 62 attached to the fork guide shaft 60.

As shown in FIG. 26, the fork guide shaft 60 has a washer 92h disposed adjacent to the idle gear 62, and a circlip 98b disposed adjacent to the washer 92h. In this manner, the idle gear 62 is rotatably provided to the fork guide shaft 60. Of the idle gears 62, 64 serving as the speed-increasing gear, the idle gear 62 is disposed coaxially with the fork guide shaft 60. This suppresses structural complexity. The present teaching is not limited to this example. In another example, in a case where the transmission includes a plurality of fork guide shafts, each of a plurality of idle gears may be provided to each of the fork guide shafts.

The idle gear 62 is meshed with the idle gear 64 attached to an idle shaft 63. As shown in FIG. 26, the idle shaft 63 is attached to the cover member 15. The cover member 15 is attached to the casing 14 (see FIG. 21) with screws 89a, 89b, 89c. The idle shaft 63 has, substantially at the center thereof (substantially at the center thereof in FIG. 26), the circlip 98e. The circlip 98e is pinched by the casing 14 and the cover member 15, and thus the idle shaft 63 is fixed to the casing 14 with respect to the axial direction. The idle gear 64 is provided on the other end side (in FIG. 26, the left end side) of the idle shaft 63. On the other end side of the idle shaft 63, a washer 92i is disposed adjacent to the idle gear 64, and a circlip 98c is disposed adjacent to the washer 92i. In this manner, the idle gear 64 is rotatably provided to the idle shaft 63.

The idle gear 64 is configured such that intermittent rotation of the index cam 130 of the shift mechanism 80 is transmitted. That is, the intermittent rotation of the index cam 130 is transmitted to the follower gear 47 via the idle gears 64, 62. As a result, the control cam shaft 40 intermittently rotates in accordance with an operation of the shift mechanism 80.

<<Structure of Dog Engagement Mechanism>>

The dog engagement mechanism 70 includes: the shift cam 50 with cam grooves 52a to 52d formed in an outer peripheral surface thereof; the shift forks 53a to 53d that are partially received in the cam grooves 52a to 52d, respectively; the fork guide shaft 60 that supports the shift forks 53a, 53d movably in the axial direction; the dog rings 23a, 23b that are coupled to the shift forks 53a, 53d, respectively; a fork guide shaft 65 that supports the shift forks 53b, 53c movably in the axial direction; and the dog rings 33a, 33b that are coupled to the shift forks 53b, 53c, respectively. Each of the dog rings 33b, 33a, 23b, 23a is one example of each of the first to fourth dog rings. Each of the shift forks 53d, 53c, 53b, 53a is one example of each of the first to fourth shift forks (see FIG. 21).

The shift cam 50 is rotatably supported on the casing 14 via the bearings 51L, 51R. The shift cam 50 has, in the outer peripheral surface thereof, the cam grooves 52a to 52d (see FIG. 35B). In one end portion (in FIG. 21, a right end portion) of the shift cam 50, the index cam 130 of the shift mechanism 80 is provided. The shift cam 50 intermittently rotates in accordance with driving of the shift mechanism 80. The shift cam 50 is parallel to the input shaft 20 and the output shaft 30.

The shift cam 50 is included in the dog engagement mechanism 70. The dog engagement mechanism 70 activates the power transmission from the input shaft 20 to the hub 32b for one odd-numbered stage or activates the power transmission from the input shaft 20 to the hub 32a for one even-numbered stage, which power transmission is implemented selectively by dog engagement. As for the odd-numbered stage, the dog engagement mechanism 70 restricts either relative rotation between the input shaft 20 and the odd-numbered stage drive gear 245 or relative rotation between any one of the odd-numbered stage driven gears 341, 343 and the hub 32b, to activates the power transmission from the input shaft 20 to the hub 32b for one odd-numbered stage. As for the even-numbered stage, the dog engagement mechanism 70 restricts either relative rotation between the input shaft 20 and the even-numbered stage drive gear 246 or relative rotation between any one of the even-numbered stage driven gears 342, 344 and the hub 32a, to activates the power transmission from the input shaft 20 to the hub 32a for one even-numbered stage. In the dog engagement mechanism 70, a period transiently occurs in which both power transmission from the input shaft 20 to the hub 32b for one odd-numbered stage and power transmission from the input shaft 20 to the hub 32a for one even-numbered stage are set active or are activated during a gear shifting operation. The ratchet mechanism 400, however, selects and activates the power transmission from the hub 32a or 32b to the output shaft 30. As a result, power transmission from the input shaft 20 to the output shaft 30 via a drive gear and a driven gear corresponding to any one gear stage is set active or activated.

In the cam grooves 52a to 52d, the shift forks 53a to 53d are partially received, respectively, such that the shift forks 53a to 53d move in the axial direction while being guided by the cam grooves 52a to 52d along with rotation of the shift cam 50 (see FIG. 21). The shift forks 53a, 53d, which are disposed movably in the axial direction on the fork guide shaft 60, are coupled to the dog rings 33a, 33b of the output shaft 30, respectively. The shift forks 53b, 53c, which are disposed movably in the axial direction on the fork guide shaft 65, are coupled to the dog rings 23a, 23b of the input shaft 20, respectively. The fork guide shafts 60, 65 are disposed in parallel to the shift cam 50 (see, for example, FIG. 29).

In the transmission 13, the plurality of drive gears 241 to 246 and the plurality of driven gears 341 to 346 are constantly meshed. The transmission 13 is a constant-mesh type transmission. In the transmission 13, selection of a combination of a drive gear and a driven gear for power transmission is implemented by rotation of the shift cam 50 in the shift mechanism 80.

As the shift cam 50 rotates, the shift forks 53a to 53d move in the axial direction in accordance with the cam grooves 52a to 52d. Accordingly, the dog rings 23a, 23b, 33a, 33b move together with the shift forks 53a to 53d in the axial direction.

Figure 29:
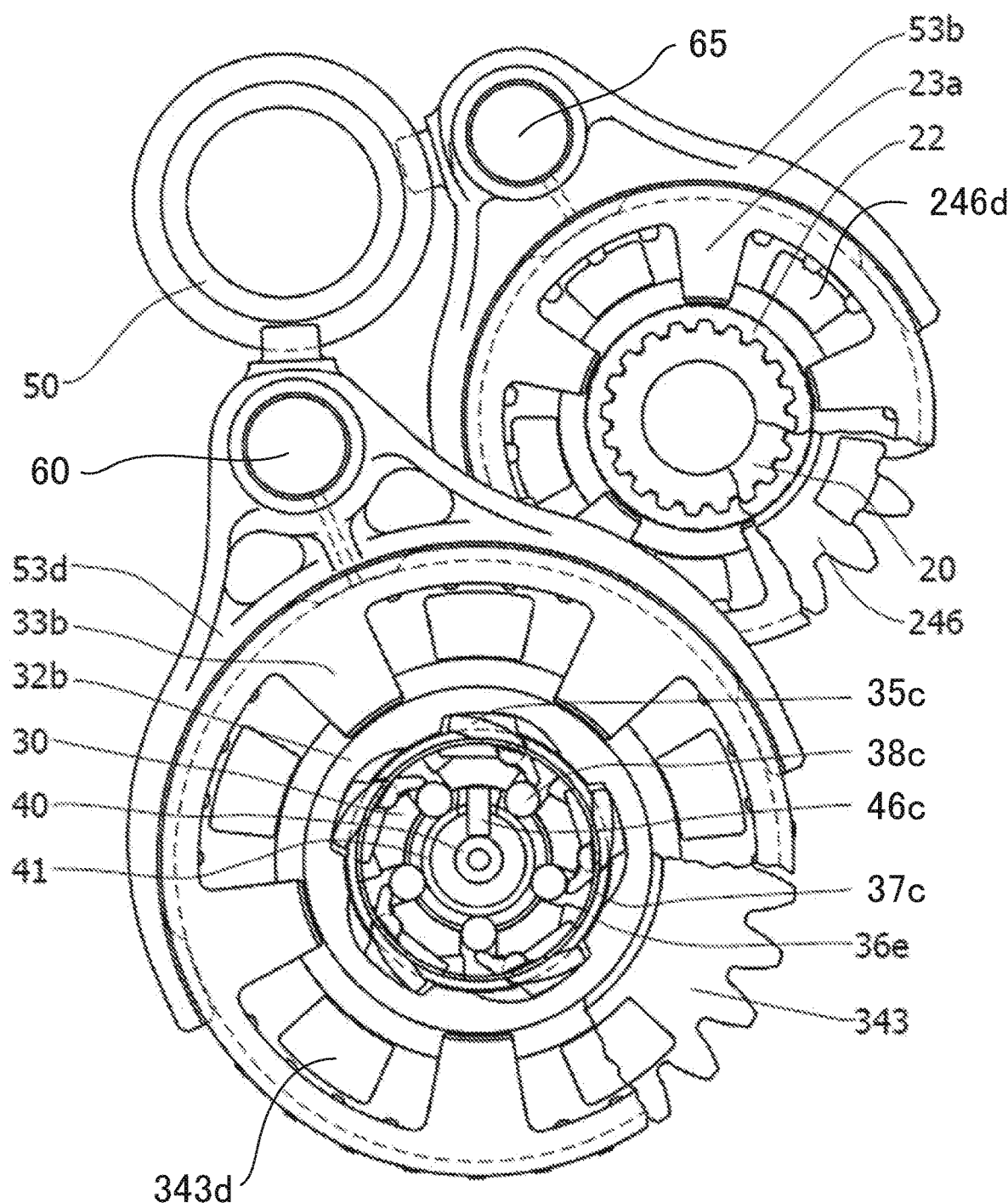
FIG. 29 is a cross-sectional development diagram as taken along the line N-P of FIG. 9.

The dog ring 23a is configured to be meshed or not meshed with the dog of the sixth-speed drive gear 246 as a result of moving in the axial direction. The dog ring 23b is configured to be meshed or not meshed with the dog of the fifth-speed drive gear 245 as a result of moving in the axial direction. FIG. 29 shows engagement between the dog ring 23a and a dog 246d provided on a side surface of the sixth-speed drive gear 246.

The dog ring 33a is configured to be meshed with the dog of the second-speed driven gear 342, meshed with the dog of the fourth-speed driven gear 344, or not meshed with either the second-speed driven gear 342 or the fourth-speed driven gear 344, as a result of moving in the axial direction. The dog ring 33b is configured to be meshed with the dog of the first-speed driven gear 341, meshed with the dog of the third-speed driven gear 343, or not meshed with either the first-speed driven gear 341 or the third-speed driven gear 343, as a result of moving in the axial direction. FIG. 29 shows engagement between the dog ring 33b and a dog 343d provided on a side surface of the third-speed driven gear 343.

As a result of any dog ring of the dog rings 23a, 23b, 33a, 33b being meshed with a dog of a transmission gear (the drive gears 245, 246, the driven gears 341 to 344) adjacent to the dog ring, a pair of gears used for power transmission is selected. Through the selected pair of gears, power of the input shaft 20 is transmitted to the hub 32a or the hub 32b. In a case where the gear stage is the neutral, none of the dog rings 23a, 23b, 33a, 33b is meshed with the drive gears 245, 246 nor the driven gears 341 to 344.

<<Operation of Ratchet Mechanism>>

Operations of the ratchet mechanism are as follows. The control cam shaft 40 rotates along with rotation of the follower gear 47. Power transmitted from the follower gear 47 is power inputted to the ratchet control mechanism. As the control cam shaft 40 rotates, the engagement pins 46a to 46d move within the guide holes 44a to 44d while being guided by the cam grooves 42a to 42d (FIG. 31B). As a result, the sliders 43a to 43d move together with the engagement pins 46a to 46d in the axial direction. The movement of the sliders 43a to 43d in the axial direction causes the balls 38a to 38d in the holes 39a to 39d to move outward or inward with respect to the diameter direction. Consequently, the pawls 35a to 35d are raised outward with respect to the diameter direction, or lowered inward with respect to the diameter direction. As a result of engagement of any of the pawls 35a to 35d with the hub 32a or the 32b, relative rotation between the output shaft 30 and the hubs 32a, 32b is selectively restricted. Power transmission by the pawls 35a to 35d will be described later (see FIGS. 30A and 30B). In this manner, the ratchet control mechanism mechanically transmits power inputted to the ratchet control mechanism within the ratchet control mechanism, and mechanically operates the pawls 35a to 35d separately from one another.

Figure 30B:
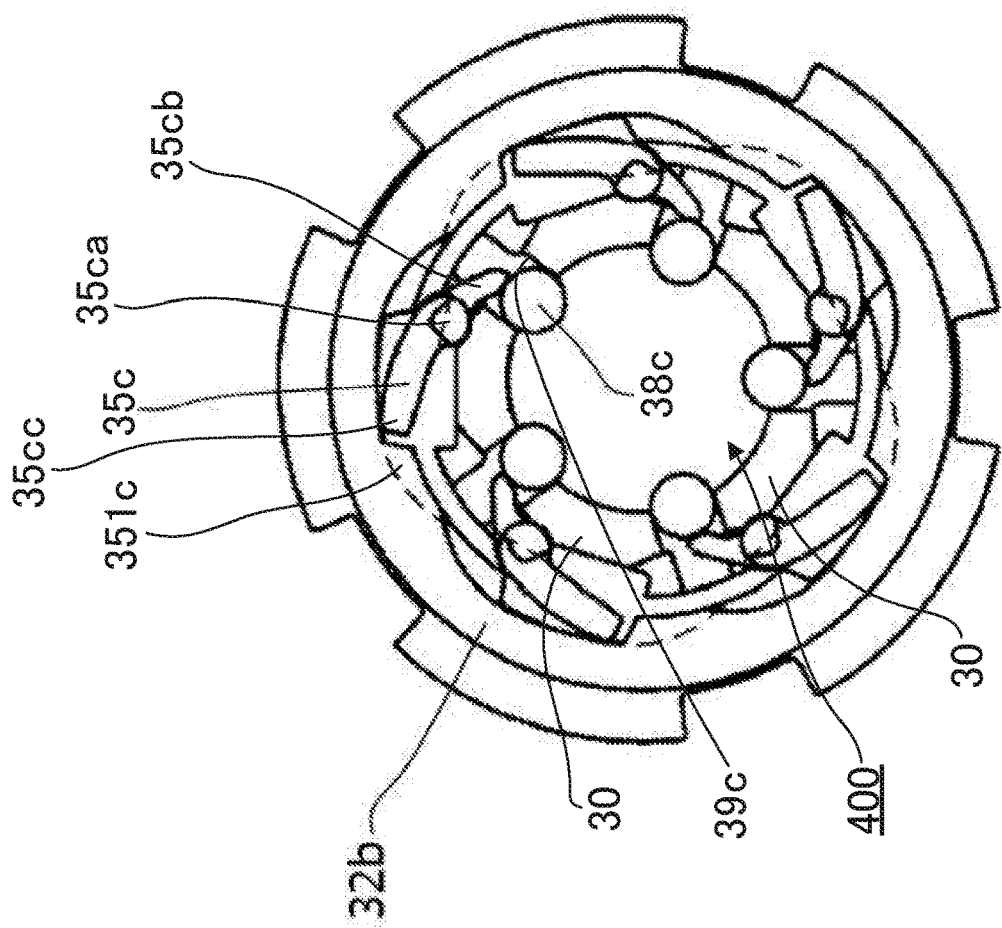
FIG. 30AA is a cross-sectional view schematically showing a pawl in a lowered state; and BFIG. 30B is a cross-sectional view schematically showing the pawl in a raised state.
Figure 30A:
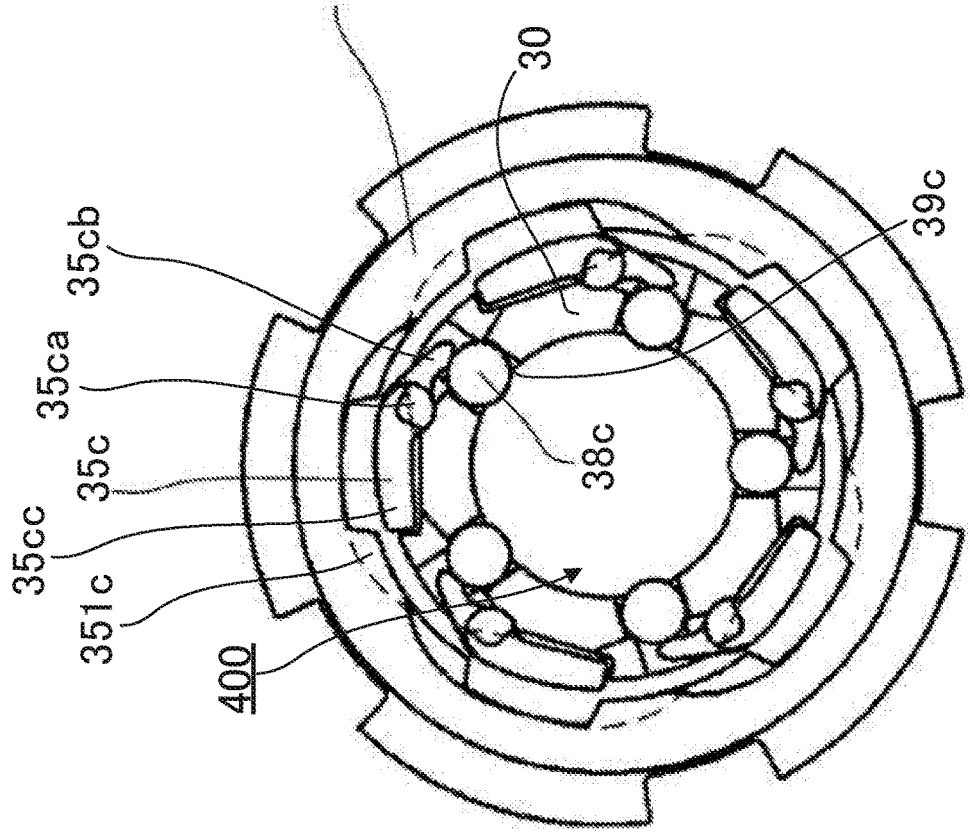

FIG. 30A is a cross-sectional view schematically showing a situation where the pawls 35c are lowered. FIG. 30B is a cross-sectional view schematically showing a situation where the pawls 35c are raised. In these drawings, the clockwise direction is the forward rotation direction of the hub 32b and the output shaft 30.

In a case of not shifting gears where relative rotation between the hub 32b and the output shaft 30 is restricted, power transmission is performed between the hub 32b and the output shaft 30. At this time, the hub 32b and the output shaft 30 rotate at substantially the same speed in the forward rotation direction (the clockwise direction in the drawings).

In a case where the ratchet mechanism 400 (see FIG. 23 to FIG. 25) operates so as to make the slider 43c press the balls 38c outward with respect to the diameter direction, the balls 38c in the holes 39c move outward with respect to the diameter direction, so that the balls 38c push proximal end portions 35cb of the pawls 35c outward with respect to the diameter direction, as shown in FIG. 30A. As a result, each pawl 35c pivots counterclockwise in the drawings with a shaft 35ca serving as a fulcrum.

Consequently, distal end portions 35cc of the pawls 35c are lowered inward with respect to the diameter direction. At this time, the distal end portions 35cc of the pawls 35c are not engaged with engaging protrusions 351c of the hub 32b. Now that the engagement of the pawls 35c with the hub 32b is cancelled, rotational power of the hub 32b is not transmitted to the output shaft 30 even when the hub 32b rotates in an accelerating direction (clockwise in the drawings) relative to the output shaft 30.

In a case where the ratchet mechanism 400 (see FIG. 23 to FIG. 25) operates so as to cancel the slider 43c pressing the balls 38c outward with respect to the diameter direction, the balls 38c in the holes 39c become movable inward with respect to the diameter direction, so that the proximal end portions 35cb of the pawls 35c also become movable inward with respect to the diameter direction. At this time, due to a biasing force exerted by the circlip 37c (see FIG. 29) and a centrifugal force applied to the pawls 35c, the distal end portions 35cc of the pawls 35c are raised outward with respect to the diameter direction, as shown in FIG. 30B. Concurrently, the proximal end portions 35cb of the pawls 35c move inward with respect to the diameter direction. This makes each pawl 35c pivot clockwise in the drawings with the shaft 35ca serving as a fulcrum. As a result, the distal end portions 35cc of the pawls 35c become engageable with the engaging protrusions 351c of the hub 32b.

In the situation shown in FIG. 30B, if the hub 32b rotates in the accelerating direction (clockwise when viewed from the output shaft) relative to the output shaft 30, the distal end portions 35cc of the pawls 35c are engaged with the engaging protrusions 351c of the hub 32b. The engagement of the pawls 35c with the hub 32b allows power (torque directed to acceleration) of the hub 32b to be transmitted to the output shaft 30. On the other hand, if the hub 32b rotates in a decelerating direction (counterclockwise when viewed from the output shaft) relative to the output shaft 30, an inner peripheral surface of the hub 32b makes the pawls 35c lowered, so that the distal end portions 35cc of the pawls 35c are not engaged with the engaging protrusions 351c of the hub 32b. Since the engagement of the pawls 35c with the hub 32b is cancelled, the power (torque) of the hub 32b is not transmitted to the output shaft 30. In this manner, the odd-numbered stage accelerating pawls 35c, when raised, allow acceleration-directed power to be transmitted between the odd-numbered stage hub 32b and the output shaft 30, and, when lowered, do not allow transmission of the power. In the present specification and claims, the term "acceleration-directed power" refers to power in a first rotation direction of the output shaft 30, and the term "deceleration-directed power" refers to power in an opposite rotation direction of the output shaft 30. In one embodiment, the term "acceleration-directed power" may refer to power that would increase the rotation rate of the output shaft 30, and "deceleration-directed power" may refer to power that would decrease the rotation rate of the output shaft 30.

While FIG. 30A to FIG. 30B illustrate the odd-numbered stage accelerating pawls 35*c* as an example, the operations for raising and lowering the other pawls 35*a*, 35*b*, 35*d* are the same as for the pawls 35*c*. The even-numbered stage accelerating pawls 35*a*, when raised, allow acceleration-directed power (torque) to be transmitted between the even-numbered stage hub 32*a* and the output shaft 30, and, when lowered, do not allow transmission of the power (torque). The even-numbered stage decelerating pawls 35*b*, when raised, allow deceleration-directed power (torque) to be transmitted between the even-numbered stage hub 32*a* and the output shaft 30, and, when lowered, do not allow transmission of the power (torque). The odd-numbered stage decelerating pawls 35*d*, when raised, allow acceleration-directed power (torque) to be transmitted between the odd-numbered stage hub 32*b* and the output shaft 30, and, when lowered, do not allow transmission of the power (torque). Here, the acceleration-directed power (torque) is power (torque) that accelerates the straddled vehicle. The deceleration-directed power (torque) is power (torque) that decelerates the straddled vehicle.

When the hub 32*a* rotates in the accelerating direction relative to the output shaft 30, the even-numbered stage accelerating pawls 35*a* in the raised state come into engagement with the hub 32*a*, thus transmitting power of the hub 32*a* to the output shaft 30. When the hub 32*a* rotates in the decelerating direction relative to the output shaft 30, the engagement of the raised even-numbered stage accelerating pawls 35*a* with the hub 32*a* is cancelled, so that power of the hub 32*a* is not transmitted to the output shaft 30.

When the hub 32*a* rotates in the decelerating direction relative to the output shaft 30, the even-numbered stage decelerating pawls 35*b* in the raised state come into engagement with the hub 32*a*, thus transmitting power of the hub 32*a* to the output shaft 30. When the hub 32*a* rotates in the accelerating direction relative to the output shaft 30, the engagement of the raised even-numbered stage decelerating pawls 35*b* with the hub 32*a* is cancelled, so that power of the hub 32*a* is not transmitted to the output shaft 30.

When the hub 32*b* rotates in the decelerating direction relative to the output shaft 30, the odd-numbered stage decelerating pawls 35*d* in the raised state come into engagement with the hub 32*b*, thus transmitting power of the hub 32*b* to the output shaft 30. When the hub 32*b* rotates in the accelerating direction relative to the output shaft 30, the engagement of the raised odd-numbered stage decelerating pawls 35*d* with the hub 32*b* is cancelled, so that power of the hub 32*b* is not transmitted to the output shaft 30. The pawls 35*a* to 35*d*, when lowered, do not allow power of the hubs 32*a*, 32*b* to be transmitted to the output shaft 30.

In this embodiment, the pawls 35*a* to 35*d*, when lowered, are fixed in a lowered state by the balls 38*a* to 38*d*. When raised, on the other hand, the pawls 35*a* to 35*d* are raised due to a biasing force exerted by the circlips 37*a* to 37*d* and a centrifugal force applied to the pawls 35*a* to 35*d*. In both cases of shifting gears and not shifting gears, the raised posture of the pawls 35*a* to 35*d* is not fixed by any mechanical configuration. Thus, the pawls 35*a* to 35*d* can be lowered if a force directed to lowering of the pawls 35*a* to 35*d* is applied to the raised pawls 35*a* to 35*d*. That is, the ratchet control mechanism keeps the lowered posture of the pawls 35*a* to 35*d* fixed by contacting the pawls 35*a* to 35*d* with a mechanical configuration (e.g., the balls 38*a* to 38*d*), but does not keep the raised posture of the pawls 35*a* to 35*d* fixed by a mechanical configuration. This can suppress occurrence of displacement, desynchronization, deformation, or wear of members constituting the ratchet control mechanism (e.g., the sliders 43*a* to 43*d* that support the balls 38*a* to 38*d* or the engagement pins 46*a* to 46*d*).

<<Operations of Ratchet Control Mechanism>>

FIG. 31A is a cross-sectional view schematically showing the control cam shaft and the guide shaft. FIG. 31B is a development diagram schematically showing the shapes of the cam grooves of the control cam shaft. FIG. 31C is a schematic diagram for explanation of movement of the control cam shaft.

In the ratchet mechanism 400, as shown in FIG. 31A, the guide shaft 41 having a cylindrical shape and the control cam shaft 40 received inside the guide shaft 41 with respect to the diameter direction are coaxial. The guide shaft 41 is fixed to the casing 14 as shown in FIG. 21, and therefore not rotate. The control cam shaft 40 is rotatable. That is, the control cam shaft 40 is rotatable relative to the guide shaft 41.

FIG. 31B shows, in outline, the cam grooves 42, 42*a* to 42*d* and the guide holes 44, 44*a* to 44*d* formed in the outer peripheral surface of the control cam shaft 40, and the engagement pins 46, 46*a* to 46*d*. As mentioned above, each of the engagement pins 46, 46*a* to 46*d* is provided to each of the sliders 43, 43*a* to 43*d*. In the drawings, ESH represents "Even-numbered Stage Hub". OSH represents "Odd-numbered Stage Hub". Acc represents "for Acceleration". Dec represents "for Deceleration". En represents a pawl-raising position. Re represents a pawl-lowering position. As the guide shaft 41 rotates relative to the control cam shaft 40, the guide holes 44, 44*a* to 44*d* move relative to the cam grooves 42, 42*a* to 42*d*. In the drawings, the guide holes 44, 44*a* to 44*d* move in the vertical direction.

As shown in FIG. 31C, the control cam shaft 40 and the guide shaft 41 has a relative rotation angle of 180° between the odd-numbered stage position "OSP" and the even-numbered stage position "ESP". On the outer peripheral surface of the control cam shaft 40, the odd-numbered stage position and the even-numbered stage position are distant from each other by 180° in the circumferential direction. As a circumferential length of the control cam shaft 40 corresponding to one stage shifting, a long length is obtained. This enables reduction in the diameter of the control cam shaft 40 while ensuring a stability in controlling the operation of the pawls 35*a* to 35*d* by the control cam shaft 40. A higher robustness can be obtained with improvement in mountability to vehicle.

In FIG. 31B, one scale division between the odd-numbered stage position "OSP" and the even-numbered stage position "ESP" corresponds to a rotation angle of 30°. Rotation of the control cam shaft 40 relative to the guide shaft 41 is in different directions in a case of shift-up and in a case of shift-down. In FIG. 31C, the rotation direction of the control cam shaft 40 is clockwise in a case of shift-up, and counterclockwise in a case of shift-down. As for the rotation direction of the control cam shaft 40, the downward direction in FIG. 31B corresponds to a shift-up direction and the upward direction in FIG. 31B corresponds to a shift-down direction. In FIG. 31B and FIG. 31C, AR1 represents a first region and AR2 represents a second region. The first region AR1 is a region extending in the shift-up direction from the even-numbered stage position ESP to the odd-numbered stage position OSP with respect to the circumferential direction of the control cam shaft 40. The second region AR2 is a region extending in the shift-down direction from the even-numbered stage position ESP to the odd-numbered stage position OSP with respect to the circumferential direction of the control cam shaft 40.

The cam groove 42 is a groove that is constant in the circumferential direction and unchanged in the axial direction of the control cam 40. The engagement pin 46 is fixed to the guide hole 44 by the guide hole 44 and the slider 43. This way, movement of the control cam shaft 40 relative to the guide shaft 41 is restricted in the axial direction.

The slider 43*a* moves in the axial direction of the control cam shaft 40, so that the cam groove 42*a*, the guide hole 44*a*, and the engagement pin 46*a* control the raised or lowered state of the even-numbered stage accelerating pawls 35*a* of the hub 32*a* which is the "even-numbered stage hub".

The slider 43*b* moves in the axial direction of the control cam shaft 40, so that the cam groove 42*b*, the guide hole 44*b*, and the engagement pin 46*b* control the raised or lowered state of the even-numbered stage decelerating pawls 35*b* of the hub 32*a* which is the "even-numbered stage hub".

The slider 43*c* moves in the axial direction of the control cam shaft 40, so that the cam groove 42*c*, the guide hole 44*c*, and the engagement pin 46*c* control the raised or lowered state of the odd-numbered stage accelerating pawls 35*c* of the hub 32*b* which is the "odd-numbered stage hub".

The slider 43*d* moves in the axial direction of the control cam shaft 40, so that the cam groove 42*d*, the guide hole 44*d*, and the engagement pin 46*d* control the raised or lowered state of the odd-numbered stage decelerating pawls 35*d* of the hub 32*b* which is the "odd-numbered stage hub".

Rotation of the guide shaft 41 relative to the control cam shaft 40 changes positions where the cam grooves 42*a* to 42*d* overlap the guide holes 44*a* to 44*d* in the diameter direction of the control cam shaft 40. The engagement pins 46*a* to 46*d* are guided by the cam grooves 42*a* to 42*d* and the guide holes 44*a* to 44*d* so as to move to the overlap positions. As a result, the sliders 43*a* to 43*d* move in the axial direction of the control cam shaft 40, to control the raised or lowered state of the respective pawls 35*a* to 35*d*.

Referring to FIG. 31B, when the engagement pin 46*a* to 46*d* is in the pawl-raising position En, the pawls corresponding to this engagement pin are raised, so that power transmission between the hub corresponding to these pawls and the output shaft 30 is enabled. When the engagement pin 46*a* to 46*d* is in the pawl-lowering position Re, the pawls corresponding to this engagement pin are lowered. At this time, power transmission between the hub corresponding to these pawls and the output shaft 30 is not performed. More detailed description will be given using FIG. 36 to FIG. 49.

Next, movement paths and movement timings of the engagement pins 46*a* to 46*d* relative to the cam grooves 42*a* to 42*d* of the control cam shaft 40 will be described with reference also to FIG. 32 to FIG. 34. The sliders 43*a* to 43*d* provided with the engagement pins 46*a* to 46*d* (see FIG. 24) move together with the engagement pins 46*a* to 46*d*. Thus, when the engagement pin moves to the pawl-raising position, the corresponding slider also moves to the pawl-raising position. When the engagement pin moves to the pawl-lowering position, the corresponding slider also moves to the pawl-lowering position.

<Case of not Shifting Gears with Even-Numbered Stage Selected>

Figure 32:
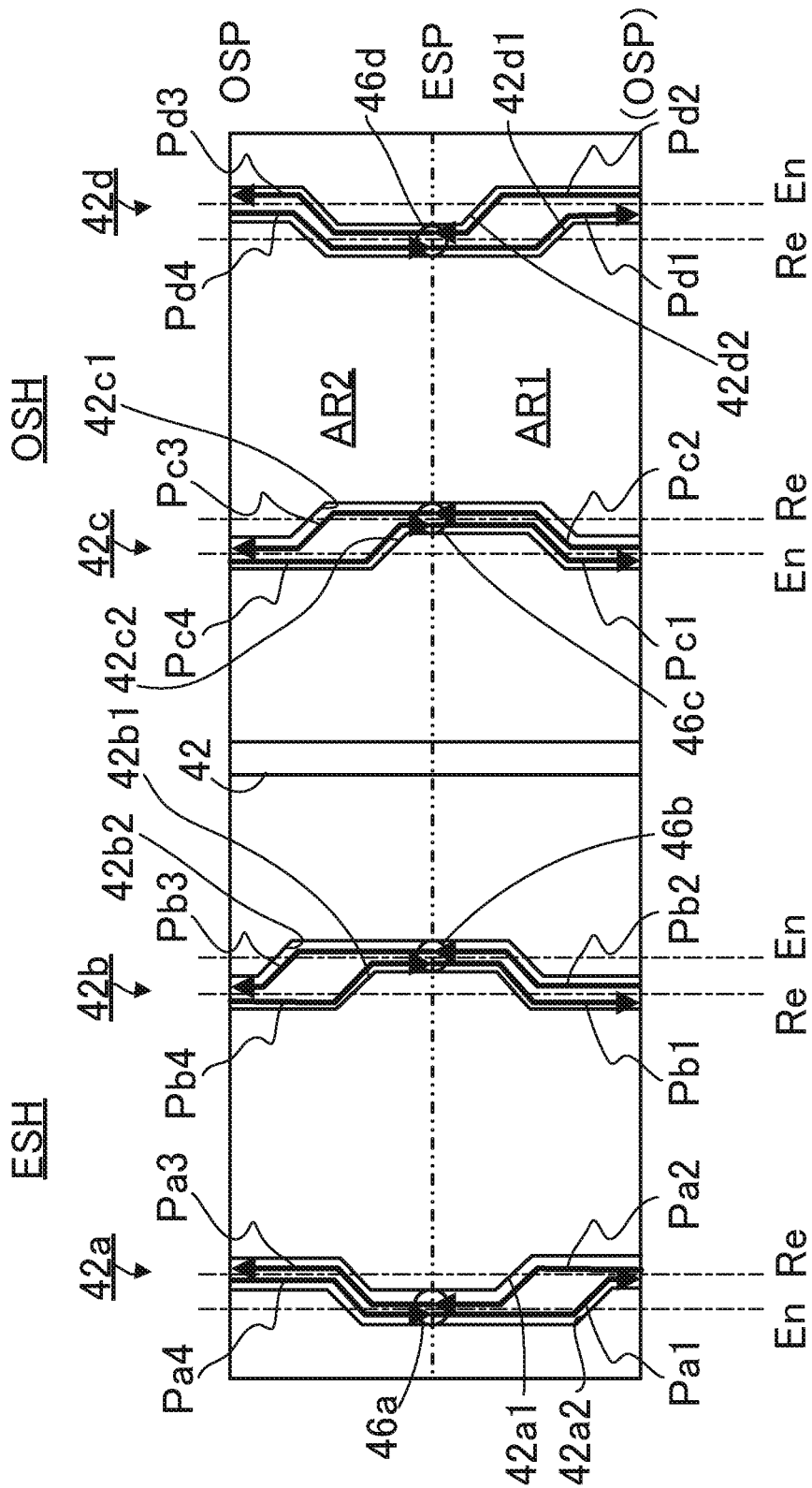
FIG. 32 is an explanatory diagram schematically showing movement paths of engagement pins relative to the cam grooves of the control cam shaft.
Figure 36A:
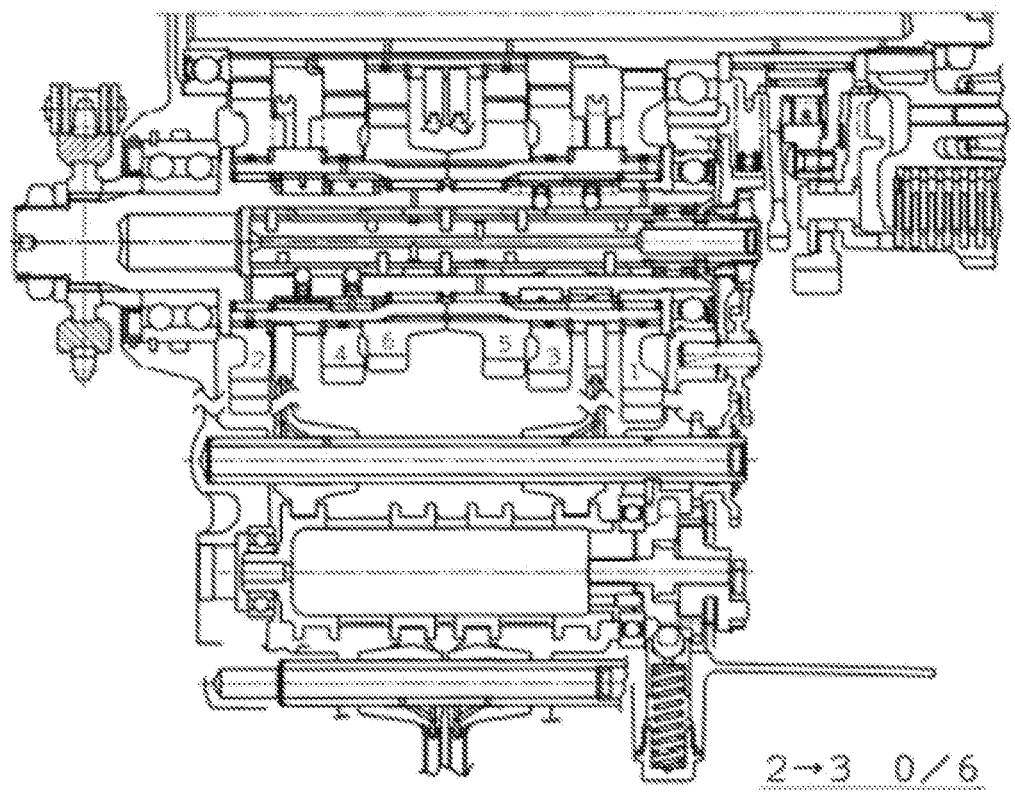
Figure 36G:
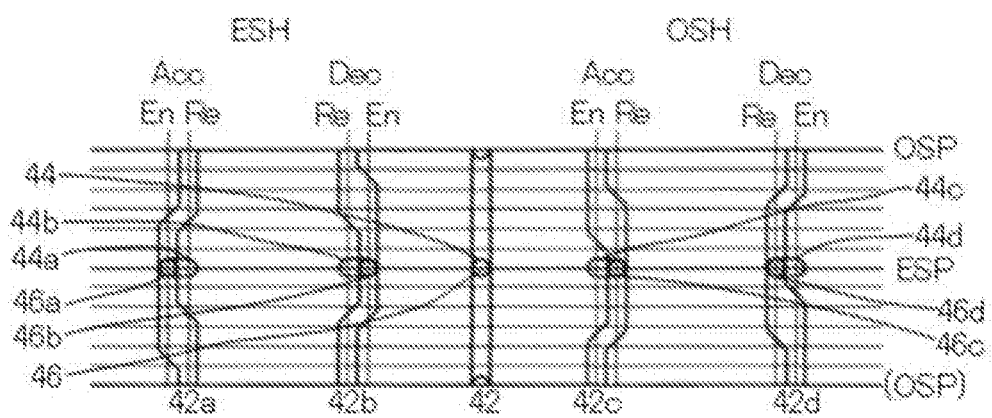
Figure 49A:
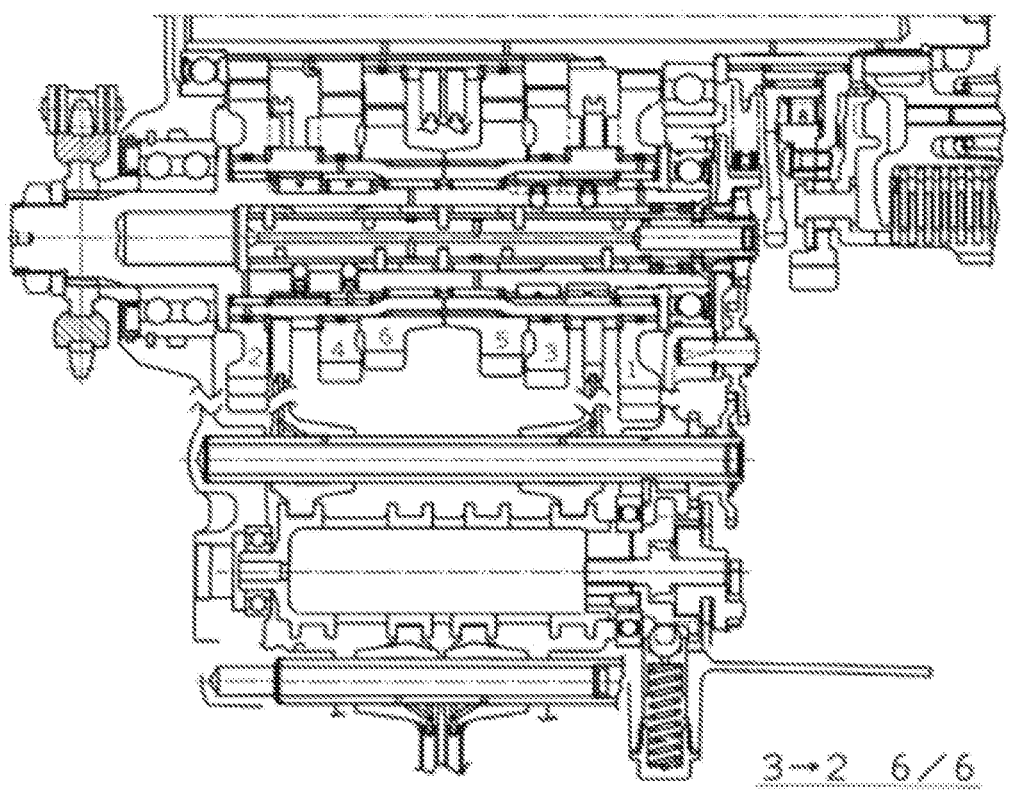
Figure 49G:
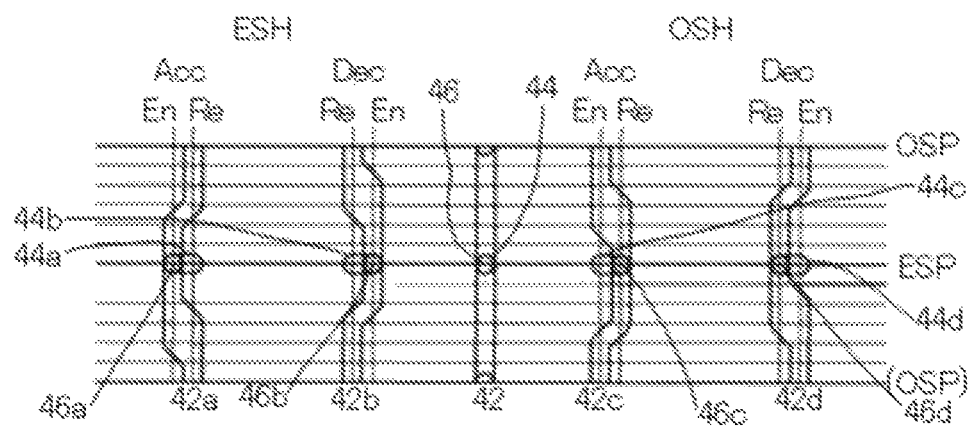
Figure 49H:
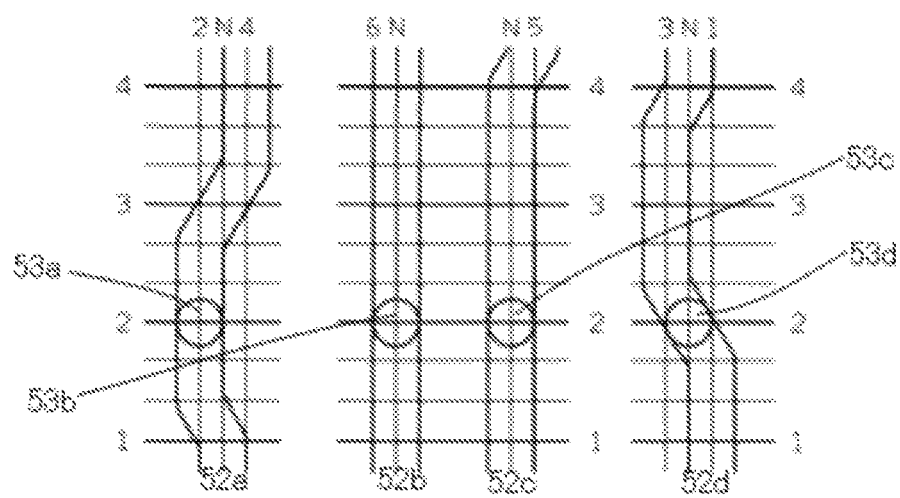

In a case of not shifting gears with the even-numbered stage selected, the engagement pins 46*a* to 46*d* are in the even-numbered stage position ESP, as shown in FIG. 32. The positions of the engagement pins 46*a* to 46*d* are also shown in FIG. 36G and FIG. 49G. At this time, the engagement pins 46*a*, 46*b* corresponding to the even-numbered stage which is selected are in the pawl-raising positions En. The engagement pins 46*c*, 46*d* corresponding to the odd-numbered stage which is not selected are in the pawl-lowering positions Re. Accordingly, the pawls 35*a* to 35*d* are in an even-numbered stage state. In the even-numbered stage state, the even-numbered stage accelerating pawls 35*a* and the even-numbered stage decelerating pawls 35*b* are raised, while the odd-numbered stage accelerating pawls 35*c* and the odd-numbered stage decelerating pawls 35*d* are lowered.

<Case of not Shifting Gears with Odd-Numbered Stage Selected>

Figure 42A:
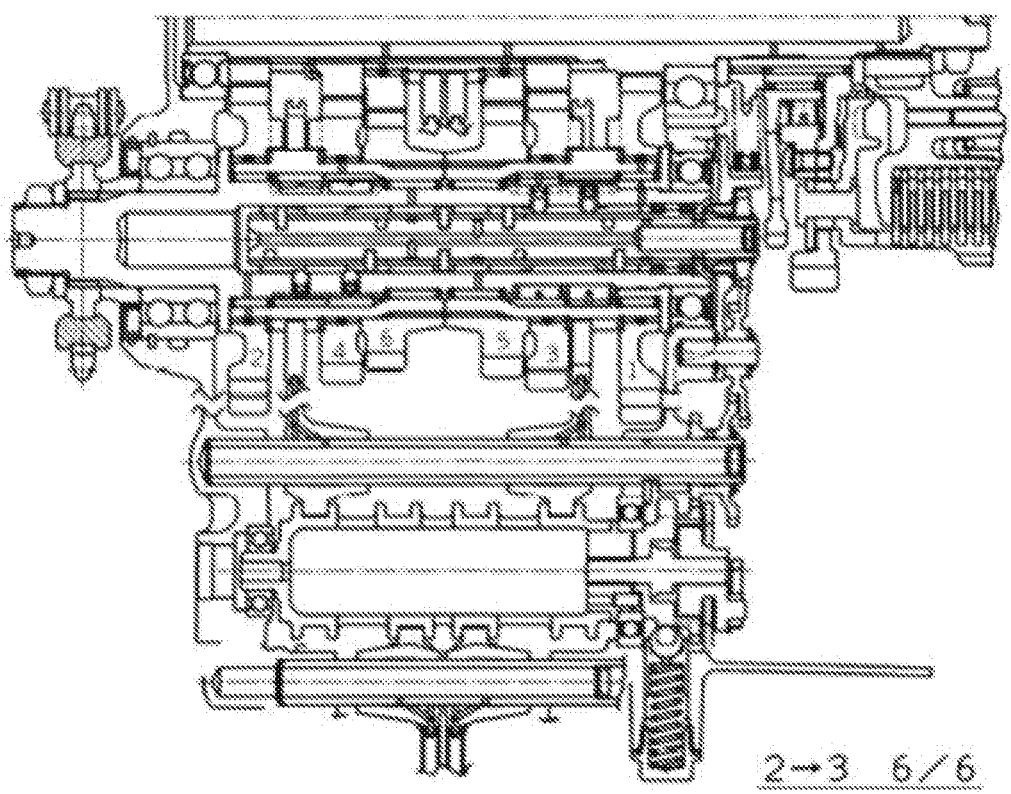
Figure 42G:
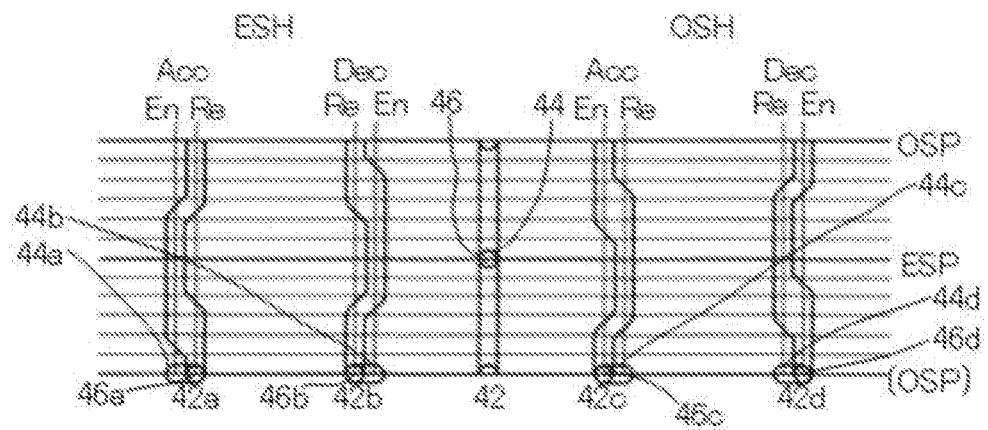
Figure 42H:
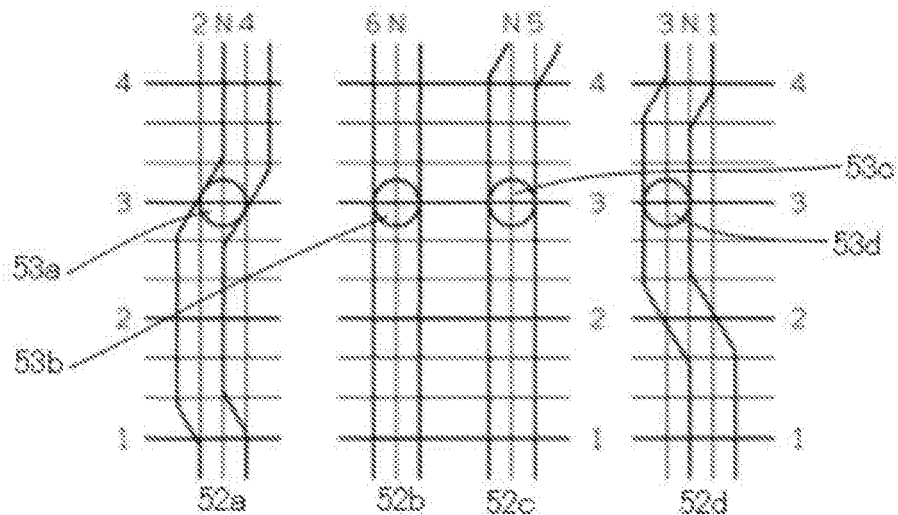

In a case of not shifting gears with the odd-numbered stage selected, the engagement pins 46*a* to 46*d* are in the odd-numbered stage position OSP. The positions of the engagement pins 46*a* to 46*d* are also shown in FIG. 42G and FIG. 43G. At this time, the engagement pins 46*c*, 46*d* corresponding to the odd-numbered stage which is selected are in the pawl-raising positions En. The engagement pins 46*a*, 46*b* corresponding to the even-numbered stage which is not selected are in the pawl-lowering positions Re. Accordingly, the pawls 35*a* to 35*d* are in an odd-numbered stage state. In the odd-numbered stage state, the odd-numbered stage accelerating pawls 35*c* and the odd-numbered stage decelerating pawls 35*d* are raised, while the even-numbered stage accelerating pawls 35*a* and the even-numbered stage decelerating pawls 35*b* are lowered.

<General Description about the Case of not Shifting Gears>

As described above, either in the case of not shifting gears with the odd-numbered stage selected (see FIG. 42 and FIG. 43) or in the case of not shifting gears with the even-numbered stage selected (see FIG. 36 and FIG. 49), the plurality of cam grooves 42*a* to 42*d* make the engagement pins 46*a* to 46*d* positioned according to (I) and (II) below.

(I) The plurality of sliders 43*a* to 43*d* (see FIG. 24) raise accelerating pawls and decelerating pawls corresponding to a selected gear stage.

(II) The plurality of sliders 43*a* to 43*d* (see FIG. 24) lower accelerating pawls and decelerating pawls corresponding to a non-selected gear stage.

<Case of Shifting Up from Even-Numbered Stage to Odd-Numbered Stage>

In a case of shifting up from an even-numbered stage to an odd-numbered stage, no matter whether the shifting-up is power-on upshift or power-off upshift, the engagement pins 46*a* to 46*d* simultaneously move downward in FIG. 32 from the even-numbered stage position ESP to the odd-numbered stage position OSP that locates lower in FIG. 32 through paths Pa1 to Pd1 within the first region AR1. The paths Pa1 to Pd1 are also shown in FIG. 33. In a process of the engagement pins 46*a* to 46*d* passing through the paths Pa1 to Pd1, the engagement pins 46*a* to 46*d* are guided by the cam grooves 42*a* to 42*d* in the sequence of (i) to (iii) below. As a result, a ratchet operation C is performed as follows.

(i) The engagement pin 46*b* moves from the pawl-raising position En to the pawl-lowering position Re while being guided by a lowered-direction drive surface 42*b*2 of the cam groove 42*b* (see Pb1). As a result, the even-numbered stage decelerating pawls 35*b* are lowered. The even-numbered stage decelerating pawls 35*b* correspond to an original even-numbered stage from which the speed is to be changed. The pawls 35*b* are for deceleration, and the decelerating pawls 35*b* are pawls not allowing power transmission in a power-on state. In a case of shifting up in a power-off state, a control for transiently preventing the decelerating pawls 35*b* from allowing power transmission is performed before lowering of the decelerating pawls 35*b*. This control is a control in which, for example, a torque of the engine 11 is transiently made positive. Due to the control, the decelerating pawls 35*b* are lowered after the decelerating pawls 35*b* become pawls not allowing power transmission. The control is terminated after engagement of the decelerating pawls 35*b* is cancelled.

(ii) The engagement pin 46*c* moves from the pawl-lowering position Re to the pawl-raising position En while being guided by a raised-direction drive surface 42*c*1 of the cam groove 42*c* (see Pc1). In addition, the engagement pin 46*d* moves from the pawl-lowering position Re to the pawl-raising position En while being guided by a raised-direction drive surface 42*d*1 of the cam groove 42*d* (see Pd1). As a result, the odd-numbered stage accelerating pawls 35*c* and the odd-numbered stage decelerating pawls 35*d* are raised. The odd-numbered stage accelerating pawls 35*c* and the odd-numbered stage decelerating pawls 35*d* correspond to a target odd-numbered stage to which the speed is to be changed.

(iii) The engagement pin 46*a* moves from the pawl-raising position En to the pawl-lowering position Re while being guided by a lowered-direction drive surface 42*a*2 of the cam groove 42*a* (see Pa1). As a result, the even-numbered stage accelerating pawls 35*a* are lowered. The even-numbered stage accelerating pawls 35*a* are pawls that are not lowered in the preceding (i) among the pawls corresponding to the original even-numbered stage from which the speed is to be changed.

<Case of Shifting Down from Odd-Numbered Stage to Even-Numbered Stage>

In a case of shifting down from an odd-numbered stage to an even-numbered stage, no matter whether the shifting-down is power-on downshift or power-off downshift, the engagement pins 46*a* to 46*d* simultaneously move upward in FIG. 32 from the odd-numbered stage position OSP that locates lower in FIG. 32 to the even-numbered stage position ESP through paths Pa2 to Pd2 within the first region AR1. The paths Pa2 to Pd2 are also shown in FIG. 34. In a process of the engagement pins 46*a* to 46*d* passing through the paths Pa2 to Pd2, the engagement pins 46*a* to 46*d* are guided by the cam grooves 42*a* to 42*d* in the sequence of (i) to (iii) below. As a result, a ratchet operation B is performed as follows.

(i) The engagement pin 46*c* moves from the pawl-raising position En to the pawl-lowering position Re while being guided by a lowered-direction drive surface 42*c*2 of the cam groove 42*c* (see Pc2). As a result, the odd-numbered stage accelerating pawls 35*c* are lowered. The odd-numbered stage accelerating pawls 35*c* correspond to an original odd-numbered stage from which the speed is to be changed. The pawls 35*c* are for acceleration, and the accelerating pawls 35*c* are pawls not allowing power transmission in a power-off state. In a case of shifting down in a power-on state, a control for transiently preventing the accelerating pawls 35*c* from allowing power transmission is performed before lowering of the accelerating pawls 35*c*. This control is a control in which, for example, a torque of the engine 11 is made negative. Due to the control, the accelerating pawls 35*c* are lowered after the accelerating pawls 35*c* become pawls not allowing power transmission. The control is terminated after engagement of the accelerating pawls 35*c* is cancelled.

(ii) The engagement pin 46*a* moves from the pawl-lowering position Re to the pawl-raising position En while being guided by a raised-direction drive surface 42*a*1 of the cam groove 42*a* (see Pa2). In addition, the engagement pin 46*b* moves from the pawl-lowering position Re to the pawl-raising position En while being guided by a raised-direction drive surface 42*b*1 of the cam groove 42*b* (see Pb2). As a result, the even-numbered stage accelerating pawls 35*a* and the even-numbered stage decelerating pawls 35*b* are raised. The even-numbered stage accelerating pawls 35*a* and the even-numbered stage decelerating pawls 35*b* correspond to a target even-numbered stage to which the speed is to be changed.

(iii) The engagement pin 46*d* moves from the pawl-raising position En to the pawl-lowering position Re while being guided by a lowered-direction drive surface 42*d*2 of the cam groove 42*d* (see Pd2). As a result, the odd-numbered stage decelerating pawls 35*d* are lowered. The odd-numbered stage decelerating pawls 35*d* are pawls that are not lowered in the preceding (i) among the pawls corresponding to the original odd-numbered stage from which the speed is to be changed.

<Case of Shifting Down from Even-Numbered Stage to Odd-Numbered Stage>

In a case of shifting down from an even-numbered stage to an odd-numbered stage, no matter whether the shifting-down is power-on downshift or power-off downshift, the engagement pins 46*a* to 46*d* simultaneously move upward in FIG. 32 from the even-numbered stage position ESP to the odd-numbered stage position OSP that locates upper in FIG. 32 through paths Pa3 to Pd3 within the second region AR2. The paths Pa3 to Pd3 are also shown in FIG. 34. In a process of the engagement pins 46*a* to 46*d* passing through the paths Pa3 to Pd3, the engagement pins 46*a* to 46*d* are guided by the cam grooves 42*a* to 42*d* in the sequence of (i) to (iii) below. As a result, a ratchet operation D is performed as follows.

(i) The engagement pin 46*a* moves from the pawl-raising position En to the pawl-lowering position Re while being guided by the lowered-direction drive surface 42*a*2 of the cam groove 42*a* (see Pa3). As a result, the even-numbered stage accelerating pawls 35*a* are lowered. The even-numbered stage accelerating pawls 35*a* correspond to an original even-numbered stage from which the speed is to be changed. The pawls 35*a* are for acceleration, and the accelerating pawls 35*a* are pawls not allowing power transmission in a power-off state. In a case of shifting down in a power-on state, a control for transiently preventing the accelerating pawls 35*a* from allowing power transmission is performed before lowering of the accelerating pawls 35*a*. This control is similar to the above-mentioned control for transiently preventing the accelerating pawls 35*c* from allowing power transmission.

(ii) The engagement pin 46*c* moves from the pawl-lowering position Re to the pawl-raising position En while being guided by the raised-direction drive surface 42*c*1 of the cam groove 42*c* (see Pc3). In addition, the engagement pin 46*d* moves from the pawl-lowering position Re to the pawl-raising position En while being guided by the raised-direction drive surface 42*d*1 of the cam groove 42*d* (see Pd3). As a result, the odd-numbered stage accelerating pawls 35*c* and the odd-numbered stage decelerating pawls 35*d* are raised. The odd-numbered stage accelerating pawls 35*c* and the odd-numbered stage decelerating pawls 35*d* correspond to a target odd-numbered stage to which the speed is to be changed.

(iii) The engagement pin 46*b* moves from the pawl-raising position En to the pawl-lowering position Re while being guided by the lowered-direction drive surface 42*b*2 of the cam groove 42*b* (see Pb3). As a result, the even-numbered stage decelerating pawls 35*b* are lowered. The even-numbered stage decelerating pawls 35*b* are pawls that are not lowered in the preceding (i) among the pawls corresponding to the original even-numbered stage from which the speed is to be changed.

<Case of Shifting Up from Odd-Numbered Stage to Even-Numbered Stage>

In a case of shifting up from an odd-numbered stage to an even-numbered stage, no matter whether the shifting-up is power-on upshift or power-off upshift, the engagement pins 46*a* to 46*d* simultaneously move downward in FIG. 32 from the odd-numbered stage position OSP that locates upper in FIG. 32 to the even-numbered stage position ESP through paths Pa4 to Pd4 within the second region AR2. The paths Pa4 to Pd4 are also shown in FIG. 33. In a process of the engagement pins 46*a* to 46*d* passing through the paths Pa4 to Pd4, the engagement pins 46*a* to 46*d* are guided by the cam grooves 42*a* to 42*d* in the sequence of (i) to (iii) below. As a result, a ratchet operation A is performed as follows.

(i) The engagement pin 46*d* moves from the pawl-raising position En to the pawl-lowering position Re while being guided by the lowered-direction drive surface 42*d*2 of the cam groove 42*d* (see Pd4). As a result, the odd-numbered stage decelerating pawls 35*d* are lowered. The odd-numbered stage decelerating pawls 35*d* correspond to an original odd-numbered stage from which the speed is to be changed. The pawls 35*d* are for deceleration, and the decelerating pawls 35*d* are pawls not allowing power transmission in a power-on state. In a case of shifting up in a power-off state, a control for transiently preventing the decelerating pawls 35*d* from allowing power transmission is performed before lowering of the decelerating pawls 35*d*. This control is similar to the above-mentioned control for transiently preventing the decelerating pawls 35*b* from allowing power transmission.

(ii) The engagement pin 46*a* moves from the pawl-lowering position Re to the pawl-raising position En while being guided by the raised-direction drive surface 42*a*1 of the cam groove 42*a* (see Pa4). In addition, the engagement pin 46*b* moves from the pawl-lowering position Re to the pawl-raising position En while being guided by the raised-direction drive surface 42*b*1 of the cam groove 42*b* (see Pb4). As a result, the even-numbered stage accelerating pawls 35*a* and the even-numbered stage decelerating pawls 35*b* are raised. The even-numbered stage accelerating pawls 35*a* and the even-numbered stage decelerating pawls 35*b* correspond to a target even-numbered stage to which the speed is to be changed.

(iii) The engagement pin 46*c* moves from the pawl-raising position En to the pawl-lowering position Re while being guided by the lowered-direction drive surface 42*c*2 of the cam groove 42*c* (see Pc4). As a result, the odd-numbered stage accelerating pawls 35*c* are lowered. The odd-numbered stage accelerating pawls 35*c* are pawls that are not lowered in the preceding (i) among the pawls corresponding to the original odd-numbered stage from which the speed is to be changed.

<General Description about Gear Shifting Between Even-Numbered Stage and Odd-Numbered Stage>

Figure 33:
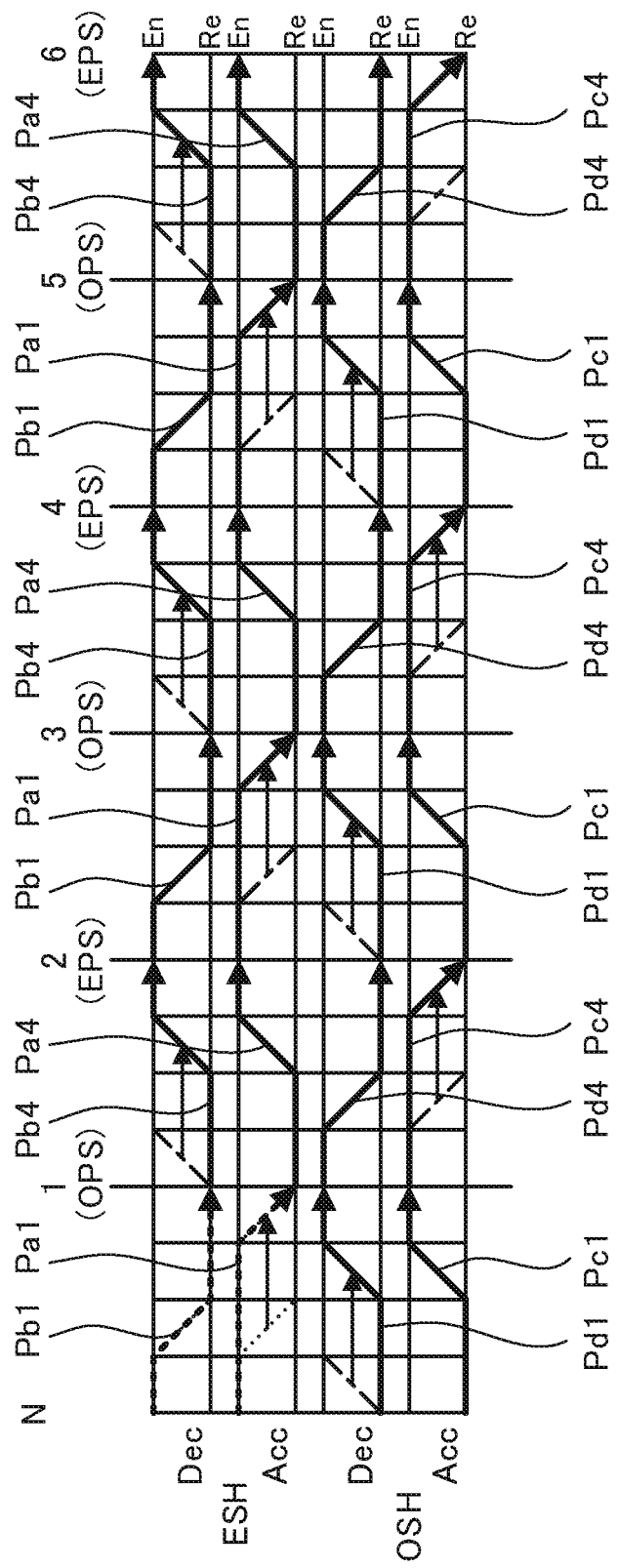
FIG. 33 is a timing chart showing movement timings of the engagement pins in a case of shift-up.
Figure 34:
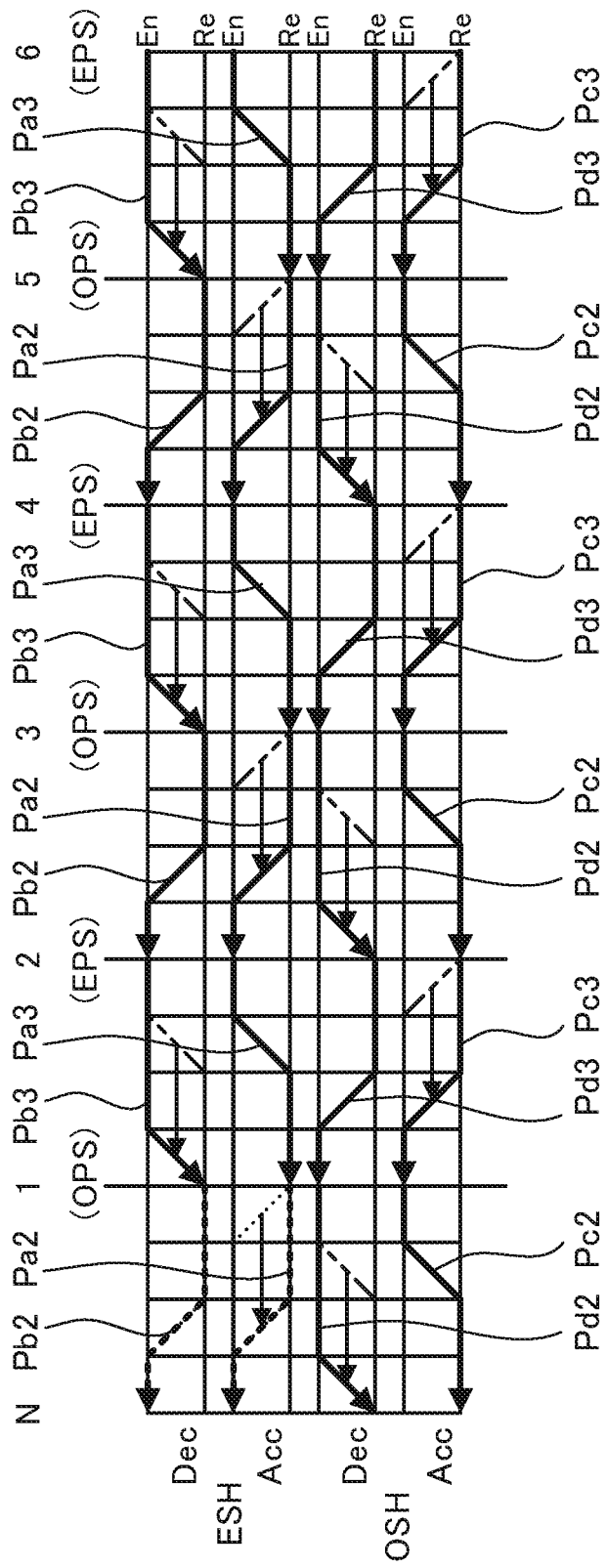
FIG. 34 is a timing chart showing movement timings of the engagement pins in a case of shift-down.

As shown in FIG. 32 to FIG. 34, the movement paths Pa1 to Pd1 of the engagement pins 46*a* to 46*d* in a case of shifting up from an even-numbered stage to an odd-numbered stage are different from the movement paths Pa2 to Pd2 of the engagement pins 46*a* to 46*d* in a case of shifting down from an odd-numbered stage to an even-numbered stage, though they pass through the same first region AR1.

To be specific, the movement paths Pa1, Pa2 are different from each other. The movement paths Pd1, Pd2 are also different from each other.

As shown in FIG. 32 to FIG. 34, the movement paths Pa3 to Pd3 of the engagement pins 46*a* to 46*d* in a case of shifting up from an even-numbered stage to an odd-numbered stage are different from the movement paths Pa4 to Pd4 of the engagement pins 46*a* to 46*d* in a case of shifting down from an odd-numbered stage to an even-numbered stage, though they pass through the same second region AR2. To be specific, the movement paths Pb3, Pb4 are different from each other. The movement paths Pc3, Pc4 are also different from each other.

In this manner, the plurality of cam grooves 42*a* to 42*d* are formed such that the movement paths of the engagement pins 46*a* to 46*d* in the cam grooves 42*a* to 42*d* differ between shifting-up and shifting-down. Accordingly, in both cases of shifting up and shifting down, the engagement pins 46*a* to 46*d* are guided by the cam grooves 42*a* to 42*d* in the sequence of (i) to (iii) below.

(i) An engagement pin corresponding to pawls not allowing power transmission, among accelerating pawls and decelerating pawls corresponding to an original gear stage from which the speed is to be changed, moves from the pawl-raising position En to the pawl-lowering position Re.

(ii) An engagement pin corresponding to accelerating and decelerating pawls corresponding to a target gear stage to which the speed is to be changed moves from the pawl-lowering position Re to the pawl-raising position En.

(iii) An engagement pin corresponding to pawls different from the pawls mentioned in the preceding (i), among the accelerating pawls and decelerating pawls corresponding to the original gear stage from which the speed is to be changed, moves from the pawl-raising position En to the pawl-lowering position Re.

The movement paths Pa1 to Pd1, the movement paths Pa2 to Pd2, the movement paths Pa3 to Pd3, and the movement paths Pa4 to Pd4 have in common that the engagement pins move in the sequence of (i) to (iii) above. In other words, the cam grooves 42*a* to 42*d* are formed such that the movement paths Pa1 to Pd1, the movement paths Pa2 to Pd2, the movement paths Pa3 to Pd3, and the movement paths Pa4 to Pd4 have the above point in common.

As for the sequence of operating the pawls, therefore, the ratchet mechanism 400 is able to perform the above-described sequence of (i) to (iii) as a reversible sequence enabled by the movement paths of the guide object parts providing different forward and reverse paths. That is, the ratchet mechanism 400 is able to perform the above-described sequence of (i) to (iii) in both cases where the single control cam shaft 40 is rotated in the shift-up direction and in the shift-down direction. The above-described sequence of (i) to (iii) allows each of power-on upshift and power-off downshift to be performed seamlessly. The above-described sequence of (i) to (iii) is also applicable to power-off upshift and power-on downshift. Accordingly, the gear shifting operation can be continued even if acceleration and deceleration are switched during the gear shifting operation in a case of shifting up or shifting-down. Since the sequence of operating the pawls in each gear shifting pattern is standardized by a mechanical configuration, the gear shifting operation can be easily controlled.

<<Operations of Dog Engagement Mechanism>>

FIG. 35A is a cross-sectional view schematically showing the shift cam. FIG. 35B is a development diagram schematically showing the shapes of the cam grooves of the shift cam. FIG. 35C is a schematic diagram for explanation of movement of the shift cam.

The shift cam 50 shown in FIG. 35A has, in its outer peripheral surface, the cam grooves 52a to 52d shown in FIG. 35B. As shown in FIG. 35C, in a case of shifting up, the shift cam 50 rotates counterclockwise. In a case of shifting down, the shift cam 50 rotates clockwise. The rotation direction of the shift cam 50 in a case of shifting up and the rotation direction of the shift cam 50 in a case of shifting down are opposite to each other.

As shown in FIG. 35C, the gear stage positions corresponding to the respective gear stages are set circumferentially on the outer peripheral surface of the shift cam 50. The gear stage positions are provided within the full rotation angle 360° of the shift cam 50. The gear stage positions are placed in order according to high and low of the gear stages in the circumferential direction of the shift cam 50. As mentioned above, the rotation angle between ones of the gear stages is 55.38° in a region from the neutral position to the sixth speed, and the angle between the sixth speed and the neutral position is 27.69°. In this embodiment, the angle between ones of the gear stage positions is fixed.

In FIG. 35B, one scale division between respective ones of the gear stages in the region from the neutral position to the sixth speed is ⅓ of the rotation angle between respective ones of the gear stages. The synchronization mechanism 150 is configured to, when the shift cam 50 is rotated through an angle (55.38°) corresponding to one gear stage, transmit the rotation to the control cam shaft 40 such that the control cam shaft 40 is rotated through an angle (180°) corresponding to one gear stage.

As shown in FIG. 35B, the shift forks 53a to 53d are guided by the cam grooves 52a to 52d, respectively, so as to move in the axial direction of the shift cam 50. The movement of the shift forks 53a to 53d in the axial direction of the shift cam 50 causes the dog rings 33a, 23a, 23b, 33b to move in the axial direction of the shift cam 50.

In a process of the shift fork 53a moving along the cam groove 52a, the shift fork 53a comes in the position "2", and at this time, the shift fork 53a brings the dog ring 33a into mesh with the dog of the second-speed driven gear 342. When the shift fork 53a is in the position "4", the shift fork 53a brings the dog ring 33a into mesh with the dog of the fourth-speed driven gear 344. When the shift fork 53a is in the position "N" between "2" and "4", the shift fork 53a does not bring the dog ring 33a into mesh with either the second-speed driven gear 342 or the fourth-speed driven gear 344.

In a process of the shift fork 53b moving along the cam groove 52b, the shift fork 53b comes in the position "6", and at this time, the shift fork 53b brings the dog ring 23a into mesh with the dog of the sixth-speed drive gear 246. When the shift fork 53b is in the position "N", the shift fork 53b does not bring the dog ring 23a into mesh with the sixth-speed drive gear 246.

In a process of the shift fork 53c moving along the cam groove 52c, the shift fork 53c comes in the position "5", and at this time, the shift fork 53c brings the dog ring 23b into mesh with the dog of the fifth-speed drive gear 245. When the shift fork 53c is in the position "N", the shift fork 53c does not bring the dog ring 23b into mesh with the fifth-speed drive gear 245.

In a process of the shift fork 53d moving along the cam groove 52d, the shift fork 53d comes in the position "1", and at this time, the shift fork 53d brings the dog ring 33b into mesh with the dog of the first-speed driven gear 341. When the shift fork 53d is in the position "3", the shift fork 53d brings the dog ring 33b into mesh with the dog of the third-speed driven gear 343. When the shift fork 53d is in the position "N" between "1" and "3", the shift fork 53d does not bring the dog ring 33b into mesh with either the first-speed driven gear 341 or the third-speed driven gear 343.

Referring to FIG. 35B, when the shift forks 53a to 53d move in the corresponding cam grooves 52a to 52d from down to up in the drawing, the dog engagement is performed as follows.

When the shift forks 53a to 53d are in the neutral position, the shift forks 53a to 53d are in the position "N". When the shift forks 53a to 53d move from the neutral position to the first-speed gear stage position, the shift fork 53d moves to "1", to bring the dog ring 33b into engagement with the first-speed driven gear 341. When the shift forks 53a to 53d are in the first-speed gear stage position, the shift fork 53d is in the position "1", and the dog ring 33b is engaged with the first-speed driven gear 341.

When the shift forks 53a to 53d move from the first-speed gear stage position to the second-speed gear stage position, the shift fork 53a moves from "N" to "2", to bring the dog ring 33a into engagement with the second-speed driven gear 342. In addition, the shift fork 53d moves from "1" to "N", to cancel the engagement between the dog ring 33b and the first-speed driven gear 341. As shown in FIG. 35B, in a case of shifting gears from the first speed to the second speed, a period occurs in which the dog ring 33b is engaged with the first-speed driven gear 341 while the dog ring 33a is engaged with the second-speed driven gear 342.

When the shift forks 53a to 53d are in the second-speed gear stage position, the shift fork 53a is in the position "2", and the dog ring 33a is engaged with the second-speed driven gear 342.

When the shift forks 53a to 53d move from the second-speed gear stage position to the third-speed gear stage position, the shift fork 53d moves from "N" to "3", to bring the dog ring 33b into engagement with the third-speed driven gear 343. In addition, the shift fork 53a moves from "2" to "N", to cancel the engagement between the dog ring 33a and the second-speed driven gear 342. As shown in FIG. 35B, in a case of shifting gears from the second speed to the third speed, a period occurs in which the dog ring 33a is engaged with the second-speed driven gear 342 while the dog ring 33b is engaged with the third-speed driven gear 343.

When the shift forks 53a to 53d are in the third-speed gear stage position, the shift fork 53d is in the position "3", and the dog ring 33b is engaged with the third-speed driven gear 343.

When the shift forks 53a to 53d move from the third-speed gear stage position to the fourth-speed gear stage position, the shift fork 53a moves from "N" to "4", to bring the dog ring 33a into engagement with the fourth-speed driven gear 344. In addition, the shift fork 53d moves from "3" to "N", to cancel the engagement between the dog ring 33b and the third-speed driven gear 343. As shown in FIG. 35B, in a case of shifting gears from the third speed to the fourth speed, a period occurs in which the dog ring 33b is engaged with the third-speed driven gear 343 while the dog ring 33a is engaged with the fourth-speed driven gear 344.

When the shift forks 53a to 53d are in the fourth-speed gear stage position, the shift fork 53a is in the position "4", and the dog ring 33a is engaged with the fourth-speed driven gear 344.

When the shift forks 53a to 53d move from the fourth-speed gear stage position to the fifth-speed gear stage position, the shift fork 53c moves from "N" to "5", to bring the dog ring 23b into engagement with the fifth-speed drive gear 245. In addition, the shift fork 53a moves from "4" to "N", to cancel the engagement between the dog ring 33a and the fourth-speed driven gear 344. As shown in FIG. 35B, in a case of shifting gears from the fourth speed to the fifth speed, a period occurs in which the dog ring 33a is engaged with the fourth-speed driven gear 344 while the dog ring 23b is engaged with the fifth-speed drive gear 245.

When the shift forks 53a to 53d are in the fifth-speed gear stage position, the shift fork 53c is in the position "5", and the dog ring 23b is engaged with the fifth-speed drive gear 245.

When the shift forks 53a to 53d move from the fifth-speed gear stage position to the sixth-speed gear stage position, the shift fork 53b moves from "N" to "6", to bring the dog ring 23a into engagement with the sixth-speed drive gear 246. In addition, the shift fork 53c moves from "5" to "N", to cancel the engagement between the dog ring 23b and the fifth-speed drive gear 245. As shown in FIG. 35B, in a case of shifting gears from the fifth speed to the sixth speed, a period occurs in which the dog ring 23b is engaged with the fifth-speed drive gear 245 while the dog ring 23a is engaged with the sixth-speed drive gear 246.

When the shift forks 53a to 53d are in the sixth-speed gear stage position, the shift fork 53b is in the position "6", and the dog ring 23a is engaged with the sixth-speed drive gear 246.

This way, the dog engagement mechanism 70 is configured to sequentially set a gear stage for which power transmission is to be activated in each of the odd-numbered stages and the even-numbered stages by the shapes of the cam grooves 52a to 52d formed in the shift cam 50 and the phase angle of the shift cam 50.

As shown in FIG. 31A to FIG. 31C and FIG. 35A to FIG. 35C, both the operation of the dog engagement mechanism 70 and the raising or lowering of each pawl 35a to 35d in the ratchet mechanism 400 are mechanically controlled by a mechanical element, namely, the shift cam 50 and the control cam shaft 40.

In the dog engagement mechanism 70, as described above, while the shift forks 53a to 53d are moving from an original gear stage position from which the speed is to be changed to a target gear stage position to which the speed is to be changed, a period occurs having both dog engagement with the drive gear or the driven gear corresponding to the original gear stage from which the speed is to be changed and dog engagement with the drive gear or the driven gear corresponding to the target gear stage to which the speed is to be changed. In this period, relative rotation of two gear stages including one odd-numbered stage and one even-numbered stage is restricted. That is, when shifting gears, the dog engagement mechanism 70 simultaneously restricts relative rotation of at most two gear stages including one odd-numbered stage and one even-numbered stage <<Operations of Dog Engagement Mechanism and Ratchet Mechanism>>

Next, operations of the dog engagement mechanism 70 and the ratchet mechanism 400 will be described with reference to FIG. 36A to FIG. 49H. To be specific, operations of the dog engagement mechanism 70 and the ratchet mechanism 400 in a process of shifting down from the third speed to the second speed in the power-off state after shifting up from the second speed to the third speed in the power-on state will be described. FIG. 50A to FIG. 51B are also referred to herein.

In FIG. 36A to FIG. 49H, the drawings labeled 36A-49A are cross-sectional views of the transmission. Cross-sectional views of the transmission are also shown in FIG. 20 to FIG. 22, and reference signs of respective elements are given on FIG. 20 to FIG. 22. Herein, therefore, the reference signs are omitted. The drawings labeled 36B-49B show the star-shaped portion 130b of the index cam 130. The star-shaped portion 130b of the index cam 130 is also shown in FIG. 13A, etc., and reference signs of respective elements are given on FIG. 13A, etc. Herein, therefore, the reference signs are omitted.

The drawings labeled 36C-49C through 36F to 49F are cross-sectional views each schematically showing the ratchet mechanism 400. The drawings labeled 36C-49C are cross-sectional views at a position including the even-numbered stage accelerating pawls 35a. The drawings labeled 36D-49D are cross-sectional views at a position including the odd-numbered stage accelerating pawls 35c. The drawings labeled 36E-49E are cross-sectional views at a position including the even-numbered stage decelerating pawls 35b. The drawings labeled 36F-49F are cross-sectional views at a position including the odd-numbered stage decelerating pawls 35d. The drawings labeled 36G-49G show the positional relationship among the cam grooves 42, 42a to 42d, the guide holes 44, 44a to 44d, and the engagement pins 46, 46a to 46b. The drawings labeled 36H-49H show the positional relationship between the cam grooves 52a to 52d and the shift forks 53a to 53d.

In FIG. 36A to FIG. 49H, drawings labeled the same number show the cross sections obtained at the same moment. In FIG. 36A to FIG. 49H, each of the process of shifting from the second speed to the third speed and the process of shifting from the third speed to the second speed is divided into seven steps of step 0 to step 6.

At step 0 in the process of shifting from the second speed to the third speed in the power-on state, the phase of the index cam 130 is held at "2" by the ball 140, as shown in FIG. 36B. At this time, as shown in FIG. 36G, the engagement pins 46a to 46d are in the even-numbered stage position ESP of the respective cam grooves 42a to 42d with respect to the circumferential direction (in the drawing, the vertical direction). The engagement pins 46a, 46b are in the pawl-raising position En and the engagement pins 46c, 46d are in the pawl-lowering position Re with respect to the axial direction (in the drawing, the horizontal direction). Thus, the even-numbered stage accelerating pawls 35a and the even-numbered stage decelerating pawls 35b are raised as shown in FIG. 36C and FIG. 36E. The odd-numbered stage accelerating pawls 35c and the odd-numbered stage decelerating pawls 35d are lowered as shown in FIG. 36D and FIG. 36F.

Figure 36H:
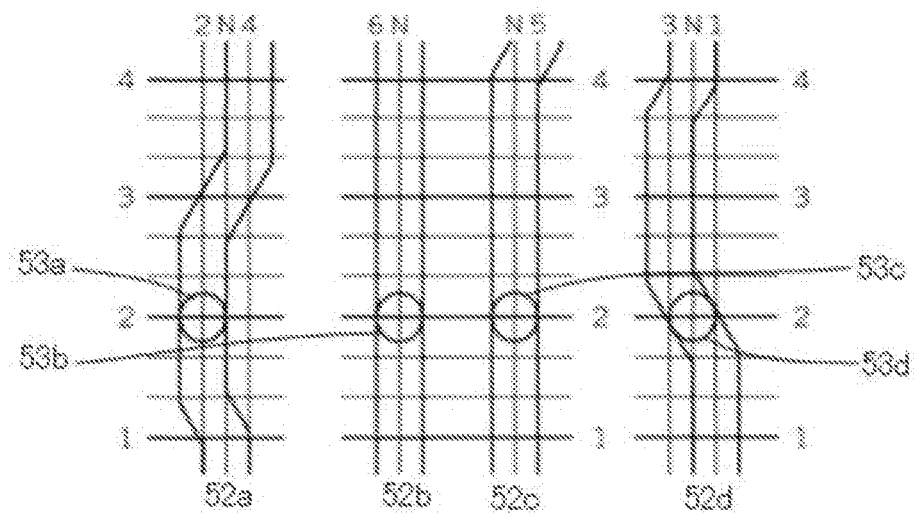
Figure 37A:
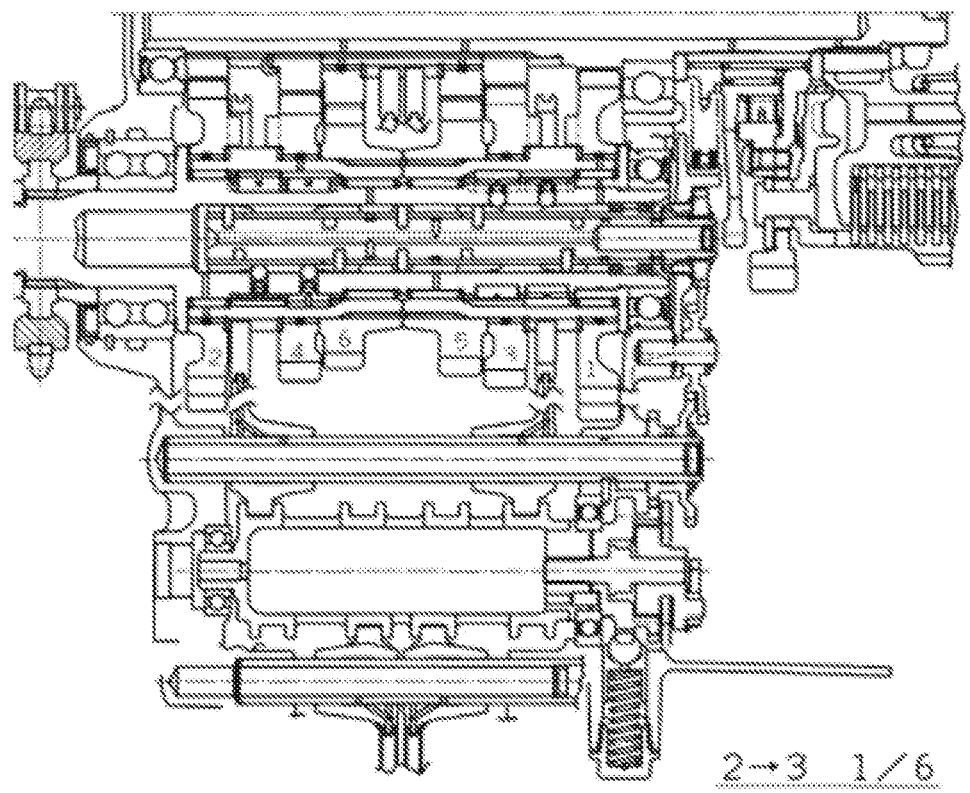
Figure 37G:
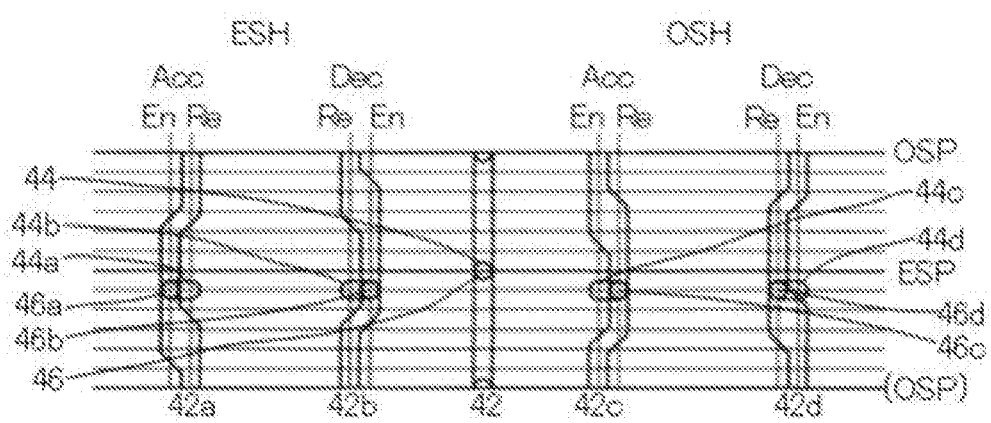
Figure 37H:
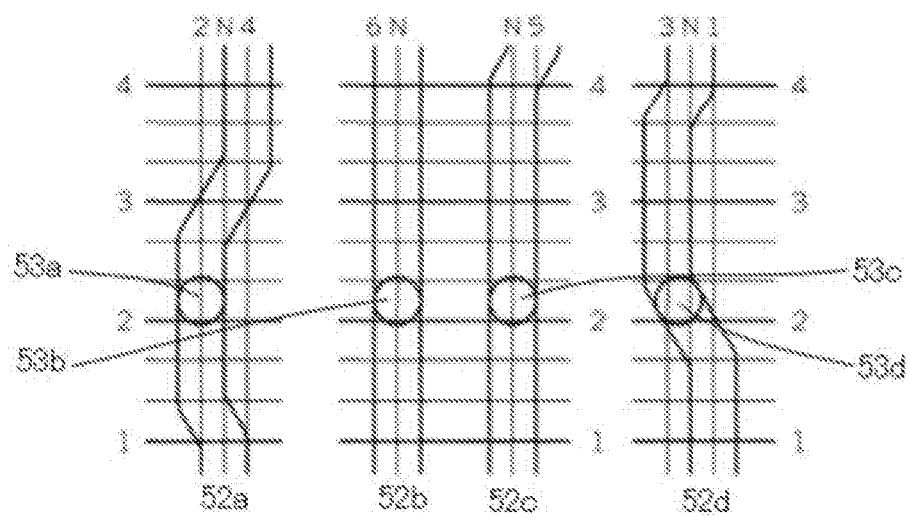
Figure 38A:
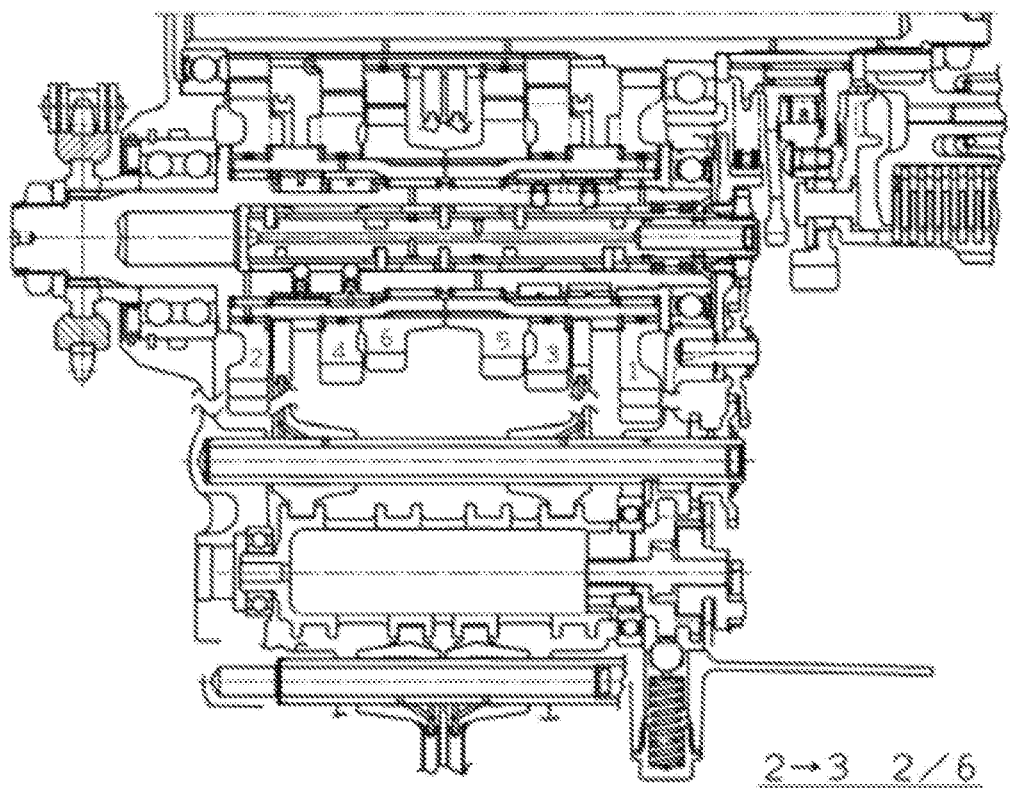
Figure 38G:
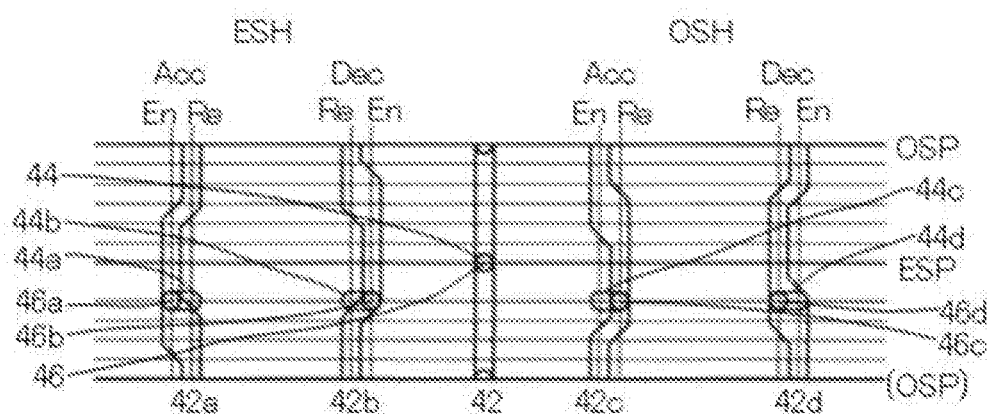
Figure 38H:
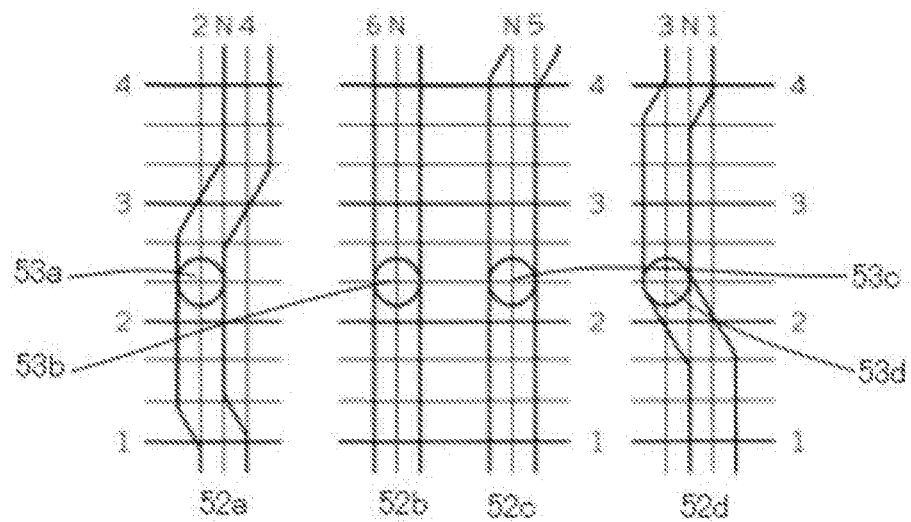
Figure 39A:
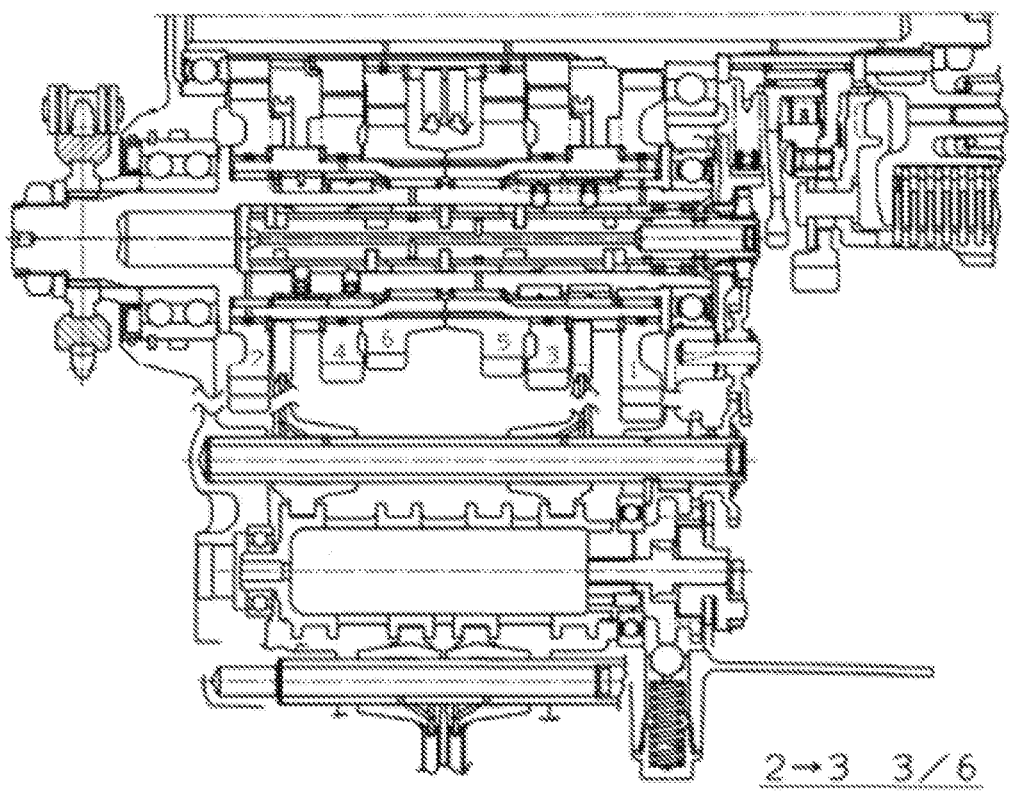
FIGS. 39A-39H are explanatory diagrams showing the transmission mechanism at step 3 in the process of shifting from the second speed to the third speed.
Figures 39B, 39C, 39D, 39E, 39F:
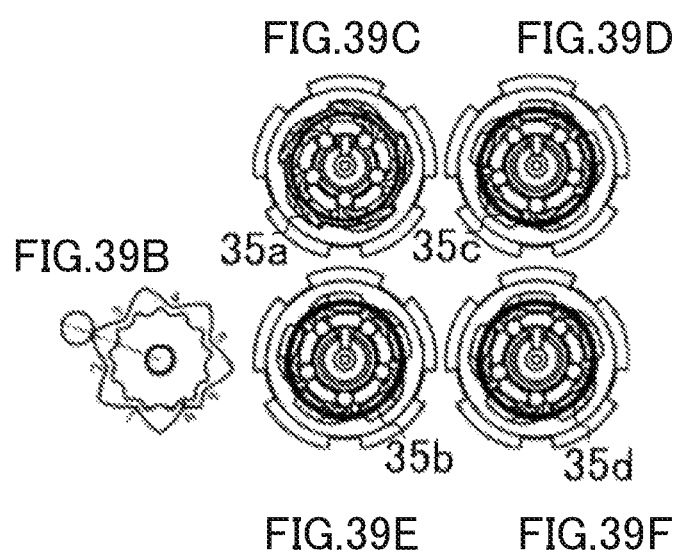
Figure 39G:
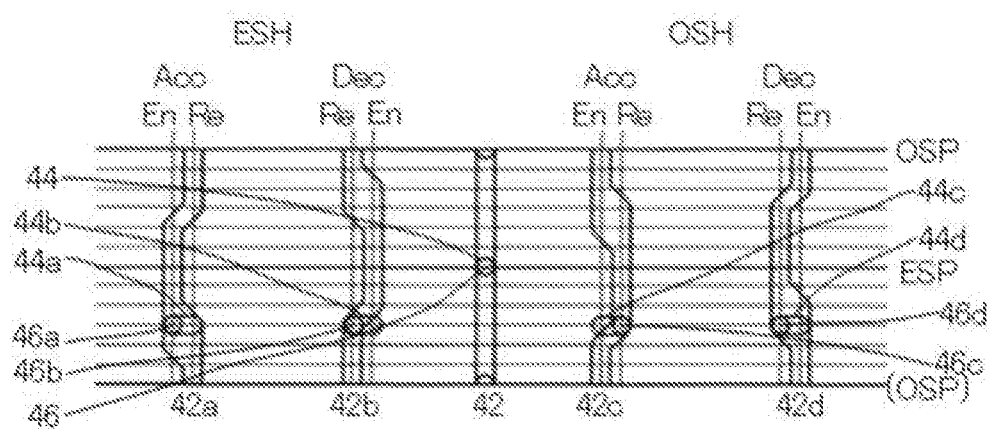
Figure 39H:
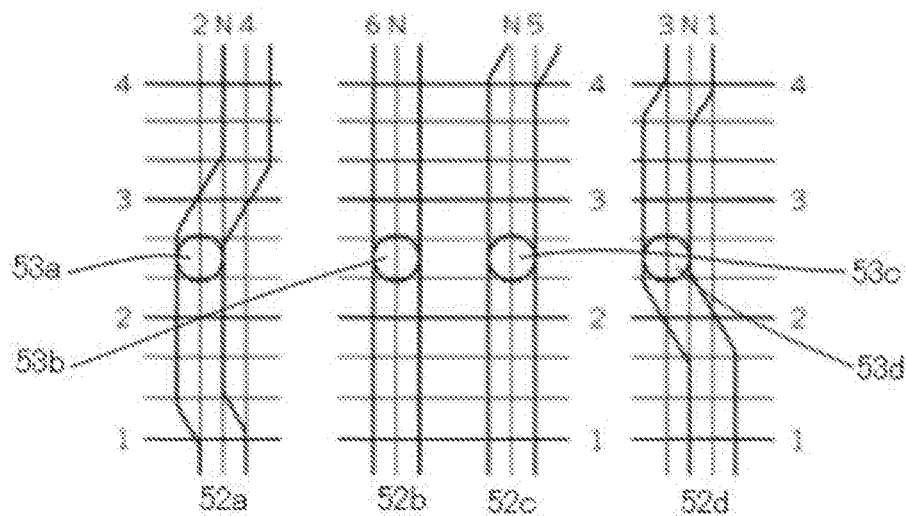
Figure 40A:
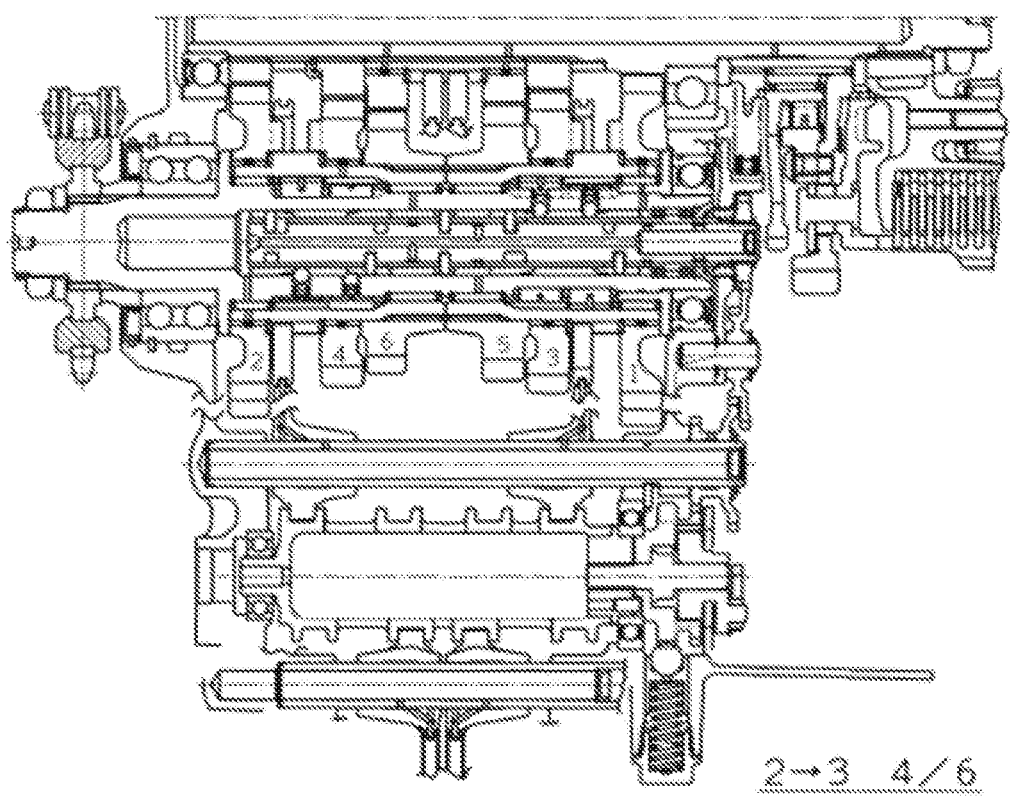
Figure 40G:
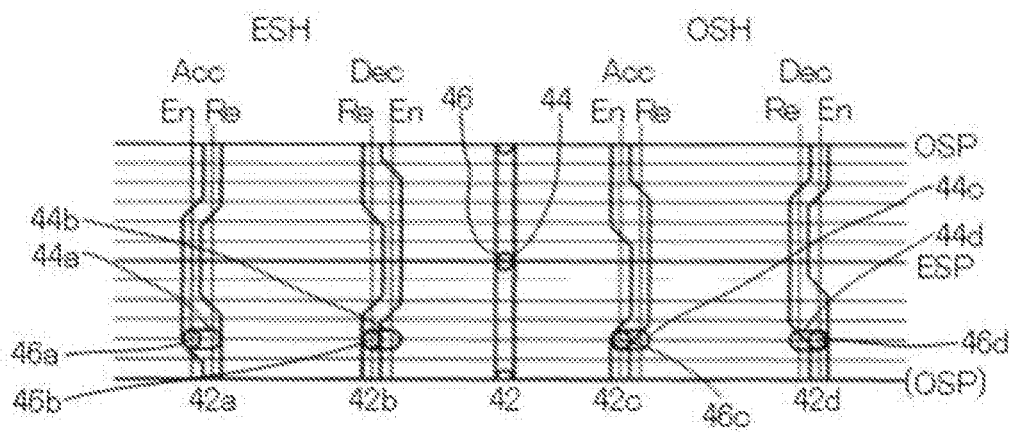
Figure 40H:
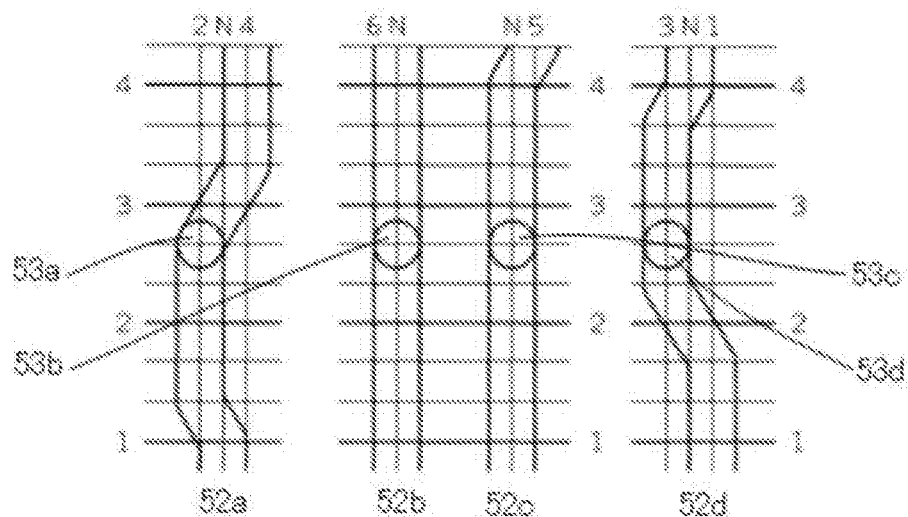
Figure 41A:
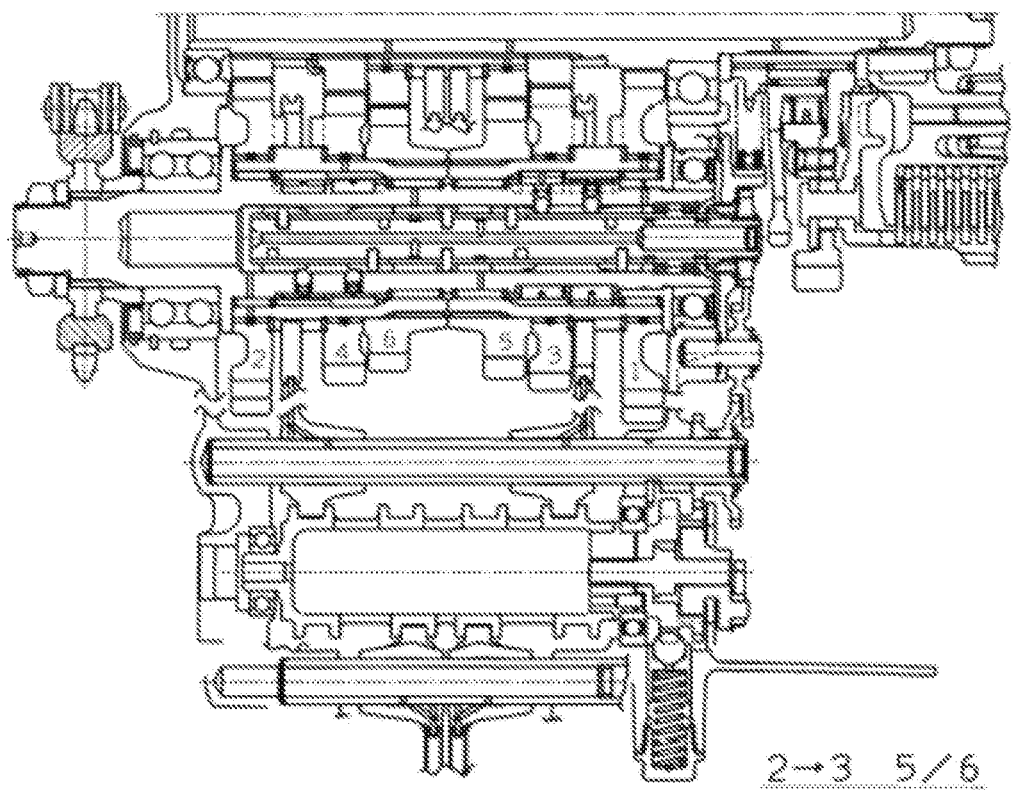
Figure 41G:
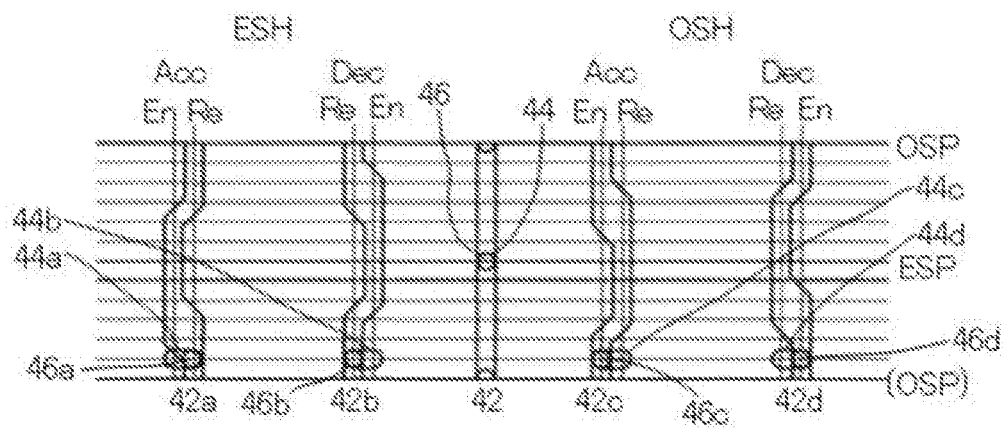
Figure 41H:
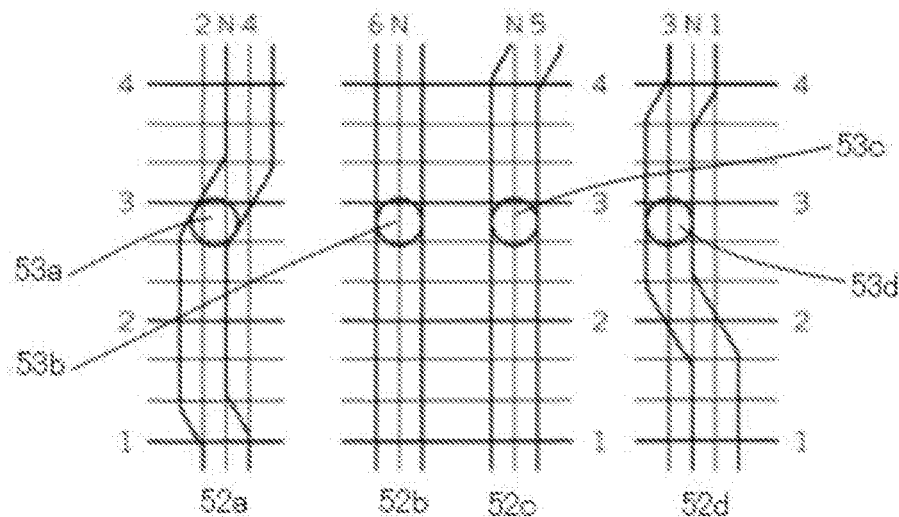

As shown in FIG. 36H, the shift forks 53a to 53d are in the position "2" in the cam grooves 52a to 52d with respect to the circumferential direction (in the drawing, the vertical direction). The shift fork 53a is in the position "2" and the shift forks 53b to 53d are in the position "N" with respect to the axial direction (in the drawing, the horizontal direction). Thus, as shown in FIG. 36A, the shift fork 53a brings the dog ring 33a into mesh with the dog of the second-speed driven gear 342. On the other hand, the shift forks 53b to 53d do not bring the dog rings 23a, 23b, 33b into mesh with a dog of any gear.

At step 0 in the process of shifting from the second speed to the third speed in the power-on state, a rotational force inputted to the input shaft 20 is transmitted to the even-numbered stage hub 32a via the second-speed drive gear 242 and the second-speed driven gear 342 meshed with the dog ring 33a. The even-numbered stage hub 32a is engaged with the raised, even-numbered stage accelerating pawls 35a which are provided in the output shaft 30. Accordingly, the rotational force (torque) transmitted to the even-numbered stage hub 32a is transmitted to the output shaft 30.

In the course of proceeding from step 0 to step 6 through steps 1-5 in the process of shifting from the second speed to the third speed in the power-on state, the phase of the index cam 130 shifts from "2" to "3", as shown in FIG. 37B, FIG. 38B, FIG. 39B, FIG. 40B, FIG. 41B, and FIG. 42B. At this time, the engagement pins 46a to 46d move from the even-numbered stage position ESP to the odd-numbered stage position OSP in the cam grooves 42a to 42d with respect to the circumferential direction, as shown in FIG. 37G, FIG. 38G FIG. 39G, FIG. 40G, FIG. 41G, and FIG. 42G. In this moving process, in steps 0 to 2, the engagement pins 46a to 46d maintain their step-0 states described above. In steps 2 to 3, the engagement pin 46b moves from the pawl-raising position En to the pawl-lowering position Re. In steps 3 to 4, the engagement pin 46c moves from the pawl-lowering position Re to the pawl-raising position En, and the engagement pin 46d moves from the pawl-lowering position Re to the pawl-raising position En. In steps 4 to 5, the engagement pin 46a moves from the pawl-raising position En to the pawl-lowering position Re.

The shift forks 53a to 53d move from "2" to "3" in the cam grooves 52a to 52d with respect to the circumferential direction, as shown in FIG. 37H, FIG. 38H, FIG. 39H, FIG. 40H, FIG. 41H, and FIG. 42H. In this moving process, in steps 0 to 2, the shift fork 53d moves from "N" to "3" with respect to the axial direction. In steps 4 to 6, the shift fork 53a moves from "2" to "N" with respect to the axial direction. The shift forks 53b, 53c are held at "N".

Figure 50A:
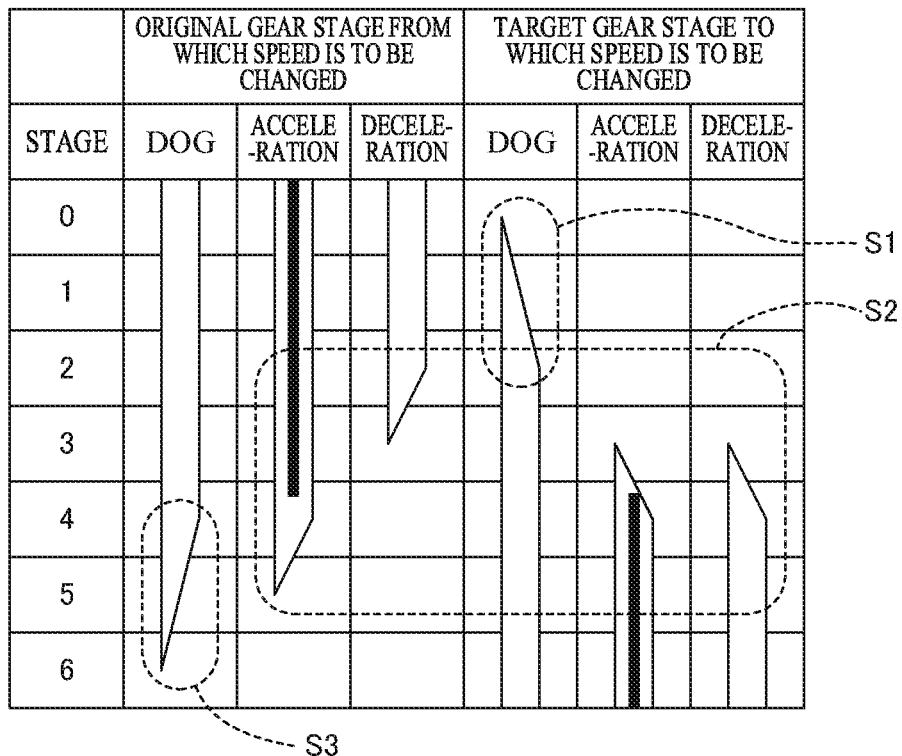
FIG. 50AA is a timing chart showing operation timings of a dog engagement mechanism and the ratchet mechanism in power-on upshift; and BFIG. 50B is a timing chart showing operation timings of the dog engagement mechanism and the ratchet mechanism in power-off downshift.
Figure 51A:
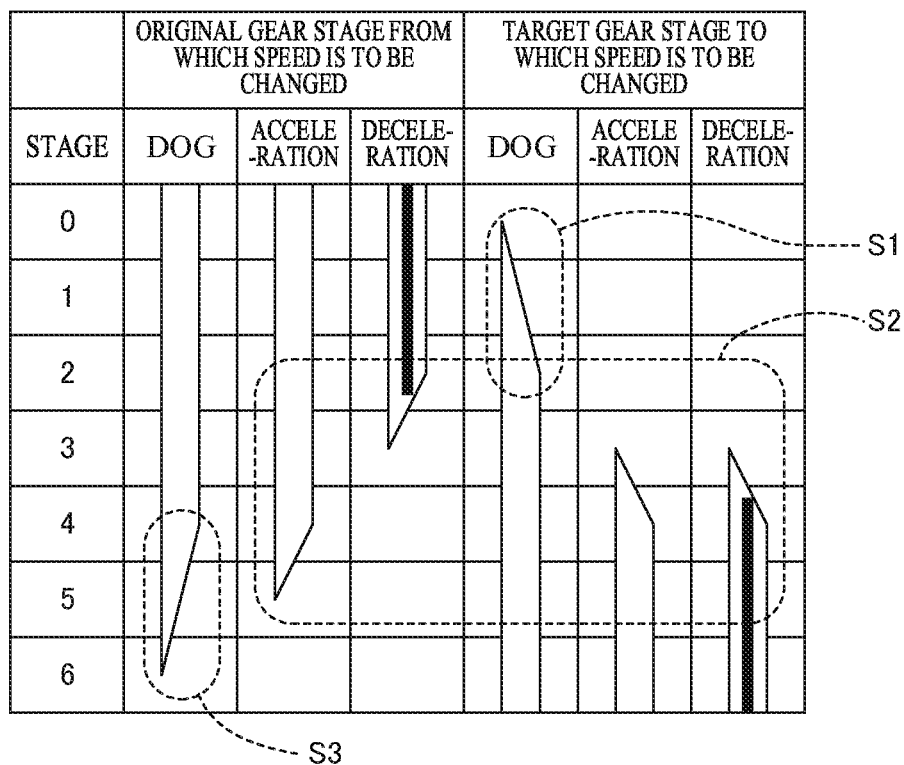
FIG. 51AA is a timing chart showing operation timings of the dog engagement mechanism and the ratchet mechanism in power-off upshift; and BFIG. 51B is a timing chart showing operation timings of the dog engagement mechanism and the ratchet mechanism in power-on downshift.

Thus, in the process of shifting up from the second speed to the third speed, firstly in steps 0 to 2, the shift fork 53d brings the dog ring 33b into mesh with the dog of the third-speed driven gear 343, as shown also in FIG. 50A and FIG. 51A. As a result, the dog corresponding to the target gear stage to which the speed is to be changed (third speed) is engaged. Then in steps 2 to 3, the even-numbered stage decelerating pawls 35b corresponding to the original gear stage from which the speed is to be changed (second speed) are lowered. Then in steps 3 to 4, the odd-numbered stage accelerating pawls 35c and the odd-numbered stage decelerating pawls 35d corresponding to the target gear stage to which the speed is to be changed (third speed) are raised. In steps 4 to 5, the even-numbered stage accelerating pawls 35a corresponding to the original gear stage from which the speed is to be changed (second speed) are lowered. In steps 4 to 6, the shift fork 53a disconnects the dog ring 33a from the dog of the second-speed driven gear 342. As a result, the engagement with the dog corresponding to the original gear stage from which the speed is to be changed (second speed) is cancelled. In this manner, the gear shifting from the second speed to the third speed is completed.

That is, as shown in FIG. 50A and FIG. 51A, in a case of shifting up from an even-numbered stage to an odd-numbered stage, firstly, the dog engagement mechanism 70 restricts relative rotation of a gear corresponding to the odd-numbered stage by dog engagement (step S1). Then, the ratchet mechanism 400 performs the ratchet operation C (step S2). Then, the dog engagement mechanism 70 cancels dog engagement that restricts relative rotation corresponding to the even-numbered stage (step S3).

Figure 43A:
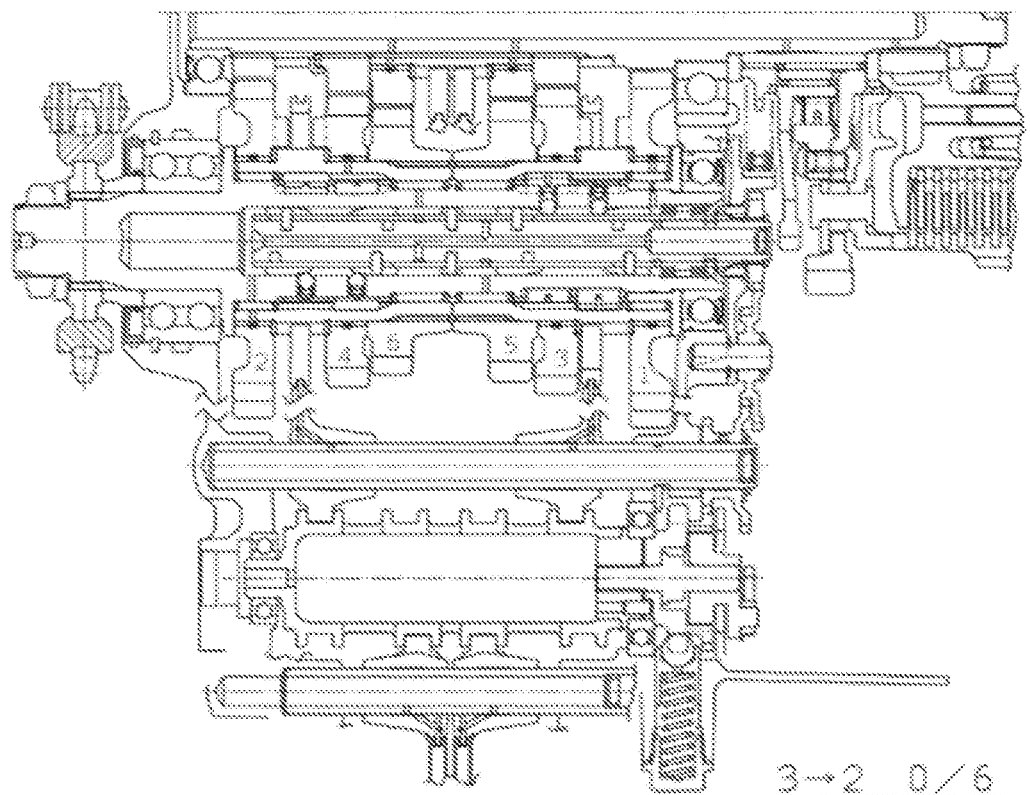
Figure 43G:
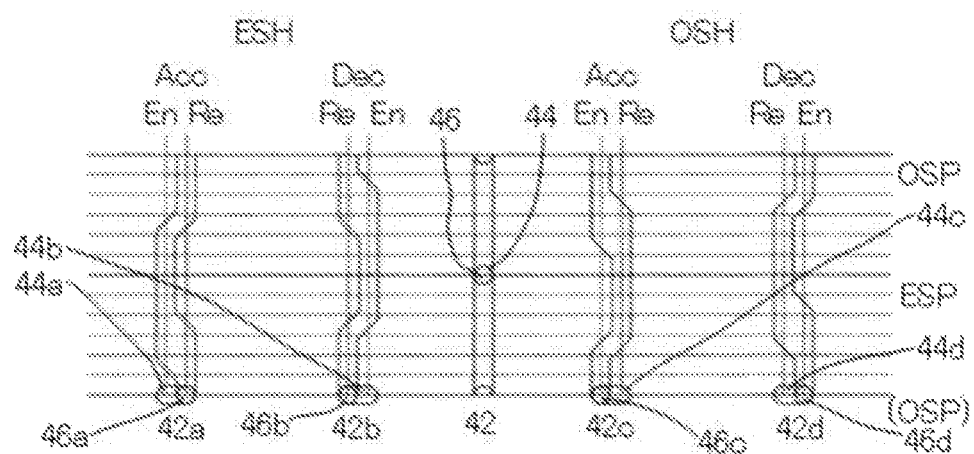

FIG. 43A to FIG. 43H show step 0 in the process of shifting from the third speed to the second speed. Here, step 0 in the process of shifting from the third speed to the second speed in the power-off state is identical to step 6 in the process of shifting from the second speed to the third speed which is shown in FIG. 42A to FIG. 42H. In this state, as shown in FIG. 43B, the phase of the index cam 130 is held at "3" by the ball 140. At this time, as shown in FIG. 43G, the engagement pins 46a to 46d are in the odd-numbered stage position OSP in the cam grooves 42a to 42d with respect to the circumferential direction (in the drawing, the vertical direction). The engagement pins 46a, 46b are in the pawl-lowering position Re and the engagement pins 46c, 46d are in the pawl-raising position En with respect to the axial direction (in the drawing, the horizontal direction).

Thus, the odd-numbered stage accelerating pawls 35c and the odd-numbered stage decelerating pawls 35d are raised as shown in FIG. 43D and FIG. 43F. The even-numbered stage accelerating pawls 35a and the even-numbered stage decelerating pawls 35b are lowered as shown in FIG. 43C and FIG. 43E.

Figure 43H:
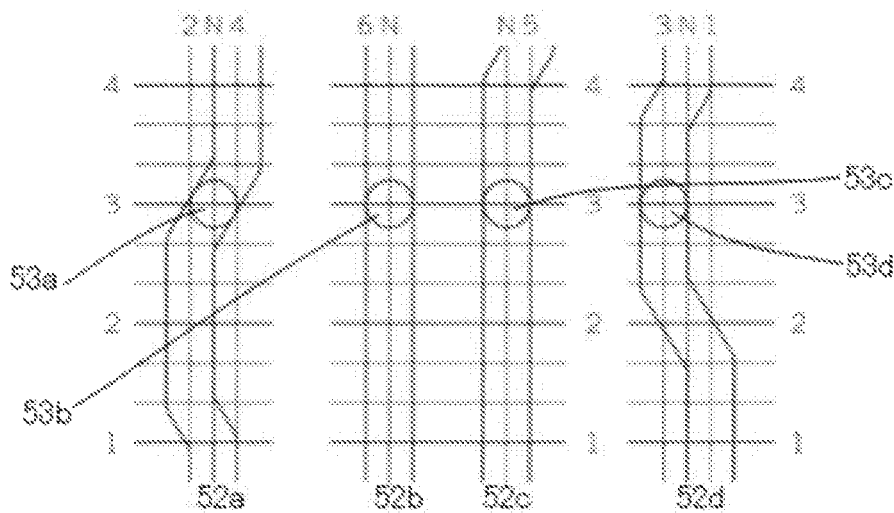
Figure 44A:
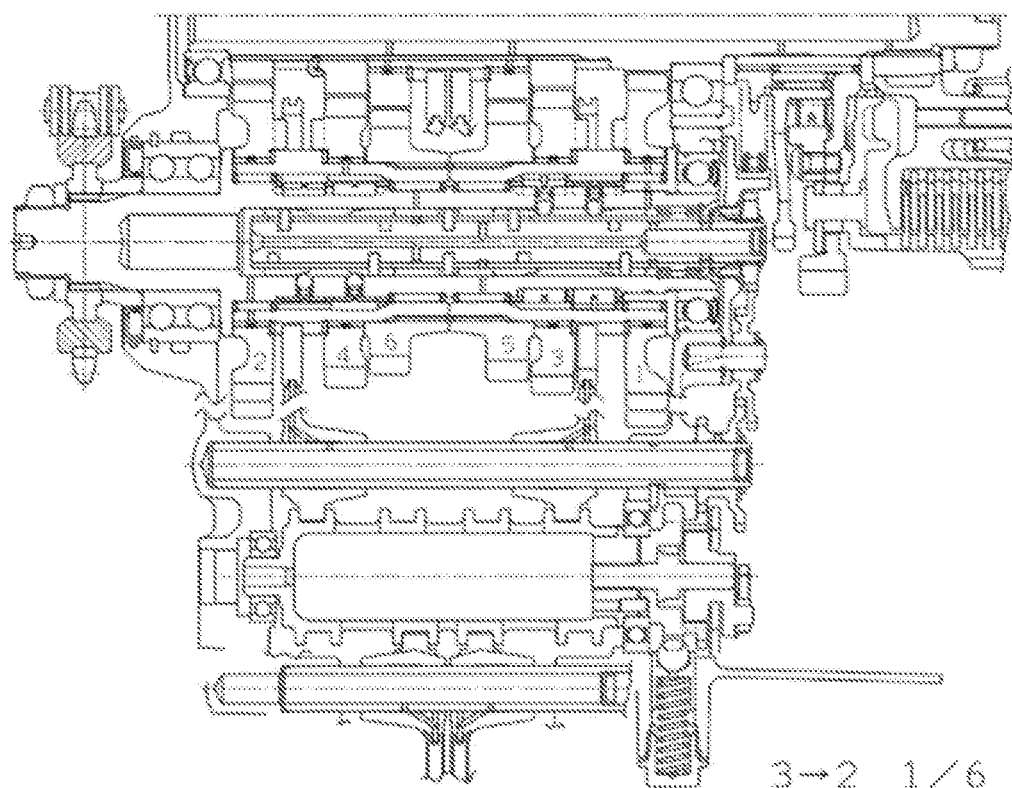
Figure 44G:
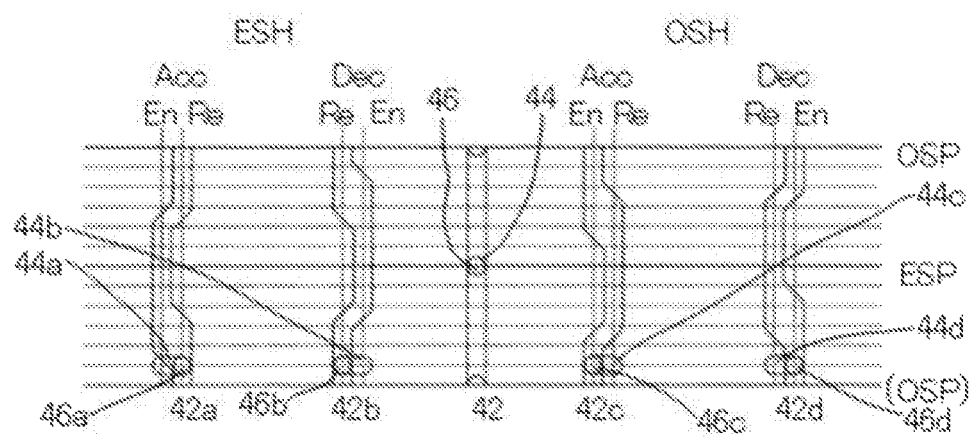
Figure 44H:
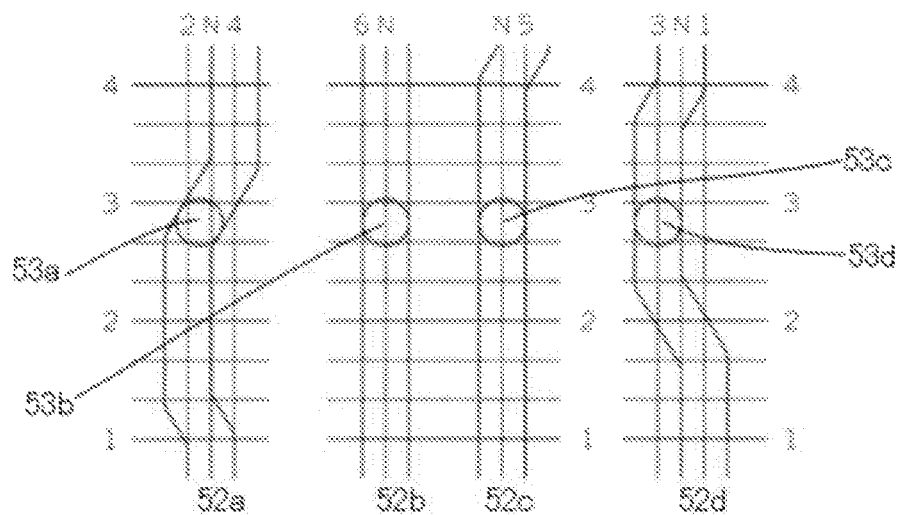
Figure 45A:
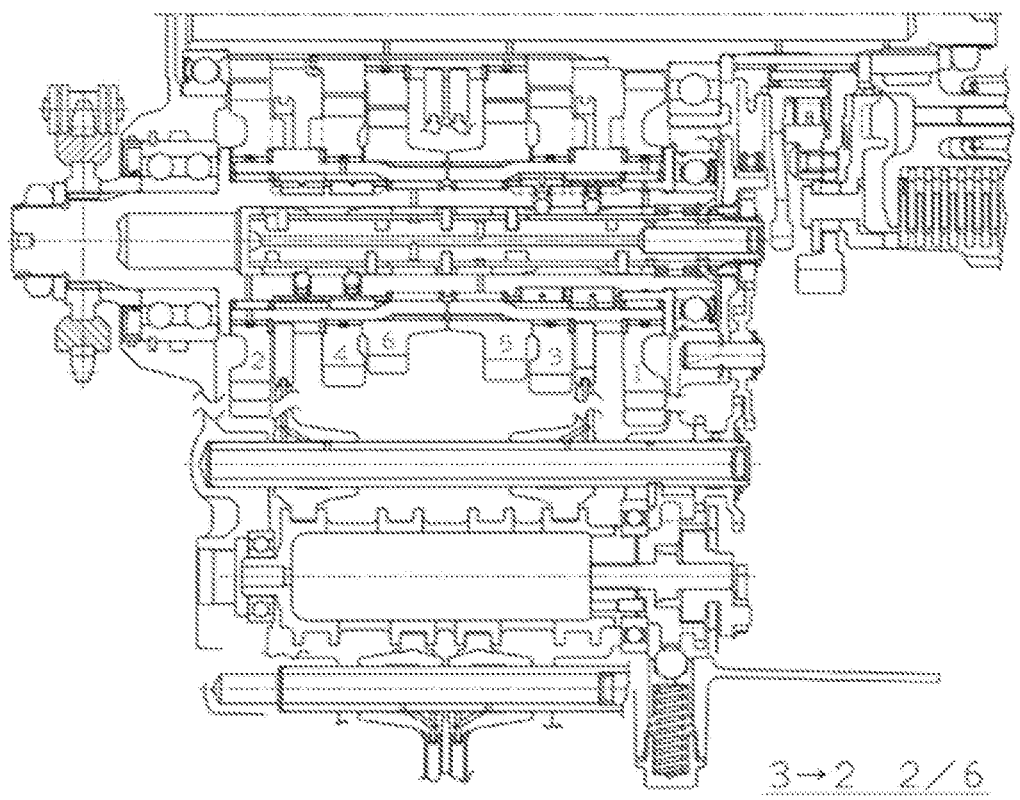
Figure 45G:
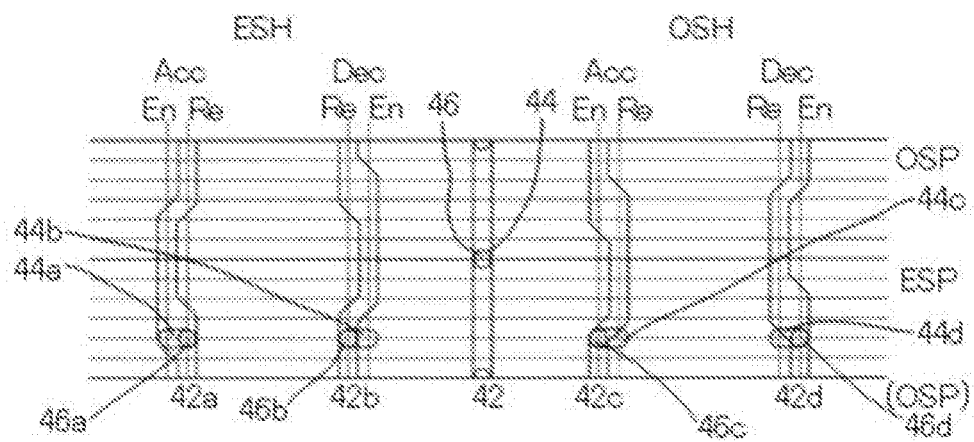
Figure 45H:
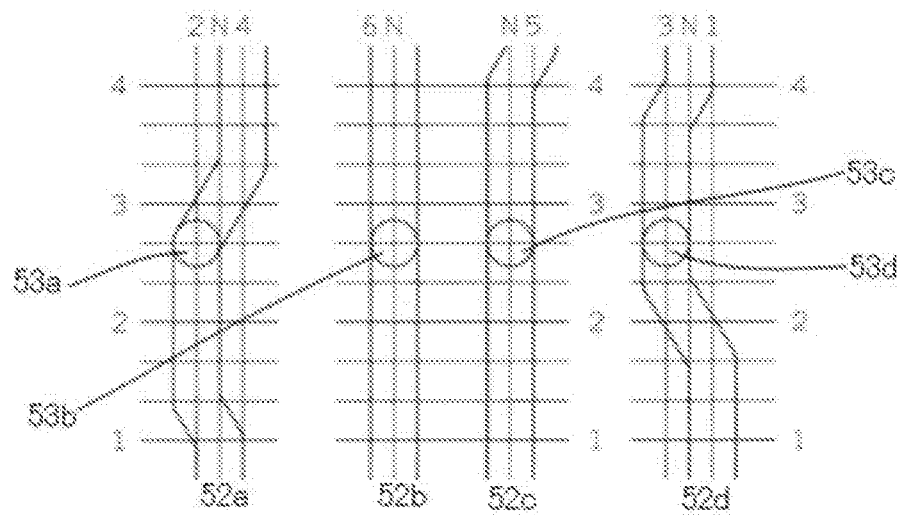
Figure 46A:
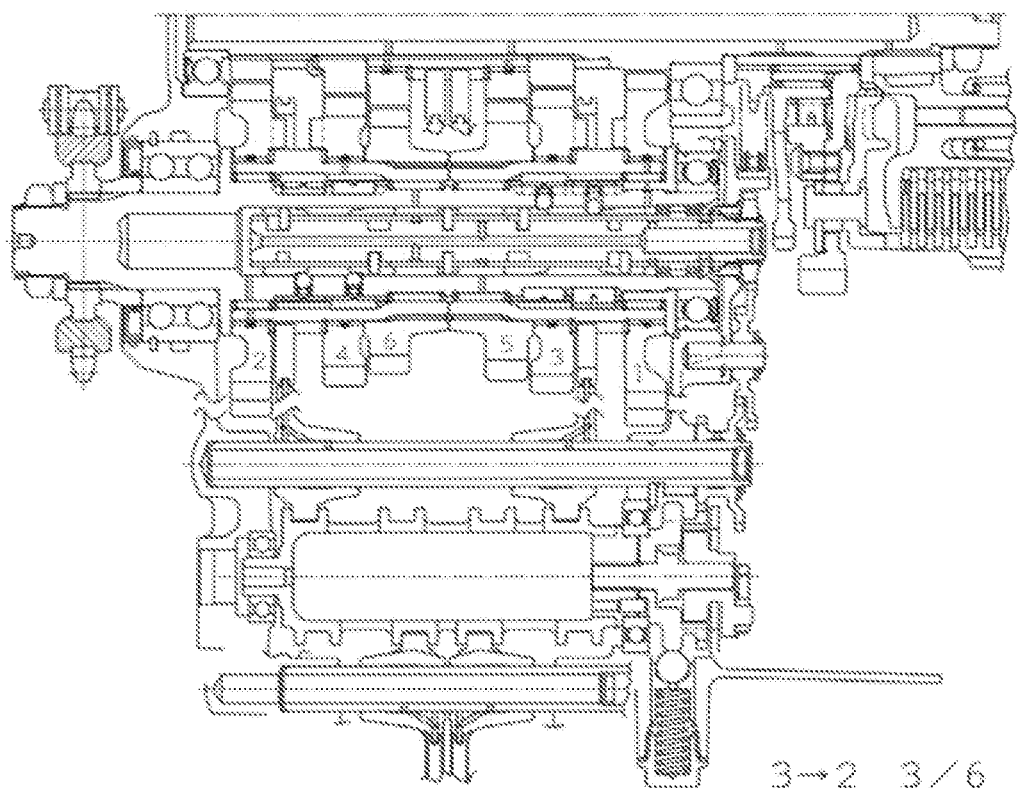
Figure 46G:
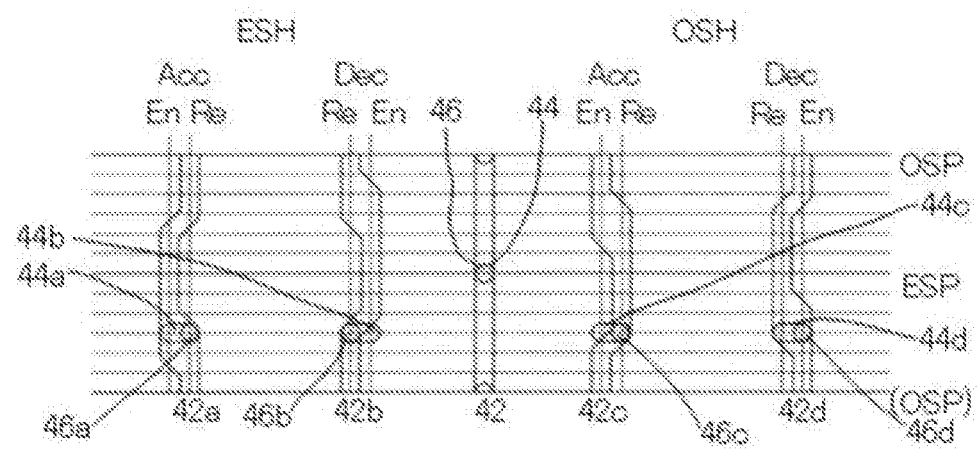
Figure 46H:
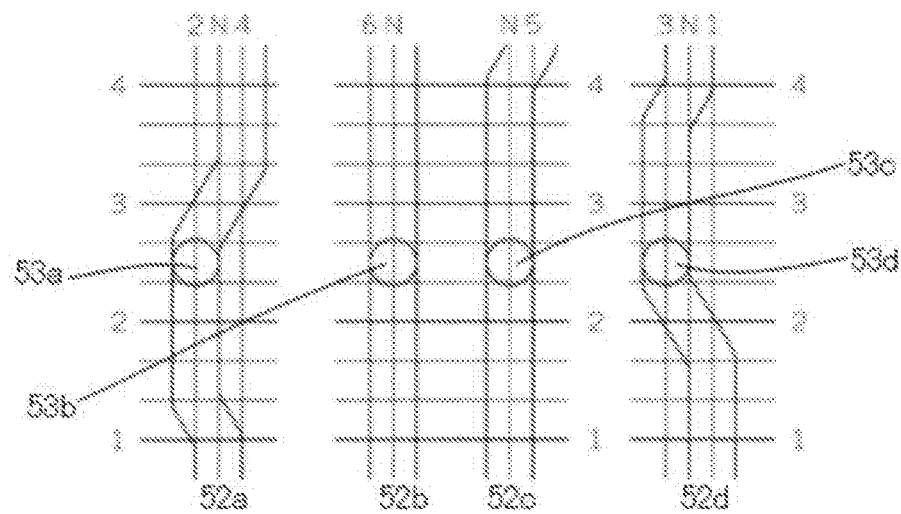
Figure 47A:
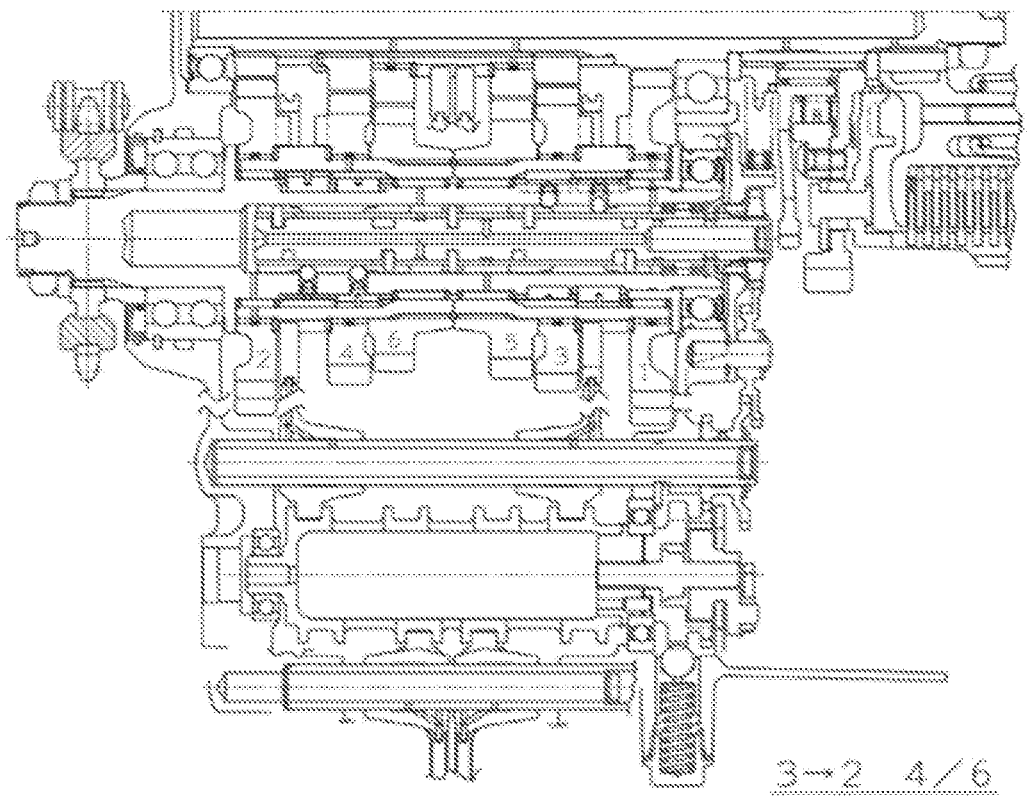
Figure 47G:
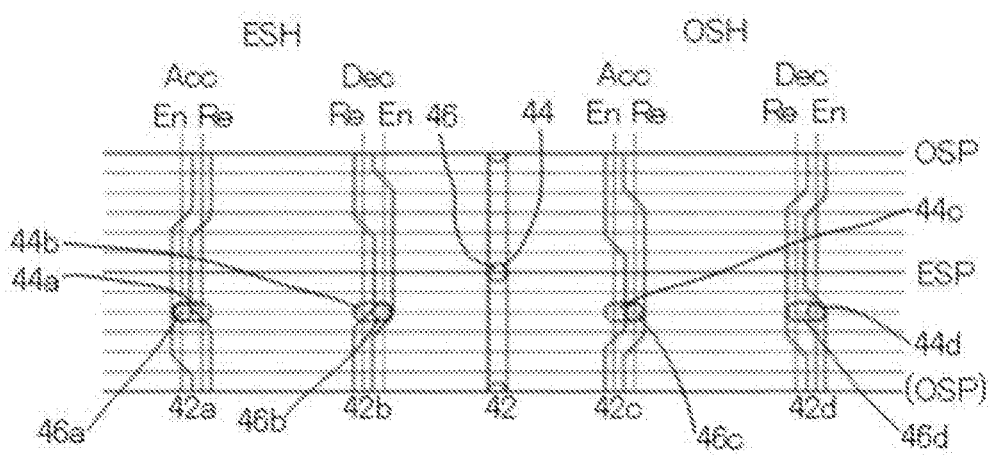
Figure 47H:
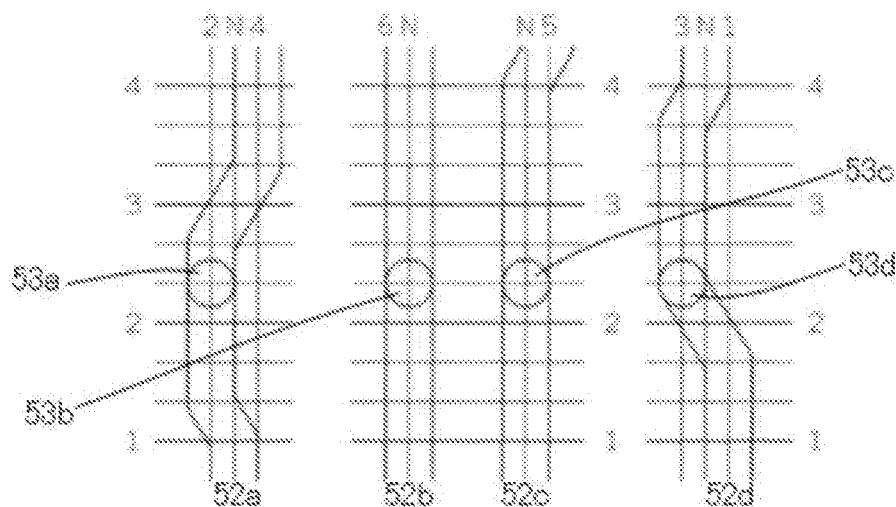
Figure 48A:
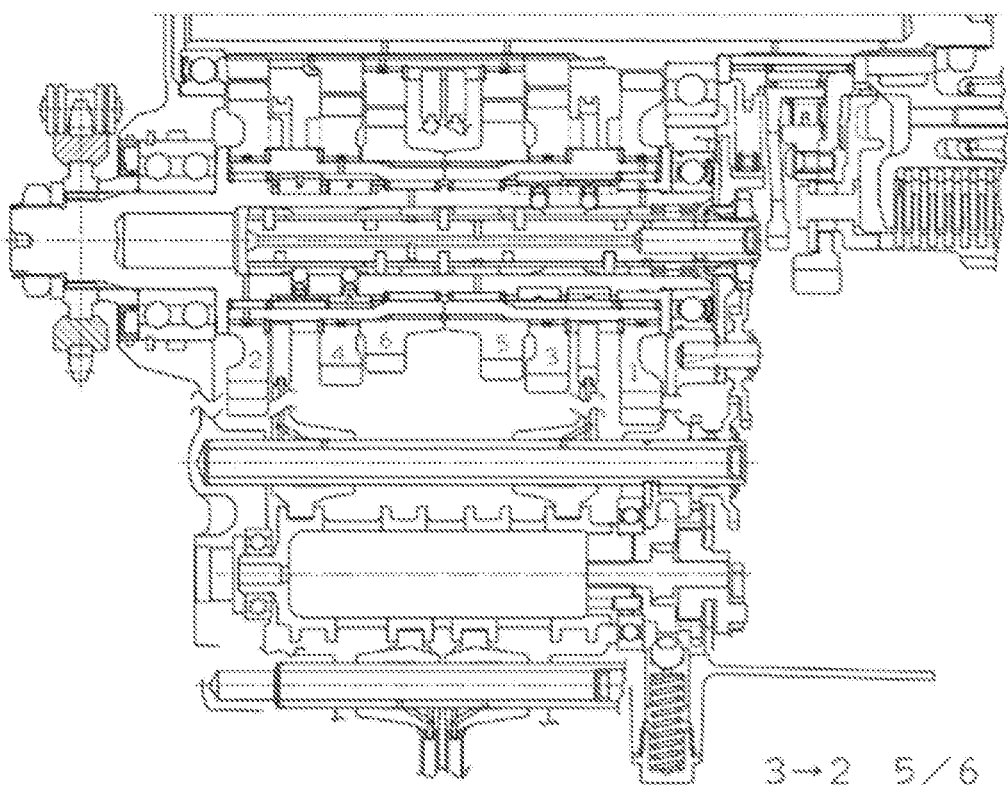
Figure 48G:
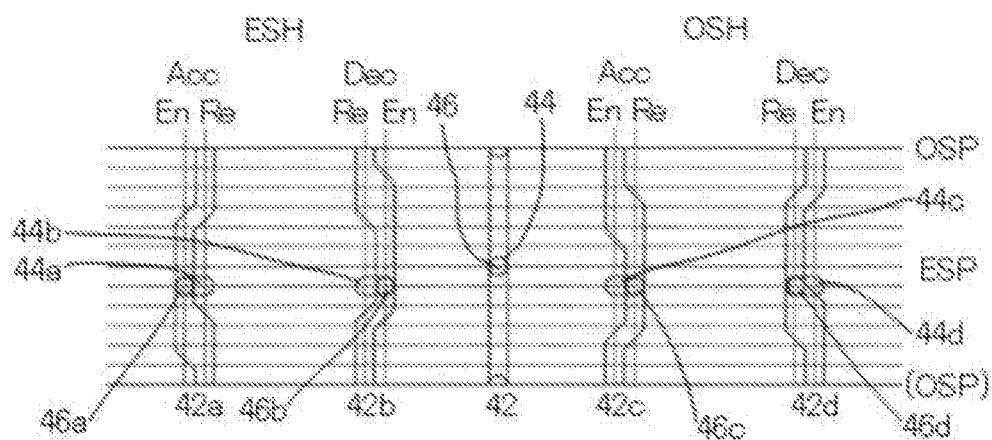
Figure 48H:
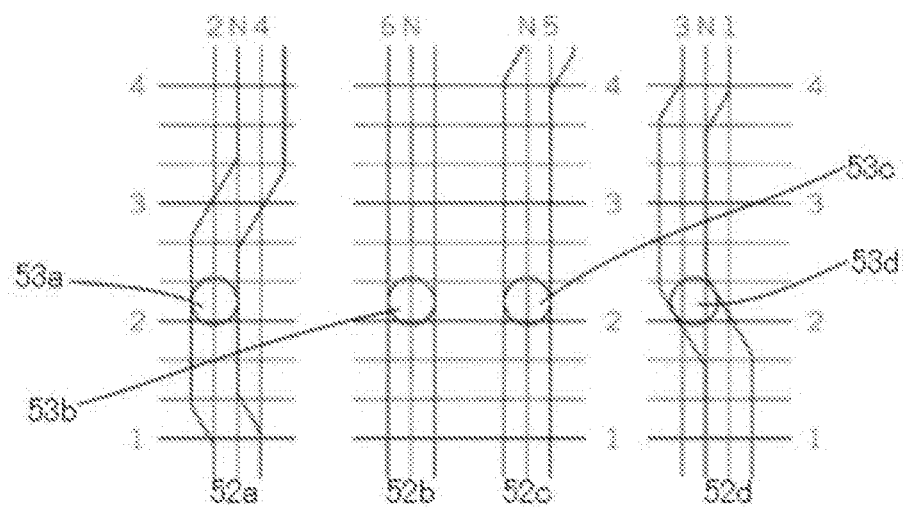

As shown in FIG. 43H, the shift forks 53a to 53d are in the position "3" in the cam grooves 52a to 52d with respect to the circumferential direction (in the drawing, the vertical direction). The shift fork 53d is in the position "3" and the shift forks 53a to 53c are in the position "N" with respect to the axial direction (in the drawing, the horizontal direction). Thus, as shown in FIG. 43A, the shift fork 53d brings the dog ring 33b into mesh with the dog of the third-speed driven gear 343. On the other hand, the shift forks 53a to 53c do not bring the dog rings 33a, 23a, 23b into mesh with a dog of any gear.

At step 0 in the process of shifting from the third speed to the second speed in the power-off state, a rotational force inputted to the input shaft 20 is transmitted to the odd-numbered stage hub 32b via the third-speed drive gear 243 and the third-speed driven gear 343 meshed with the dog ring 33b. The odd-numbered stage hub 32b is engaged with the raised, odd-numbered stage decelerating pawls 35d which are provided in the output shaft 30. Accordingly, the rotational force transmitted to the odd-numbered stage hub 32b is transmitted to the output shaft 30.

In the course of proceeding from step 0 to step 6 through steps 1-5 in the process of shifting from the third speed to the second speed in the power-off state, the phase of the index cam 130 shifts from "3" to "2", as shown in FIG. 44B, FIG. 45B, FIG. 46B, FIG. 47B, FIG. 48B, and FIG. 49B. At this time, the engagement pins 46a to 46d move from the odd-numbered stage position OSP to the even-numbered stage position ESP in the cam grooves 42a to 42d with respect to the circumferential direction, as shown in FIG. 44G, FIG. 45G, FIG. 46G, FIG. 47G, FIG. 48G, and FIG. 49G. In this moving process, in steps 0 to 2, the engagement pins 46a to 46d maintain their step-0 states described above. In steps 2 to 3, the engagement pin 46c moves from the pawl-raising position En to the pawl-lowering position Re. In steps 3 to 4, the engagement pins 46a, 46b move from the pawl-lowering position Re to the pawl-raising position En. In steps 4 to 5, the engagement pin 46d moves from the pawl-raising position En to the pawl-lowering position Re.

The shift forks 53a to 53d move from "3" to "2" in the cam grooves 52a to 52d with respect to the circumferential direction, as shown in FIG. 44H, FIG. 45H, FIG. 46H, FIG. 47H, FIG. 48H, and FIG. 49H. In this moving process, in steps 0 to 2, the shift fork 53a moves from "N" to "2" with respect to the axial direction. In steps 4 to 6, the shift fork 53*d* moves from "3" to "N" with respect to the axial direction. The shift forks 53*b*, 53*c* are held at "N".

Figure 50B:
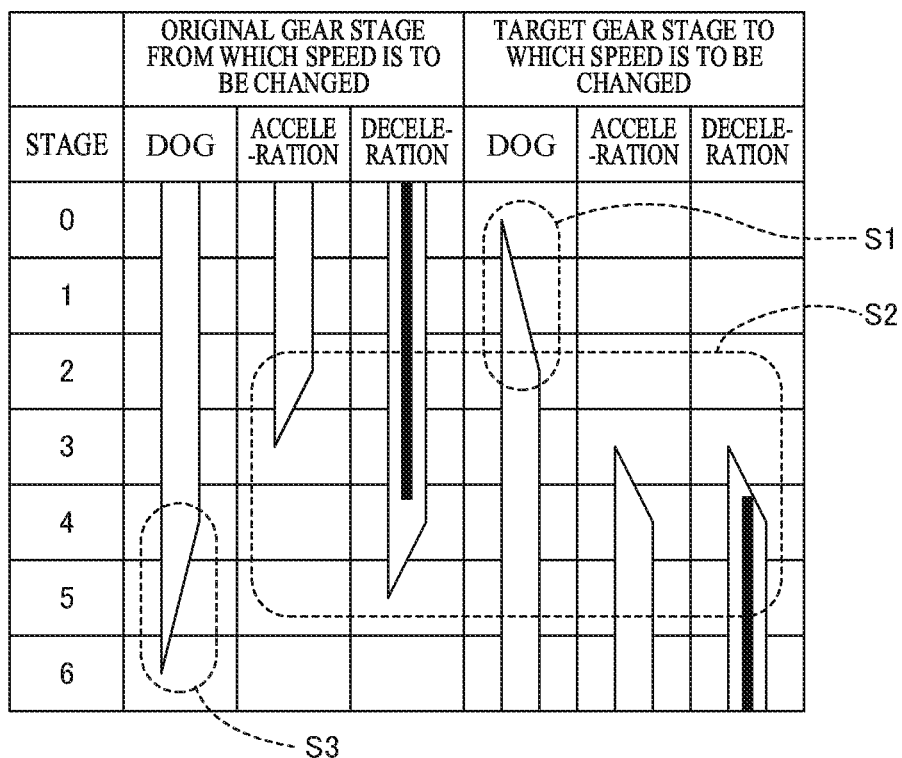
Figure 51B:
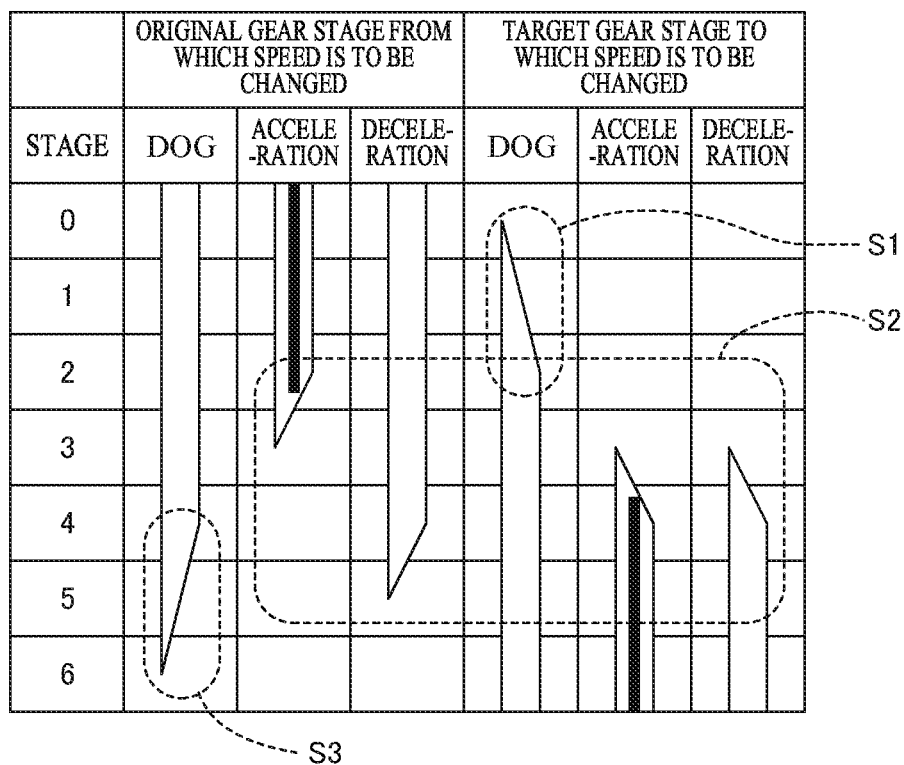

Thus, in the process of shifting down from the third speed to the second speed, firstly in steps 0 to 2, the shift fork 53*a* brings the dog ring 33*a* into mesh with the dog of the second-speed driven gear 342, as shown also in FIG. 50B and FIG. 51B. As a result, the dog corresponding to the target gear stage to which the speed is to be changed (second speed) is engaged. Then in steps 2 to 3, the odd-numbered stage accelerating pawls 35*c* corresponding to the original gear stage from which the speed is to be changed (third speed) are lowered. Then in steps 3 to 4, the even-numbered stage accelerating pawls 35*a* and the even-numbered stage decelerating pawls 35*b* corresponding to the target gear stage to which the speed is to be changed (second speed) are raised. Then in steps 4 to 5, the odd-numbered stage decelerating pawls 35*d* corresponding to the original gear stage from which the speed is to be changed (third speed) are lowered. In steps 4 to 6, the shift fork 53*d* disconnects the dog ring 33*b* from the dog of the third-speed driven gear 343. As a result, the engagement with the dog corresponding to the original gear stage from which the speed is to be changed (third speed) is cancelled. In this manner, the gear shifting from the third speed to the second speed is completed.

That is, as shown in FIG. 50B and FIG. 51B, in a case of shifting down from an odd-numbered stage to an even-numbered stage, firstly, the dog engagement mechanism 70 restricts relative rotation of a gear corresponding to the even-numbered stage by dog engagement (step S1). Then, the ratchet mechanism 400 performs the ratchet operation B (step S2). Then, the dog engagement mechanism 70 cancels dog engagement that restricts relative rotation corresponding to the odd-numbered stage (step S3).

While the above example illustrates the shifting-up from the second speed to the third speed and the shifting-down from the third speed to the second speed, shifting-up and shifting down to and from the other gear stages are performed in the same manner by the corresponding mechanisms and members. In a case of shifting up from an odd-numbered stage to an even-numbered stage, firstly, the dog engagement mechanism 70 restricts relative rotation of a gear corresponding to the odd-numbered stage by dog engagement; then, the ratchet mechanism 400 performs the ratchet operation A; and then, the dog engagement mechanism 70 cancels dog engagement that restricts relative rotation corresponding to the odd-numbered stage. In a case of shifting down from an even-numbered stage to an odd-numbered stage, firstly, the dog engagement mechanism 70 restricts relative rotation of a gear corresponding to the even-numbered stage by dog engagement; then, the ratchet mechanism 400 performs the ratchet operation D; and then, the dog engagement mechanism 70 cancels dog engagement that restricts relative rotation corresponding to the odd-numbered stage.

In the transmission 13, as shown in FIG. 50A, FIG. 50B, FIG. 51A, and FIG. 51B, the ratchet mechanism 400 and the dog engagement mechanism 70 operate so as to sequentially perform: restriction of relative rotation of a gear corresponding to a target gear stage to which the speed is to be changed by dog engagement (step S1); any one of the ratchet operations A to D (step S2); and cancellation of dog engagement that restricts relative rotation corresponding to an original gear stage from which the speed is to be changed (step S3). Since the operation sequence is standardized, it is possible to change a gear shifting pattern in a case of shifting up and a gear shifting pattern in a case of shifting down. Since the operation sequence of the dog engagement mechanism 70 and the ratchet mechanism 400 is standardized, the transmission 13 can cover all gear shifting patterns while suppressing structural complexity. In FIG. 50A, FIG. 50B, FIG. 51A, and FIG. 51B, the thick lines indicate pawls that are allowing power transmission. As shown in FIG. 50A and FIG. 50B, the power-on upshift and the power-off downshift are performed seamlessly. As shown in FIG. 51A, the power-off upshift is performed in the same sequence as the sequence of the power-on upshift shown in FIG. 50A. As shown in FIG. 51B, the power-on downshift is performed in the same sequence as the sequence of the power-off downshift shown in FIG. 50B.

In this embodiment, step S3 is started before step S2 is completed. This example also falls into the case where the operation is performed in the sequence of step S2 to step S3. As for steps S1 to S3, therefore, step S2 may be started before step S1 is completed, and step S3 may be started before step S2 is completed. The ratchet operations A to D performed in step S2 include an operation for raising accelerating pawls and decelerating pawls corresponding to a target gear stage to which the speed is to be changed. After this operation, the operation of the dog engagement mechanism 70 corresponding to step S1 is completed. Before this operation, the operation of the dog engagement mechanism 70 corresponding to step S3 is started.

<Power Transmission in Entire Transmission>

Next, a configuration and operations of the entire transmission 13 will be described with reference to FIG. 52 to FIG. 58.

Figure 52:
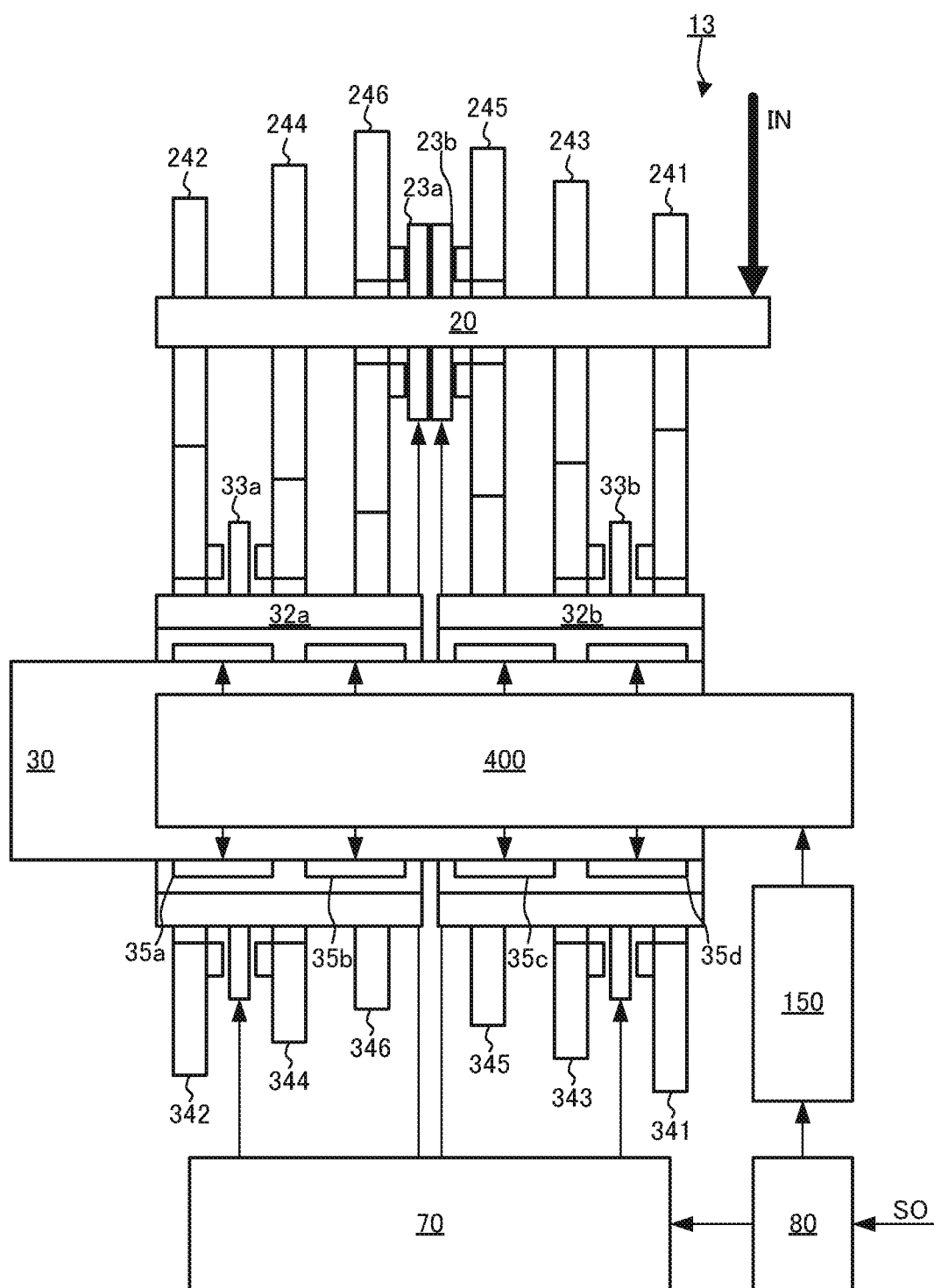
FIG. 52 is an explanatory diagram showing outline of power transmission in the transmission when a neutral position is selected.

As shown in FIG. 52, the transmission 13 includes the input shaft 20, the plurality of drive gears 241 to 246, the output shaft 30, the odd-numbered stage hub 32*b*, the even-numbered stage hub 32*a*, the plurality of odd-numbered stage driven gears 341, 343, 345, the plurality of even-numbered stage driven gears 342, 344, 346, the dog engagement mechanism 70, and the ratchet mechanism 400. The transmission 13 of this embodiment further includes the shift mechanism 80 and the synchronization mechanism 150.

Upon input of a shift operation SO to the transmission 13, the shift operation SO is transmitted to the dog engagement mechanism 70. Thus, the dog engagement mechanism 70 moves the dog rings 23*a*, 23*b*, 33*a*, 33*b*. The dog engagement mechanism 70 activates the power transmission active from the input shaft 20 to the hub 32*a* or 32*b* via a drive gear and a driven gear corresponding to any one gear stage. The ratchet mechanism 400 activates the power transmission active from the hub 32*a* or 32*b* to the output shaft 30.

The synchronization mechanism 150 transmits the shift operation SO inputted to the shift mechanism 80 to the ratchet mechanism 400. The pawls 35*a* to 35*d* included in the ratchet mechanism 400 are raised or lowered accordingly. The synchronization mechanism 150 causes the ratchet mechanism 400 and the dog engagement mechanism 70 to operate in coordination with each other such that a gear shifting is implemented in accordance with the inputted shift operation SO.

<Neutral>

FIG. 52 shows power transmission in the transmission 13 when the neutral position is selected.

The input shaft 20 and the first-speed drive gear 241 rotate together, but relative rotation between the first-speed driven gear 341 and the hub 32*b* is not restricted. Therefore, rotation of the input shaft 20 is not transmitted to the hub 32*b*. The input shaft 20 and the second-speed drive gear 242 rotate together, but relative rotation between the second-speed driven gear 342 and the hub 32a is not restricted. Therefore, rotation of the input shaft 20 is not transmitted to the hub 32a. The input shaft 20 and the third-speed drive gear 243 rotate together, but relative rotation between the third-speed driven gear 343 and the hub 32b is not restricted. Therefore, rotation of the input shaft 20 is not transmitted to the hub 32b. The input shaft 20 and the fourth-speed drive gear 244 rotate together, but relative rotation between the fourth-speed driven gear 344 and the hub 32a is not restricted. Therefore, rotation of the input shaft 20 is not transmitted to the hub 32a.

Relative rotation between the input shaft 20 and the fifth-speed drive gear 245 is not restricted. Therefore, rotation of the input shaft 20 is not transmitted to any of the fifth-speed drive gear 245, the fifth-speed driven gear 345, and the hub 32b. Relative rotation between the input shaft 20 and the sixth-speed drive gear 246 is not restricted. Therefore, rotation of the input shaft 20 is not transmitted to any of the sixth-speed drive gear 246, the sixth-speed driven gear 346, and the hub 32a. This way, when the neutral position is selected, rotation of the input shaft 20 is not transmitted to either the hub 32a or the hub 32b The ratchet mechanism 400 activates the power transmission between the hub 32a and the output shaft 30 by raising the pawls 35a, 35b corresponding to the even-numbered stages, and inactivates or deactivates the power transmission between the hub 32b and the output shaft 30 by lowering the pawls 35c, 35d corresponding to the odd-numbered stages. In this manner, the ratchet mechanism 400 performs a gear shifting operation for setting the gear stage to an even-numbered stage, as a gear shifting operation for setting the gear stage to the neutral position. When, however, the neutral position is selected, rotation of the input shaft 20 is not transmitted to either the hub 32a or the hub 32b, as mentioned above, and therefore rotation of the input shaft 20 is not transmitted to the output shaft 30. The ratchet mechanism 400 need not be provided with a mechanical mechanism that performs a gear shifting operation for setting the gear stage to the neutral position, in addition to a mechanical mechanism that performs a gear shifting operation for setting the gear stage to an odd-numbered stage or an even-numbered stage. This can reduce structural complexity.

Next, power transmission when one of the first to sixth speeds is selected will be described. Here, differences from the power transmission when the neutral position is selected will be mainly described. In FIG. 53 to FIG. 58, the thick-line arrow schematically shows a path through which power is transmitted. In the drawings, the pawls 35a, 35b are indicated as a power transmission path between the hub 32a and the output shaft 30. This means that power transmission via the pawls 35a is performed in a case of acceleration and power transmission via the pawls 35b is performed in a case of deceleration. Likewise, the pawls 35c, 35d are indicated as a power transmission path between the hub 32b and the output shaft 30. This means that power transmission via the pawls 35c is performed in a case of acceleration and power transmission via the pawls 35d is performed in a case of deceleration.

<First Speed>

Figure 53:
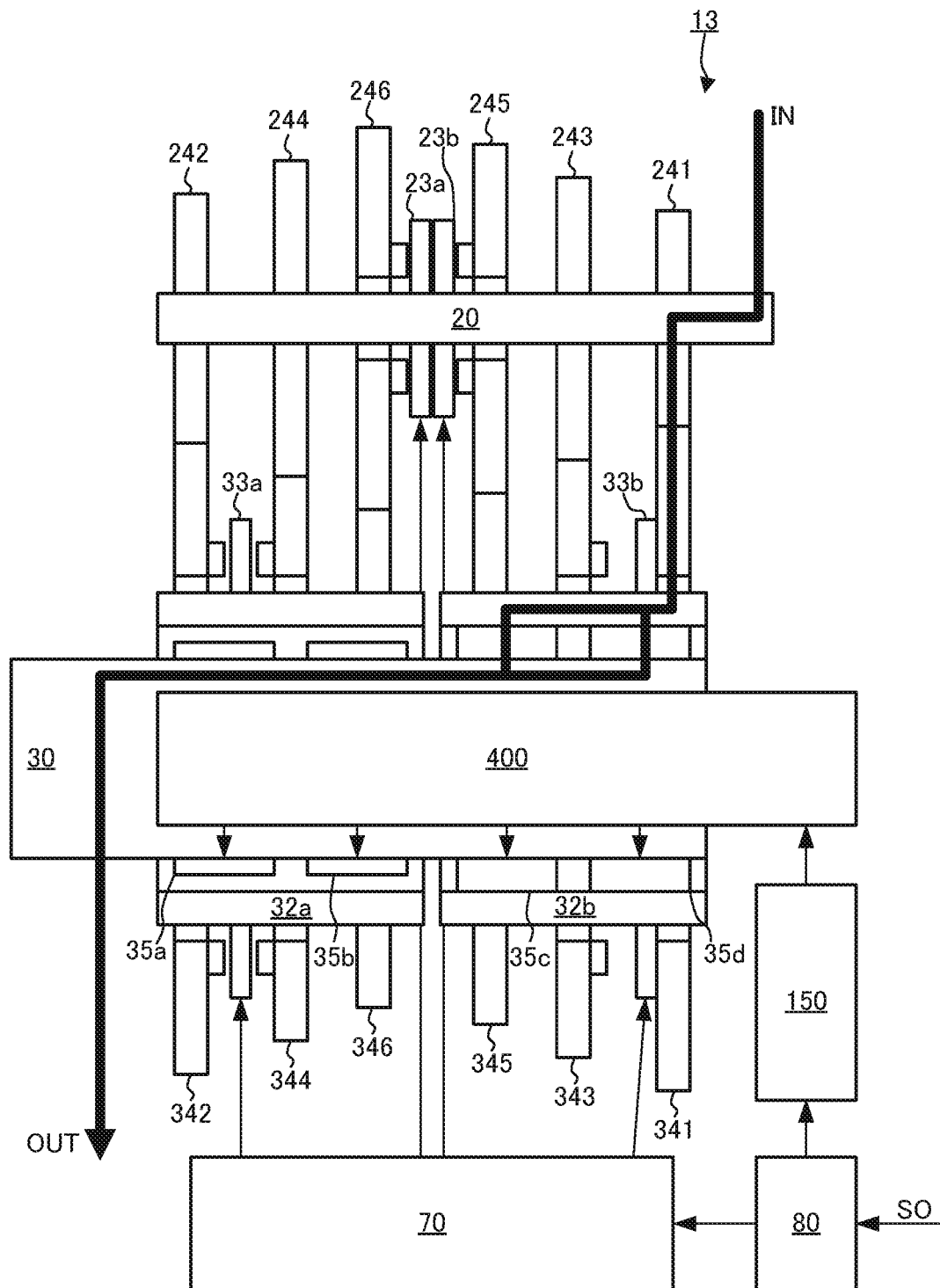
FIG. 53 is an explanatory diagram showing outline of power transmission in the transmission when a first speed is selected.

When the first speed is selected, as shown in FIG. 53, the input shaft 20 and the first-speed drive gear 241 rotate together, and relative rotation between the first-speed driven gear 341 and the hub 32b is restricted by the dog ring 33b. Therefore, rotation of the input shaft 20 is transmitted to the hub 32b. In the ratchet mechanism 400, the pawls 35a, 35b corresponding to the even-numbered stages are lowered so that power transmission between the hub 32a and the output shaft 30 is set inactive or is deactivated, while the pawls 35c, 35d corresponding to the odd-numbered stages are raised so that power transmission between the hub 32b and the output shaft 30 is set active or is activated. As a result, rotation of the input shaft 20 is transmitted to the output shaft 30 via the first-speed drive gear 241, the first-speed driven gear 341, and the odd-numbered stage hub 32b.

<Second Speed>

Figure 54:
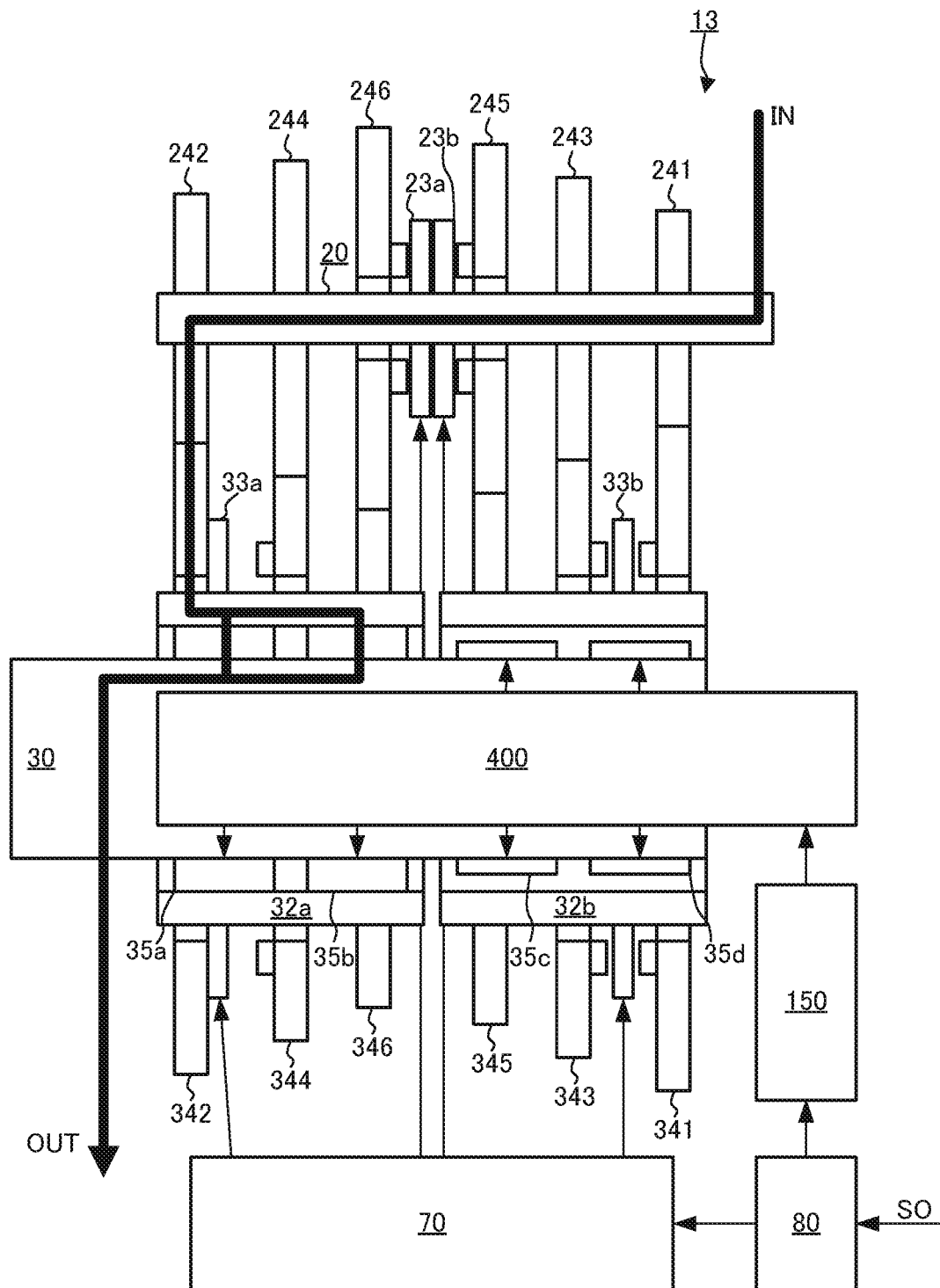
FIG. 54 is an explanatory diagram showing outline of power transmission in the transmission when a second speed is selected.

When the second speed is selected, as shown in FIG. 54, the input shaft 20 and the second-speed drive gear 242 rotate together, and relative rotation between the second-speed driven gear 342 and the hub 32a is restricted by the dog ring 33a. Therefore, rotation of the input shaft 20 is transmitted to the hub 32a. In the ratchet mechanism 400, the pawls 35a, 35b corresponding to the even-numbered stages are raised so that power transmission between the hub 32a and the output shaft 30 is set active or is activated, while the pawls 35c, 35d corresponding to the odd-numbered stages are lowered so that power transmission between the hub 32b and the output shaft 30 is set inactive or is deactivated. As a result, rotation of the input shaft 20 is transmitted to the output shaft 30 via the second-speed drive gear 242, the second-speed driven gear 342, and the even-numbered stage hub 32a.

<Third Speed>

Figure 55:
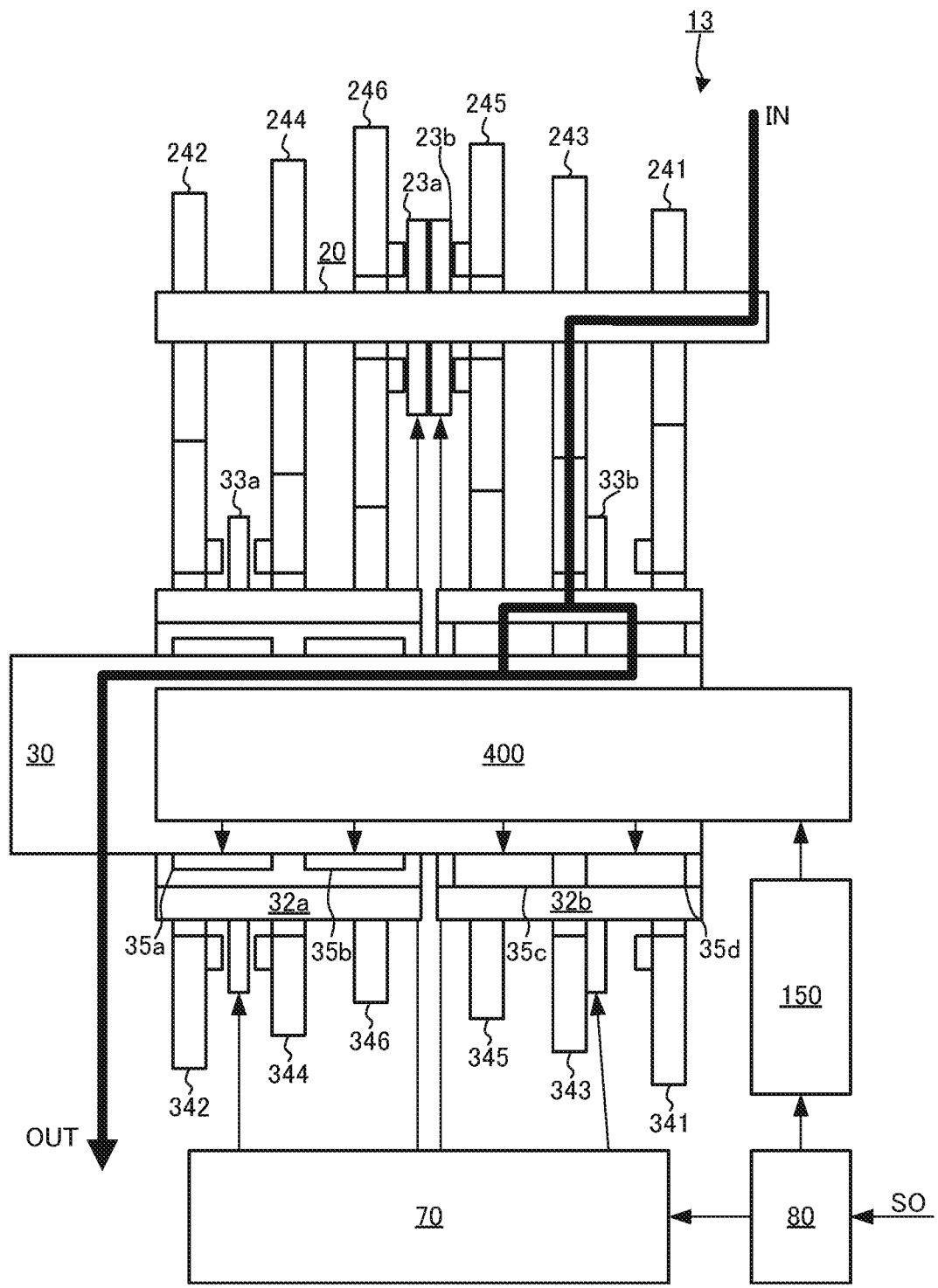
FIG. 55 is an explanatory diagram showing outline of power transmission in the transmission when a third speed is selected.

When the third speed is selected, as shown in FIG. 55, the input shaft 20 and the third-speed drive gear 243 rotate together, and relative rotation between the third-speed driven gear 343 and the hub 32b is restricted by the dog ring 33b. Therefore, rotation of the input shaft 20 is transmitted to the hub 32b. In the ratchet mechanism 400, the pawls 35a, 35b corresponding to the even-numbered stages are lowered so that power transmission between the hub 32a and the output shaft 30 is set inactive or deactivated, while the pawls 35c, 35d corresponding to the odd-numbered stages are raised so that power transmission between the hub 32b and the output shaft 30 is set active or is activated. As a result, rotation of the input shaft 20 is transmitted to the output shaft 30 via the third-speed drive gear 243, the third-speed driven gear 343, and the odd-numbered stage hub 32b.

<Fourth Speed>

Figure 56:
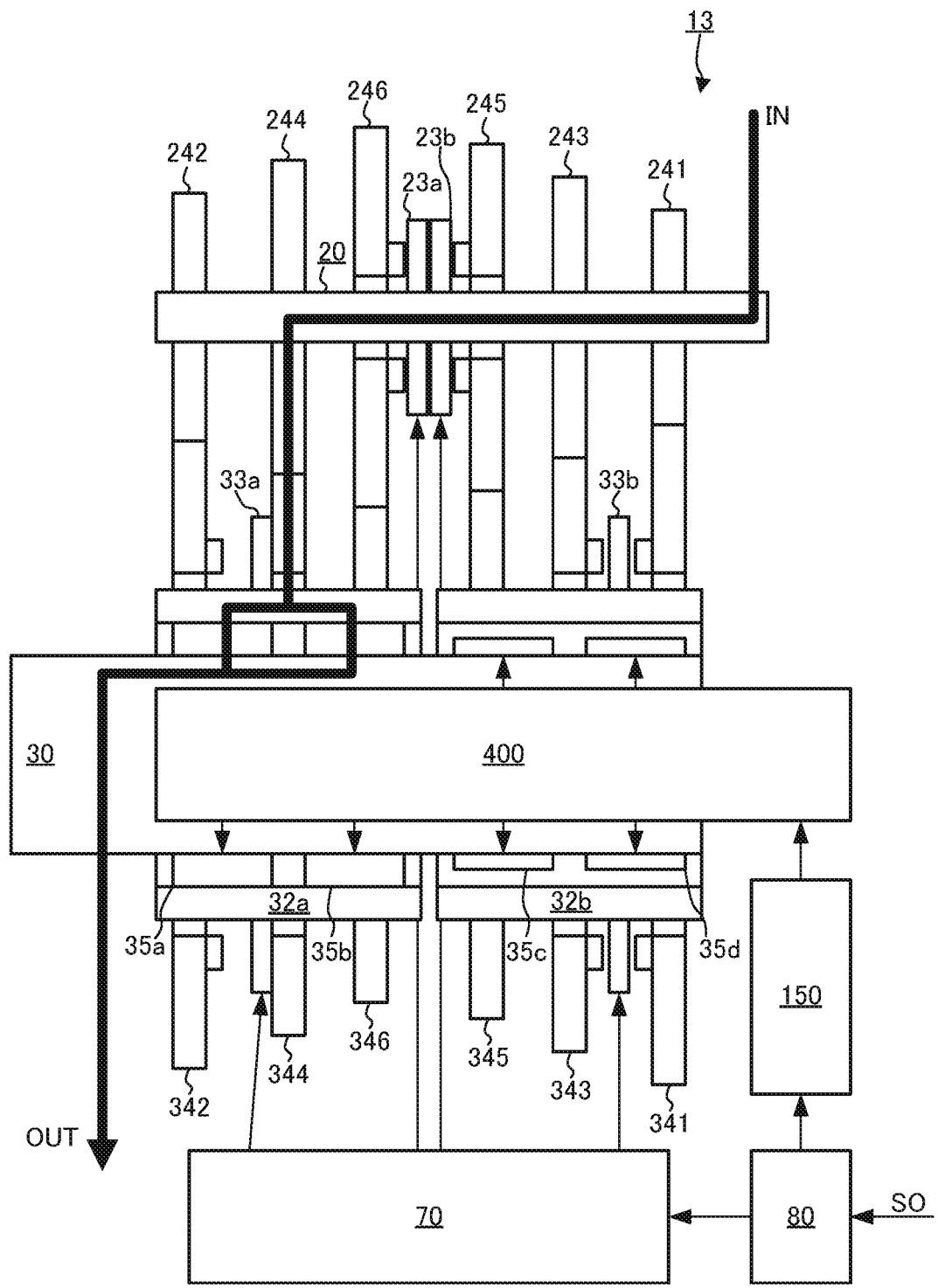
FIG. 56 is an explanatory diagram showing outline of power transmission in the transmission when a fourth speed is selected.

When the fourth speed is selected, as shown in FIG. 56, the input shaft 20 and the fourth-speed drive gear 244 rotate together, and relative rotation between the fourth-speed driven gear 344 and the hub 32a is restricted by the dog ring 33a. Therefore, rotation of the input shaft 20 is transmitted to the hub 32a. In the ratchet mechanism 400, the pawls 35a, 35b corresponding to the even-numbered stages are raised so that power transmission between the hub 32a and the output shaft 30 is set active or is activated, while the pawls 35c, 35d corresponding to the odd-numbered stages are lowered so that power transmission between the hub 32b and the output shaft 30 is set inactive or is deactivated. As a result, rotation of the input shaft 20 is transmitted to the output shaft 30 via the fourth-speed drive gear 244, the fourth-speed driven gear 344, and the even-numbered stage hub 32a.

<Fifth Speed>

Figure 57:
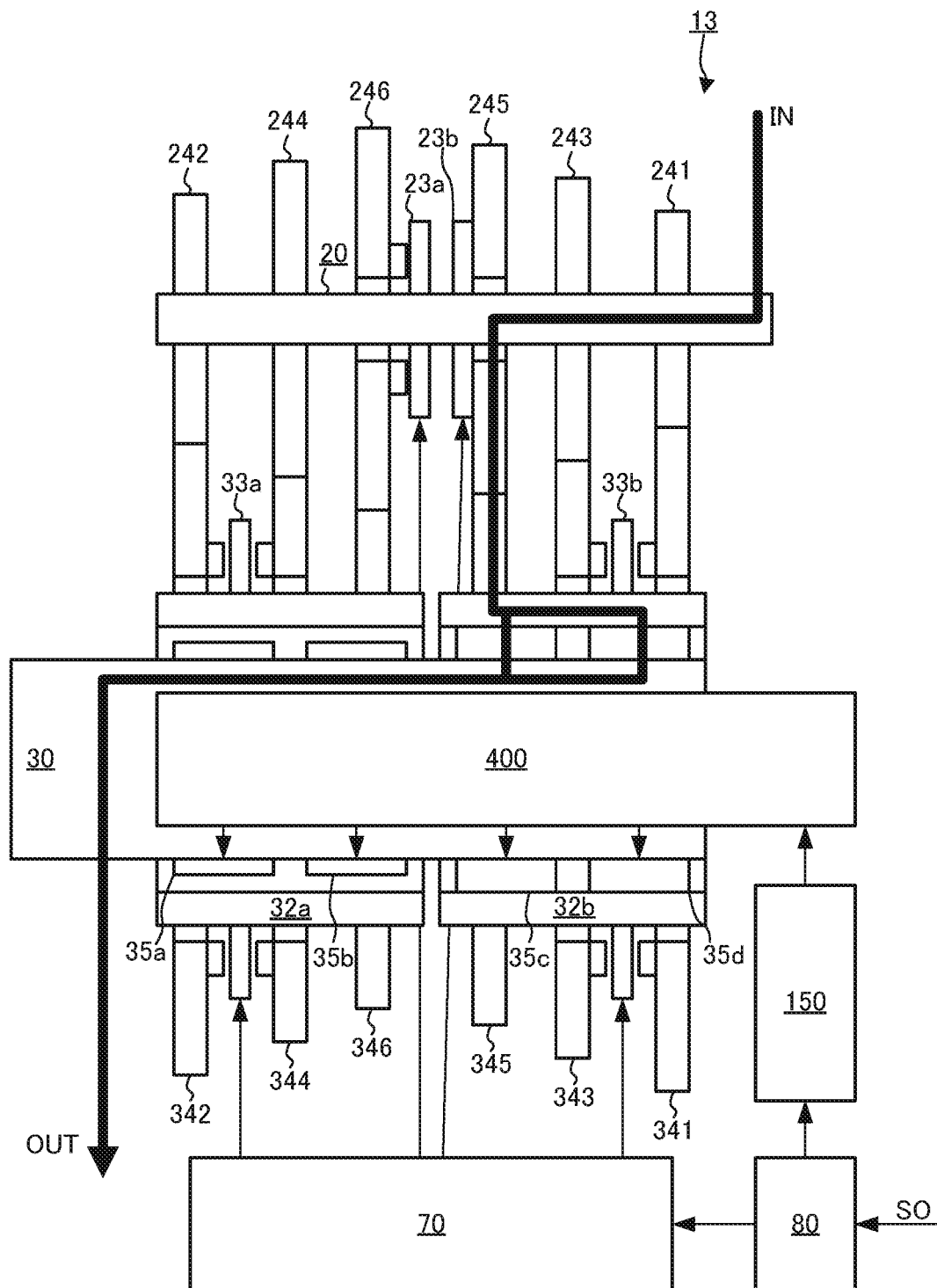
FIG. 57 is an explanatory diagram showing outline of power transmission in the transmission when a fifth speed is selected.

When the fifth speed is selected, as shown in FIG. 57, relative rotation between the input shaft 20 and the fifth-speed drive gear 245 is restricted by the dog ring 23b, and the fifth-speed driven gear 345 and the hub 32b rotate together. Therefore, rotation of the input shaft 20 is transmitted to the hub 32b. In the ratchet mechanism 400, the pawls 35a, 35b corresponding to the even-numbered stages are lowered so that power transmission between the hub 32a and the output shaft 30 is set inactive or is deactivated, while the pawls 35c, 35d corresponding to the odd-numbered stages are raised so that power transmission between the hub 32*b* and the output shaft 30 is set active is activated. As a result, rotation of the input shaft 20 is transmitted to the output shaft 30 via the fifth-speed drive gear 245, the fifth-speed driven gear 345, and the odd-numbered stage hub 32*b*.

<Sixth Speed>

Figure 58:
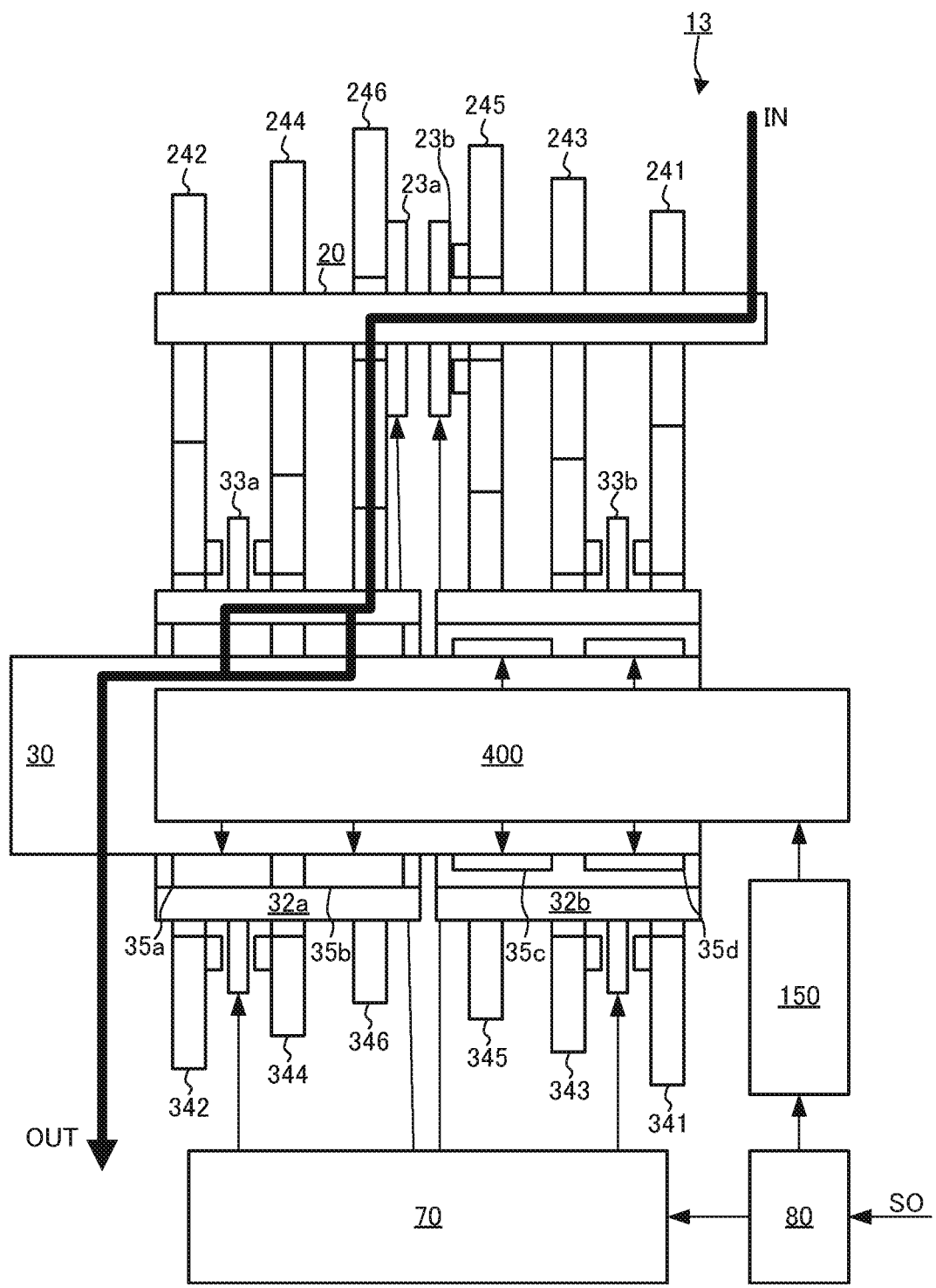
FIG. 58 is an explanatory diagram showing outline of power transmission in the transmission when a sixth speed is selected.

When the sixth speed is selected, as shown in FIG. 58, relative rotation between the input shaft 20 and the sixth-speed drive gear 246 is restricted by the dog ring 23*a*, and the sixth-speed driven gear 346 and the hub 32*a* rotate together. Therefore, rotation of the input shaft 20 is transmitted to the hub 32*a*. In the ratchet mechanism 400, the pawls 35*a*, 35*b* corresponding to the even-numbered stages are raised so that power transmission between the hub 32*a* and the output shaft 30 is set active or is activated, while the pawls 35*c*, 35*d* corresponding to the odd-numbered stages are lowered so that power transmission between the hub 32*b* and the output shaft 30 is set inactive or is deactivated. As a result, rotation of the input shaft 20 is transmitted to the output shaft 30 via the sixth-speed drive gear 246, the sixth-speed driven gear 346, and the even-numbered stage hub 32*a*.

The transmission 13 of this embodiment, which has five or more gear stages, is able to seamlessly perform power-on upshift and power-off downshift and achieve power-on downshift and power-off upshift in the same sequence as the sequence of the power-on upshift and the power-off downshift by the dog engagement mechanism 70 and the ratchet mechanism 400 having four types of pawls 35*a* to 35*d* each corresponding to acceleration or deceleration, as described above. This can reduce the number of component parts inside the input shaft 20, and can reduce structural complexity inside the input shaft 20. It therefore is easy to keep a certain size of each component part inside the input shaft 20 while suppressing a size increase of the entire transmission 13. Accordingly, the transmission 13 can adequately cover all gear shifting patterns, ensuring a mountability to a vehicle, and reducing structural complexity. The reduction of structural complexity can achieve making a manufacturing process less cumbersome, and ensuring a robustness.

Although an embodiment of the present teaching has been described above, the present teaching is not limited to the above-described embodiment.

In this embodiment, the plurality of drive gears 241 to 246 and driven gears 341 to 346 are configured as follows. Each of the first-speed driven gear 341 and the third-speed driven gear 343 is able to rotate relative to the hub 32*b*. Each of the second-speed driven gear 342 and the fourth-speed driven gear 344 is able to rotate relative to the hub 32*a*. The fifth-speed drive gear 245 is able to rotate relative to the input shaft 20. The sixth-speed drive gear 246 is able to rotate relative to the input shaft 20. The dog engagement mechanism 70 is configured to restrict each of these relative rotations separately by dog engagement. As for which relative rotation between the drive gear and the input shaft or between the driven gear and the hub (the odd-numbered stage hub or the even-numbered stage hub) is to be enabled in each gear stage, the example illustrated in this embodiment is not limiting. The present teaching can adopt, for example, a configuration shown in FIG. 59.

Figure 59:
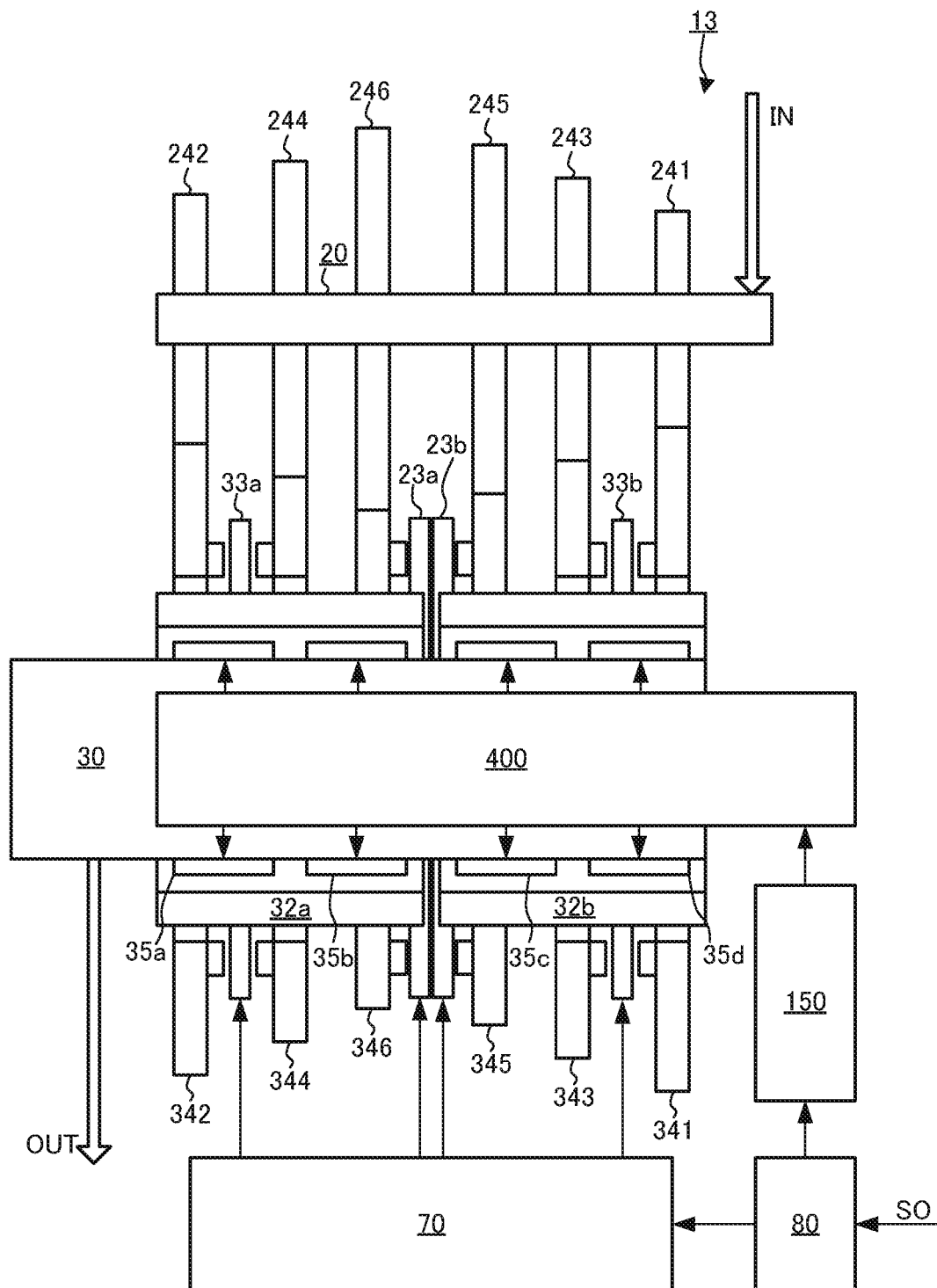
FIG. 59 is an explanatory diagram schematically showing a transmission according to another embodiment.

FIG. 59 is an explanatory diagram schematically showing a transmission according to another embodiment. In FIG. 59, elements identical or corresponding to the elements of the transmission according to the above-described embodiment are denoted by the same reference signs as the reference signs given in the above-described embodiment. In the following, differences from the above-described embodiment will be mainly described.

In the embodiment shown in FIG. 59, a plurality of drive gears 241 to 246 and driven gears 341 to 346 are configured as follows. Each of the first-speed driven gear 341 and the third-speed driven gear 343 is able to rotate relative to the hub 32*b*. Each of the second-speed driven gear 342 and the fourth-speed driven gear 344 is able to rotate relative to the hub 32*a*. The fifth-speed driven gear 345 is able to rotate relative to the hub 32*b*. The sixth-speed driven gear 346 is able to rotate relative to the hub 32*a*. The dog engagement mechanism 70 is configured to restrict each of these relative rotations separately by dog engagement. As shown in FIG. 59, the transmission does not have any gear stage in which the drive gear is rotatable relative to the input shaft, and has gear stages in which the driven gears are rotatable relative to the hubs.

In the embodiments described above, each of the dog rings 33*a*, 33*b* is able to restrict relative rotation of gears corresponding to two gear stages, selectively by dog engagement. Each of the dog rings 23*a*, 23*b* is able to restrict relative rotation of a gear corresponding to one gear stage, by dog engagement. In the present teaching, however, no particular limitation is put on for which gear stage each dog ring restricts relative rotation of the corresponding gear. Also for the shift forks, no particular limitation is put on for which gear stage each shift fork restricts relative rotation of the corresponding gear. Although two fork guide shafts are provided in the embodiments described above, the number of fork guide shafts in the present teaching is not particularly limited, and it may be one.

While the transmission of an embodiment described above has six gear stages, the number of gear stages provided in the transmission of the present teaching is not particularly limited as long, as it is five or more. It is desirable that the gears of the respective gear stages are, when provided, divided with respect to the axial direction into an odd-numbered stage gear group and an even-numbered stage gear group. The odd-numbered stage gear group includes three or more gear stages. The even-numbered stage gear group includes two or more gear stages. The arrangement sequence of the drive gears and the driven gears with respect to the axial direction of the input shaft and the output shaft is, for example, as follows. In the following examples, each number represents a gear stage.

1-3-5-4-2
1-3-5-6-4-2 (the above embodiments)
1-3-5-7-6-4-2
1-3-5-7-8-6-4-2

In this embodiment, the pawls are attached to the output shaft and configured to be engaged with the hub when raised, but the present teaching is not limited to this example. The pawls may be attached to the hub and configured to be engaged with the output shaft when raised. The ratchet mechanism includes pawls that are pivotable about an axis line parallel to the output shaft, and can be raised or lowered with respect to the diameter direction of the output shaft. The ratchet mechanism mechanically switches the raised or lowered state of the pawls in accordance with a shift operation.

In this embodiment, the control cam shaft 40 (rotary cam) is disposed inside with respect to the diameter direction, and the guide shaft 41 is disposed outside with respect to the diameter direction, but the present teaching is not limited to this example. The rotary cam may be disposed outside with respect to the diameter direction, and the guide shaft may be disposed inside with respect to the diameter direction. In this configuration, the rotary cam has, as the cam portion, a cam groove extending in the circumferential direction of the rotary cam and penetrating through the rotary cam in the diameter direction of the rotary cam, for example.

Although the transmission of this embodiment is a transmission of bottom-neutral type, the transmission of the present teaching is not limited to the bottom-neutral type. The transmission of the present teaching may be a transmission of half-neutral type (bottom low type). The bottom-neutral type means a shift pattern in which the neutral position is arranged below the first speed. The half-neutral type is a shift pattern in which the neutral position is arranged between the first speed and the second speed.

Although the transmission of this embodiment is a transmission of return type, the transmission of the present teaching is not limited to the return type. The transmission of the present teaching may be of rotary type.

It should be understood that the terms and expressions used herein are for descriptions and have no intention to be construed in a limited manner, do not eliminate any equivalents of features shown and mentioned herein, and allow various modifications falling within the claimed scope of the present teaching. The present teaching is not limited to the embodiments as set forth herein.

DESCRIPTION OF THE REFERENCE SIGNS 13 transmission
20 input shaft
23a, 23b dog ring
30 output shaft
32a, 32b hub
33a, 33b dog ring
35a, 35b, 35c, 35d pawl
40 control cam shaft (inner shaft)
41 guide shaft (outer shaft)
42, 42a, 42b, 42c, 42d cam groove
43, 43a, 43b, 43c, 43d slider
44, 44a, 44b, 44c, 44d guide hole
46, 46a, 46b, 46c, 46d engagement pin
50 shift cam
52a, 52b, 52c, 52d cam groove
53a, 53b, 53c, 53d shift fork
60, 65 fork guide shaft
70 dog engagement mechanism
80 shift mechanism
90 crankshaft
130 index cam
145 phase-holding mechanism
150 synchronization mechanism
241-246 drive gear
341-346 driven gear
400 ratchet mechanism

The invention claimed is:

1. A constant-mesh type transmission for a straddled vehicle, the transmission being configured to be mounted on the straddled vehicle and having five or more gear stages in addition to a neutral position, the transmission comprising:
an input shaft disposed in a rotatable manner, and configured to receive power from a crankshaft;
five or more drive gears disposed on the input shaft so as to be coaxial with the input shaft, and configured to constantly rotate together with the input shaft or rotate relative to the input shaft, each of the drive gears corresponding to a gear stage of odd-numbered stages and even-numbered stages;
an output shaft disposed in a rotatable manner having an axis line, around which the output shaft rotates, defining an axial direction of the output shaft, the axis line being parallel to an axis line of the input shaft, around which the input shaft rotates;
an odd-numbered stage hub and an even-numbered stage hub arranged around the output shaft, such that the output shaft is located inside the odd-numbered stage hub and inside the even-numbered stage hub, with respect to a diameter direction, the odd-numbered stage hub and the even-numbered stage hub supported on the output shaft so as to be coaxial with the output shaft and rotatable relative to the output shaft, the odd-numbered stage hub and the even-numbered stage hub being arranged side by side in the axial direction of the output shaft so as to be rotatable relative to each other;
a plurality of odd-numbered stage driven gears supported on the odd-numbered stage hub so as to be coaxial with the odd-numbered stage hub at a location outside the odd-numbered stage hub with respect to a diameter direction, the plurality of odd-numbered stage driven gears being constantly meshed with corresponding gears of the odd-numbered stage drive gears, the plurality of odd-numbered stage driven gears being configured such that each odd-numbered stage driven gear rotates relative to the odd-numbered stage hub when the corresponding odd-numbered stage drive gear constantly rotates together with the input shaft, and such that the odd-numbered stage driven gear constantly rotates together with the odd-numbered stage hub when the corresponding odd-numbered stage drive gear rotates relative to the input shaft;
a plurality of even-numbered stage driven gears supported on the even-numbered stage hub so as to be coaxial with the even-numbered stage hub at a location outside the even-numbered stage hub with respect to a diameter direction, the plurality of even-numbered stage driven gears being constantly meshed with corresponding gears of the even-numbered stage drive gears, the plurality of even-numbered stage driven gears being configured such that each respective even-numbered stage driven gear rotates relative to the even-numbered stage hub when the corresponding even-numbered stage drive gear constantly rotates together with the input shaft, and such that the respective even-numbered stage driven gear constantly rotates together with the even-numbered stage hub when the corresponding even-numbered stage drive gear rotates relative to the input shaft;
a dog engagement mechanism that, by dog engagement, selectively sets power transmission to be engaged from the input shaft to the odd-numbered stage hub, the odd-numbered stage hub corresponding to one of the odd-numbered stages, or power transmission to be engaged from the input shaft to the even-numbered stage hub, the even-numbered stage hub corresponding to one of the even-numbered stages, the dog engagement mechanism being configured to restrict either one of relative rotation between the odd-numbered stage driven gear and the odd-numbered stage hub or relative rotation between the odd-numbered stage drive gear and the input shaft when the power transmission from the input shaft to the odd-numbered stage hub corresponding to the one of the odd-numbered stages, is set as engaged, and to restrict either one of relative rotation between the even-numbered stage driven gear and the even-numbered stage hub or relative rotation between the even-numbered stage drive gear and the input shaft when the power transmission from the input shaft to the even-numbered stage hub corresponding to the one of the even-numbered stages is set as engaged; and a ratchet mechanism including an odd-numbered stage accelerating pawl, an odd-numbered stage decelerating pawl, an even-numbered stage accelerating pawl, an even-numbered stage decelerating pawl, and a ratchet control mechanism, the odd-numbered stage accelerating pawl being pivotable between the output shaft and the odd-numbered stage hub so as to, when raised, allow acceleration-directed power to be transmitted between the output shaft and the odd-numbered stage hub and, when lowered, to not allow the power to be transmitted to the output shaft, the odd-numbered stage decelerating pawl being pivotable between the output shaft and the odd-numbered stage hub so as to, when raised, allow deceleration-directed power to be transmitted between the output shaft and the odd-numbered stage hub and, when lowered, to not allow the power to be transmitted to the output shaft, the even-numbered stage accelerating pawl being pivotable between the output shaft and the even-numbered stage hub so as to, when raised, allow acceleration-directed power to be transmitted between the output shaft and the even-numbered stage hub and, when lowered, to not allow the power to be transmitted to the output shaft, the even-numbered stage decelerating pawl being pivotable between the output shaft and the even-numbered stage hub so as to, when raised, allow deceleration-directed power to be transmitted between the output shaft and the even-numbered stage hub and, when lowered, to not allow the power to be transmitted to the output shaft, the ratchet control mechanism being configured to mechanically switch raising or lowering of the odd-numbered stage accelerating pawl, the odd-numbered stage decelerating pawl, the even-numbered stage accelerating pawl, and the even-numbered stage decelerating pawl in response to the transmission shifting up or shifting down, such that relative rotation between the output shaft and either one of the odd-numbered stage hub or the even-numbered stage hub is selectively restricted.

2. The transmission according to claim 1, comprising a synchronization mechanism that mechanically synchronizes an operation of the ratchet mechanism with an operation of the dog engagement mechanism.

3. The transmission according to claim 2, wherein
the dog engagement mechanism includes a shift cam having, on an outer peripheral surface thereof, a plurality of cam portions extending in a circumferential direction, the shift cam being in parallel to the output shaft and configured to rotate in response to the transmission shifting up or shifting down such that a rotation direction corresponding to the transmission shifting up and a rotation direction corresponding to the transmission shifting down are opposite to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position in response to the transmission shifting gears, the ratchet control mechanism includes a rotary cam inside the output shaft with respect to a diameter direction so as to be coaxial with the output shaft, the rotary cam being configured to rotate response to the transmission shifting up or shifting down such that a rotation direction corresponding to the transmission shifting up and a rotation direction corresponding to the transmission shifting down are reverse to each other, the rotary cam having, on an outer peripheral surface thereof, a plurality of cam portions each corresponding to each of the odd-numbered stage accelerating pawl, the odd-numbered stage decelerating pawl, the even-numbered stage accelerating pawl, and the even-numbered stage decelerating pawl, the plurality of cam portions being for separately controlling raising or lowering of each of the pawls, the rotary cam having set on the outer peripheral surface thereof V odd-numbered stage positions corresponding to the odd-numbered stages and V even-numbered stage positions corresponding to the even-numbered stages, the V odd-numbered stage positions and the V even-numbered stage positions being set at different positions with respect to a circumferential direction, V is a positive integer equal to or less than a number of gear stages provided in the transmission, the gear stages provided in the transmission including a neutral position, the V odd-numbered stage positions and the V even-numbered stage positions are alternately arranged on the outer peripheral surface of the rotary cam and distant from each other by W° with respect to the circumferential direction, where W satisfies the following expression (A):

$$W=360/2V \qquad (A),$$

the dog engagement mechanism performs a gear shifting operation by rotating the shift cam through the predetermined angle at a time of each one stage shifting, and the ratchet mechanism performs a gear shifting operation by rotating the rotary cam through W° in coordination with rotation of the shift cam through the predetermined angle via the synchronization mechanism.

4. The transmission according to claim 3, wherein
the dog engagement mechanism sequentially sets a gear stage for which power transmission is to be engaged in each of the odd-numbered stages and the even-numbered stages by a shape of the cam portions of the shift cam and a phase angle of the shift cam, the transmission includes a phase-holding mechanism that holds the shift cam at a gear stage position corresponding to any one gear stage among the five or more gear stages based on the transmission not shifting gears, and the rotary cam is held at an odd-numbered stage position or an even-numbered stage position corresponding to the one gear stage by the phase-holding mechanism via the synchronization mechanism based on the transmission not shifting gears.

5. The transmission according to claim 4, wherein
the output shaft has one end side and another end side opposite from the one end side in the axial direction of the output shaft, the output shaft has, on the one end side, a power output part that outputs power to a drive wheel of the straddled vehicle, and the output shaft has, on the other end side, the synchronization mechanism that couples the dog engagement mechanism and the ratchet mechanism to each other.

6. The transmission according to claim 1, further comprising a synchronization mechanism that mechanically synchronizes an operation of the ratchet mechanism with an operation of the dog engagement mechanism, wherein
the dog engagement mechanism includes:
a shift cam having, on an outer peripheral surface thereof, a plurality of cam portions extending in a circumferential direction, the shift cam being in parallel to the output shaft and configured to rotate in response to the transmission shifting up and or shifting down such that a rotation direction corresponding to the transmission shifting up and a rotation direction corresponding to the transmission shifting down are opposite to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position in response to the transmission shifting gears;
at least one dog ring configured to be in dog engagement with any one of the drive gears or any one of the driven gears, as a result of moving in the axial direction of the output shaft;
at least one shift fork engaged with the cam portion of the shift cam so as to be moved in the axial direction by the cam portion of the shift cam, and engaged with the dog ring with respect to the axial direction, the at least one shift fork being configured to move the dog ring in the axial direction by being moved in the axial direction by the cam portion of the shift cam; and
a fork guide shaft that supports the shift fork so as to guide movement of the shift fork in the axial direction,
the synchronization mechanism including a plurality of speed-increasing gears, at least one of the speed-increasing gears being disposed coaxially with the fork guide shaft.

7. The transmission according to claim 1, wherein
in response to the transmission shifting gears, the dog engagement mechanism simultaneously restricts relative rotation of at most two gear stages corresponding to the one of the odd-numbered stages and the one of the even-numbered stages.

8. The transmission according to claim 1, wherein
the dog engagement mechanism includes:
a first dog ring disposed outside the odd-numbered stage hub with respect to a diameter direction such that relative rotation between the first dog ring and the odd-numbered stage hub is restricted and the first dog ring is movable in an axial direction of the odd-numbered stage hub, the first dog ring being configured to move in the axial direction of the odd-numbered stage hub to come into dog engagement with one of the plurality of odd-numbered stage driven gears, to restrict relative rotation between the one of the plurality of odd-numbered stage driven gears and the odd-numbered stage hub;
a second dog ring disposed outside the even-numbered stage hub with respect to a diameter direction such that relative rotation between the second dog ring and the even-numbered stage hub is restricted and the second dog ring is movable in an axial direction of the even-numbered stage hub, the second dog ring being configured to move in the axial direction of the even-numbered stage hub to come into dog engagement with one of the plurality of even-numbered stage driven gears, to restrict relative rotation between the one of the plurality of even-numbered stage driven gears and the even-numbered stage hub;
a third dog ring disposed outside the input shaft with respect to a diameter direction such that relative rotation between the third dog ring and the input shaft is restricted and the third dog ring is movable in an axial direction of the input shaft, the third dog ring being configured to move in the axial direction of the input shaft to come into dog engagement with, among the odd-numbered stage drive gears, one drive gear that is rotatable relative to the input shaft, to restrict relative rotation between the drive gear and the input shaft;
a fourth dog ring disposed outside the input shaft with respect to a diameter direction such that relative rotation between the fourth dog ring and the input shaft is restricted and the fourth dog ring is movable in the axial direction of the input shaft, the fourth dog ring being configured to move in the axial direction of the input shaft to come into dog engagement with, among the even-numbered stage drive gears, one drive gear that is rotatable relative to the input shaft, to restrict relative rotation between the drive gear and the input shaft;
a shift cam having, on an outer peripheral surface thereof, a plurality of cam portions extending in a circumferential direction, the shift cam being in parallel to the output shaft and configured to rotate in response to the transmission shifting up or shifting down such that a rotation direction corresponding to the transmission shifting up and a rotation direction corresponding to the transmission shifting down are opposite to each other, the shift cam having a plurality of gear stage positions arranged apart from one another by a predetermined angle with respect to the circumferential direction such that each of the plurality of gear stage positions corresponds to each of the plurality of gear stages, the shift cam being configured to rotate through the predetermined angle from one gear stage position among the plurality of gear stage positions to a gear stage position adjacent to the one gear stage position in response to the transmission shifting gears;
a first shift fork engaged with the cam portion of the shift cam so as to be moved in the axial direction by the cam portion of the shift cam, and engaged with the first dog ring with respect to the axial direction, the first shift fork being configured to move the first dog ring in the axial direction by being moved in the axial direction by the cam portion of the shift cam;
a second shift fork engaged with the cam portion of the shift cam so as to be moved in the axial direction by the cam portion of the shift cam, and engaged with the second dog ring with respect to the axial direction, the second shift fork being configured to move the second dog ring in the axial direction by being moved in the axial direction by the cam portion of the shift cam;
a third shift fork engaged with the cam portion of the shift cam so as to be moved in the axial direction by the cam portion of the shift cam, and engaged with the third dog ring with respect to the axial direction, the third shift fork being configured to move the third dog ring in the axial direction by being moved in the axial direction by the cam portion of the shift cam; and
a fourth shift fork engaged with the cam portion of the shift cam so as to be moved in the axial direction by the cam portion of the shift cam, and engaged with the fourth dog ring with respect to the axial direction, the fourth shift fork being configured to move the fourth dog ring in the axial direction by being moved in the axial direction by the cam portion of the shift cam.

9. The transmission according to claim 8, wherein
the first dog ring moves in the axial direction of the odd-numbered stage hub to come into dog engagement with a first-speed driven gear or a third-speed driven gear, to restrict relative rotation between the first-speed driven gear and the odd-numbered stage hub or between the third-speed driven gear and the odd-numbered stage hub,
the second dog ring moves in the axial direction of the even-numbered stage hub to come into dog engagement with a second-speed driven gear or a fourth-speed driven gear, to restrict relative rotation between the second-speed driven gear and the even-numbered stage hub or between the fourth-speed driven gear and the even-numbered stage hub,
the third dog ring moves in the axial direction of the input shaft to come into dog engagement with a fifth-speed drive gear, to restrict relative rotation between the fifth-speed drive gear and the input shaft, and
the fourth dog ring moves in the axial direction of the input shaft to come into dog engagement with a sixth-speed drive gear, to restrict relative rotation between the sixth-speed drive gear and the input shaft.

10. The transmission according to claim 9, wherein
the ratchet control mechanism includes:
a rotary cam inside the output shaft with respect to a diameter direction so as to be coaxial with the output shaft, the rotary cam being configured to rotate in response to the transmission shifting up or shifting down such that a rotation direction corresponding to the transmission shifting up and a rotation direction in corresponding to the transmission shifting down are opposite to each other, the rotary cam having, on an outer peripheral surface thereof, a plurality of cam portions each corresponding to each of the odd-numbered stage accelerating pawl, the odd-numbered stage decelerating pawl, the even-numbered stage accelerating pawl, and the even-numbered stage decelerating pawl, the plurality of cam portions being for separately controlling the raising or lowering of each of the pawls, the rotary cam having set on the outer peripheral surface thereof V odd-numbered stage positions corresponding to the odd-numbered stages and V even-numbered stage positions corresponding to the even-numbered stages, the V odd-numbered stage positions and the V even-numbered stage positions being set at different positions with respect to a circumferential direction; and
a plurality of sliders each corresponding to each of the odd-numbered stage accelerating pawl, the odd-numbered stage decelerating pawl, the even-numbered stage accelerating pawl, and the even-numbered stage decelerating pawl, the plurality of sliders being disposed so as to be movable in an axial direction of the rotary cam, the plurality of sliders having guide object parts that are guided by the cam portions and, by the guide object parts guided by the cam portions, moving between a pawl-raising position and a pawl-lowering position that are set with respect to the axial direction of the rotary cam, the plurality of sliders being configured such that, when the slider moves to the pawl-raising position, a corresponding pawl is raised and, when the slider moves to the pawl-lowering position, the corresponding pawl is lowered, and
V is a positive integer equal to or less than a number of gear stages provided in the transmission, the gear stages provided in the transmission including a neutral position.

11. The transmission according to claim 10, wherein
the ratchet control mechanism includes a guide shaft that receives the rotary cam inside with respect to the diameter direction and holds the rotary cam such that the guide shaft is rotatable relative to the rotary cam, the guide shaft being received inside the output shaft with respect to the diameter direction, and
the plurality of sliders are provided to an outer peripheral surface of the guide shaft, and configured to move in the axial direction of the rotary cam as a result of relative rotation between the rotary cam and the guide shaft.

12. The transmission according to claim 11, wherein
the plurality of cam portions of the rotary cam are a plurality of cam grooves, each of the cam grooves having a lowered-direction drive surface and a raised-direction drive surface, the lowered-direction drive surface allowing a corresponding slider to move from the pawl-raising position to the pawl-lowering position by relative rotation between the rotary cam and the guide shaft, the raised-direction drive surface allowing a corresponding slider to move from the pawl-lowering position to the pawl-raising position by relative rotation between the rotary cam and the guide shaft,
the guide shaft has a plurality of guide holes each corresponding to each of the plurality of cam grooves, the plurality of guide holes being formed as elongated holes elongated in an axial direction and penetrating through the guide shaft in a diameter direction,
the guide object part extends in the diameter direction so as to pass through the guide hole and be received in the cam groove,
the output shaft has a plurality of through holes each corresponding to each of the pawls, the plurality of through holes being formed so as to penetrate through the output shaft in the diameter direction, and
the ratchet control mechanism includes a plurality of balls each received in the through hole of the output shaft, the plurality of balls being configured such that, when the slider moves to the pawl-lowering position, the ball abuts against the slider and moves outward with respect to the diameter direction so that the corresponding pawl is lowered and, when the slider moves to the pawl-raising position, the ball moves inward with respect to the diameter direction so that the corresponding pawl is raised.

13. The transmission according to claim 12, wherein
the output shaft has, on one end side thereof with respect to the axial direction of the output shaft, a power output part that outputs power to a drive wheel of the straddled vehicle,
end portions of the rotary cam and the guide shaft protrude from another end side of the output shaft in the axial direction of the output shaft,
the transmission includes:
a casing that rotatably supports at least each of the input shaft and the output shaft; and
a cover member that at least partially covers, from outside of the casing, a shaft bearing and a shaft bearing hole thereof, the shaft bearing supporting the other end side of the output shaft in the casing, the transmission has an oil passage provided in the casing, the oil passage opening into a space formed between the shaft bearing that supports the other end side of the output shaft and the cover member, and the rotary cam and the guide shaft have oil introduction holes formed such that a lubricant supplied from the oil passage through the space is distributed to surroundings of the output shaft.

14. The transmission according to claim 13, wherein the plurality of cam portions of the rotary cam are formed so as to:

position respective guide object parts such that the plurality of sliders raise an accelerating pawl and a decelerating pawl corresponding to a selected gear stage and lower an accelerating pawl and a decelerating pawl corresponding to a non-selected gear stage, either based on the transmission not shifting gears with an odd-numbered stage selected or based on the transmission not shifting gears with an even-numbered stage selected; and provide movement paths through which the guide object parts move in the cam portions, the movement paths being different between the transmission shifting up and shifting down to and from the odd-numbered stage and the even-numbered stage, the movement paths being provided such that, either in response to the transmission shifting up to, or in response to the transmission shifting down from, the odd-numbered stage and the even-numbered stage, the plurality of sliders operate the pawls in a sequence of lowering of a pawl not allowing power transmission among an accelerating pawl and a decelerating pawl corresponding to an original gear stage from which a speed is to be changed, raising of an accelerating pawl and a decelerating pawl corresponding to a target gear stage to which a speed is to be changed, and lowering of another pawl among the accelerating pawl and the decelerating pawl corresponding to the original gear stage from which the speed is to be changed.

15. The transmission according to claim 14, wherein the rotary cam has, on the outer peripheral surface thereof, the odd-numbered stage positions and the even-numbered stage positions that are distant from each other by W° with respect to the circumferential direction, the rotary cam being rotatable in both directions of a shift-up direction and a shift-down direction reverse to the shift-up direction, where W satisfies the following expression (A):

$$W=360/2V \quad (A),$$

V is a positive integer equal to or less than the number of gear stages provided in the transmission, the gear stages provided in the transmission including a neutral position, and the rotary cam is configured to:

based on the transmission not shifting gears with the odd-numbered stage selected, be held at the odd-numbered stage position, thus creating an odd-numbered stage state in which the odd-numbered stage accelerating pawl and the odd-numbered stage decelerating pawl are raised while the even-numbered stage accelerating pawl and the even-numbered stage decelerating pawl are lowered;

based on the transmission not shifting gears with the even-numbered stage selected, be held at the even-numbered stage position, thus creating an even-numbered stage state in which the even-numbered stage accelerating pawl and the even-numbered stage decelerating pawl are raised while the odd-numbered stage accelerating pawl and the odd-numbered stage decelerating pawl are lowered;

in response to the transmission shifting up from the odd-numbered stage to the even-numbered stage, rotate in the shift-up direction from an odd-numbered stage position to an even-numbered stage position, thus performing a ratchet operation A of firstly lowering the odd-numbered stage decelerating pawl, then raising the even-numbered stage accelerating pawl and the even-numbered stage decelerating pawl, and finally lowering the odd-numbered stage accelerating pawl;

in response to the transmission shifting down from the odd-numbered stage to the even-numbered stage, rotate in the shift-down direction from the odd-numbered stage position to the even-numbered stage position, thus performing a ratchet operation B of firstly lowering the odd-numbered stage accelerating pawl, then raising the even-numbered stage accelerating pawl and the even-numbered stage decelerating pawl, and lowering the odd-numbered stage decelerating pawl;

in response to the transmission shifting up from the even-numbered stage to the odd-numbered stage, rotate in the shift-up direction from the even-numbered stage position to the odd-numbered stage position, thus performing a ratchet operation C of firstly lowering the even-numbered stage decelerating pawl, then raising the odd-numbered stage accelerating pawl and the odd-numbered stage decelerating pawl, and lowering the even-numbered stage accelerating pawl; and in response to the transmission shifting down from the even-numbered stage to the odd-numbered stage, rotate in the shift-down direction from the even-numbered stage position to the odd-numbered stage position, thus performing a ratchet operation D of firstly lowering the even-numbered stage accelerating pawl, then raising the odd-numbered stage accelerating pawl and the odd-numbered stage decelerating pawl, and lowering the even-numbered stage decelerating pawl.

16. The transmission according to claim 15, comprising a synchronization mechanism that mechanically synchronizes an operation of the ratchet mechanism with an operation of the dog engagement mechanism, wherein the dog engagement mechanism includes:

a first dog ring disposed outside the odd-numbered stage hub with respect to a diameter direction such that relative rotation between the first dog ring and the odd-numbered stage hub is restricted and the first dog ring is movable in an axial direction of the odd-numbered stage hub, the first dog ring being configured to move in the axial direction of the odd-numbered stage hub to come into dog engagement with one of the plurality of odd-numbered stage driven gears, to restrict relative rotation between the one of the plurality of odd-numbered stage driven gears and the odd-numbered stage hub;

a second dog ring disposed outside the even-numbered stage hub with respect to a diameter direction such that relative rotation between the second dog ring and the even-numbered stage hub is restricted and the second dog ring is movable in an axial direction of the even-numbered stage hub, the second dog ring being configured to move in the axial direction of the even-numbered stage hub to come into dog engagement with one of the plurality of even-numbered stage driven gears, to restrict relative rotation between the one of the plurality of even-numbered stage driven gears and the even-numbered stage hub;

a third dog ring disposed outside the input shaft with respect to a diameter direction such that relative rotation between the third dog ring and the input shaft is restricted and the third dog ring is movable in an axial direction of the input shaft, the third dog ring being configured to move in the axial direction of the input shaft to come into dog engagement with, among the odd-numbered stage drive gears, one drive gear that is rotatable relative to the input shaft, to restrict relative rotation between the drive gear and the input shaft, the one drive gear being constantly meshed with an odd-numbered stage driven gear that is fixed to the odd-numbered stage hub so as to constantly rotate together with the odd-numbered stage hub;

a fourth dog ring disposed outside the input shaft with respect to a diameter direction such that relative rotation between the fourth dog ring and the input shaft is restricted and the fourth dog ring is movable in the axial direction of the input shaft, the fourth dog ring being configured to move in the axial direction of the input shaft to come into dog engagement with, among the even-numbered stage drive gears, one drive gear that is rotatable relative to the input shaft, to restrict relative rotation between the drive gear and the input shaft, the one drive gear being constantly meshed with an even-numbered stage driven gear that is fixed to the even-numbered stage hub so as to constantly rotate together with the even-numbered stage hub;

a shift cam having, on an outer peripheral surface thereof, a plurality of cam portions extending in a circumferential direction, the shift cam being in parallel to the output shaft and configured to rotate in response to the transmission shifting up and in response to the transmission shifting down such that a rotation direction corresponding to the transmission shifting up and a rotation direction corresponding to the transmission shifting down are opposite to each other, the shift cam having five or more gear stage positions arranged apart from one another by a predetermined angle with respect to the circumferential direction such that each of the five or more gear stage positions corresponds to each of the five or more gear stages, the shift cam being configured to rotate through the predetermined angle from one gear stage position among the five or more gear stage positions to a gear stage position adjacent to the one gear stage position based on the transmission shifting gears;

a first shift fork engaged with the cam portion of the shift cam so as to be moved in the axial direction by the cam portion of the shift cam, and engaged with the first dog ring with respect to the axial direction, the first shift fork being configured to move the first dog ring in the axial direction by being moved in the axial direction by the cam portion of the shift cam;

a second shift fork engaged with the cam portion of the shift cam so as to be moved in the axial direction by the cam portion of the shift cam, and engaged with the second dog ring with respect to the axial direction, the second shift fork being configured to move the second dog ring in the axial direction by being moved in the axial direction by the cam portion of the shift cam;

a third shift fork engaged with the cam portion of the shift cam so as to be moved in the axial direction by the cam portion of the shift cam, and engaged with the third dog ring with respect to the axial direction, the third shift fork being configured to move the third dog ring in the axial direction by being moved in the axial direction by the cam portion of the shift cam; and a fourth shift fork engaged with the cam portion of the shift cam so as to be moved in the axial direction by the cam portion of the shift cam, and engaged with the fourth dog ring with respect to the axial direction, the fourth shift fork being configured to move the fourth dog ring in the axial direction by being moved in the axial direction by the cam portion of the shift cam, based on the transmission not shifting gears with the odd-numbered stage selected, the dog engagement mechanism sets power transmission active from the input shaft to the odd-numbered stage hub corresponding to the one of the odd-numbered stages by the first shift fork and the third shift fork, while the ratchet mechanism creates the odd-numbered stage state, so that power transmission from the input shaft to the output shaft in the one of the odd-numbered stages is set active, based on the transmission not shifting gears with the even-numbered stage selected, the dog engagement mechanism sets power transmission active from the input shaft to the even-numbered stage hub corresponding to the one of the even-numbered stages by the second shift fork and the fourth shift fork, while the ratchet mechanism creates the even-numbered stage state, so that power transmission from the input shaft to the output shaft in the one of the even-numbered stages is set active, in a process of shifting up from the odd-numbered stage to the even-numbered stage, firstly, the dog engagement mechanism sets, by dog engagement, power transmission active from the input shaft to the even-numbered stage hub corresponding to the even-numbered stage by the second shift fork and the fourth shift fork along with rotation of the shift cam in the rotation direction corresponding to the transmission shifting up, then, further rotation of the shift cam in the rotation direction corresponding to the transmission shifting up is transmitted via the synchronization mechanism so that the ratchet mechanism rotates the rotary cam in the rotation direction corresponding to the transmission shifting up from the odd-numbered stage position to the even-numbered stage position, to perform the ratchet operation A, and then, along with further rotation of the shift cam in the rotation direction corresponding to the transmission shifting up, the dog engagement mechanism cancels dog engagement in which power transmission from the input shaft to the odd-numbered stage hub corresponding to the odd-numbered stage is set active by the first shift fork and the third shift fork, in a process of shifting down from the odd-numbered stage to the even-numbered stage, firstly, the dog engagement mechanism sets, by dog engagement, power transmission active from the input shaft to the even-numbered stage hub corresponding to the even-numbered stage by the second shift fork and the fourth shift fork along with rotation of the shift cam in the rotation direction corresponding to the transmission shifting down, then, further rotation of the shift cam in the rotation direction corresponding to the transmission shifting down is transmitted via the synchronization mechanism so that the ratchet mechanism rotates the rotary cam in the rotation direction corresponding to the transmission shifting down from the odd-numbered stage position to the even-numbered stage position, to perform the ratchet operation B, and then, along with further rotation of the shift cam in the rotation direction corresponding to the transmission shifting down, the dog engagement mechanism cancels dog engagement in which power transmission from the input shaft to the odd-numbered stage hub corresponding to the odd-numbered stage is set active by the first shift fork and the third shift fork, in a process of shifting up from the even-numbered stage to the odd-numbered stage, firstly, the dog engagement mechanism sets, by dog engagement, power transmission active from the input shaft to the odd-numbered stage hub corresponding to the odd-numbered stage by the first shift fork and the third shift fork along with rotation of the shift cam in the rotation direction corresponding to the transmission shifting up, then, further rotation of the shift cam in the rotation direction corresponding to the transmission shifting up is transmitted via the synchronization mechanism so that the ratchet mechanism rotates the rotary cam in the rotation direction corresponding to the transmission shifting up from the even-numbered stage position to the odd-numbered stage position, to perform the ratchet operation C, and then, along with further rotation of the shift cam in the rotation direction corresponding to the transmission shifting up, the dog engagement mechanism cancels dog engagement in which power transmission from the input shaft to the even-numbered stage hub corresponding to the even-numbered stage is set active by the second shift fork and the fourth shift fork, and in a process of shifting down from the even-numbered stage to the odd-numbered stage, firstly, the dog engagement mechanism sets, by dog engagement, power transmission active from the input shaft to the odd-numbered stage hub corresponding to the odd-numbered stage by the first shift fork and the third shift fork along with rotation of the shift cam in the rotation direction corresponding to the transmission shifting down, then, further rotation of the shift cam in the rotation direction corresponding to the transmission shifting down is transmitted via the synchronization mechanism so that the ratchet mechanism rotates the rotary cam in the rotation direction corresponding to the transmission shifting down from the even-numbered stage position to the odd-numbered stage position, to perform the ratchet operation D, and then, along with further rotation of the shift cam in the rotation direction corresponding to the transmission shifting down, the dog engagement mechanism cancels dog engagement in which power transmission from the input shaft to the even-numbered stage hub corresponding to the even-numbered stage is set active by the second shift fork and the fourth shift fork.

17. The transmission according to claim 16, wherein
the ratchet mechanism performs a gear shifting operation for setting a gear stage to an even-numbered stage, as a gear shifting operation for setting a gear stage to a neutral position.

18. The transmission according to claim 1, wherein
the ratchet mechanism includes:
  an odd-numbered stage accelerating pawl group including a plurality of the odd-numbered stage accelerating pawls;
  an odd-numbered stage decelerating pawl group including a plurality of the odd-numbered stage decelerating pawls;
  an even-numbered stage accelerating pawl group including a plurality of the even-numbered stage accelerating pawls; and
  an even-numbered stage decelerating pawl group including a plurality of the even-numbered stage decelerating pawls, and
respective pawl groups are disposed at different positions with respect to an axial direction of the output shaft, and provided such that a plurality of pawls included in each pawl group are arranged side by side with respect to a circumferential direction of the output shaft.

19. The transmission according to claim 1, wherein
the output shaft has one end side and another end side opposite from the one end side in the axial direction of the output shaft,
the output shaft has, on the one end side, a power output part that outputs power to a drive wheel of the straddled vehicle,
the transmission includes:
  a casing that rotatably supports at least each of the input shaft and the output shaft;
  a cover member that at least partially covers, from outside of the casing, a shaft bearing and a shaft bearing hole thereof, the shaft bearing supporting the other end side of the output shaft in the casing;
  a shaft bearing that supports one end side of the input shaft in the casing;
  a clutch drive gear provided on the other end side of the output shaft with respect to the axial direction and disposed in an end portion of the input shaft so as to be coaxial with the input shaft, the clutch drive gear being configured to transmit power received from the crankshaft to the input shaft;
  an oil pump drive gear disposed between the shaft bearing and the clutch drive gear with respect to the axial direction of the input shaft so as to be coaxial with the input shaft, the oil pump drive gear being coupled to the clutch drive gear to rotate together with the clutch drive gear;
  an oil pump positioned lower than the input shaft and the output shaft in the straddled vehicle in an upright state; and
  a pump drive chain that transmits rotational power from the oil pump drive gear to the oil pump, and
the pump drive chain is bent by a chain guide part provided on the cover member.

20. The transmission according to claim 1, wherein
the transmission has six gear stages.

21. A straddled vehicle comprising the transmission according to claim 1.

22. A motorcycle comprising the transmission according to claim 1.

* * * * *